(12) United States Patent
Mills

(10) Patent No.: US 7,925,079 B1
(45) Date of Patent: Apr. 12, 2011

(54) METHOD AND SYSTEM FOR PATTERN RECOGNITION AND PROCESSING

(76) Inventor: Randell L. Mills, Newtown, PA (US)

( * ) Notice: Subject to any disclaimer, the term of this patent is extended or adjusted under 35 U.S.C. 154(b) by 1826 days.

(21) Appl. No.: 09/220,970

(22) Filed: Dec. 23, 1998

Related U.S. Application Data

(60) Provisional application No. 60/068,834, filed on Dec. 24, 1997.

(51) Int. Cl.
*G06K 9/62* (2006.01)
*G06F 15/18* (2006.01)

(52) U.S. Cl. .......................... 382/159; 706/14

(58) Field of Classification Search .................. 382/190, 382/191, 278, 279, 280, 159, 155–158, 160–161, 382/207; 706/14–16, 18, 20, 22, 38, 40, 706/44, 48, 50, 25
See application file for complete search history.

(56) References Cited

U.S. PATENT DOCUMENTS

| | | | | |
|---|---|---|---|---|
| 3,697,703 | A | | 10/1972 | Clark, Jr. et al. ............. 179/1 SA |
| 4,559,602 | A | * | 12/1985 | Bates, Jr. ...................... 364/487 |
| 4,764,973 | A | | 8/1988 | O'Hair et al. |
| 5,168,213 | A | | 12/1992 | Wardle et al. .................... 324/77 |
| 5,257,364 | A | * | 10/1993 | Melamed et al. ............. 395/500 |
| 5,274,714 | A | | 12/1993 | Hutcheson et al. |
| 5,337,264 | A | * | 8/1994 | Levien ............................ 708/300 |
| 5,459,680 | A | * | 10/1995 | Zimmerman et al. ........ 364/721 |
| 5,486,833 | A | * | 1/1996 | Barrett .......................... 342/204 |
| 5,579,436 | A | * | 11/1996 | Chou et al. ..................... 395/253 |
| 5,638,305 | A | | 6/1997 | Kobayashi et al. ............ 364/574 |
| 5,724,487 | A | * | 3/1998 | Streit .............................. 706/25 |
| 6,058,206 | A | * | 5/2000 | Kortge .......................... 382/159 |
| 6,173,275 | B1 | * | 1/2001 | Caid .............................. 706/14 |

FOREIGN PATENT DOCUMENTS

EP 0 778 541 A 6/1997

OTHER PUBLICATIONS

Gottfried, "Quantum Mechanics, vol. I", 1966, pp. 52-59, 250-252, The Benjamin/Cummings Publishing Company, Inc., Reading, MA.*
Goodstein, "States of Matter"—Statistical Thermodynamics, 1975, pp. 41-55, Dover Publications, New York.*

(Continued)

*Primary Examiner* — Wenpeng Chen
(74) *Attorney, Agent, or Firm* — Lahive & Cockfield, LLP

(57) ABSTRACT

The present invention provides a method and system for pattern recognition and processing. Information representative of physical characteristics or representations of physical characteristics is transformed into a Fourier series in Fourier space within an input context of the physical characteristics that is encoded in time as delays corresponding to modulation of the Fourier series at corresponding frequencies. Associations are formed between Fourier series by filtering the Fourier series and by using a spectral similarity between the filtered Fourier series to determine the association based on Poissonian probability. The associated Fourier series are added to form strings of Fourier series. Each string is ordered by filtering it with multiple selected filters to form multiple time order formatted subset Fourier series, and by establishing the order through associations with one or more initially ordered strings to form an ordered string. Associations are formed between the ordered strings to form complex ordered strings that relate similar items of interest. The components of the invention are active based on probability using weighting factors based on activation rates.

256 Claims, 26 Drawing Sheets

OTHER PUBLICATIONS

Young et al., "Handbook of Pattern Recognition of Image Processing", 1986, pp. 175-177&257-259 & 194-195&531-535 & 295-297 & 490-491 & 204 & 663-670, Academic Press, San Diego, CA.*

Hecht, "Optics"—3rd Edition, 1998, pp. 300-315, Addison-Wesley, New York.*

Young et al., "Handbook of Pattern Recognition & Image Processing: Computer Vision"—vol. 2, 1994, pp. 497-521, Academic Press, San Diego.*

Nadler et al., "Pattern Recognition Engineering",1993, pp. 196-223, John Wiley&Sons, New York.*

Oppenheim et al., "Signals& Systems",2nd Edition, 1997, pp. 211-223, Prentice Hall, New Jersey.*

Poularikas et al., "The Transforms & Applications Handbook", 1996, pp. 95-106, CRC Press, Boca Raton, FL.*

"Texture Analysis via Unsupervised and supervised Learning," H. Greenspan et al. IJCNN-91-Seattle International Joint Conference on Neural Networks, 1991, vole. 1, pp. 639-644.*

"Classifying Biosignals with Wavelet Networks" by Dickhaus et al, IEEE Engineering in Medicine and Biology, Sep./Oct. 1996, pp. 103-111.*

* cited by examiner

Coherent State Phase Separation φ

Coherent State Phase Separation φ

Coherent State Phase Separation φ

Cascaded Ensemble Phase Separation φ

Cascaded Ensemble Phase Separation φ

Cascaded Ensemble Phase Separation φ

Cascaded Ensemble Phase Separation φ

Association Filter Layer to Form a "String"

FIGURE 21C

"String" Ordering Layer

Recall String from Memory $$V_{\underline{\Sigma}_{s,m}}(k_\rho, k_z) = \sum_{s=1}^{S}\sum_{m=1}^{M}\sum_{n=-\infty}^{\infty} \frac{4\pi}{1+\frac{k_z^2}{k_\rho^2}} \tilde{a}_{0_{s,m}} N_{s,m_{\rho 0}} N_{s,m_{z0}} e^{-jk_\rho(\rho_{\rho_{s,m}}+\rho_{1,m})}$$

$$\sin\left(\left(k_\rho - n\frac{2\pi}{\rho_{0_{s,m}}}\right)\frac{N_{s,m_{\rho 0}}\rho_{0_{s,m}}}{2}\right)\sin\left(\left(k_z - n\frac{2\pi}{z_{0_{s,m}}}\right)\frac{N_{s,m_{z0}}z_{0_{s,m}}}{2}\right)$$

MATRIX METHOD OF ANALYSIS $$K_4 \quad K_3 \quad K_2 \quad K_1 \quad X_1 \quad X_2 \quad X_3 \quad X_4$$

*Each $K_n$; $X_n$ is a "SFCs"*

$$V_{\underline{\Sigma}_n}(k_\rho, k_z) = \sum_{m=1}^{M}\sum_{n=-\infty}^{\infty} \frac{4\pi}{1+\frac{k_z^2}{k_\rho^2}} \tilde{a}_{0_m} N_{m_{\rho 0}} N_{m_{z0}} e^{-jk_\rho(\rho_{\rho_m}+\rho_{1,m})} \sin\left(k_\rho \frac{N_{m_{\rho 0}}\rho_{0_m}}{2} - n\frac{2\pi N_{m_{\rho 0}}}{2}\right)\sin\left(k_z \frac{N_{m_{z0}}z_{0_m}}{2} - n\frac{2\pi N_{m_{z0}}}{2}\right)$$

Select and Order Each "SFCs" of the String in Fourier Space (Determine Each Time Delay, $\sqrt{\dfrac{N_s}{\alpha_s}}$, and Half - Width Parameter, $\alpha_s$ )

Via the Matrix Method of Analysis in Real Space

FIGURE 21E

Output of the Ordered "String" to Higher Level Memory Layer with Formation of the Predominant Configuration Activate Each "SFCs" With Its "Known" Gaussian Filter Filter Is Based On Coupling Probability where $$V_{\sum_{s,m}}(k_\rho, k_z) = \sum_{s=1}^{S} \sum_{m=1}^{M_s} \sum_{n=-\infty}^{\infty} \frac{4\pi}{1 + \frac{k_z^2}{k_\rho^2}} a_{0_{s,m}} N_{s,m_{\rho_0}} N_{s,m_{\rho_u}} N_{s,m_{z_0}} e^{-\frac{1}{2}\left(v_{\rho 0}\frac{k_\rho}{\alpha_{\rho 0}}\right)^2} e^{-\sqrt{\frac{N_{\rho 0}}{\alpha_{\rho 0}}}(v_{\rho 0}k_\rho)} e^{-\frac{1}{2}\left(v_{z0}\frac{k_z}{\alpha_{z0}}\right)^2} e^{-\sqrt{\frac{N_{z0}}{\alpha_{z0}}}(v_{z0}k_z)}$$

$$e^{-jk_\rho\left(\rho_{\theta_{s,m}} + \rho_{t_{s,m}}\right)} \sin\left(\left(k_\rho - n\frac{2\pi}{\rho_{0_{s,m}}}\right)\frac{N_{s,m_{\rho_0}}\rho_{0_{s,m}}}{2}\right) \sin\left(\left(k_z - n\frac{2\pi}{v_{s,m}t_{0_{s,m}}}\right)\frac{N_{s,m_{z_0}}z_{0_{s,m}}}{2}\right)$$

$\Downarrow$ $K_8 \quad K_7 \quad K_6 \quad K_5 \quad K_4 \quad K_3 \quad K_2 \quad K_1$

*String with the Correct Order of Its Elements —*
*Each a "SFCs"*

$\Downarrow$

New "P String" is Integrated into the
Predominant Configuration

US 7,925,079 B1

METHOD AND SYSTEM FOR PATTERN RECOGNITION AND PROCESSING

CROSS REFERENCE TO RELATED APPLICATIONS

This application claims the benefit of U.S. provisional application Ser. No. 60/068,834, filed Dec. 24, 1997.

BACKGROUND OF THE INVENTION

Attempts have been made to create pattern recognition systems using programming and hardware. The state of the art includes neural nets. Neural nets typically comprise three layers—an input layer, a hidden layer, and an output layer. The hidden layer comprises a series of nodes which serve to perform a weighted sum of the input to form the output. Output for a given input is compared to the desired output, and a back projection of the errors is carried out on the hidden layer by changing the weighting factors at each node, and the process is reiterated until a tolerable result is obtained. The strategy of neural nets is analogous to the sum of least squares algorithms. These algorithms are adaptive to provide reasonable output to variations in input, but they can not create totally unanticipated useful output or discover associations between multiple inputs and outputs. Their usefulness to create novel conceptual content is limited; thus, advances in pattern recognition systems using neural nets is limited.

SUMMARY OF THE INVENTION

The present invention is directed to a method and system for pattern recognition and processing involving processing information in Fourier space.

The system of the present invention includes an Input Layer for receiving data representative of physical characteristics or representations of physical characteristics capable of transforming the data into a Fourier series in Fourier space. The data is received within an input context representative of the physical characteristics that is encoded in time as delays corresponding to modulation of the Fourier series at corresponding frequencies. The system includes a memory that maintains a set of initial ordered Fourier series. The system also includes an Association Layer that receives a plurality of the Fourier series in Fourier space including at least one ordered Fourier series from the memory and forms a string comprising a sum of the Fourier series and stores the string in memory. The system also includes a String Ordering Layer that receives the string from memory and orders the Fourier series contained in the string to form an ordered string and stores the ordered string in memory. The system also includes a Predominant Configuration Layer that receives multiple ordered strings from the memory, forms complex ordered strings comprising associations between the ordered strings, and stores the complex ordered strings to the memory. The components of the system are active based on probability using weighting factors based on activation rates.

Another aspect of the present invention is directed to ordering a string representing the information. This aspect of the invention utilizes a High Level Memory section of the memory that maintains an initial set of ordered Fourier series. This aspect of the invention includes obtaining a string from the memory and selecting at least two filters from a selected set of filters stored in the memory. This aspect also includes sampling the string with the filters such that each of the filters produce a sampled Fourier series. Each Fourier series comprises a subset of the string. This aspect also includes modulating each of the sampled Fourier series in Fourier space with the corresponding selected filter such that each of the filters produce an order formatted Fourier series. Furthermore, this aspect includes adding the order formatted Fourier series produced by each filter to form a summed Fourier series in Fourier space, obtaining an ordered Fourier series from the memory, determining a spectral similarity between the summed Fourier series and the ordered Fourier series, determining a probability expectation value based on the spectral similarity, and generating a probability operand having a value selected from a set of zero and one, based on the probability expectation value. These steps are repeated until the probability operand has a value of one. Once the probability operand has a value of one, this aspect includes storing the summed Fourier series to an intermediate memory section. Thereafter, this aspect includes removing the selected filters from the selected set of filters to form an updated set of filters, removing the subsets from the string to obtain an updated string, and selecting an updated filter from the updated set of filters. This aspect further includes sampling the updated string with the updated filter to produce a sampled Fourier series comprising a subset of the string, modulating the sampled Fourier series in Fourier space with the corresponding selected updated filter to produce an updated order formatted Fourier series, recalling the summed Fourier series from the intermediate memory section, adding the updated order formatted Fourier series to the summed Fourier series to form an updated summed Fourier series in Fourier space, and obtaining an updated ordered Fourier series from the memory. This aspect further includes determining a spectral similarity between the updated summed Fourier series and the updated ordered Fourier series, determining a probability expectation value based on the spectral similarity, and generating a probability operand having a value selected from a set of zero and one, based on the probability expectation value. These steps are repeated until the probability operand has a value of one or all of the updated filters have been selected from the updated set of filters. If all of the updated filters have been selected before the probability operand has a value of one, then clearing the intermediate memory section and repeating the steps starting with selecting at least two filters from a selected set of filters. Once the probability operand has a value of one, the updated summed Fourier series is stored to the intermediate memory section and steps beginning with removing the selected filters from the selected set of filters to form an updated set of filters are repeated until one of the following set of conditions is satisfied: the updated set of filters is empty or the remaining subsets of the string is nil. If the remaining subsets of the string is nil, then the Fourier series in the intermediate memory section is stored in the High Level Memory section of the memory.

Another aspect of the present invention is directed to forming complex ordered strings by forming associations between a plurality of ordered strings. This aspect of the invention includes recording ordered strings to the High Level Memory section, forming associations of the ordered strings to form complex ordered strings, and recording the complex ordered strings to the High Level Memory section. A further aspect of the invention is directed to forming a predominant configuration based on probability. This aspect of the invention includes generating an activation probability parameter, storing the activation probability parameter in the memory, generating an activation probability operand having a value selected from a set of zero and one, based on the activation probability parameter, activating any one or more components of the present invention such as matrices representing functions, data parameters, Fourier components, Fourier series, strings, ordered strings, components of the Input Layer, components of the Association Layer, components of the String Ordering Layer, and components of the Predominant Configuration Layer, the activation of each component being based on the corresponding activation probability parameter, and weighting each activation probability parameter based on an activation rate of each component.

DETAILED DESCRIPTION OF THE INVENTION

A Fourier series in Fourier space is a sum of trigonometric functions in frequency space where each variable is frequency and the parameters of the Fourier series are input data or processed input data.

A probability operand is a system that returns a binary number in response to a probability-expectation-value or activation-probability-parameter input according to a specific statistic. The value of the operand causes a specific action, such as adding Fourier series to form a string, storing a summed Fourier series to memory, or activating a component of the system.

The present invention is directed to systems and methods for performing pattern recognition and association based upon receiving, storing, and processing information. The information is based upon physical characteristics or representations of physical characteristics and a relationship of the physical characteristics, hereinafter referred to as physical context, of an item of interest. The physical characteristics and physical context serve as a basis for stimulating a transducer. The transducer converts an input signal representative of the physical characteristics and the physical context into the information for processing. The information is data and an input context. The data is representative of the physical characteristics or the representations of physical characteristics and the input context corresponds to the physical context based upon the identity of a specific transducer and its particular transducer elements. The physical context maps on a one to one basis to the input context. The information defines a Fourier series in Fourier space that represents the item of interest. In other words, a Fourier series in Fourier space represents the information parameterized according to the data and the input context. In addition, the input context maps on a one to one basis to an Input Layer section of a memory. Thus, there is a one to one map of physical context to input context to Input Layer section of a memory. The representation of information as a Fourier series in Fourier space allows for the mapping.

Figure 1:
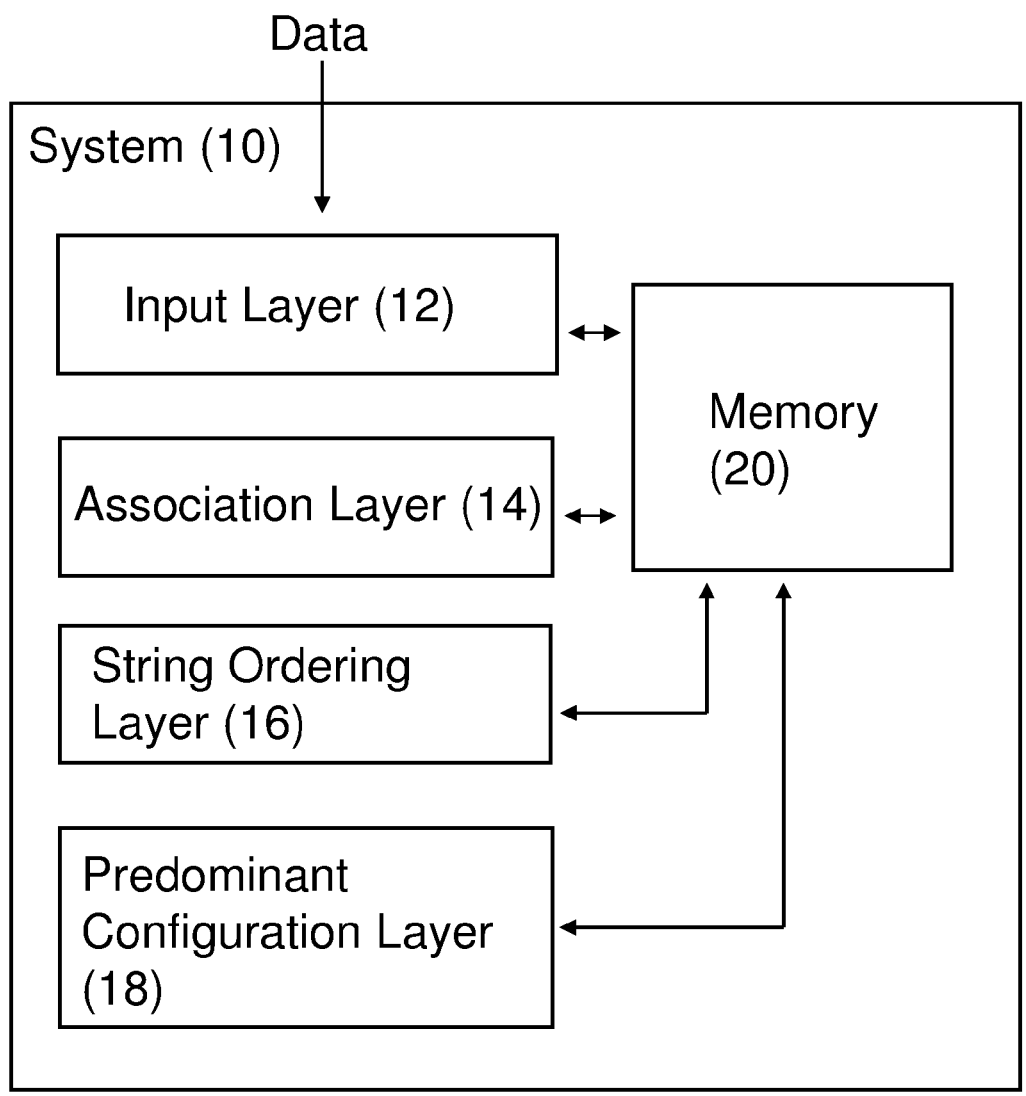
FIG. 1 is a high level block diagram illustrating an embodiment of the present invention.

As illustrated in FIG. 1, at a high level, the system 10 includes several function specific layers. These include an Input Layer 12, an Association Layer 14, an String Ordering Layer 16 and a Predominant Configuration Layer 18. The Input Layer 12 receives the data within the input context and transforms the data into the Fourier series in Fourier space representative of the information. The system 10 also includes a memory 20 for storing information. The Input Layer 12 also encodes the input context as delays in time corresponding to a modulation factor of the Fourier series at corresponding frequencies. The Association Layer 14 receives a plurality of Fourier series in Fourier space, including at least one ordered Fourier series from the memory 20, forms a string comprising a sum of the Fourier series and stores the string to the memory 20. The String Ordering Layer 16 receives the string from the memory 20, orders the Fourier series contained in the string to form an ordered string and stores the ordered string in the memory 20. The Predominant Configuration Layer 18 receives multiple ordered strings from the memory 20, forms associations between the ordered strings to form a complex ordered string, also referred to as a predominant configuration string, and stores the predominant configuration string to the memory 20. The memory 20 may be partitioned in several distinct sections for storing different types of information or distinctly classified types of information. Specifically, the memory may include a High Level Memory section, an intermediate level memory section, etc. as will be described in more detail below.

The following example illustrates how the present invention processes the physical characteristics of an item of interest, specifically a triangle. In flat geometry, the physical characteristics of a triangle are three connected lines at angles aggregating to 180°. The physical characteristics provide spatial variations of light scattering. In one embodiment, a light responsive transducer (not shown) of the system 10 transduces the light scattering into the data. An exemplary transducer is a charge coupled device ("CCD") array. One data element at a point in time may be a voltage of a particular CCD element of the CCD array. Each CCD element of the CCD array has a spatial identity. The physical context for the triangle is the relationship of the lines at the corresponding angles providing a spatial variation of light scattering. The input context is the identity of each CCD element that responds according to the physical context. For example, a CCD element (100,13) of a 512 by 512 CCD array will uniquely respond to light scattered by the lines and angular relations of the triangle relative to the other CCD elements of the CCD array. The response is stored in a specific memory register of an Input Layer section of the memory 20. The specific memory register is reflective of the input context. In the present invention, a Fourier series in Fourier space represents the information of the triangle parameterized according to the voltage and the CCD element identity.

Figure 2:
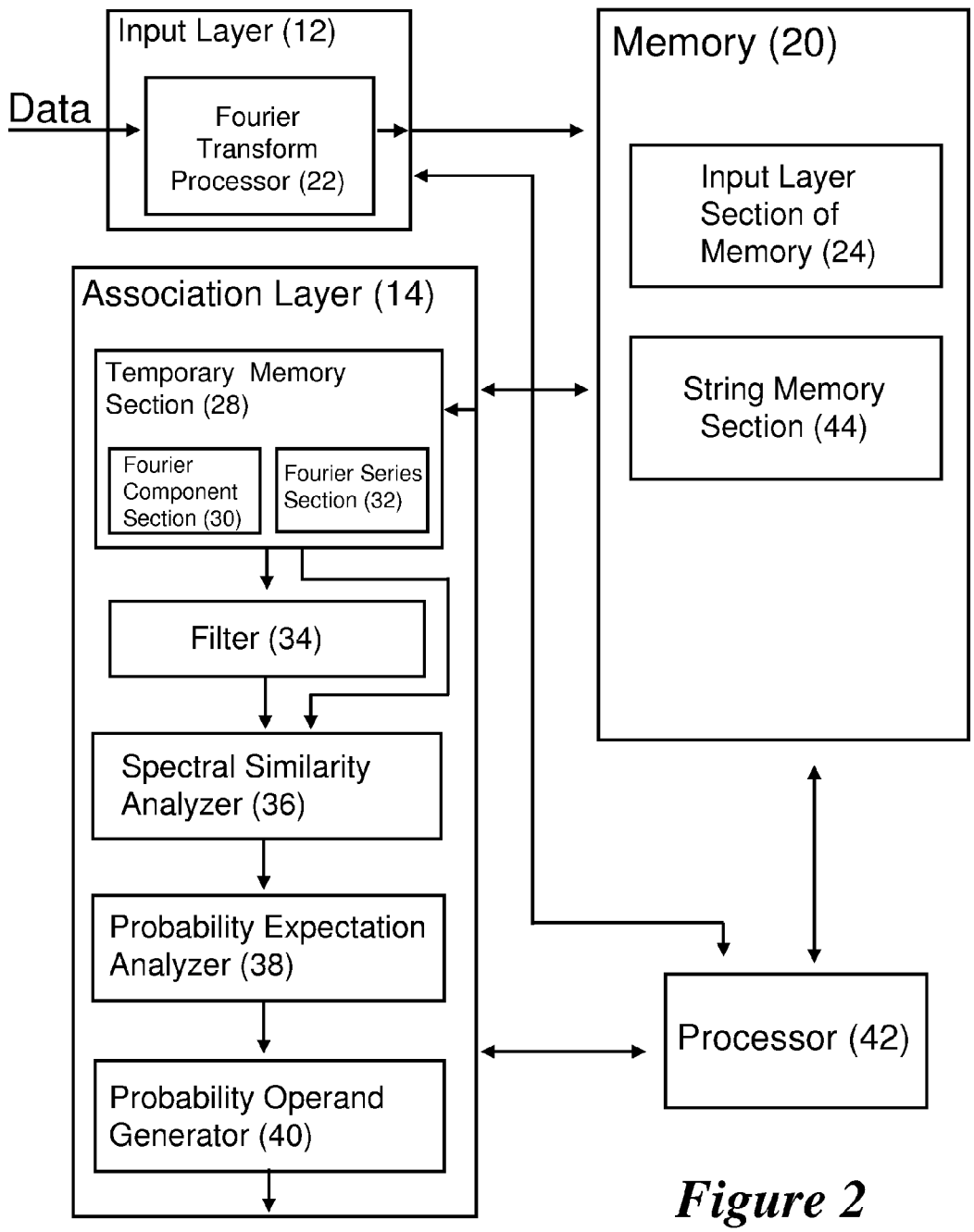
FIG. 2 is a detailed block diagram illustrating an Input Layer, an Association Layer, and a memory layer of the embodiment of FIG. 1.

Referring to FIG. 2, in the first step, the Input Layer 12 receives the data from the transducer (not shown). A Fourier transform processor 22 encodes each data element as parameters of a Fourier component in Fourier space and stores the data parameter values to the Input Layer section 24 of the memory 20. Each Fourier component of the Fourier series may comprise a quantized amplitude, frequency, and phase angle. For example the Fourier series in Fourier space may be:

$$\sum_{m=1}^{M} \sum_{n=-\infty}^{\infty} \frac{4\pi}{1+\frac{k_z^2}{k_\rho^2}} a_{0_m} N_{m_{\rho 0}} N_{m_{z 0}} \sin\left(\left(k_\rho - n\frac{2\pi}{\rho_{0_m}}\right)\frac{N_{m_{\rho 0}} \rho_{0_m}}{2}\right)$$

$$\sin\left(\left(k_z - n\frac{2\pi}{z_{0_m}}\right)\frac{N_{m_{z 0}} z_{0_m}}{2}\right)$$

having a quantized amplitude, frequency, and phase angle, wherein $a_{0_m}$ is a constant, $k_\rho$ and $k_z$ are the frequency variables, n, m, and M are integers, and $N_{m_{\rho 0}}$, $N_{m_{z 0}}$, $\rho_{O_m}$, and $z_{O_m}$ are the data parameters.

Figure 3:
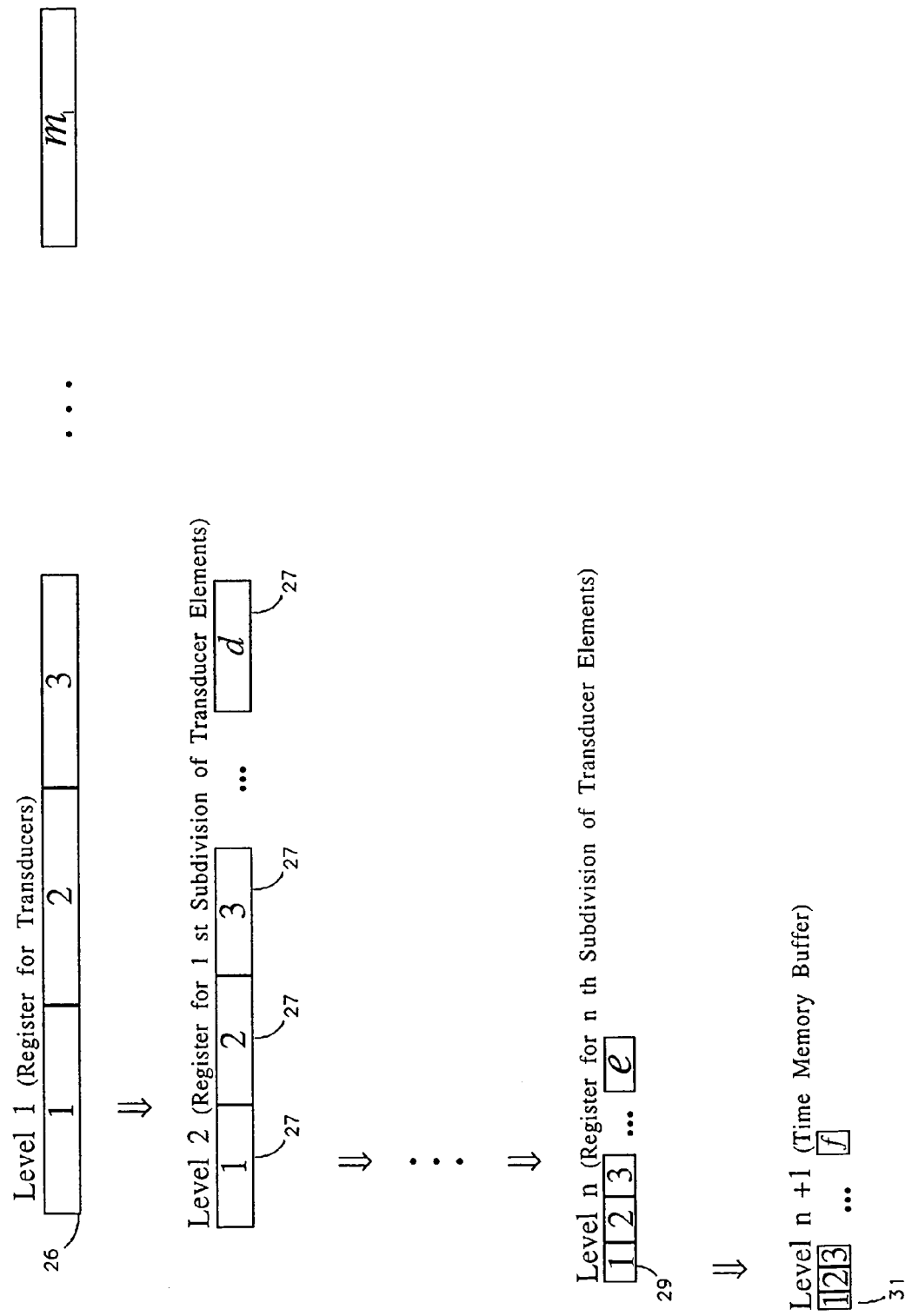
FIG. 3 is a flow diagram of an exemplary transducer data structure of a time delay interval subdivision hierarchy wherein the data from a transducer having n levels of subcomponents numbering integer m per level is assigned a master time interval with n+1 sub time intervals in a hierarchical manner wherein the data stream from the final n th level transducer element is recorded as a function of time in the n+1 th time coded sub memory buffer in accordance with the present invention.

In a first embodiment, the data parameters $N_{m_{\rho 0}} N_{m_{z 0}}$ of the Fourier series component are proportional to the rate of change of the physical characteristic. Each of the data parameters $\rho_{O_m}$ and $z_{O_m}$ of each Fourier component is inversely proportional to the amplitude of the physical characteristic. In the triangle example, the amplitude of the voltage at a given CCD element relative to the neighboring CCD element defines the rate of change of the voltage which is converted into the data parameters $N_{m_{\rho 0}}$ and $N_{m_{z 0}}$. The inverse of the amplitude of the voltage of each CCD element is converted into the data parameters $\rho_{O_m}$ and $z_{O_m}$. As illustrated in FIG. 3 and described above, for each CCD element, the Fourier series, parameterized accordingly, are stored to a specific sub register 27 of a specific register 26 of the Input Layer section 24 of the memory 20. Since the structure of a Fourier series is known in the art, only the parameters need to be stored in a digital embodiment.

The number and types of transducers that may supply information to the system is only limited by available technology, hardware and economics, as is the number m of corresponding registers 26 for each transducer. Each register 26 may have any number d of subregisters 27, where the number d of subregisters of one register 26 is not necessarily the same as other registers 26. For example, "Level 1" register "1" may have thirty "Level 2" subregisters 27 and "Level 1" register "2" may have one-hundred subregisters 27. Furthermore, each "Level 2" register may have any number e of subregisters, where the number e of subregisters of one register 27 is not necessarily the same as other registers 27. For example, "Level 2" register "1" may have fifty "Level n" subregisters 29 and "Level 2" register "2" may have seventy "Level n" subregisters 29. Still further, each "Level n" register 29 may have any number f of time buffer elements 31, where the number f of time buffer elements 31 is not necessarily the same as other time buffer elements 31.

In a second embodiment, each of the data parameters and $N_{m_{z 0}}$ of the Fourier series component is proportional to the amplitude of the physical characteristic. Each of the data parameters $\rho_{O_m}$ and $z_{O_m}$ of each Fourier component is inversely proportional to the rate of change of the physical characteristic. As in the first embodiment, for each CCD element, these parameters are stored in a specific sub register of the Input Layer section of the memory.

In a third embodiment, each of the data parameters $N_{m_{\rho 0}}$ and $N_{m_{z 0}}$ of the Fourier series component is proportional to the duration of the signal response of each transducer. Each of the data parameters $\rho_{O_m}$ and $z_{O_m}$ of each Fourier component is inversely proportional to the physical characteristic. As in the first embodiment, for each CCD element, these parameters are stored in a specific sub register of the Input Layer section of the memory.

As an alternative example, the Fourier series in Fourier space may be:

$$\sum_{m=1}^{M} \sum_{n=-\infty}^{\infty} \frac{4\pi}{1+\frac{k_z^2}{k_\rho^2}} \frac{4}{\rho_{0_m} z_{0_m}} a_{0_m} \sin\left(\left(k_\rho - n\frac{2\pi}{\rho_{0_m}}\right)\frac{N_{m_{\rho 0}} \rho_{0_m}}{2}\right)$$

$$\sin\left(\left(k_z - n\frac{2\pi}{z_{0_m}}\right)\frac{N_{m_{z 0}} z_{0_m}}{2}\right)$$

having a quantized frequency, and phase angle, wherein $a_{0_m}$ is a constant, $k_\rho$ and $k_z$ are the frequency variables, n, m, and M are integers, and $N_{m_{\rho 0}}$, $N_{m_{z 0}}$, $\rho_{O_m}$, and $z_{O_m}$ are the data parameters. As described with respect to the previous example, for each CCD element, these parameters are stored in a specific sub register of the Input Layer section of the memory.

The physical context is conserved by mapping with a one to one basis between the physical context and the input context based on the identity of each transducer. The input context is conserved by mapping on a one to one basis to the Input Layer section 24 of memory 20. In an embodiment, the input context is encoded in time as a characteristic modulation frequency band in Fourier space of the Fourier series. The characteristic modulation frequency band in Fourier space represents the input context according to the identity of a specific transducer of the relationship of two transducer elements. The modulation within each frequency band may encode not only input context but context in a general sense. The general context may encode temporal order, cause and effect relationships, size order, intensity order, before-after order, top-bottom order, left-right order, etc. all of which are relative to the transducer.

Still referring to FIG. 3, the transducer has n levels of subcomponents. Each transducer is assigned a portion 26 of the Input Layer section 24 of the memory 20. The memory 20 is arranged in a hierarchical manner. Specifically, the memory is divided and assigned to correspond to a master time interval with n+1 sub time intervals. The hierarchy parallels the n levels of the transducer subcomponents. The n th level transducer sub component provides a data stream to the system 10. The data stream is recorded as a function of time in the n+1 sub time interval. The time intervals represent time delays which correspond to the characteristic modulation frequency band in Fourier space which in turn represents the input context according to the specific transducer or transducer subcomponent.

An exemplary complex transducer which may be represented by a data structure comprising a hierarchical set of time delay intervals is a CCD array of a video camera comprising a multitude of charge coupled devices (CCDs). Each CCD comprises a transducer element and is responsive to light intensity of a given wavelength band at a given spatial location in a grid. Another example of a transducer is an audio recorder comprising transducer elements each responsive to sound intensity of a given frequency band at a given spatial location or orientation. A signal within the band 300-400 MHz may encode and identify the signal as a video signal; whereas, a signal within the band 500-600 MHz may encode and identify the signal as an audio signal. Furthermore, a video signal within the band 315-325 MHz may encode and identify the signal as a video signal as a function of time of CCD element (100,13) of a 512 by 512 array of CCDs.

In one embodiment, the characteristic modulation having a frequency within the band in Fourier space is represented by $e^{-j2\pi f t_0}$. The modulation corresponds to the time delay $\delta(t-t_0)$ wherein f is the frequency variable, t is the time variable, and $t_0$ is the time delay. The characteristic modulation is encoded as a delay in time by storing the Fourier series in a specific portion of the Input Layer section of the memory wherein the specific portion has n+1 sub time intervals. Each sub time interval corresponds to a frequency band.

In an alternative embodiment, the characteristic modulation, having a frequency within the band is represented by $$e^{-jk_\rho(\rho_{fb_m}+\rho_{t_m})}.$$

Thus, the Fourier series in Fourier space may be:

$$\sum_{m=1}^{M}\sum_{n=-\infty}^{\infty} \frac{4\pi}{1+\frac{k_z^2}{k_\rho^2}} a_{0_m} N_{m_{\rho 0}} N_{m_{z 0}} e^{-jk_\rho(\rho_{fb_m}+\rho_{t_m})}$$

$$\sin\left(k_\rho \frac{N_{m_{\rho 0}}\rho_{0_m}}{2}-n\frac{2\pi N_{m_{\rho 0}}}{2}\right)\sin\left(k_z \frac{N_{m_{z 0}}z_{0_m}}{2}-n\frac{2\pi N_{m_{z 0}}}{2}\right)$$

wherein $\rho_{t_m}=v_{t_m}t_{t_m}$ is the modulation factor which corresponds to the physical time delay $t_{t_m}$, $\rho_{fb_m}=v_{fb_m}t_{fb_m}$ is the modulation factor which corresponds to the specific transducer time delay $t_{fb_m}$, $v_{t_m}$ and $v_{fb_m}$ are constants such as the signal propagation velocities, $a_{0_m}$ is a constant, $k_\rho$ and $k_z$ are the frequency variables, n, m, and M are integers, and $N_{m_{\rho 0}}$, $N_{m_{z 0}}$, $\rho_{0_m}$, and $z_{0_m}$ are data parameters. The data parameters are selected in the same manner as described above.

Transducer strings may be created by obtaining a Fourier series from at least two selected transducers and adding the Fourier series. Transducers that are active simultaneously may be selected. The transducer string may be stored in a distinct memory location of the memory. The characteristic modulation, having a frequency within the band in Fourier space can be represented by $e^{-j2\pi f t_0}$ which corresponds to the time delay $\delta(t-t_0)$ wherein f is the frequency variable, t is the time variable, and $t_0$ is the time delay.

Recalling any part of the transducer string from the distinct memory location may thereby cause additional Fourier series of the transducer string to be recalled. In other words the Fourier series are linked. Fourier series, in addition to those of transducer strings may be linked. In order to achieve linking of the Fourier series, the system generates a probability expectation value that recalling any part of one of the Fourier series from the memory causes at least another Fourier series to be recalled from the memory. The system stores the probability expectation value to memory. The system generates a probability operand having a value selected from a set of zero and one, based on the probability expectation value. The system recalls at least another Fourier series from the memory if the operand is one. The probability expectation value may increase with a rate of recalling any part of any of the Fourier series.

The system may be initialized by learning. The relationship between the data and the data parameters such as $\rho_{0_m}$ and $N_{m_{\rho 0}}$ of each component of the Fourier series is learned by the system by applying standard physical signals. In the case of the triangle example, the standard physical signals are the scattered light from the physical characteristics of the triangle. The physical signals are applied to each transducer together with other information that is associated with the standard. A data base is established. This information that is associated with the standard is recalled and comprises input into the Association Layer and the String Ordering Layer.

The data parameters and the input context are established and stored in the Input Layer section 24 of the memory 20.

Referring again to FIG. 2, several parameterized Fourier components are input to the Association Layer to form associations of the Fourier series. The Fourier components may be stored in a Fourier component section 30 of a temporary memory section 28. The Fourier components are added to form multiple Fourier series which in turn may be stored in a Fourier series section 32 of the temporary memory section 28. At least one of the Fourier series stored in the Fourier series section 32 is input to a filter 34 wherein the filter 34 samples and modulates the Fourier series. The filtered Fourier series is input to a spectral similarity analyzer 36. The spectral similarity analyzer 36 determines the spectral similarity between the filtered Fourier series and another Fourier series stored in the Fourier series section 32 of the temporary memory section 28. A spectral similarity value is output from the spectral similarity analyzer 36 and input to a probability expectation analyzer 38. The probability expectation analyzer 38 determines a probability expectation value based on the spectral similarity value. The probability expectation value output from the probability expectation analyzer 38 is input to a probability operand generator 40. The probability operand generator 40 generates a probability operand value of one or zero based upon the probability expectation value. The probability operand value is output to a processor 42. If the probability operand value is zero, the processor 42 sends another Fourier series from the Fourier series section 32 of the temporary memory section 28 to the filter 34 and begins the process again. If the probability operand value is one, the filtered Fourier series and the other Fourier series are added to form a string and the string is stored in a string memory section 44.

The filter 34 can be a time delayed Gaussian filter in the time domain. The filter may be characterized in time by:

$$\frac{\alpha}{\sqrt{2\pi}} e^{-\frac{\left(t - \frac{\sqrt{N}}{\alpha}\right)^2}{\frac{2}{\alpha^2}}}$$

wherein $$\frac{\sqrt{N}}{\alpha}$$

is a delay parameter, $\alpha$ is a half-width parameter, and t is the time parameter. The Gaussian filter may comprise a plurality of cascaded stages each stage having a decaying exponential system function between stages. The filter, in frequency space, can be characterized by:

$$e^{-\frac{1}{2}\left(\frac{2\pi f}{\alpha}\right)^2} e^{-j\sqrt{N}\left(\frac{2\pi f}{\alpha}\right)}$$

wherein $$\frac{\sqrt{N}}{\alpha}$$

and $\alpha$ are a corresponding delay parameter and a half-width parameter in time, respectively, and f is the frequency parameter. The probability distribution may be Poissonian. Thus, the probability expectation value can be based upon Poissonian probability. The probability expectation value may be characterized by $$\prod_s \left[ p_{\uparrow_s} + (P - p_{\uparrow_s}) \exp\left[ -\beta_s^2 \left( \frac{1 - \cos 2\phi_s}{2} \right) \right] \cos(\delta_s + 2\sin\phi_s) \right]$$

wherein P is the maximum probability of at least one other Fourier series being associated with a first Fourier series, $p_{\uparrow_s}$ is a probability of at least one other Fourier series being associated with a first Fourier series in the absence of coupling of the first Fourier series with the at least one other Fourier series, $\beta_s^2$ is a number that represents the amplitude of spectral similarity between at least two filtered or unfiltered Fourier series, $\phi_s$ represents the frequency difference angle between at least two filtered or unfiltered Fourier series, and $\delta_s$, is a phase factor. $\beta_s^2$ may be characterized by $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} a_{0_{m_s}} N_{m_s} \exp\left\{ -\frac{\left( \frac{\alpha_1^2 \alpha_s^2}{\alpha_1^2 + \alpha_s^2} \left( \frac{\sqrt{N_1}}{\alpha_1} - \frac{\sqrt{N_s}}{\alpha_s} + \frac{N_{m_1} \rho_{0_{m_1}}}{2v_{m_1}} - \frac{N_{m_s} \rho_{0_{m_s}}}{2v_{m_s}} \right) \right)^2}{2} \right\}$$

$$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}$ and $a_{0_{m_s}}$ are constants, $v_{m_1}$ and $v_{m_s}$ are constants such as the signal propagation velocities, and $N_{m_1}$, $N_{m_s}$, $\rho_{0_{m_1}}$ and $\rho_{0_{m_s}}$ are data parameters. The data parameters are selected in the same manner as described above. $\phi_s$ may be characterized by $$\phi_s = \frac{\pi \left( \frac{\sqrt{N_1}}{\alpha_1} - \frac{\sqrt{N_s}}{\alpha_s} + \sum_{m_1=1}^{M_1} \frac{N_{m_1} \rho_{0_{m_1}}}{2v_{m_1}} - \sum_{m_s=1}^{M_s} \frac{N_{m_s} \rho_{0_{m_s}}}{2v_{m_s}} \right)}{\frac{\sqrt{N_1}}{\alpha_1} + \sum_{m_1=1}^{M_1} \frac{N_{m_1} \rho_{0_{m_1}}}{2v_{m_1}}}$$

$$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}$ and $a_{0_{m_s}}$ are constants, $v_{m_1}$ and $v_{m_s}$ are constants such as the signal propagation velocities, and $N_{m_1}$, $N_{m_s}$, $\rho_{0_{m_1}}$ and $\rho_{0_{m_s}}$ are data parameters. The data parameters are selected in the same manner as described above.

An exemplary string with a characteristic modulation having a frequency within the band represented by $$e^{-jk_\rho(\rho_{fb_{s,m}}+\rho_{s_m})}$$

is:

$$\sum_{s=1}^{S}\sum_{m=1}^{M_s}\sum_{m=-\infty}^{\infty}\frac{4\pi}{1+\frac{k_z^2}{k_\rho^2}}a_{0_{s,m}}N_{s,m_{\rho_0}}N_{s,m_{z_0}}e^{-jk_\rho(\rho_{fb_{s,m}}+\rho_{t_{s,m}})}$$

$$\sin\left(\left(k_\rho-n\frac{2\pi}{\rho_{0_{s,m}}}\right)\frac{N_{s,m_{\rho_0}}\rho_{0_{s,m}}}{2}\right)\sin\left(\left(k_z-n\frac{2\pi}{z_{0_{s,m}}}\right)\frac{N_{s,m_{z_0}}z_{0_{s,m}}}{2}\right)$$

wherein $\rho_{t_{s,m}}=v_{t_{s,m}}t_{t_{s,m}}$ is the modulation factor which corresponds to the physical time delay $t_{t_{s,m}}$, $\rho_{fb_{s,m}}=v_{fb_{s,m}}t_{fb_{s,m}}$ is the modulation factor which corresponds to the specific transducer time delay $t_{fb_{s,m}}$, $v_{t_{s,m}}$ and $v_{fb_{s,m}}$ are constants such as the signal propagation velocities, $a_{0_{s,m}}$ is a constant, $k_\rho$ and $k_z$ are the frequency variables, n, m, s, $M_s$, and S are integers, and $N_{s,m_{\rho_0}}$, $N_{s,m_{z_0}}$, $\rho_{0_{s,m}}$, and $z_{0_{s,m}}$ are data parameters. The data parameters are selected in the same manner as described above.

An exemplary string with each Fourier series multiplied by the Fourier transform of the delayed Gaussian filter represented by $$e^{-\frac{1}{2}\left(v_{sp0}\frac{k_\rho}{\alpha_{sp0}}\right)^2}e^{-j\frac{\sqrt{N_{sp0}}}{\alpha_{sp0}}(v_{sp0}k_\rho)}e^{-\frac{1}{2}\left(v_{sz0}\frac{k_z}{\alpha_{sz0}}\right)^2}e^{-j\frac{\sqrt{N_{sz0}}}{\alpha_{sz0}}(v_{sz0}k_z)}$$

that established the association to form the string is:

$$\sum_{s=1}^{S}\sum_{m=1}^{M_s}\sum_{n=-\infty}^{\infty}\frac{4\pi}{1+\frac{k_z^2}{k_\rho^2}}a_{0_{s,m}}N_{s,m_{\rho_0}}N_{s,m_{z_0}}e^{-\frac{1}{2}\left(v_{sp0}\frac{k_\rho}{\alpha_{sp0}}\right)^2}e^{-j\frac{\sqrt{N_{sp0}}}{\alpha_{sp0}}(v_{sp0}k_\rho)}e^{-\frac{1}{2}\left(v_{sz0}\frac{k_z}{\alpha_{sz0}}\right)^2}e^{-j\frac{\sqrt{N_{sz0}}}{\alpha_{sz0}}(v_{sz0}k_z)}$$

$$e^{-jk_\rho(\rho_{fb_{s,m}}+\rho_{t_{s,m}})}\sin\left(\left(k_\rho-n\frac{2\pi}{\rho_{0_{s,m}}}\right)\frac{N_{s,m_{\rho_0}}\rho_{0_{s,m}}}{2}\right)\sin\left(\left(k_z-n\frac{2\pi}{v_{s,m}t_{0_{s,m}}}\right)\frac{N_{s,m_{z_0}}z_{0_{s,m}}}{2}\right)$$

wherein $v_{sp0}$ and $v_{sz0}$ are constants such as the signal propagation velocities in the $\rho$ and z directions, respectively, $$\frac{\sqrt{N_{s\rho 0}}}{\alpha_{s\rho 0}} \text{ and } \frac{\sqrt{N_{sz0}}}{\alpha_{sz0}}$$

are delay parameters and $\alpha_{sp0}$ and $\alpha_{sz0}$ are half-width parameters of a corresponding Gaussian filter in the $\rho$ and z directions, respectively, $\rho_{t_{s,m}}=v_{t_{s,m}}t_{t_{s,m}}$ is the modulation factor which corresponds to the physical time delay $t_{t_{s,m}}$, $\rho_{fb_{s,m}}=v_{fb_{s,m}}t_{fb_{s,m}}$ is the modulation factor which corresponds to the specific transducer time delay $t_{fb_{s,m}}$, $v_{t_{s,m}}$ and $v_{fb_{s,m}}$ are constants such as the signal propagation velocities, $a_{0_{s,m}}$ is a constant, $k_\rho$ and $k_z$ are the frequency variables, n, m, s, $M_s$, and S are integers, and $N_{s,m_{\rho_0}}$, $N_{s,m_{z_0}}$, $\rho_{0_{s,m}}$, and $z_{0_{s,m}}$ are data parameters. The data parameters are selected in the same manner as described above.

Therein, the Association Layer forms associations between Fourier series and sums the associated Fourier series to form a string. The string is then stored in the string memory section.

Figure 4:
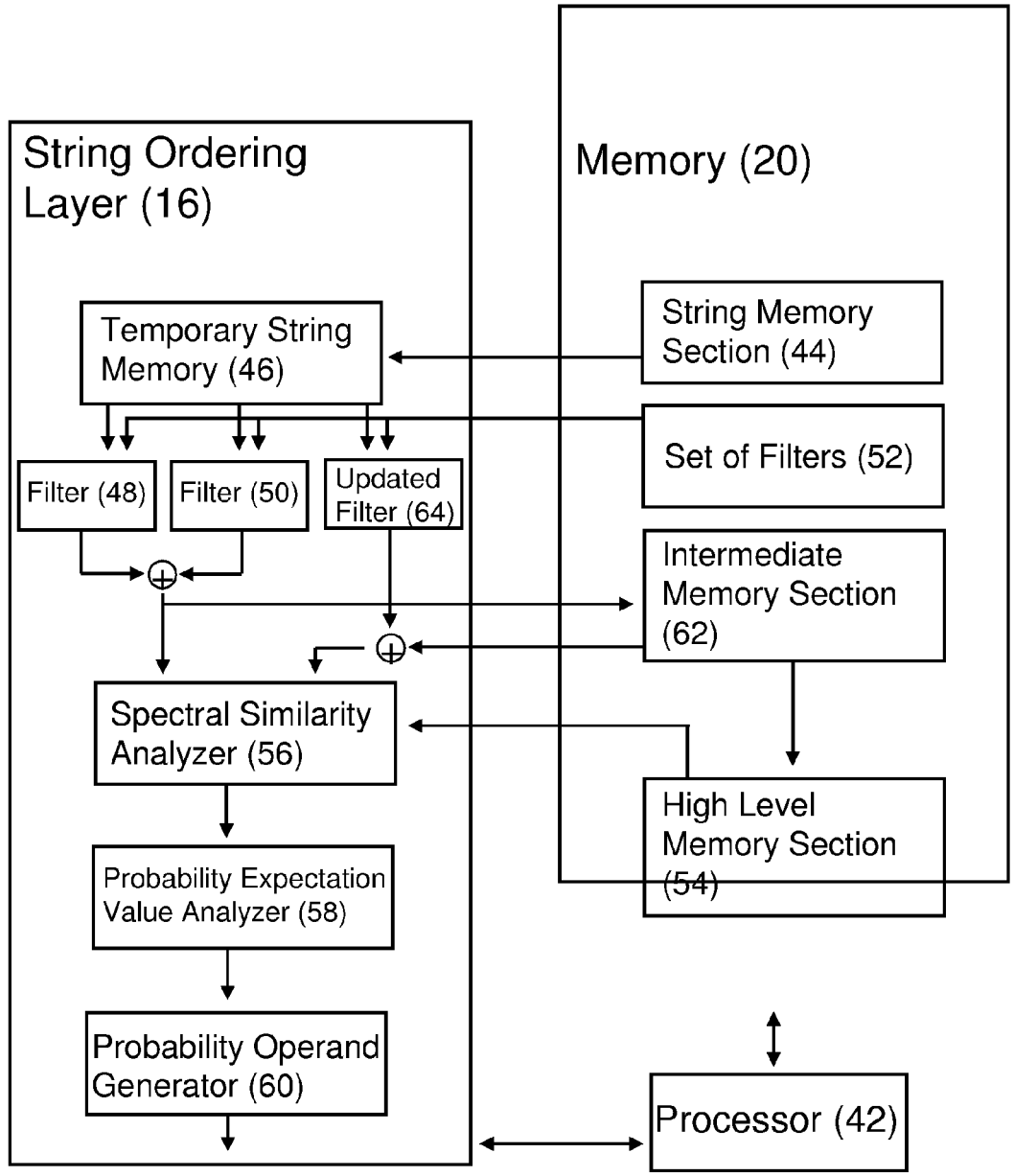
FIG. 4 is a detailed block diagram illustrating an String Ordering Layer and the memory layer of the embodiment of FIG. 1.

The next aspect of the present invention is the ordering of the strings stored in the string memory section 44. The ordering may be according to any one of the following: temporal order, cause and effect relationships, size order, intensity order, before-after order, top-bottom order, or left-right order. Referring to FIG. 4, the method for ordering the strings stored in the string memory section 44 entails the following:

a.) obtaining a string from the string memory section 44 and storing the string to a temporary string memory section 46;

b.) selecting at least two filters 48, 50 from a selected set of filters 52;

c.) sampling the string with the filters 48, 50, each of the filters forming a sampled Fourier series, each Fourier series comprising a subset of the string;

d.) modulating each of the sampled Fourier series in Fourier space with the corresponding selected filter 48, 50, each forming an order formatted Fourier series;

e.) adding the order formatted Fourier series to form a summed Fourier series in Fourier space;

f.) obtaining an ordered Fourier series from the High Level Memory section 54;

g.) determining a spectral similarity with a spectral similarity analyzer 56 between the summed Fourier series and the ordered Fourier series;

h.) determining a probability expectation value, with a probability expectation value analyzer 58 based on the spectral similarity;

i.) generating a probability operand, with a probability operand generator 60 having a value selected from a set of zero and one, based on the probability expectation value;

j.) repeating steps b-i until the probability operand has a value of one as determined by the processor 42;

k.) storing the summed Fourier series to an intermediate memory section 62;

l.) removing the selected filters from the selected set of filters 52 to form an updated set of filters 52;

m.) removing the subsets from the string to obtain an updated string;

n.) selecting an updated filter 64 from the updated set of filters;

o.) sampling the updated string with the updated filter to form a sampled Fourier series comprising a subset of the string;

p.) modulating the sampled Fourier series in Fourier space with the corresponding selected updated filter to form an updated order formatted Fourier series;

q.) recalling the summed Fourier series from the intermediate memory section 62;

r.) adding the updated order formatted Fourier series to the summed Fourier series from the intermediate memory section to form an updated summed Fourier series in Fourier space;

s.) obtaining another ordered Fourier series from the High Level Memory section 54;

t.) determining a spectral similarity between the updated summed Fourier series and the another ordered Fourier series;

u.) determining a probability expectation value based on the spectral similarity;

v.) generating a probability operand having a value selected from a set of zero and one, based on the probability expectation value;

w.) repeating steps n-v until the probability operand has a value of one or all of the updated filters have been selected from the updated set of filters as determined by processor 42;

x.) if all of the updated filters have been selected before the probability operand has a value of one, then clearing the intermediate memory section and returning to step b;

y.) if the probability operand has a value of one, then clearing the intermediate memory section and storing the updated summed Fourier series to the intermediate memory section;

z.) repeating steps l-y until the one of the following set of conditions is satisfied: the updated set of filters is empty, or the remaining subsets of the string of step m.) is nil as determined by the processor 42;

aa.) storing the Fourier series of intermediate memory section to the High Level Memory section 54.

Each filter of the set of filters can be a time delayed Gaussian filter having a half-width parameter $\alpha$ which determines the amount of the string that is sampled. Each filter of the set of filters can be a time delayed Gaussian filter having a delay parameter $$\frac{\sqrt{N}}{\alpha}$$

which corresponds to a time point. Each Fourier series of the ordered string can be multiplied by the Fourier transform of the delayed Gaussian filter represented by $$e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)}.$$

The filter established the correct order. The ordered string can be represented by:

$$\sum_{s=1}^{S}\sum_{m=1}^{M_s}\sum_{n=-\infty}^{\infty} \frac{4\pi}{1+\frac{k_z^2}{k_\rho^2}} a_{0_{s,m}} N_{s,m\rho_0} N_{s,mz_0} e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)}$$

$$e^{-jk_\rho(\rho_{fb_{s,m}}+\rho_{t_{s,m}})} \sin\left(\left(k_\rho - n\frac{2\pi}{\rho_{0_{s,m}}}\right)\frac{N_{s,m\rho_0}\rho_{0_{s,m}}}{2}\right) \sin\left(\left(k_z - n\frac{2\pi}{v_{s,m}t_{0_{s,m}}}\right)\frac{N_{s,mz_0}z_{0_{s,m}}}{2}\right)$$

wherein $v_{sp0}$ and $v_{sz0}$ are constants such as the signal propagation velocities in the $\rho$ and $z$ directions, respectively, $$\frac{\sqrt{N_{sp0}}}{\alpha_{sp0}} \text{ and } \frac{\sqrt{N_{sz0}}}{\alpha_{sz0}}$$

are delay parameters and $\alpha_{sp0}$ and $\alpha_{sz0}$ are half-width parameters of a corresponding Gaussian filter in the $\rho$ and $z$ directions, respectively, $\rho_{t_{s,m}} = v_{t_{s,m}} t_{t_{s,m}}$ is the modulation factor which corresponds to the physical time delay $t_{t_{s,m}}$, $\rho_{fb_{s,m}} = v_{fb_{s,m}} t_{fb_{s,m}}$ is the modulation factor which corresponds to the specific transducer time delay $t_{fb_{s,m}}$, $v_{t_{s,m}}$ and $v_{fb_{s,m}}$ are constants such as the signal propagation velocities, $a_{0_{s,m}}$ is a constant, $k_\rho$ and $k_z$ are the frequency variables, $n$, $m$, $s$, $M_s$, and $S$ are integers, and $N_{s,m\rho_0}$, $N_{s,mz_0}$, $\rho_{0_{s,m}}$, and $z_{0_{s,m}}$ are data parameters. The data parameters are selected in the same manner as described above.

The probability expectation value may be based upon Poissonian probability. The probability expectation value is represented by $$\prod_s \left[ p_{\uparrow_s} + (P - p_{\uparrow_s})\exp\left[-\beta_s^{-2}\left(\frac{1-\cos 2\phi_s}{2}\right)\right]\cos(\delta_s + 2\sin\phi_s) \right]$$

wherein P is the maximum probability that at least one other Fourier series is active given that a first Fourier series is active, $p_{\uparrow_s}$ is a probability of a Fourier series becoming active in the absence of coupling from at least one other active Fourier series, $\beta_s^2$ is a number that represents the amplitude of spectral similarity between at least two filtered or unfiltered Fourier series, $\phi_s$ represents the frequency difference angle between at least two filtered or unfiltered Fourier series, and $\delta_s$, is a phase factor. $\beta_s^2$ may be represented by $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} a_{0_{m_s}} N_{m_s}$$

$$\exp\left\{-\frac{\frac{\alpha_1^2 \alpha_s^2}{\alpha_1^2+\alpha_s^2}\left(\frac{\sqrt{N_1}}{\alpha_1}-\frac{\sqrt{N_s}}{\alpha_s}+\left(\frac{N_{m_1}\rho_{0_{m_1}}}{2v_{m_1}}+\frac{\rho_{fb_{m_1}}}{v_{fb_{m_1}}}+\frac{\rho_{t_{m_1}}}{v_{t_{m_1}}}\right)-\left(\frac{N_{m_s}\rho_{0_{m_s}}}{2v_{m_s}}+\frac{\rho_{fb_{m_s}}}{v_{fb_{m_s}}}+\frac{\rho_{t_{m_s}}}{v_{t_{m_s}}}\right)\right)^2}{2}\right\}$$

wherein $$\rho_{t_{m_1}} = v_{t_{m_1}} t_{t_{m_1}} \text{ and } \rho_{t_{m_s}} = v_{t_{m_s}} t_{t_{m_s}}$$

are the modulation factors which corresponds to the physical time delays $t_{t_{m_1}}$ and $t_{t_{m_s}}$ respectively, $$\rho_{fb_{m_1}} = v_{fb_{m_1}} t_{fb_{m_1}} \text{ and } \rho_{fb_{m_s}} = v_{fb_{m_s}} t_{fb_{m_s}}$$

are the modulation factors which corresponds to the specific transducer time delay $t_{fb_{m_1}}$ and $t_{fb_{m_s}}$ respectively, $v_{t_{m_1}}, v_{t_{m_s}}, v_{fb_{m_1}}$ and $v_{fb_{m_s}}$ are constants such as the signal propagation velocities, $$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}$, $a_{0_{m_s}}$ are constants, $v_{m_t}$ and $v_{m_s}$ are constants such as the signal propagation velocities, and $N_{m_1}$, $N_{m_s}$, $\rho_{0_{m_1}}$, and $\rho_{0_{m_s}}$ are data parameters. The data parameters are selected in the same manner as described above. $\phi_s$ may be represented by $$\phi_s = \frac{\pi\left(\frac{\sqrt{N_1}}{\alpha_1} - \frac{\sqrt{N_s}}{\alpha_s} + \sum_{m_1=1}^{M_1}\left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right) - \sum_{m_s=1}^{M_s}\left(\frac{N_{m_s}\rho_{0_{m_s}}}{2v_{m_s}} + \frac{\rho_{fb_{m_s}}}{v_{fb_{m_s}}} + \frac{\rho_{t_{m_s}}}{v_{t_{m_s}}}\right)\right)}{\frac{\sqrt{N_1}}{\alpha_1} + \sum_{m_1=1}^{M_1}\left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right)}$$

wherein $$\rho_{t_{m_1}} = v_{t_{m_1}} t_{t_{m_1}} \text{ and } \rho_{t_{m_s}} = v_{t_{m_s}} t_{t_{m_s}}$$

are the modulation factors which corresponds to the physical time delays $t_{t_{m_1}}$ and $t_{t_{m_s}}$, respectively, $$\rho_{fb_{m_1}} = v_{fb_{m_1}} t_{fb_{m_1}} \text{ and } \rho_{fb_{m_s}} = v_{fb_{m_s}} t_{fb_{m_s}}$$

are the modulation factors which corresponds to the specific transducer time delay $t_{fb_{m_1}}$ and $t_{fb_{m_s}}$, respectively, $v_{t_{m_s}}$, $v_{t_{m_1}}$, $v_{fb_{m_1}}$, and $v_{fb_{m_s}}$ are constants such as the signal propagation velocities, $$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$, and $M_s$ are integers, $a_{0_{m_1}}$ and $a_{0_{m_s}}$ are constants, $v_{m_1}$ and $v_{m_s}$ are constants such as the signal propagation velocities, and $N_{m_1}$, $N_{m_s}$, $\rho_{0_{m_1}}$ and $\rho_{0_{m_s}}$ are data parameters. The data parameters are selected in the same manner as described above.

The String Ordering Layer produces an ordered string of Fourier series, wherein the ordered string is stored in the High Level Memory section.

Figure 5:
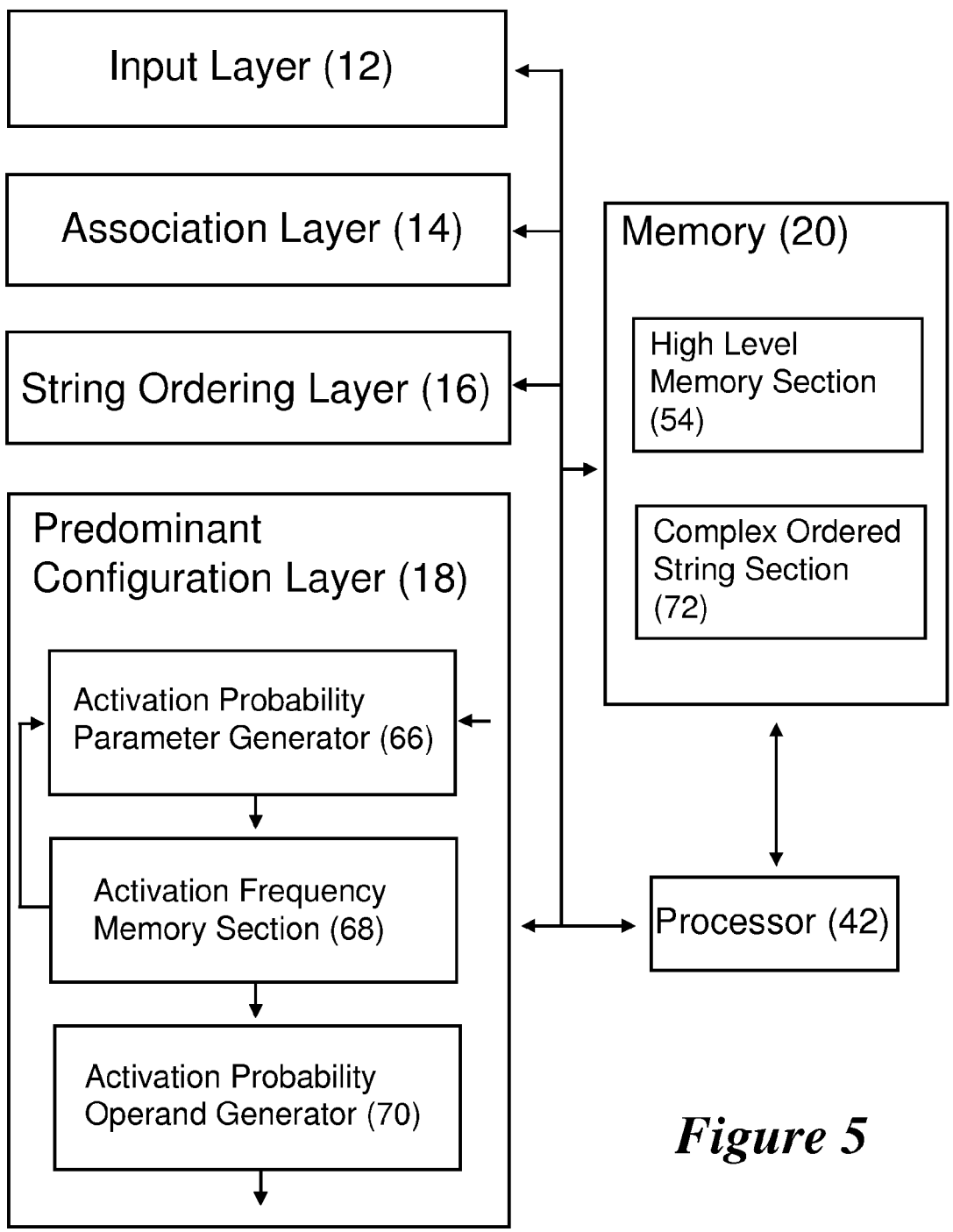
FIG. 5 is a detailed block diagram illustrating a Predominant Configuration Layer and the memory of the embodiment of FIG. 1 in relation to the Input Layer, the Association Layer, and the String Ordering Layer of the present invention.

The next aspect of the present invention is the formation of a predominant configuration by forming complex ordered strings through the association of ordered strings. Referring to FIG. 5, the method for forming the complex ordered strings from strings stored in the string memory section entails the following. The Predominant Configuration Layer 18 receives ordered strings from the High Level Memory section 54 and forms more complex ordered strings by forming associations between the ordered strings. The complex ordered strings are stored in the complex ordered string section 72 of the memory 20.

The Predominant Configuration Layer 18 also activates components within the Input Layer 12, the Association Layer 14, and the String Ordering Layer 16. The layers of the present invention may be treated and implemented as abstract data types in the art of computer science relating to object-oriented programming. The components of the layers therefore refer to all classes, instances, methods, attributes, behaviors, and messages of the layer abstractions as defined above. A class is the implementation of an abstract data type (ADT). It defines attributes and methods implementing the data structure and operations of the ADT, respectively. Instances of classes are called objects. Consequently, classes define properties and behavior of sets of objects. An object can be uniquely identified by its name and it defines a state which is represented by the values of its attributes at a particular time. The behavior of an object is defined by the set of methods which can be applied to it. A method is associated with a class. An object invokes a method as a reaction to receipt of a message.

Thus, the components of a layer comprise all entities in anyway related to or associated with the layer such as inputs, outputs, operands, matrices representing functions, systems, processes, methods, and probability parameters. In a digital embodiment, activation results in the recall of the component from memory and may further result in processing steps such as matrix multiplication of matrices representing functions. Activation involves generating an activation probability parameter. The activation probability parameter is a parameter responsible for activating any component of the system and is dependent on a prior activation history of each component in the system.

The Predominant Configuration Layer 18 includes an activation probability parameter generator 66. The activation probability parameter generator 66 receives a listing of prior activation frequencies of all of the available components of the present invention such as matrices representing functions, data parameters, Fourier components, Fourier series, strings, ordered strings, components of the Input Layer, components of the Association Layer, components of the String Ordering Layer, and components of the Predominant Configuration Layer from an activation frequency memory section 68. The activation probability parameter generator 66 also receives a listing of all active components from the processor 42. Alternatively, the activation probability parameter generator 66 may receive a listing of all active components directly from the active components. The activation probability parameter is stored in memory 20. The activation probability parameter is input to an activation probability operand generator 70. The activation probability operand generator 70 generates a probability operand value of one or zero based upon the activation probability parameter. The probability operand value is output to the processor 42. Any one or more of the components are activated when the probability operand corresponding to each component has a value of one as determined by the processor 42. Thus, the activation of each component is based on the corresponding activation probability parameter. Each activation probability parameter is weighted based on the activation rate of the component. The activation process continues while the system is on. Thus, the activation process is akin to an operating system kernel in a forever loop.

Embodiments of the system for performing pattern recognition and processing may comprise a general purpose computer. Such a general purpose computer may have any number of basic configurations. For example, such a general purpose computer may comprise a central processing unit (CPU), one or more specialized processors, system memory, a mass storage device such as a magnetic disk, an optical disk, or other storage device, an input means such as a keyboard or mouse, a display device, and a printer or other output device. A system implementing the present invention can also comprise a special purpose computer or other hardware system and all should be included within its scope.

Embodiments within the scope of the present invention also include computer program products comprising computer readable medium having embodied therein program code means. Such computer readable media can be any available media which can be accessed by a general purpose or special purpose computer. By way of example, and not limitation, such computer readable media can comprise RAM, ROM, EPROM, CD ROM, DVD or other optical disk storage, magnetic disk storage or other magnetic storage devices, or any other medium which can embody the desired program code means and which can be accessed by a general purpose or special purpose computer. Combinations of the above should also be included within the scope of computer readable media. Program code means comprises, for example, executable instructions and data which cause a general purpose computer or special purpose computer to perform a certain function of a group of functions.

The present invention may be embodied in other specific forms without departing from the spirit or essential attributes thereof and, accordingly, reference should be made to the appended claims, rather than to the foregoing specification, as indicating the scope of the invention.

Also, included as part of this application is a Support Appendix and associated sub-appendices. These include the following:

SUB-APPENDIX I is the derivation of the Input and the Band-Pass Filter of the Analog Fourier Processor according to the present invention;

SUB-APPENDIX II is the derivation of the Modulation and Sampling Gives the Input to the Association Mechanism and Basis of Reasoning according to the present invention;

SUB-APPENDIX III is the derivation of the Association Mechanism and Basis of Reasoning according to the present invention;

SUB-APPENDIX IV is the Ordering of Associations: Matrix Method according to the present invention;

SUB-APPENDIX V is the GENOMIC DNA SEQUENCING METHOD/MATRIX METHOD OF ANALYSIS according to the present invention;

SUB-APPENDIX VI is the derivation of the Input Context according to the present invention, and SUB-APPENDIX VII is the derivation of the Comparison of Processing Activity to Statistical Thermodynamics/Predominant Configuration according to the present invention.

Support Appendix

The methods and systems of the present invention are herein defined as the "processor" which is capable of storing, retrieving, and processing data to form novel conceptual content according to the present invention. The "processor" comprises systems and associated processes which serve specific functions which are collectively called "layers". The "layers" are organized so as to receive the appropriate inputs and produce the appropriate outputs according to the present invention. In a preferred embodiment, the memory layer is organized in a hierarchical manner according to the significance of the stored information. The significance may be measured by how frequently the information is recalled during processing, or it may be significant because it represents reference or standard information. The most significant information may be stored in a layer called "High Level Memory". Unlike a conventional processor such as a Turing Machine, the "processor" of the present invention may constantly change its state such that the output to a given input may not be identical. The "processor" may be governed by a principle similar to the entropy principle of thermodynamics whereby a chemical system achieves a state representative of a predominant configuration, most probable state in time. The "predominant configuration" of the present "processor" is the total systems of the "processor" and the total state of their components in time. The following invention of Pattern Recognition, Learning, and Processing Methods and Systems comprises analog or digital embodiments of:

1.) an Input Layer which receives data representative of physical characteristics or representations of physical characteristics of the environment and transforms it into a Fourier series in k,ω-space wherein input context is encoded in time as delays which corresponds to modulation of the Fourier series at corresponding frequencies. The derivation of the input comprising a Fourier series in k,ω-space is given in SUB-APPENDIX I—The Input and the Band-Pass Filter of the Analog Fourier Processor. The derivation of the encoding of input context in time as delays which corresponds to modulation of the Fourier series at corresponding frequencies is given in SUB-APPENDIX VI—Input Context. A flow diagram of an exemplary transducer data structure of a time delay interval subdivision hierarchy is shown in FIG. 3. The corresponding derivations are also given in SUB-APPENDIX VI;

2.) an Association Filter Layer which receives multiple Fourier series from the Input layer, and High Level Memory, and forms a series (called a "string") of multiple Fourier series each representative of separate information by establishing "associations" between "string" member Fourier series. In k,ω-space, the Fourier series are sampled and modulated via time delayed Gaussian filters called "association filters" or "association ensembles" that provide input to form the "associations". The derivation of the time delayed Gaussian filters which provide sampling and modulation (frequency shifting) of the Fourier series in k,ω-space is given in SUB-APPENDIX II—Modulation and Sampling Gives the Input to the Association Mechanism and Basis of Reasoning. The derivation of the "association" of Fourier series is given SUB-APPENDIX III—Association Mechanism and Basis of Reasoning;

3.) a "String" Ordering Layer which receives the "string" as input from the Association Filter Layer and orders the information represented by the "string" as a nested set of subsets of information with a Matrix Method of Analysis Algorithm via Poissonian probability based associations with input from High Level Memory. The methods of ordering the "string" comprising associated information are given SUB-APPENDIX IV—Ordering of Associations: Matrix Method, and 4.) an Output of the Ordered "String" to High Level Memory Layer with Formation of the "Predominant Configuration" which is analogous to statistical thermodynamics and arises spontaneously because the activation of any association filter, input to the Association Filter Layer to form a "string", and the input to the "String" Ordering Layer are based on their activation history whereby activation is effected by probability operators. The derivation of the predominant configuration structure is given in SUB-APPENDIX VII—Comparison of Processing Activity to Statistical Thermodynamics/Predominant Configuration.

Figure 18:
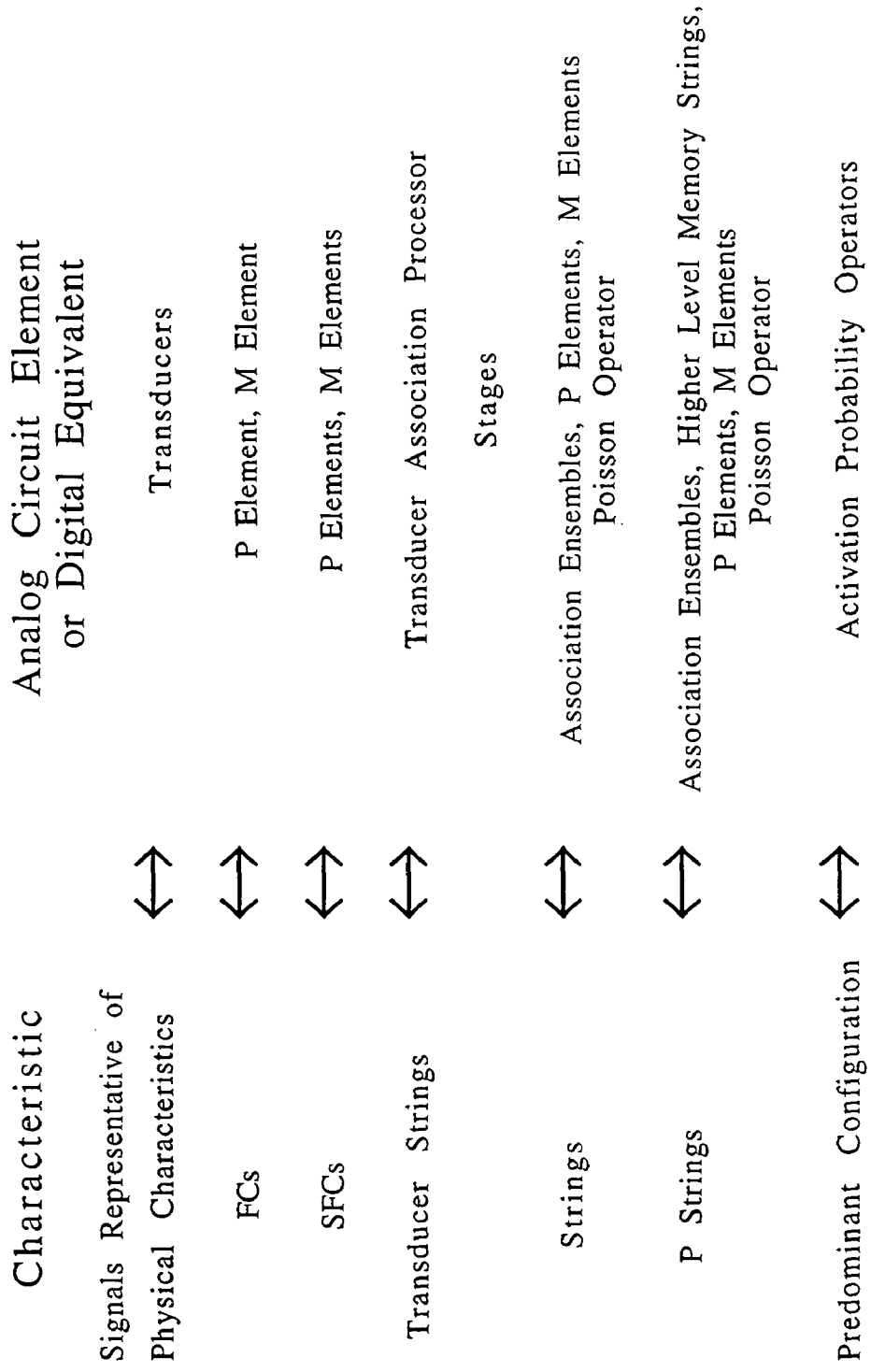
FIG. 18 is a flow diagram of an exemplary hierarchical relationship between the characteristics and the processing and storage elements in accordance with the present invention.
Figure 19:
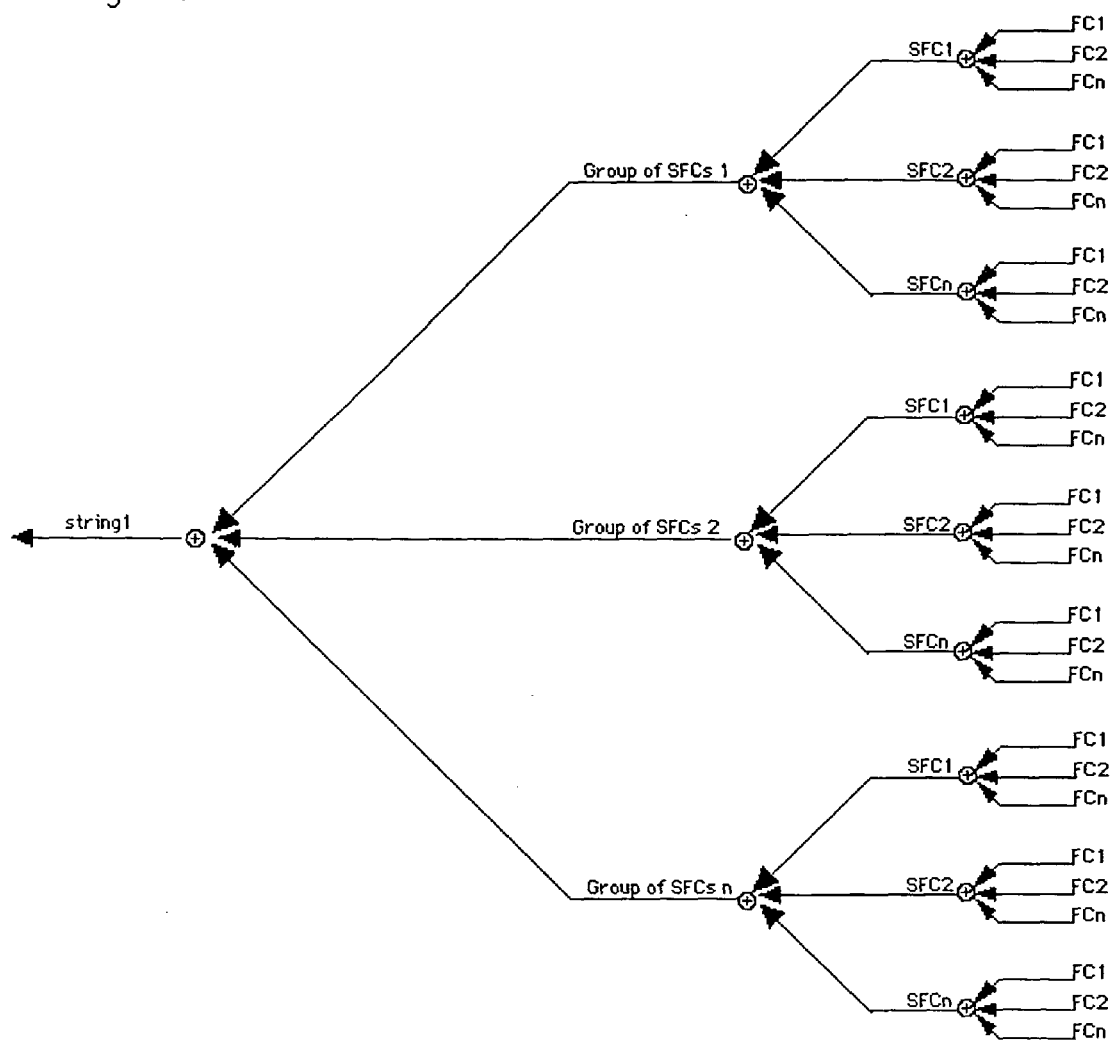
FIG. 19 is a flow diagram of an exemplary hierarchical relationship of the signals in Fourier space comprising FCs, SFCs, groups of SFCs, and a string in accordance with the present invention.
Figure 20:
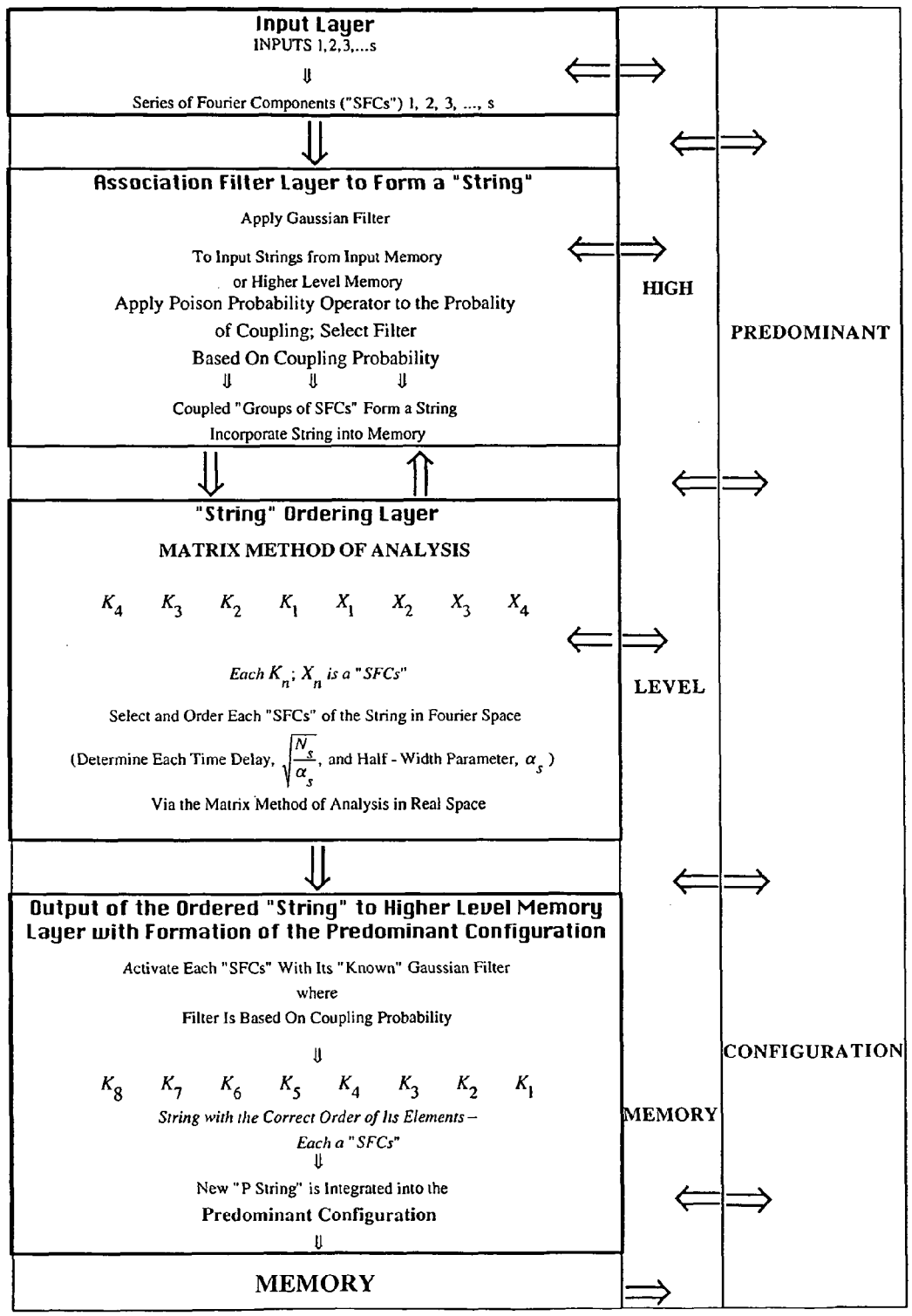
FIG. 20 is an exemplary layer structure in accordance with the present invention.
Figure 21A:
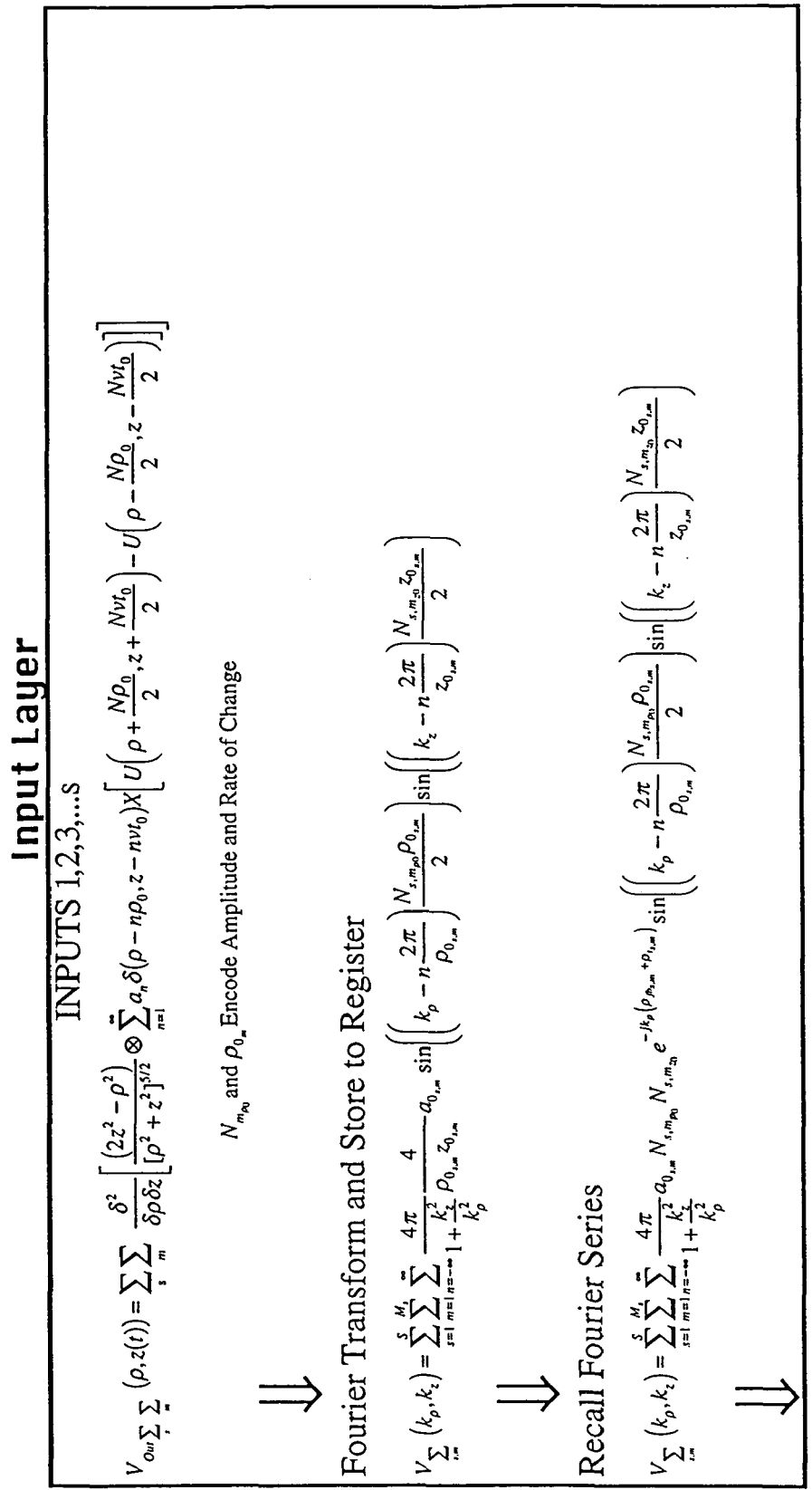
FIG. 21 is a flow diagram of an exemplary layer structure and exemplary signal format in accordance with the present invention.
Figure 21B:
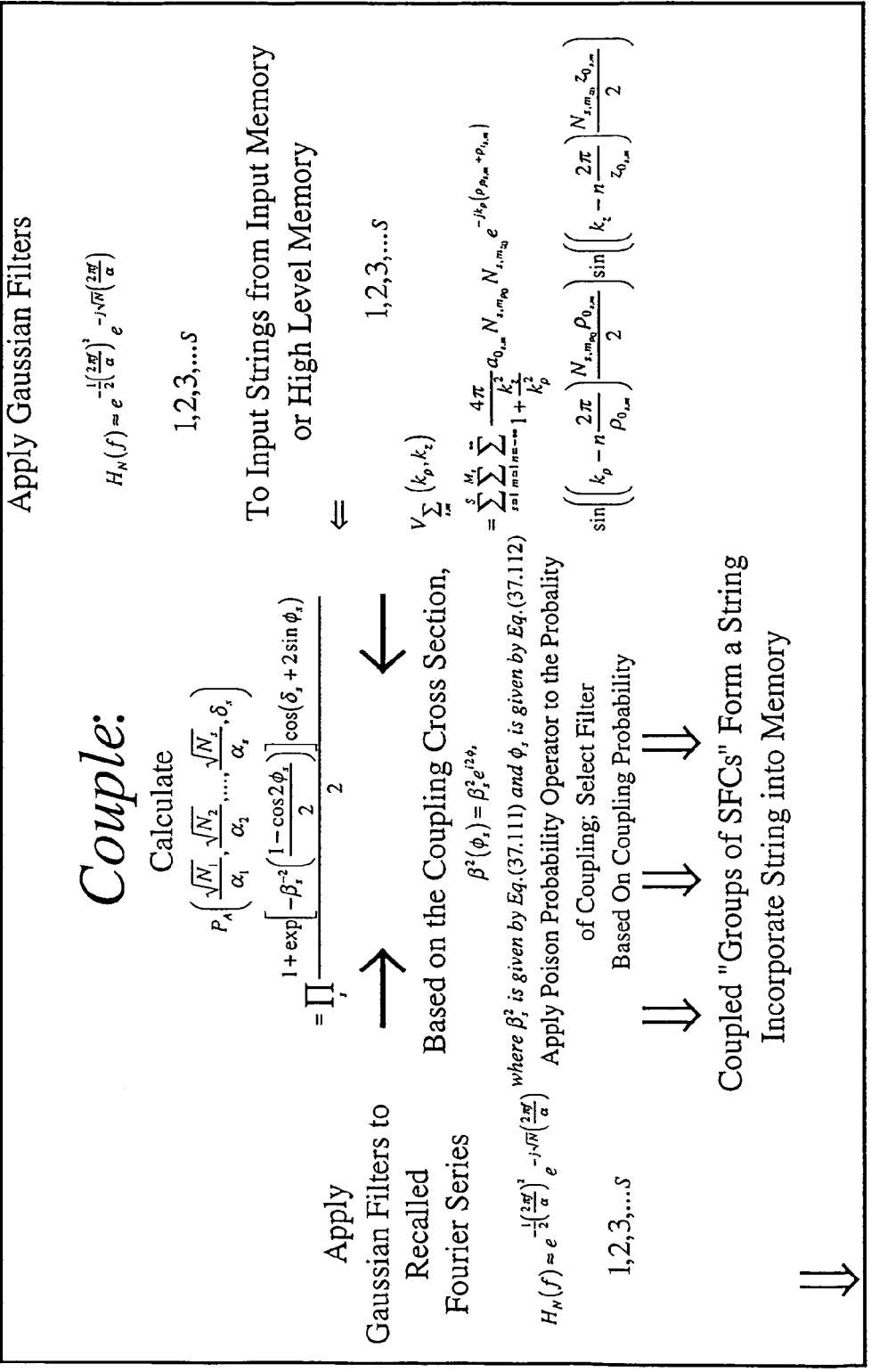
Figure 21D:
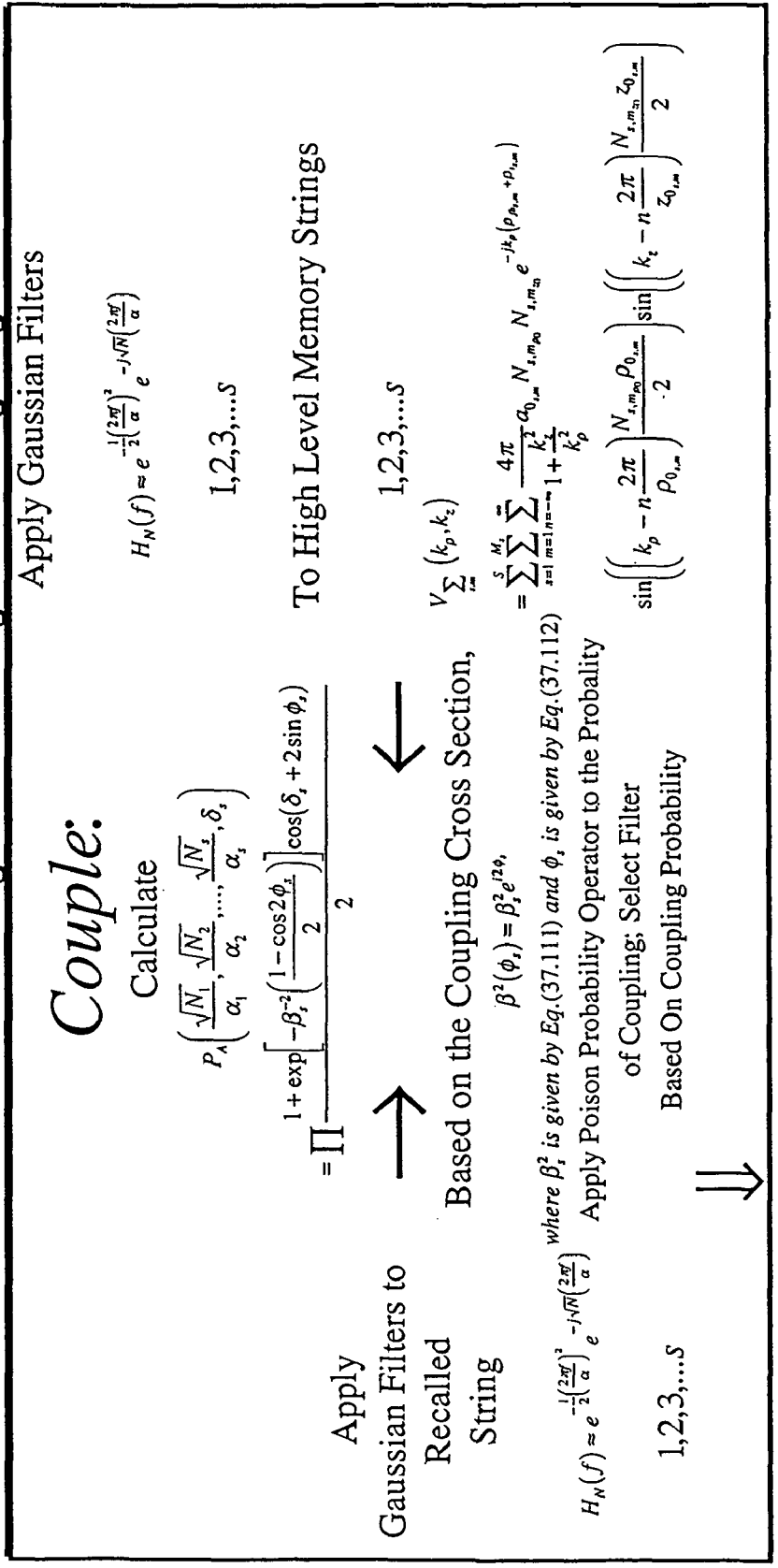

A flow diagram of an exemplary hierarchical relationship between the characteristics and the processing and storage elements of the present "processor" is shown in FIG. 18. FIG. 19 is a flow diagram of an exemplary hierarchical relationship of the signals in Fourier space comprising "FCs", "SFCs", "groups of SFCs", and a "string" accordance with the present invention. An exemplary layer structure is shown in FIG. 20. A flow diagram of an exemplary layer structure and exemplary signal format which demonstrates the relationships of the inputs and outputs of the processing layers is shown in FIG. 21.

Figure 6:
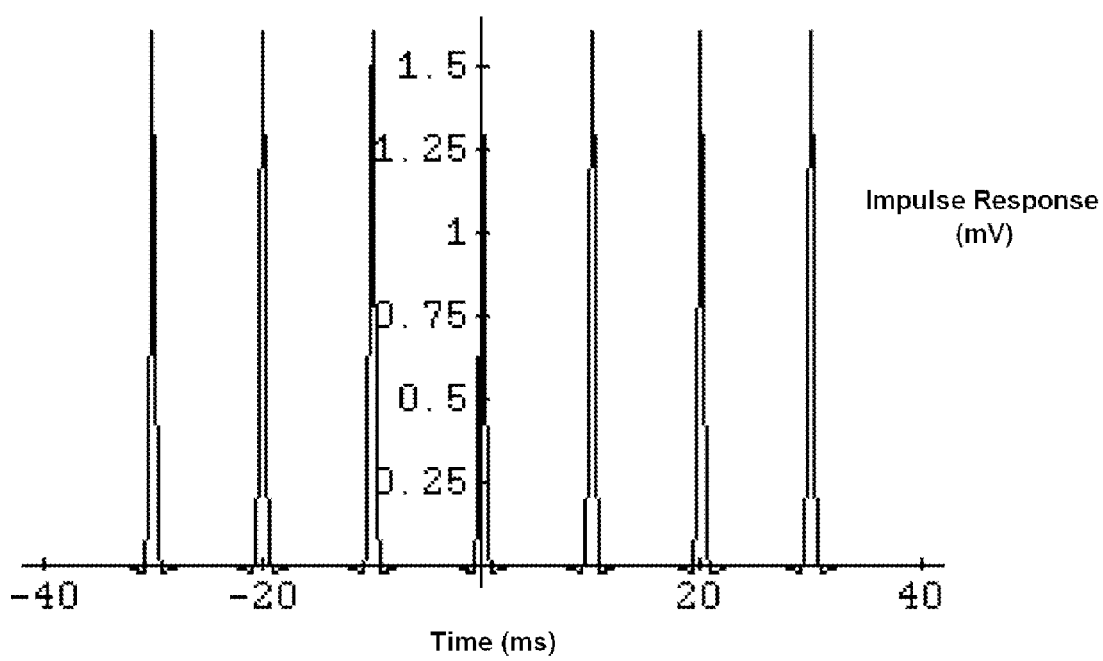
FIG. 6 is a schematic drawing of the "P or M element response" comprised of a series of seven "impulse responses" in accordance with the invention.

All layers comprise processor elements called "P elements" each with a system function response defined as the "impulse response" (Eqs. (37.22-37.24)) and an output (herein defined as the "P element response") shown in FIG. 6 comprising a "pulse train of impulse responses"—an integer number of traveling dipole waveforms (each called an "impulse response"). The Fourier transform of this signal is the convolution of a sinc function with a periodic series of delta functions where the amplitude and the width of the sinc function is determined by the integer number of "impulse responses" of the signal. In a preferred embodiment, the amplitude of the "impulse response", the temporal and spatial spacing or repetition frequency of the "impulse responses", and the integer number of "impulse responses" of the "P element" signal is proportional to rate of voltage change called "depolarization" of the "P element". This rate is determined by the amplitude and rate of change of the input. Thus, in the preferred embodiment, each "P element" is a linear differentiator—the output (pulse train of "impulse responses") is the sum (superposition) of the derivative of the inputs. Additionally in the embodiment, the "P element" has a threshold of "depolarization" to generate an output. In this case, the Fourier transform of "P element response" comprises a repeated series of a Fourier component herein defined as a "FC" with quantized frequency and phase angle. In another embodiment, the amplitude is also quantized. In k,ω-space, the Fourier transform of the "impulse response" function filters the "FC" of a "P element" and is a band-pass when the spatial frequency of the "FC" is equal to the temporal frequency (i.e. the "FC" is band-passed when $k_\rho = k_z$).

An exemplary output signal of an analog "P element" to an input of the form given by Eq. (37.26) is given in time by Eq. (37.27) (the parameters $\rho_0$, $z_0$, and N may encode quantitative information such as intensity and rate of change of a physical parameter such as temperature) and in k,ω-space by Eq. (37.32). The latter equation is that of a series of a Fourier component with information encoded in the parameters $\rho_0$ and N of the Fourier component. "P elements" are directionally massively interconnected in terms of the inputs and the outputs of the present invention which may superimpose. Multiple "P elements" input into any given "P element" which then outputs to multiple "P elements. The Fourier transform of the superposition of the output of multiple "P elements" is a repeating Fourier series—a repeating series of trigonometric functions comprising a series of Fourier components "FCs" herein referred to as a "SFCs". Exemplary representations are given by Eq. (37.33) and Eq. (37.33a). Thus, the present "processor" may function as an analog Fourier processor.

All layers also comprise memory elements called "M elements" that store an input such as a "P element response". The stored "P element response" may be recalled from the "M element". Each "M element" has a system function response defined as the "impulse response" (Eqs. (37.22-37.24)) and an output (herein defined as the "M element response") also shown in FIG. 6 comprising a "pulse train of impulse responses"—an integer number of traveling dipole waveforms (each called an "impulse response"). In a preferred embodiment, the output, the "M element response", is the product of the "pulse train of impulse responses" and a time ramp. In this case, the Fourier transform of "M element response" comprises a repeated series of a Fourier component herein defined as a "FC" with quantized amplitude, frequency, and phase angle. An exemplary output signal of a group of analog "M elements" to an input time ramp is given in k,ω-space by Eq. (37.33a) (the parameters $\rho_{0_m}$, $z_{0_m}$, $N_{m_{\rho_0}}$, and $N_{m_{z_0}}$ of the recalled function are typically the same as those stored). The "M elements" are directionally massively interconnected in terms of the inputs and the outputs of the present invention which may superimpose. Multiple "M elements" input into any given "M element" which then outputs to multiple "M elements". The collective of multiple "M elements" including their stored inputs is referred to as "memory" of the "processor". The collective storage of a signal such as a "SFCs" having an exemplary representation given by Eq. (37.33) to multiple "M elements" is called "store to memory". The collective activation of multiple "M elements" to provide a signal such as a "SFCs" having an exemplary representation given by Eq. (37.33a) is referred to as "recall from memory". An exemplary representation of information "recalled from memory" with input context encoded by specific modulation is given by Eq. (37.110).

The Association Layer and the "String" Ordering Layer comprise cascaded processor stages which are herein defined as "stages". The "stages" need not be identical. Let $h_i(t)$ be the impulse response of the $i^{th}$ stage and assume that $h_i(t) \geq 0$, so that the step response of each stage (or indeed of any number of cascaded stages) is monotonic. Cascaded stages form filters. The Central Limit Theorem of probability theory states in effect that, under very general conditions, the cascade of a large number of linear-time-invariant (LTI) systems will tend to have a delayed Gaussian impulse response, almost independent of the characteristics of the systems cascaded. Sufficient conditions of the Central Limit Theorem are given by Eqs. (37.52-37.55) of SUB-APPENDIX II—Modulation and Sampling Gives the Input to the Association Mechanism and Basis of Reasoning. The collective of multiple cascaded "stages" comprises an "association ensemble" that receives input such as a "SFCs". Each "association ensemble" serves as a heterodyne having an exemplary representation given by Eq. (37.50) by modulating the Fourier series in k,ω-space. It further samples the Fourier series in k,ω-space. The modulation and sampling functions correspond to a delayed Gaussian filter in the time domain having an exemplary representation given by Eq. (37.51).

The "stages", "P elements", and "M elements" in one embodiment of the present "processor", are directionally massively interconnected in terms of the inputs and the outputs of the present invention which may superimpose. Multiple "stages", "P elements", and "M elements" input into any given "stage", "P element", or "M element" which then outputs to multiple "stages", "P elements", and "M elements".

The Input Layer comprises transducers that convert physical signals from the environment into measurements called "data" which in an analog circuit embodiment, is processed into an analog time signal which corresponds to a Fourier series in k,ω-space. In a digital equivalent embodiment, the "data" is further transformed by a Fourier transform processor into a Fourier series in k,ω-space. According to the present invention information is encoded in a Fourier series in k,ω-space. Information is not limited to that corresponding to data, but is meant include all forms of information such as conceptual information, temporal order, cause and effect relationships, size order, intensity order, before-after order, top-bottom order, left-right order, and knowledge derived from study, experience, or instruction. Data which are transducer measurements is processed into a Fourier series in k,ω-space to form input to higher layers such as the Association Layer shown in FIG. 21 whereby:

i.) "Data" such as the intensity and the rate of change of a physical signal such as the surface roughness, or the intensity of sound, light, or temperature recorded by a transducer is represented in terms of the frequency and amplitude parameters, $\rho_{O_m}$ and $N_{m_{P0}}$, of each component of the Fourier series (e.g. Eq. (37.33a)). Information is represented in terms of the parameters $\rho_{O_m}$ and $N_{m_{P0}}$ of each component of the Fourier series in the sense that if the transducer and Fourier processor were each a reciprocal device, then inputting the Fourier series into the output of the Fourier transform processor would yield the measured physical signals at the input of the transducers.

ii.) The input from the Input Layer to other layers can be an analog waveform in the analog case and a matrix in the digital case. Input context of a given transducer can be encoded in time as delays which correspond to modulation of the Fourier series in k,ω-space at corresponding frequencies whereby the data corresponding to each transducer maps to a distinct memory location called a "register" that encodes the input context by recording the data to corresponding specific time intervals of a time division structured memory.

iii.) Input context of a complex transducer system can be encoded in time by the mapping of data from the components of the transducer system to a memory structured according to a corresponding hierarchical set of time intervals representative of each transducer system with respect to different transducer systems, a transducer element's rank relationship relative to other transducer elements, and the response of a transducer element as a function of time. In terms of digital processing, the data from a transducer having n levels of subcomponents is assigned a master time interval with n+1 sub time intervals in a hierarchical manner wherein the data stream from the final n th level transducer element is recorded as a function of time in the n+1 th time coded sub memory buffer. During processing the time intervals represent time delays which are transformed into modulation frequencies which encode input context. A flow diagram of an exemplary transducer data structure of a time delay interval subdivision hierarchy is shown in FIG. 3. An exemplary complex transducer which may represented by a data structure comprising a hierarchical set of time delay intervals is a video camera which is comprised of a multitude of charge coupled devices (CCDs), transducer elements each responsive to light intensity of a given wavelength band at a given spatial location in a grid. Another example is an audio recorder comprising transducer elements each responsive to sound intensity of a given frequency band at a given spatial location or orientation. A signal within the band 300-400 MHz may encode and identify the signal as a video signal; whereas, a signal within the band 500-600 MHz may encode and identify the signal as an acoustic signal. Furthermore, a video signal within the band 315-325 MHz may encode and identify the signal as a video signal as a function of time of CCD element (100,13) of a 512 by 512 array of CCDs. An exemplary representation of a "SFCs" output of "P elements" or "M elements" with input context encoded by specific modulation is given by Eq. (37.110);

iv.) The relationship between the "data" and the parameters $\rho_{O_m}$ and $N_{m_{P0}}$ of each component of the Fourier series, may be learned by the "processor" by applying standard physical signals to each transducer together with other information that is "associated" with the standard. The information that is "associated" with the standard can be recalled and may comprise input to the Association Layer and the "String" Ordering Layer during processing according to the present invention.

The Association Filter Layer receives multiple Fourier series from the Input Layer, and High Level Memory, and forms a series (called a "string") of multiple Fourier series each representative of separate information by establishing associations between "string" member Fourier series. The "association" between one or more Fourier series that form the "string" occurs with Poissonian probability based on the spectral similarity of each association filtered Fourier series member with that of one or more others filtered by the same or different association filters as described further below.

The process of storing output from multiple transducers to memory further comprises creation of "transducer strings". In one embodiment of this case, associations occur at the transducer level, and "SFCs" are mapped to distinct "registers" from the corresponding distinct transducers responding simultaneously, for example. Consider a "transducer string" made up of multiple "groups of SFCs" where each "SFCs" represents information of the transducer system with respect to different transducer systems, a transducer element's rank relationship relative to other transducer elements, and the response of a transducer element as a function of time. These aspects of each transducer are encoded via time delays corresponding to modulation in k,ω-space within a frequency band corresponding to each aspect of the transducer.

Two or more "transducer string" Fourier series such as two or more "SFCs" may become "linked" which is defined according to a corresponding linkage probability weighting parameter wherein activation of one "string" Fourier series may cause other "string" Fourier series to become active in according to the linkage probability weighting parameter. The probability that other "string" Fourier series are activated when any given "string" Fourier series is activated defines the "linkage". "Active" in this case of an analog embodiment is defined as providing an output signal; thus, "activate" is defined as causing an output signal. "Active" in a digital embodiment is defined as recalled from memory; thus, "activate" is defined according to causing a Fourier series to be recalled from memory.

In a general sense, the "string" in k,ω-space is analogous to a multidimensional Fourier series. The modulation within each frequency band may encode context in a general sense. In one embodiment, it encodes temporal order, cause and effect relationships, size order, intensity order, before-after order, top-bottom order, left-right order, etc. which is relative to the transducer. Further associations are established between "groups of SFCs" (i.e. a new "string" is created) by the Association Filter Layer.

The Association Filter Layer receives multiple Fourier series from the Input layer, and High Level Memory, and forms a series (called a "string") of multiple Fourier series each representative of separate information by establishing "associations" between "string" member Fourier series. FIG. 19 is a flow diagram of an exemplary hierarchical relationship of the signals in Fourier space comprising "FCs", "SFCs", "groups of SFCs", and a "string" in accordance with the present invention. Each "FC" is "carried" (processed as a response to an input) by a "P element" or stored into and/or recalled from a "M element" as shown in FIG. 18 which is a flow diagram of an exemplary hierarchical relationship between the characteristics and the processing and storage elements of the present "processor". Each Fourier series such as a "SFCs" representing information is filtered and delayed in the time domain (modulated and sampled in the frequency domain or k,ω-space) as it is recalled from memory and "carried" (processed as a response to the memory input) by a series of cascaded association "stages" called an "association ensemble" or "association filter". Since the Fourier series is in k,ω-space, the modulation corresponds to a frequency shift. Each "association ensemble" is weakly linked with multiple other "association ensembles" at the level of the "stages". The "association ensembles" produce interference or "coupling" of the "SFCs" of one set of "stages" with that of another by producing frequency matched and phase locked Fourier series—sums of trigonometric waves that are frequency matched and periodically in phase—that give rise to "association" of the corresponding recalled or prior processed information.

"Coupling" gives rise to the formation of "associations" between one or more Fourier series that form the "string". "Coupling" refers to interference or energy exchange between "association ensembles" in an analog embodiment. In a digital embodiment, "coupling" refers to calculating an "association" probability parameter based on the spectral similarity of the each Fourier series such as a "SFCs" filtered by an "association filter" with that of one or more other Fourier series filtered by the same or different "association filters". The statistics may be Poissonian. "Association" refers to recording "coupled" Fourier series to memory based on the probability of the "coupling". In a digital embodiment, "association" refers to marking two or more Fourier series as associated based on a zero or one outcome of a probability operand applied to the "association" probability parameter and recording the "associated" Fourier series to memory. The "association" probability parameter based on Poissonian probability is derived from a correlation function in SUB-APPENDIX III—Association Mechanism and Basis of Reasoning. The "association" probability parameter has a "coupling cross section" amplitude and a "frequency difference angle" as parameters. The former is a weighting parameter of the spectral similarity of Fourier series which may become "associated". The "frequency difference angle" is the fractional difference in the frequencies of the Fourier series which may become "associated" expressed as an angle. The derivation of these parameters as well as the derivation of the "association" of Fourier series that "couple" with Poissonian probability is also found in SUB-APPENDIX III.

In a preferred embodiment, the "string" is formed by the Association Filter Layer with input context. In this case, "association" occurs whereby the "SFCs" or "groups of SFCs" such as those comprising "transducer strings" comprise a transducer specific frequency modulation factor. Exemplary representations of "string" outputs of "P elements" or "M elements" with input context encoded by specific modulation are given by Eq. (37.114) and Eq. (37.115). In this case, an exemplary representation of the "coupling cross section" amplitude and the "frequency difference angle" based on the spectral similarity of the each "SFCs" filtered by an "association filter" with that of one or more other "SFCs" filtered by the same or different "association filters" is given by Eq. (37.111) and Eq. (37.112).

The "String" Ordering Layer receives the "string" as input from the Association Filter Layer and orders the information represented in the "string" via a method developed by Mills for sequencing DNA called the "Matrix Method" which is herein presented as a mechanism used by the "processor" to sequence information temporally, conceptually, or according to causality. First, the "string" (multiple Fourier series) is stored in memory. The "string" is recalled and processed by further sets of specific "association ensembles" that "couple" with other "higher level associations", information with conceptual significance established by a previous execution of the present procedure. In k,ω-space, each specific "association ensemble" samples the "string", a Fourier series in k,ω-space. It also serves as a heterodyne by modulating the Fourier series in k,ω-space. The sampling in the frequency domain is dependent on the particular half-width parameter, $\alpha_s$, of each specific "association ensemble". The collective sampling of the specific "association ensembles" provides a nested set of subsets of information where each subset maps to a specific time point corresponding to the specific delay, $$\frac{\sqrt{N_s}}{\alpha_s},$$

of the specific Gaussian filter of the "association ensemble" (Eqs. (37.50-37.51)). The nested set of subsets of information is ordered by the Matrix Method of Analysis Algorithm of Mills with Poissonian probability based associations with input from High Level Memory. Each "group of SFCs" of the input "string" has the corresponding time delay parameter, $$\frac{\sqrt{N_s}}{\alpha_s},$$

and the half-width parameter, $\alpha_s$, of the Gaussian filter of the "association ensemble" (Eqs. (37.50-37.51)) that resulted in the "coupling" and "association" to form the "string". The process of ordering assigns a particular time delay, $$\frac{\sqrt{N_{s'}}}{\alpha_{s'}},$$

and half-width parameter, $\alpha_{s'}$, to each "group of SFCs" of the output "string". The half-width parameter, $\alpha_{s'}$ corresponds to each specific delayed Gaussian filter that samples the input "string" in the frequency domain to provide each "group of SFCs" of the output "ordered string". Each corresponding particular time delay, $$\frac{\sqrt{N_{s'}}}{\alpha_{s'}},$$

encodes and corresponds to the time domain order of each "group of SFCs" of the output "ordered string". An order processed "string" called a "P string" may comprise complex information having conceptual content.

The Output of the Ordered "String" to High Level Memory Layer with Formation of the Predominant Configuration receives ordered strings from the High Level Memory and forms more complex ordered strings as shown in FIG. 20. This layer also activates components within other layers. The Output of the Ordered "String" to High Level Memory Layer with Formation of the Predominant Configuration is analogous to statistical thermodynamics and arises spontaneously because the activation of any "processor" component such as any "P element", "M element", "stage", "association ensemble", "SFCs", "string", "ordered string", "transducer string" having "linkages", Fourier series "linkage", input to the Association Filter Layer to form a "string", and the input to the "String" Ordering Layer are based on their past activation frequency whereby activation is effected by probability operators. In one embodiment, an activation probability parameter is generated and stored in memory for each "processor" component. A probability operand is generated having a value selected from a set of zero and one, based on the activation probability parameter. If the value is one, the component is activated. Thus, any "processor" component is randomly activated wherein the activation is based on the activation probability parameter. The activation probability parameter is weighted based on an activation rate. "Processor" components may become "linked" which is defined according to the corresponding probability weighting parameter wherein activation of one "processor" component may cause other "processor" components to become "active" according to the probability weighting parameter. The probability that other "processor" components are activated when any given "processor" component is activated defines the "linkage".

The processing of information depends on and dynamically alters (through feedback) the total state of stored information, the cascades of association "stages", and the hierarchical relationships of association "stages" and stored information (memory). "Memory linkages" occur whereby recalling any part of a string from a distinct memory location thereby causes additional Fourier series of the string to be recalled. "Linkages" between "stages" occur whereby activating any "stage" thereby causes additional "stages" to become "active". A strongly "linked group of cascaded association stages" comprises an "association ensemble", and a strongly linked group of memory elements comprises a "memory ensemble". Repetitive activation of a "memory element" or association "stage" increases the probability of its future activation. A configuration of "couplings" between "memory ensembles" and "association ensembles" increases the probability of future activation of the configuration. Analogously to statistical thermodynamics, a predominant configuration arises from the ensemble level. Consider the "processor" on a higher level. The activation history of each ensemble relates to a hierarchical relationship of coupled "memory and association ensembles" which gives rise to a precedence of higher order predominant configurations. Pattern recognition, learning, and the ability to associate information and create novel information is a consequence. Machine learning arises by the feedback loop of transducer input to the coupled predominant configurations which increases the basis for machine intelligence.

Pattern recognition and learning arise from the massive directional connectivity in terms of the output to input relationships of the "processor" which in one embodiment functions as an analog Fourier processor wherein a superposition of "P element responses" becomes a superposition of trigonometric functions in frequency space (k,ω-space). Information is digitized in amplitude, frequency, and phase in k,ω-space via the "P element response". It is then modulated, sampled, associated, and ordered via the properties of cascaded groups of association "stages" with "couplings" governed by Poissonian probability. For the "processor", since information is encoded in Fourier series in k,ω-space, specific time delays achieve the specific modulations equivalent to that of heterodynes of conventional signal processing circuits. In other words, a clock substitutes for a multitude of heterodyne circuits to encode input context wherein aspects of each transducer are encoded via time delays corresponding to modulation in k,ω-space within a frequency band corresponding to each aspect of the transducer. The modulation and sampling functions correspond to a delay and filter (delayed Gaussian filter) in the time domain analogous to the key components of amplitude modulation (AM) radio except that the Fourier series of the signal and its modulation occurs k,ω-space in the case of the present "processor" versus the time domain in the AM signal processing case. The filtering function occurs in the time domain in both cases. The unique processing features of the "processor" further permits ordering of information by a method developed by Mills for sequencing DNA called the "Matrix Method" which is herein presented as a mechanism used by the "processor" to sequence information temporally, conceptually, or according to causality. According to the Fourier theorem any waveform can be recreated by an infinite series of trigonometric functions, and any aspect of the universe can be represented by an infinite series of sine and cosine functions as processed by the "processor". For the "processor" of the present invention, the trigonometric function is the basis element of information. The quantity of information such as "inputs" that can be associated into ordered "strings" ("P strings") is essentially infinite based on it being encoded in Fourier series in k,ω-space. And, the number of terms necessary to represent most objects is not overwhelming. In fact, even a potentially challenging object having sharp edges such as a square pulse poses no difficulty in that is fairly accurately represented by only seven terms of a Fourier series in the time domain comprising the prior art [1]. The same principle applies to information represented as a Fourier series in k,ω-space.

The following invention of Pattern Recognition, Learning, and Processing Methods and Systems comprises analog or digital embodiments. In one embodiment, analog circuit elements store, retrieve, and process input waveforms wherein the circuit elements have the system functions or impulse responses or comprise the operators and structures which transform input to output as described herein. In another embodiment, the mathematical functions corresponding to the waveforms of any stage of storage, retrieval, or processing are represented digitally, and the digital waveforms are digitally processed in a manner equivalent to the analog embodiment according to signal processing theory such as the Nyquist theorem. In a preferred embodiment, a digitally based "processor" comprises simulations methods and systems according to the analog systems and processes of the present invention. The Nyquist theorem states that all of the information in any waveform can be conserved and recovered by digital processing with frequency components equal to twice the maximum frequency of any waveform [2]. Thus, the analog and digital embodiments perform equivalently.

Exemplary Layer Structure and Exemplary Signal Format

FIG. 20 shows an exemplary layer structure in accordance with the present invention. FIG. 21 shows a flow diagram of an exemplary layer structure and exemplary signal format in accordance with the present invention. The present invention comprises an analog Fourier "processor" wherein the basis element of information in k,ω-space is the Fourier component. In a preferred embodiment, the analog systems and processes are implemented using the corresponding digital embodiments. The "processor" is applicable to standard computers comprising digital processors, and digital memory, storage, and retrieval systems where discrete values of the continuous functions evaluated at selected frequencies and/or at the Nyquist rate [2] form matrices upon which the operations of the exemplary signal format are performed in place of the continuous functions. Exemplary embodiments of the present invention according to the layer structure of FIG. 20 and the exemplary layer structure and exemplary signal format of FIG. 21 comprises:

Input Layer

The Input Layer receives data and transforms it into a Fourier series in k,ω-space wherein input context is encoded in time as delays which corresponds to modulation of the Fourier series at corresponding frequencies. Data is processed into a Fourier series in k,ω-space that represents information as given by Eq. (37.33) and Eq. (37.33a)

$$V_{\Sigma_m}(k_\rho, k_z) = \sum_{m=1}^{M} \sum_{n=-\infty}^{\infty} \frac{4\pi}{1+\frac{k_z^2}{k_\rho^2}} \frac{4}{\rho_{0_m} z_{0_m}} a_{0_m} \sin\left(\left(k_\rho - n\frac{2\pi}{\rho_{0_m}}\right)\frac{N_{m\rho 0}\rho_{0_m}}{2}\right) \sin\left(\left(k_z - n\frac{2\pi}{vt_0}\right)\frac{N_{m z 0} z_{0_m}}{2}\right) \quad (37.33)$$

$$V_{\Sigma_m}(k_\rho, k_z) = \sum_{m=1}^{M} \sum_{n=-\infty}^{\infty} \frac{4\pi}{1+\frac{k_z^2}{k_\rho^2}} \frac{4}{\rho_{0_m} z_{0_m}} a_{0_m} \frac{N_{m\rho 0}\rho_{0_m}}{2} \frac{N_{m z 0} z_{0_m}}{2} \sin\left(\left(k_\rho - n\frac{2\pi}{\rho_{0_m}}\right)\right) \quad (37.33a)$$

$$\frac{N_{m\rho 0}\rho_{0_m}}{2}\right) \sin\left(\left(k_z - n\frac{2\pi}{v_m t_{0_m}}\right)\frac{N_{m z 0} z_{0_m}}{2}\right)$$

$$= \sum_{m=1}^{M} \sum_{n=-\infty}^{\infty} \frac{4\pi}{1+\frac{k_z^2}{k_\rho^2}} a_{0_m} N_{m\rho 0} N_{m z 0} \sin\left(\left(k_\rho - n\frac{2\pi}{\rho_{0_m}}\right)\frac{N_{m\rho 0}\rho_{0_m}}{2}\right)$$

$$\sin\left(\left(k_z - n\frac{2\pi}{v_m t_{0_m}}\right)\frac{N_{m z 0} z_{0_m}}{2}\right)$$

whereby i.) data such as intensity and rate of change recorded by a transducer is represented in terms of the parameters $\rho_{0_m}$ and $N_{m\rho_0}$ of each component of the Fourier series; ii.) input context is encoded in time by a hierarchical set of time delay intervals representative of each transducer system with respect to different transducer systems, a transducer element's rank relationship relative to other transducer elements, and the response of a transducer element as a function of time, and iii.) the input from the Input Layer to other layers shown in FIG. 21 can be an analog waveform in the analog case and a matrix in the digital case wherein input context of a given transducer can be encoded in time as delays which correspond to modulation of the Fourier series in k,ω-space at corresponding frequencies as given by the terms $$e^{-jk\rho(\rho_{fb_{s,m}}+\rho_{t_{s,m}})}$$

of Eq. (37.113)

$$V_{\Sigma_{s,m}}(k_\rho, k_z) = \sum_{s=1}^{S} \sum_{m=1}^{M_s} \sum_{n=-\infty}^{\infty} \frac{4\pi}{1+\frac{k_z^2}{k_\rho^2}} a_{0_{s,m}} N_{s,m\rho 0} N_{s,m z 0} e^{-jk\rho(\rho_{fb_{s,m}}+\rho_{t_{s,m}})} \quad (37.113)$$

-continued $$\sin\left(\left(k_\rho - n\frac{2\pi}{\rho_{0_{s,m}}}\right)\frac{N_{s,m\rho 0}\rho_{0_{s,m}}}{2}\right)$$

$$\sin\left(\left(k_z - n\frac{2\pi}{v_{s,m} t_{0_{s,m}}}\right)\frac{N_{s,m z 0} z_{0_{s,m}}}{2}\right)$$

whereby the data corresponding to each transducer maps to a distinct memory location called a "register" that encodes the input context by recording the data to corresponding specific time intervals of a time division structured memory, and iv.) the relationship between the "data" and the parameters $\rho_{0_m}$ and $N_{m\rho_0}$ of each component of the Fourier series, may be learned by the "processor" by applying standard physical signals to each transducer together with other information that is associated with the standard. The information that is "associated" with the standard can be recalled and may comprise input into the Association Layer and the "String" Ordering Layer during processing according to the present invention. In terms of digital processing, the data from a transducer having n levels of subcomponents is assigned a master time interval with n+1 sub time intervals in a hierarchical manner wherein the data stream from the final n th level transducer element is recorded as a function of time in the n+1 th time coded memory buffer. During processing the time intervals represent time delays which are transformed into modulation frequencies which encode the input context. FIG. 3 is a flow diagram of an exemplary transducer data structure of a time delay interval subdivision hierarchy wherein the data from a transducer having n levels of subcomponents numbering integer m per level is assigned a master time interval with n+1 sub time intervals in a hierarchical manner wherein the data stream from the final n th level transducer element is recorded as a function of time in the n+1 th time coded sub memory buffer in accordance with the present invention.

The process of storing output from multiple transducers to memory further comprises creation of "transducer strings". In one embodiment, associations occur at the transducer level, and "SFCs" are mapped to distinct "registers" from the corresponding distinct transducers responding simultaneously, for example. Consider a "transducer string" made up of multiple "groups of SFCs" where each "SFCs" represents information of the transducer system with respect to different transducer systems, a transducer element's rank relationship relative to other transducer elements, and the response of a transducer element as a function of time. These aspects of each transducer are encoded via delays corresponding to modulation in k,ω-space (Eq. (37.109)) within a frequency band corresponding to each aspect of the transducer.

$$x(t) = \int_{-\infty}^{\infty} X(f) e^{j2\pi f t} df \quad X(t) = \int_{-\infty}^{\infty} x(t) e^{-j2\pi f t} dt \quad (37.109)$$

$$\overline{\text{Delay } \delta(t-t_0) \iff e^{-j2\pi f t_0}}$$

Two or more "transducer string" Fourier series such as two or more "SFCs" may become "linked" which is defined according to a corresponding linkage probability weighting parameter wherein activation of one "string" Fourier series may cause other "string" Fourier series to become "active" according to the linkage probability weighting parameter. The probability that other "string" Fourier series are activated when any given "string" Fourier series is activated defines the "linkage".

The "string" in k,ω-space is analogous to a multidimensional Fourier series. The modulation within each frequency band may further encode context in a general sense. In one embodiment, it encodes temporal order, cause and effect relationships, size order, intensity order, before-after order, top-bottom order, left-right order, etc. which is relative to the transducer.

A "FC" of Eq. (37.32) is a series of a Fourier component. A distinct superposition or series of "FCs" is called a "SFCs" which further superimpose to form "groups of SFCs". The data is digitized according to the parameter N of Eqs. (37.33), (37.33a), and (37.87). Input to higher layers is in a Fourier series format in k,ω-space or data is processed with a FFT (Fast Fourier Transform) routine and stored in memory as a series of a Fourier component in k,ω-space with quantized amplitude, frequency, and phase angle (Eq. (37.33a)). Or, data is processed with a FFT (Fast Fourier Transform) routine and stored in memory as a series of a Fourier component in k,ω-space with quantized frequency, and phase angle of the form of Eq. (37.33). In this case, "groups of SFCs" representing information are recalled from memory with a time ramp multiplication of each "FC" of a "SFCs" to give the form of Eq. (37.33a). In the digital case, multiplication is performed via multiplication of corresponding matrices formed from the continuous functions by evaluating them at discrete frequency values. A summary of an exemplary method of inputting data follows:

a.) data is recorded by one or more transducers each having one or more levels of component elements;

b.) the data recorded by each transducer is encoded as parameters such as $\rho_{0_m}$ and $N_{m_{p_0}}$ of a Fourier series in Fourier space with input context representing the information based on the physical characteristics and the physical context;

c.) the data from a transducer having n levels of subcomponents is assigned a master time interval with n+1 sub time intervals in a hierarchical manner wherein the data stream from the final n th level transducer element is recorded as a function of time in the n+1 th time coded memory buffer;

d.) the time intervals represent time delays which are transformed into modulation frequencies which encode input context (e.g. the transducer element relationship of more than one transducer elements, its rank in the transducer hierarchy, and the time point of data recording);

e.) the representation of the data is given by Eq. (37.110)

$$V_{\Sigma_m}(k_\rho, k_z) = \sum_{m=1}^{M} \sum_{n=-\infty}^{\infty} \frac{4\pi}{1+\frac{k_z^2}{k_\rho^2}} a_{0_m} N_{m\rho 0} N_{mz0} e^{-jk_\rho(\rho f b_m + \rho t_m)} \quad (37.110)$$

$$\sin\left(k_\rho \frac{N_{m\rho 0}\rho_{0_m}}{2} - n\frac{2\pi N_{m\rho 0}}{2}\right) \sin\left(k_z \frac{N_{mz0}z_{0_m}}{2} - n\frac{2\pi N_{mz0}}{2}\right)$$

f.) in the digital case, the function of Eq. (37.110) comprising a "SFCs" is evaluated at discrete frequencies at twice the rate of the highest discrete frequency $$\left(\frac{N_m \rho_{0_m}}{2}\right)$$

to form a matrix for each "SFCs";

g.) "SFCs" are mapped to distinct "registers" from corresponding distinct transducers responding simultaneously to form "transducer strings" having a representation given by Eq. (37.113) wherein input context is encoded by the transducer modulation factor $$e^{-jk_\rho(\rho f b_{3,m} + \rho t_{3,m})};$$

h.) in the digital case comprising "memory linkages" of a "transducer string", recalling any part of a "transducer string" from a distinct memory location may thereby cause additional "linked" Fourier series of the "transducer string" to be recalled. In one embodiment, a linkage probability parameter is generated and stored in memory for each "string" Fourier series such as a "SFCs". A probability operand is generated having a value selected from a set of zero and one, based on the linkage probability parameter. If the value is one, the corresponding Fourier series is recalled. Thus, when any part of a "transducer string" is recalled from memory, any other "string" Fourier series is randomly recalled wherein the recalling is based on the linkage probability parameter. The linkage probability parameter is weighted based on the linkage rate.

Association Filter Layer to Form a "String"

Each "SFCs" is filtered and delayed in the time domain (modulated and sampled in the frequency domain) as it is processed by a cascade of association filters (subprograms in the digital case) called an "association ensemble". Each "association ensemble" is weakly linked with multiple other such "association ensembles". These "association ensembles" produce interference or "coupling" of one "SFCs" with another by producing frequency matched and phase locked Fourier series—sums of trigonometric waves that are frequency matched and periodically in phase—that give rise to "association" of the recalled or prior processed information "carried" by the cascade. The Poissonian probability of such "association" (Eq. (37.106c)) is given by a correlation function given in the SUB-APPENDIX III—Association Mechanism and Basis of Reasoning wherein Eq. (37.87) and Eq. (37.89) are parameters.

$$P_A\left(\frac{\sqrt{N_1}}{\alpha_1}, \frac{\sqrt{N_2}}{\alpha_2}, \ldots, \frac{\sqrt{N_s}}{\alpha_s}, P, p_{\uparrow_s}, \delta_s\right) = \quad (37.106c)$$

$$\prod_s \left[p_{\uparrow_s} + (P - p_{\uparrow_s})\exp\left[-\beta_s^2\left(\frac{1-\cos 2\phi_s}{2}\right)\right]\cos(\delta_s + 2\sin\phi_s)\right]$$

$$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} a_{0_{m_s}} N_{m_s} \exp - \quad (37.87c)$$

$$\left\{\frac{\frac{\alpha_1^2 \alpha_s^2}{\alpha_1^2 + \alpha_s^2}\left(\frac{\sqrt{N_1}}{\alpha_1} - \frac{\sqrt{N_s}}{\alpha_s} + \frac{N_{m_1}\rho_{0_{m_1}}}{2v_{m_1}} - \frac{N_{m_s}\rho_{0_{m_s}}}{2v_{m_s}}\right)^2}{2}\right\}$$

$$\phi_s = \frac{\pi\left(\frac{\sqrt{N_1}}{\alpha_1} - \frac{\sqrt{N_s}}{\alpha_s} + \sum_{m_1=1}^{M_1}\frac{N_{m_1}\rho_{0_{m_1}}}{2v_{m_1}} - \sum_{m_s=1}^{M_s}\frac{N_{m_s}\rho_{0_{m_s}}}{2v_{m_s}}\right)}{\frac{\sqrt{N_1}}{\alpha_1} + \sum_{m_1=1}^{M_1}\frac{N_{m_1}\rho_{0_{m_1}}}{2v_{m_1}}} \quad (37.89)$$

The set of "associated" "groups of SFCs" is herein called a "string". The "string" comprises a Fourier series, a linear sum of "FCs". FIG. 19 is a flow diagram of an exemplary hierarchical relationship of the signals in Fourier space comprising "FCs", "SFCs", "groups of SFCs", and a "string" in accordance with the present invention. Each "FC" is encoded by a "P element" or stored into and/or recalled from a "M element" as shown in FIG. 18 which is a flow diagram of an exemplary hierarchical relationship between the characteristics and the processing and storage elements of the present "processor".

A summary of an exemplary method of establishing "associations" between "groups of SFCs" (i.e. a creating a "string") by "coupling" with Poissonian probability between "association ensembles" "carrying" the "groups of SFCs" comprising a transducer frequency band modulation factor according to Eq. (37.110) follows:

a.) n (n an integer) inputs each comprising a "SFCs", the function of Eq. (37.110) which in the digital case is evaluated at discrete frequencies at twice the rate of the highest discrete frequency $$\left(\frac{N_m \rho_{0_m}}{2}\right)$$

to form a "SFCs" matrix, is recalled from memory;

b.) in the digital case, discrete values are determined at twice the rate of the highest discrete frequency $$\left(\frac{N_m \rho_{0_m}}{2}\right)$$

of the Fourier series inputs of up to n different Fourier transforms of delayed Gaussian filters functions (37.50) to form up to n different association filter matrices;

c.) in the digital case, the discrete values of each of n (n an integer) inputs each comprising a "SFCs", the function of Eq. (37.110) which is evaluated at discrete frequencies to form a "SFCs" matrix, are multiplied on a matrix element by matrix element basis corresponding to the same frequency with one or more of the n different association filter matrices each comprising the Fourier transform of a delayed Gaussian filter (Eq. (37.50));

$$H_N(f) \approx e^{-\frac{1}{2}\left(\frac{2\pi f}{\alpha}\right)^2} e^{-j\sqrt{N}\left(\frac{2\pi f}{\alpha}\right)} \quad (37.50)$$

d.) the "coupling cross section" amplitude, $\beta_s^2$, and frequency difference angle, $\phi_s$, of the harmonic "coupling", is calculated for two or more filtered inputs. In the case of input context, the amplitude, $\beta_s^2$, which follows from Eq. (37.87c) is given by Eq. (37.111b), and the frequency difference angle, $\phi_s$, which follows from Eq. (37.89) is given by Eq. (37.112a);

e.) the Poissonian probability of "association" is calculated (Eq. (37.106c)) with the "coupling cross section" amplitude, $\beta_s^2$, and frequency difference angle, $\phi_s$, as parameters;

f.) a Poissonian probability operand with the expectation value given by the Poissonian probability of "association" (step e) is activated to return a value of zero or one;

g.) if the output of the Poissonian probability operand is one, then the two or more filtered inputs are marked as "associated" and this status is stored in memory;

h.) the process of forming "associations" (Steps a-g) are repeated including processing the "SFCs" inputs and "associated" "SFCs" inputs with multiple "association ensembles" comprising Gaussian filters each of different delay, $$\frac{\sqrt{N_s}}{\alpha_s},$$

and half-width parameter, $\alpha_s$ to extend the number of associated "SFCs" to form a string;

i.) in one analog embodiment, the output $r_{\bar{z}}$ Fourier space is the "string" given by Eq. (37.113) comprising the superposition of S "groups of SFCs" wherein each "SFCs" corresponds to the response of M "M or P elements", with input context. In another embodiment, the output $r_{\bar{z}}$ is the "string" of Eq. (37.114)

$$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} a_{0_{m_s}} N_{m_s} \quad (37.111b)$$

$$\exp - \left\{ \left( \frac{\alpha_1^2 \alpha_s^2}{\alpha_1^2 + \alpha_s^2} \left( \frac{\sqrt{N_1}}{\alpha_1} - \frac{\sqrt{N_s}}{\alpha_s} + \left( \frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}} \right) - \left( \frac{N_{m_s}\rho_{0_{m_s}}}{2v_{m_s}} + \frac{\rho_{fb_{m_s}}}{v_{fb_{m_s}}} + \frac{\rho_{t_{m_s}}}{v_{t_{m_s}}} \right) \right) \right)^2 \right\}$$
$$(2)$$

$$\phi_s = \frac{\pi \left( \frac{\sqrt{N_1}}{\alpha_1} - \frac{\sqrt{N_s}}{\alpha_s} + \sum_{m_1=1}^{M_1} \left( \frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}} \right) - \sum_{m_s=1}^{M_s} \left( \frac{N_{m_s}\rho_{0_{m_s}}}{2v_{m_s}} + \frac{\rho_{fb_{m_s}}}{v_{fb_{m_s}}} + \frac{\rho_{t_{m_s}}}{v_{t_{m_s}}} \right) \right)}{\frac{\sqrt{N_1}}{\alpha_1} + \sum_{m_1=1}^{M_1} \left( \frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}} \right)} \quad (37.112a)$$

$$V_{\Sigma_{s,m}}(k_\rho, k_z) \sum_{s=1}^{S} \sum_{m=1}^{M_s} \sum_{n=-\infty}^{\infty} \frac{4\pi}{1+\frac{k_z^2}{k_\rho^2}} a_{0_{s,m}} N_{s,m_{\rho 0}} N_{s,m_{z0}} e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)} \quad (37.114)$$

$$e^{-jk_\rho\left(\rho_{fb_{s,m}}+\rho_{t_{s,m}}\right)} \sin\left(\left(k_\rho - n\frac{2\pi}{\rho_{0_{s,m}}}\right)\frac{N_{s,m_{\rho 0}}\rho_{0_{s,m}}}{2}\right) \sin\left(\left(k_z - n\frac{2\pi}{v_{s,m}t_{0_{s,m}}}\right)\frac{N_{s,m_{z0}}z_{0_{s,m}}}{2}\right)$$

wherein each "SFCs" is multiplied by the Fourier transform of the delayed Gaussian filter (Eq. (37.50)) (i.e. the modulation factor $$e^{-\frac{1}{2}\left(v_{s,m}\frac{k_\rho}{\alpha}\right)^2} e^{-j\sqrt{N}\left(v_{s,m}\frac{k_\rho}{\alpha}\right)} e^{-\frac{1}{2}\left(v_{s,m}\frac{k}{\alpha}\right)^2} e^{-j\sqrt{N}\left(v_{s,m}\frac{k}{\alpha}\right)}$$

which gave rise to "coupling" and "association" to form the "string". In the digital case, the output $\tilde{v}$ in Fourier space is the "string" given by Eq. (37.113) comprising the superposition of S "groups of SFCs" wherein each "SFCs" corresponds to a matrix digitized according to Eq. (37.110), with input context. In another embodiment of the digital case, the output $\tilde{v}$ is the "string" of Eq. (37.114) wherein each "SFCs" corresponds to a matrix digitized according to Eq. (37.110) that is multiplied by a digitized matrix according to the Fourier transform of the delayed Gaussian filter (Eq. (37.50)) which gave rise to the "coupling" and "association" to form the "string".

"String" Ordering Layer

The "string" representing information is temporally or conceptually ordered via the Matrix Method of Analysis of Mills [3,4]. Each "group of SFCs" of the input "string" has the corresponding time delay parameter, $$\frac{\sqrt{N_s}}{\alpha_s},$$

and the half-width parameter, $\alpha_s$, of the Gaussian filter of the "association ensemble" (Eq. (37.51)) that resulted in the "coupling" and "association" to form the "string".

$$h_N(t) \approx \frac{\alpha}{\sqrt{2\pi}} e^{-\frac{\left(t-\frac{\sqrt{N}}{\alpha}\right)^2}{\frac{2}{\alpha^2}}} \quad (37.51)$$

The "string" comprises a Fourier series, a linear sum of "FCs" each multiplied by its corresponding Gaussian filter modulation factor and modulation factor which encodes input context (Eq. (37.114)). Therefore, new series of "FCs", "SFCs" or "groups of SFCs", may be formed using additional "association filters" that sample the input "sting" in k,ω-space.

In a preferred embodiment, the string is sampled with specific "association ensembles" which provide a "nested set of subsets" of information comprised of a "SFCs" and "groups of SFCs" where each "subset" sampled from the input "string" maps to a specific time point corresponding to the specific delay, $$\frac{\sqrt{N_s}}{\alpha_s},$$

of the specific Gaussian filter of the "association ensemble" (Eqs. (37.50-37.51)). The process of ordering assigns a particular time delay, $$\frac{\sqrt{N_{s'}}}{\alpha_{s'}},$$

and half-width parameter, $\alpha_{s'}$, to each "subset" of the output "string" using the "nested set of subsets" as input to the Matrix Method which is herein presented as a mechanism used by the "processor" to sequence information temporally, conceptually, or according to causality.

Consider Eqs. (37.33) and (37.33a) which represent a "SFCs" in k,ω-space comprising a Fourier series. A "string" is a sum of Fourier series which follows from Eqs. (37.33) and (37.33a) and is given by Eqs. (37.107) and (37.108).

$$V_{\Sigma_{s,m}}(k_\rho, k_z) = \quad (37.107)$$

$$\sum_{s=1}^{S} \sum_{m=1}^{M_s} \sum_{n=-\infty}^{\infty} \frac{4\pi}{1+\frac{k_z^2}{k_\rho^2}} \frac{4}{\rho_{0_{s,m}}z_{0_{s,m}}} a_{0_{s,m}} \sin\left(\left(k_\rho - n\frac{2\pi}{\rho_{0_{s,m}}}\right)\right.$$

$$\left.\frac{N_{s,m_{\rho 0}}\rho_{0_{s,m}}}{2}\right) \sin\left(\left(k_z - n\frac{2\pi}{v_{s,m}t_{0_{s,m}}}\right)\frac{N_{s,m_{z0}}z_{0_{s,m}}}{2}\right)$$

$$V_{\Sigma_{s,m}}(k_\rho, k_z) = \quad (37.108)$$

$$\sum_{s=1}^{S} \sum_{m=1}^{M_s} \sum_{n=-\infty}^{\infty} \frac{4\pi}{1+\frac{k_z^2}{k_\rho^2}} \frac{4}{\rho_{0_{s,m}}z_{0_{s,m}}} a_{0_{s,m}} \frac{N_{s,m_{\rho 0}}\rho_{0_{s,m}}}{2} \frac{N_{s,m_{z0}}z_{0_{s,m}}}{2} \sin\left(\left(k_\rho - n\frac{2\pi}{\rho_{0_{s,m}}}\right)\right)$$

-continued $$\frac{N_{s,m_{\rho 0}}\rho_{0s,m}}{2}\bigg)\sin\bigg(\bigg(k_z-n\frac{2\pi}{v_{s,m}t_{0s,m}}\bigg)\frac{N_{s,m_{z0}}z_{0s,m}}{2}\bigg)=$$

$$\sum_{s=1}^{S}\sum_{m=1}^{M_s}\sum_{n=-\infty}^{\infty}\frac{4\pi}{1+\frac{k_z^2}{k_\rho^2}}a_{0s,m}N_{s,m_{\rho 0}}N_{s,m_{z0}}\sin\bigg(\bigg(k_\rho-n\frac{2\pi}{\rho_{0s,m}}\bigg)\frac{N_{s,m_{\rho 0}}\rho_{0s,m}}{2}\bigg)$$

$$\sin\bigg(\bigg(k_z-n\frac{2\pi}{v_{s,m}t_{0s,m}}\bigg)\frac{N_{s,m_{z0}}z_{0s,m}}{2}\bigg)$$

The corresponding equations in the time domain are a sum of multiple finite series of traveling dipoles (each an "impulse response") wherein each dipole series is periodic in space and time. In frequency space, each time delayed Gaussian filter ("association ensemble" corresponding to a "SFCs") modulates and samples the Fourier series representing information. Thus, the time delayed Gaussian filter selects information from the "string" and provides input for the association mechanism as the "processor" implements the Matrix Method of Analysis to find the order of the associated pieces of information represented by each "SFCs" or "group of SFCs" of the "string".

Consider the time interval $t=t_i$ to $t=t_f$ of a "string" associated by "association ensembles" and recorded to memory. By processing the "string' with multiple "association ensembles" comprising Gaussian filters each of different delay, $$\frac{\sqrt{N_s}}{\alpha_s},$$

and half-width parameter, $\alpha_s$, the "string" can be "broken" into "groups of SFCs" each having a center of mass at a time point corresponding to the delay $$\frac{\sqrt{N_s}}{\alpha_s},$$

and frequency composition corresponding to $\alpha_s$ which form a nested set of "sequential subsets" of "groups of SFCs" of the "string" in k,ω-space which map to time points which are randomly positioned along the time interval from the $t=t_1$-side and the $t=t_2$-side as shown in FIGS. 8, 10, 12, and 14. This nested set of "sequential subsets" of random "groups of SFCs" mapping to random time points from the $t=t_i$-side and the $t=t_f$-side is analogous to the nested set of "sequential subsets" of random DNA fragments from the 5' end and the 3' end. The order in both cases can be solved by the Genomic DNA Sequencing Method/Matrix Method of Analysis of Mills [3, 4] described in SUB-APPENDIX V.

The output of an association filter is the convolution of the input "groups of SFCs" (each "SFCs" is given by Eqs. (37.33) and (37.33a)) of a "string" (Eq. 37.108) or the string itself with a delayed Gaussian. In terms of the matrix method of analysis (hereafter "MMA"), the filter parameter $\alpha$ of the time delayed Gaussian filter corresponds to the acquisition of the composition of a polynucleotide member of a nested set of subsets. The time delay (time domain) and modulation (frequency domain) parameter $$\frac{\sqrt{N}}{\alpha}$$

determines the center of mass of the output, and it corresponds to the terminal nucleotide data. By forming "associations" with input from "High Level Memory", the "processor" determines the relative position of the center of mass of each Fourier series such as a "group of SFCs" as either "before" or "after" the center of mass of the preceding and succeeding Fourier series "associated" with Fourier series input from "High Level Memory". The complete set of Fourier series "associated" with Fourier series input from "High Level Memory" covers all of the frequencies of the "string". By Parseval's theorem, by processing the entire interval in k,ω-space, the information is entirely processed in the time domain. The order such as temporal order of the Fourier series representing information is determined using the MMA.

"Groups of SFCs" such as the "groups of SFCs" represented by Eq. (37.110) comprising a transducer frequency band modulation factor "carried" by "association ensembles" "couple" with Poissonian probability. "Associations" are established between "groups of SFCs" that result in the output of a second ordered "string" created from the input "string". In this case of input context, the "coupling cross section" amplitude, $\beta_s^2$, which follows from Eq. (37.87) is given by Eq. (37.111). And, the frequency difference angle, $\phi_s$, of the "coupling" which follows from Eq. (37.89) is given by Eq. (37.112a).

Input to form "associations" is provided by changing the decay constant $\alpha$ and the number of "stages" in the cascade N, or by processing "a SFCs" of a "string" using an "association ensemble" with different parameters $\alpha$ and N over all "groups of SFCs" that make up the entire "string". Each "group of SFCs" is determined to be on the $t=t_i$-side or the $t=t_f$-side of the "axis" of the "string" corresponding to the 5'-side or 3'-side of the "axis" of a polynucleotide to be sequenced via the Matrix Method of Analysis. A feedback loop comprises sequentially switching to different "known", "set", or "hardwired" delayed Gaussian filters which corresponds to changing the decay constant, $\alpha_s$, with a concomitant change in the half-width parameter, $\alpha_s$, and the number of elements, $N_s$, with a concomitant change in the delay, $$\frac{\sqrt{N_s}}{\alpha_s},$$

where each $\alpha_s$ and $$\frac{\sqrt{N_s}}{\alpha_s}$$

is "known" from past experiences and associations. The feedback loop whereby information from memory encoded in the "string" is filtered and delayed (modulated and sampled in frequency space) to provide "FCs", "SFCs" or "groups of SFCs" which are "associated" with input from "High Level Memory" provides the data acquisition and processing equivalent to the formation, acquisition, and analysis of the composition and terminal nucleotide data of a set of "sequential subsets" of the Matrix Method of Analysis. Changing the filters which process the "string" corresponds to changing the "guess" of the "known" nucleotides, $K_1 K_2 K_3 K_4 \ldots K_n$, as well as the "unknown" nucleotides, $X_1, X_2, X_3, X_4 \ldots$, of the Matrix Method of Analysis as applied to DNA sequencing. The order of the "groups of SFCs" of the "string" is established when "associations" with the "High Level Memory" are achieved for a given set of delayed Gaussian filters. Then each Fourier series of the ordered "string" is recorded to the "High Level Memory" wherein each Fourier series of the ordered "string" may be multiplied by the Fourier transform of the delayed Gaussian filter represented by $$e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)}$$

that established the correct order to form the ordered "string". The total output response $^r\Sigma$ in Fourier space comprising the superposition of S "groups of SFCs" wherein each "SFCs" corresponds to the response of M "M or P elements", with input context, is the "string" given by Eq. (37.113).

A summary of a method of ordering the nested set of subsets of Fourier series (e.g. each a "group of SFCs") follows:

a.) the "string" of the Association Filter Layer to Form a "String Section is recalled from memory;

b.) the recalled "string" is filtered and delayed (modulated and sampled in frequency space) to provide input to form "associations" with "High Level Memory" as given in the Association Filter Layer to Form a "String Section;

c.) a feedback loop is used to sequentially switch as described below to different "known", "standardized", "set", or "hardwired" delayed Gaussian filters which corresponds to changing the decay constant, $\alpha_s$, with a concomitant change in the half-width parameter, $\alpha_s$, and the number of elements, $N_s$, with a concomitant change in the delay, $$\frac{\sqrt{N_s}}{\alpha_s},$$

where each $\alpha_s$ and $$\frac{\sqrt{N_s}}{\alpha_s}$$

is "known" or "standardized" from past "associations";

d.) "associations" are established between Fourier series by their "coupling" with Poissonian probability with Fourier series input from "High Level Memory" as given in the Association Filter Layer to Form a "String Section. The "associations" establish the relative position of the center of mass of each Fourier series such as a "group of SFCs" as either "before" or "after" the center of mass of the preceding and succeeding Fourier series "associated" with Fourier series input from "High Level Memory". The complete set of Fourier series "associated" with Fourier series input from "High Level Memory" covers all of the frequencies of the "string";

e.) "groups of SFCs" of a sequential "set of subsets" are sequentially mapped to a time line by being added to the "before" or "after" end of the emerging temporally, conceptually, or causally ordered "string" wherein assignment of each "group of SFCs" is consistent with the frequency compositional and center of mass data to arrive at the order of the entire "string";

f.) steps c)-e) are performed reiteratively until an order can be assigned without contradiction;

g.) the order of the associated "groups of SFCs" is established when "associations" with the "High Level Memory" are achieved for a given set of delayed Gaussian filters (i.e. the order is established when internal consistence is achieved with input from ordered "strings" of High Level Memory);

h.) the "groups of SFCs" of the "P string" of the form of Eqs. (37.113-37.115) that are parameterized according to their relative order are recorded to the "High Level Memory". For example, each Fourier series of the ordered string is recorded to the "High Level Memory" wherein each Fourier series of the ordered "string" is multiplied by the Fourier transform of the delayed Gaussian filter represented by $$e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)}$$

that established the correct order to form the ordered "string" represented by $$V_{\Sigma s,m}(k_\rho, k_z) \sum_{s=1}^{S} \sum_{m=1}^{M_s} \sum_{n=-\infty}^{\infty} a_{0s,m} N_{s,m\rho_0} e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)} e^{-jk_\rho \rho_{fb_{s,m}}} \sin\left(\left(k_\rho - n\frac{2\pi}{\rho_{0_{s,m}}}\right)\frac{N_{s,m\rho_0}\rho_{0_{s,m}}}{2}\right). \quad (37.115)$$

Output of the Ordered "String" to High Level Memory Layer with Formation of the Predominant Configuration The activation of a "P element" increases its excitability or probability of future activation with input. Each "P element" has an activation memory with a finite half-life. Repetitive activation of a "P element" results in a longer half-life of the increased excitability; thus, the activation memory becomes long term. The same principle applies to cascade of association "stages" ("association ensembles") and M elements ("memory ensembles") and "configurations" of "couplings" of ensembles. For example, each "association ensemble" is comprised of "stages" in different states of "activity" where each state is equivalent to a microstate of statistical thermodynamics. A predominant configuration arises for any "association ensemble". Of the immense total number of microstates that can be assumed by an "association ensemble", an overwhelming proportion arises from one comparatively, small set of configurations centered on, and only minutely different from, the predominant configuration—with which they share an empirically identical set of macroscopic properties. On a higher level, a configuration of "couplings" between "association ensembles" increases the activation of the "stages" comprising the "association ensembles". Analogously to statistical thermodynamics, a predominant configuration arises from the "association ensemble" level. Consider the "processor" on a higher level. The activation history of each "association ensemble" relates to a hierarchical activation relationship of coupled "association ensembles" which gives rise to a precedence of higher order predominant configurations. The ability to associate information and create novel information, is a consequence. Machine learning arises by the feedback loop of transducer input to the coupled predominant configurations which increases the basis for creating information with novel conceptual content.

A summary of the method of Output of the Ordered "String" to High Level Memory Layer with Formation of the Predominant Configuration follows:

a.) the "groups of SFCs" of the "P string" of the form of Eqs. (37.113-37.115) that are parameterized according to their relative order are recorded to the "High Level Memory";

b.) a counter corresponding to each "P string" and each "association ensemble" increases its stored count each time the "P string" or "association ensemble" is activated. In one embodiment, the count is also proportional to the length of time the "P string" or "association ensemble" is "active", and the count decays over time;

c.) the count is transformed into an expectation value and stored in a probability register which corresponds to each "string" and each "association ensemble";

d.) during the process of establishing "associations" a probability operand causes a given "P string" or "association ensemble" to become "active" with an expectation value according to the value stored in its corresponding probability register;

f.) on a lower level, the mechanism whereby past activation increases the probability of future activation applies to "P and M elements" as well;

e.) as more "P strings" are created, more "P elements", "M elements", and "stages" are activated, and more "association ensembles" are created and activated, the relationship of the probability of future activation based on past activation gives rise to a processing predominant configuration of the "processor" analogous to that of statistical thermodynamics.

Sub-Appendix I

The Input and the Band-Pass Filter of the Analog Fourier Processor

The "P element" "impulse response" is a traveling wave in one spatial dimension ($\rho$) plus time ($t=z/v$) where the wave function is a dipole traveling at a constant velocity $v$. The magnitude of the potential, V, in cylindrical spacetime coordinates at the point ($\rho$,z) due to an "impulse response" centered at the position ($\rho_0$,$z_0$) is $$V = \frac{(2(z-z_0)^2 - (\rho - \rho_0)^2)}{[(\rho - \rho_0)^2 + (z - z_0)^2]^{5/2}} \qquad (37.22)$$

$$V = \frac{(2z^2 - \rho^2)}{[\rho^2 + z^2]^{5/2}} \otimes \delta(\rho - \rho_0, z - z_0) \qquad (37.23)$$

where $$z_0 = vt_0 \qquad (37.24)$$

The potential is the convolution of the system function, h($\rho$, z), (the left-handed part of Eq. (37.23)) with the delta function (the right-hand part of Eq. (37.23)) at the position ($\rho_0$,$z_0$). A very important theorem of Fourier analysis states that the Fourier transform of a convolution is the product of the individual Fourier transforms, and the Fourier transform of a product is the convolution of the individual Fourier transforms [5]. The Fourier transform of the system function, h($\rho$,z), is given in Box 16.1 of the Superconductivity Section of Mills [6]. Also, see Mills [7].

Figure 7:
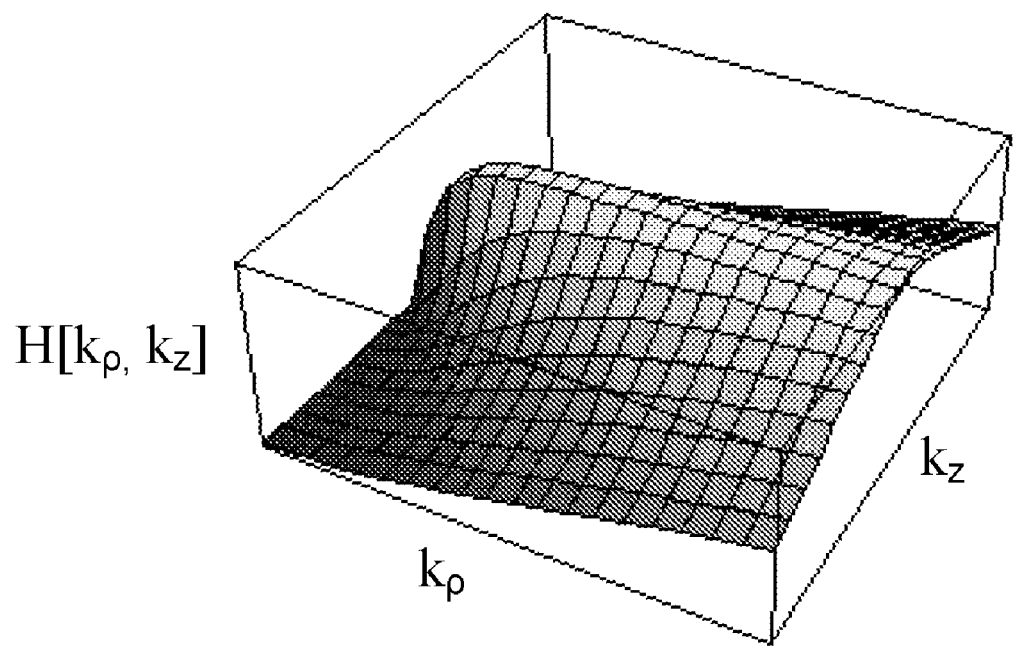
FIG. 7 is a schematic drawing of the Fourier Transform $H[k_\rho,k_z]$ of the system function $h(\rho,z)$ corresponding to the "impulse response" in accordance with the invention.
Figure 8:
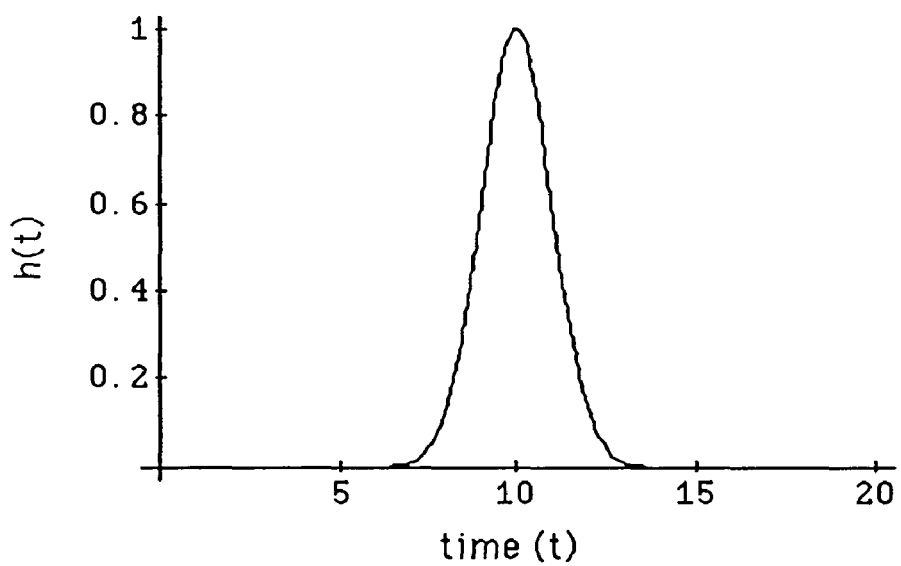
FIG. 8 is a schematic of h(t) given by Eq. (37.51) where $\alpha=1$ and N=100 in accordance with the invention.
Figure 9:
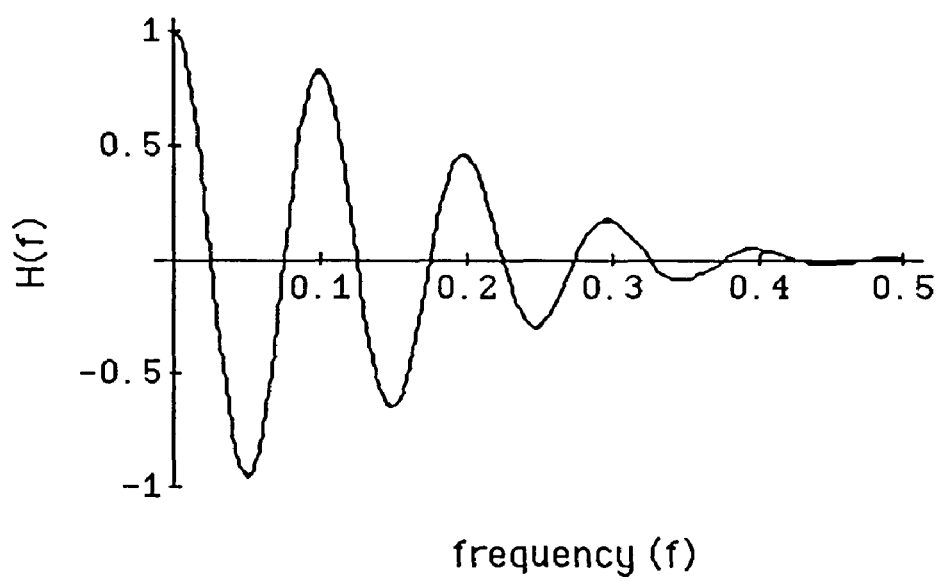
FIG. 9 is a schematic of H(f) given by Eq. (37.50) where $\alpha=1$ and N=100 in accordance with the invention.
Figure 10:
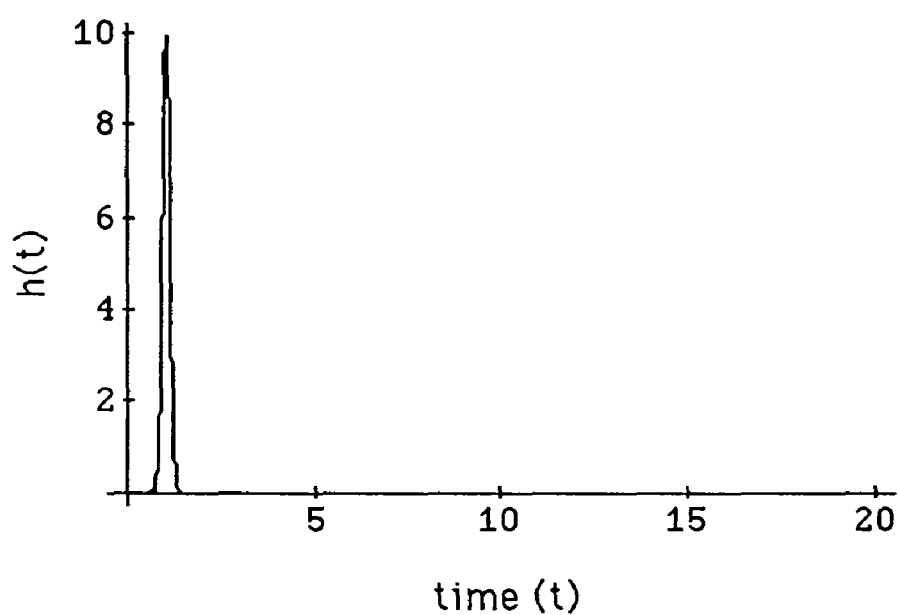
FIG. 10 is a schematic of h(t) given by Eq. (37.51) where $\alpha=10$ and N=100 in accordance with the invention.
Figure 11:
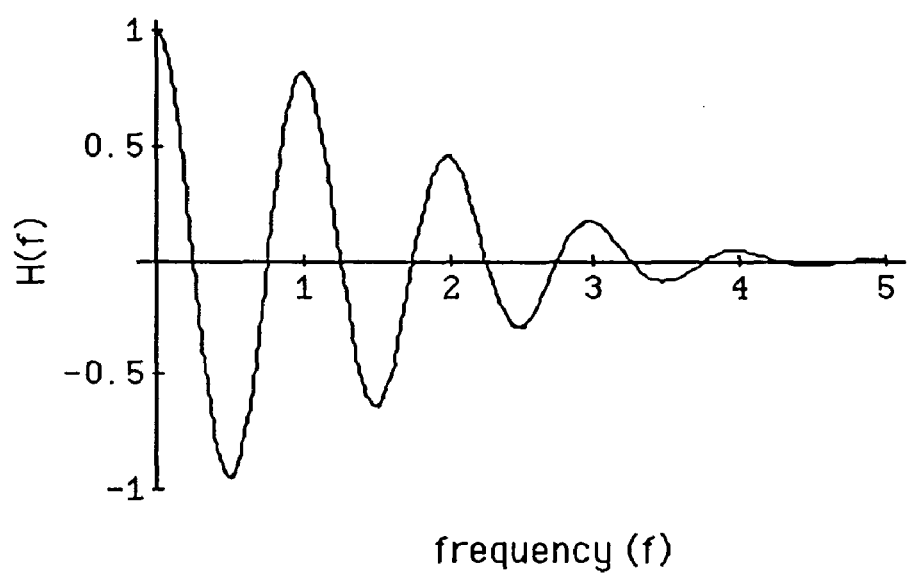
FIG. 11 is a schematic of H(f) given by Eq. (37.50) where $\alpha=10$ and N=100 in accordance with the invention.
Figure 12:
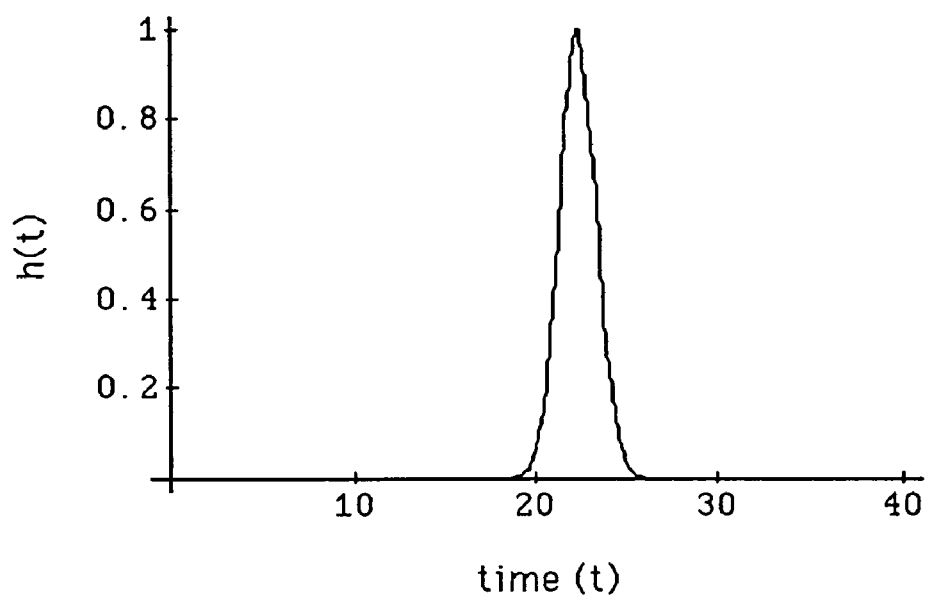
FIG. 12 is a schematic of h(t) given by Eq. (37.51) where $\alpha=1$ and N=500 in accordance with the invention.
Figure 13:
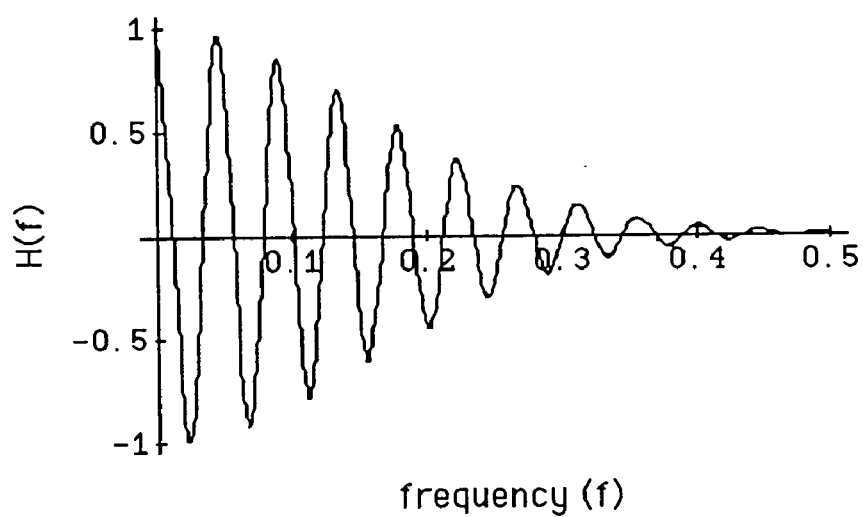
FIG. 13 is a schematic of H(f) given by Eq. (37.50) where $\alpha=1$ and N=500 in accordance with the invention.
Figure 14:
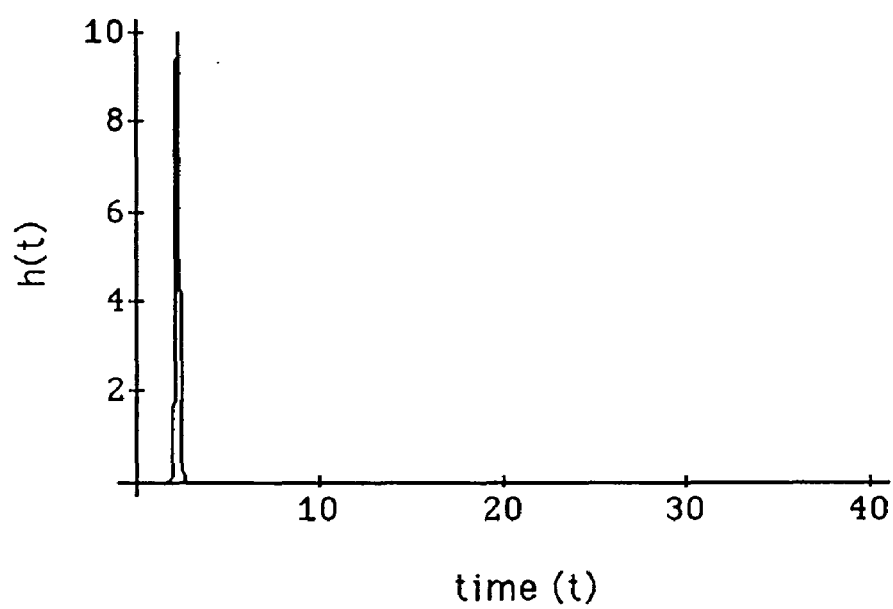
FIG. 14 is a schematic of h(t) given by Eq. (37.51) where $\alpha=10$ and N=500 in accordance with the invention.
Figure 15:
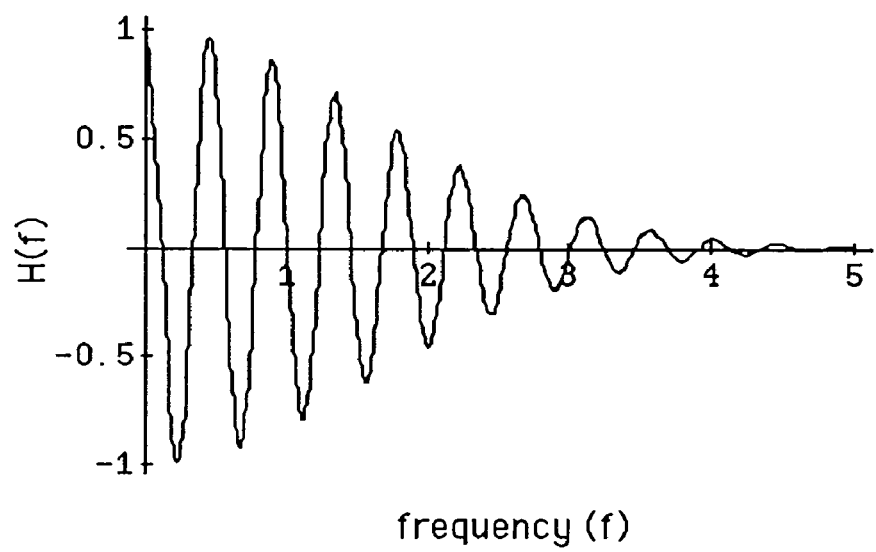
FIG. 15 is a schematic of H(f) given by Eq. (37.50) where $\alpha=10$ and N=500 in accordance with the invention.

An "impulse response" has the system function, h($\rho$,z), which has the Fourier transform, H[$k_\rho$,$k_z$], which is shown in FIG. 7.

$$H[k_\rho, k_z] = \frac{4\pi k_\rho^2}{k_z^2 + k_\rho^2} = \frac{4\pi}{1 + \frac{k_z^2}{k_\rho^2}} \qquad (37.25)$$

The output of a "P element", $V_{tr}$, to an input of a pulse train of one or more "impulse responses" is another pulse train of "impulse responses". The spacetime "P element response", a pulse train function, is the convolution of the array pattern with the elemental pattern. The elemental pattern is the system function, h($\rho$,z),—the spacetime potential function of an "impulse response". And, the array pattern is a finite periodic array of delta functions each at the center position of an "impulse response".

$$V_{tr}(\rho, z(t)) = \frac{(2z^2 - \rho^2)}{[\rho^2 + z^2]^{5/2}} \otimes \sum_{n=1}^{\infty} a_n \delta(\rho - n\rho_0, z - nvt_0) \qquad (37.26)$$

$$X\left[U\left(\rho + \frac{N\rho_0}{2}, z + \frac{Nvt_0}{2}\right) - U\left(\rho - \frac{N\rho_0}{2}, z - \frac{Nvt_0}{2}\right)\right]$$

where $a_n$ is a constant and $$U\left(\rho + \frac{N\rho_0}{2}, z + \frac{Nvt_0}{2}\right)$$

is the unitary step function at $$\rho = \frac{-N\rho_0}{2} \text{ and } z = \frac{-Nz_0}{2} = \frac{-Nvt_0}{2}$$

and $$U\left(\rho - \frac{N\rho_0}{2}, z - \frac{Nvt_0}{2}\right)$$

is the unitary step function at position $$\rho = \frac{N\rho_0}{2} \text{ and } z = \frac{Nz_0}{2} = \frac{Nvt_0}{2}.$$

Multiple "P elements" input into any given "P element" which then outputs to multiple "P elements". And, the amplitude, frequency, and length of the "P element response" (pulse train) is proportional to the length and rate of voltage change—the amplitude and rate of change of the input. Thus, each "P element" is an linear differentiator—the output, $V_{Out}$, is the sum (superposition) of the derivative of the inputs. An exemplary output signal of an analog "P element" to an input of the form given by Eq. (37.26) is $$V_{out}(\rho, z(t)) = \frac{\delta^2}{\delta\rho\delta z}\left[\frac{(2z^2 - \rho^2)}{[\rho^2 + z^2]^{5/2}} \otimes \sum_{n=1}^{\infty} a_n\delta(\rho - n\rho_0, z - nvt_0) \right. \quad (37.27)$$

$$X\left[U\left(\rho + \frac{N\rho_0}{2}, z + \frac{Nvt_0}{2}\right) - U\left(\rho - \frac{N\rho_0}{2}, z - \frac{Nvt_0}{2}\right)\right]\Bigg]$$

The Fourier Transform of the periodic array of delta functions of Eq. (37.27) is also a periodic array of delta functions in k,ω-space $$\frac{1}{\rho_0 z_0} \sum_{n=-\infty}^{\infty} a_n \delta\left(k_\rho - n\frac{2\pi}{\rho_0}, k_z - n\frac{2\pi}{vt_0}\right) \quad (37.28)$$

where $z_0 = vt_0$. The Fourier Transform of the window function given by the difference of the unitary step functions of Eq. (37.27) is the product of two sinc functions in k,ω-space $$4\frac{\sin k_\rho \frac{N\rho_0}{2}}{k_\rho} \frac{\sin k_z \frac{Nz_0}{2}}{k_z} \quad (37.29)$$

By the Fourier Theorem, the Fourier Transform of Eq. (37.26) is the product of the Fourier Transform of the elemental function, system function given by Eq. (37.25), and the Fourier Transform of the array function given by Eq. (37.28) convolved with the Fourier transform of the window function given by Eq. (37.29).

$$\frac{4\pi}{1 + \frac{k_z^2}{k_\rho^2}} \frac{1}{\rho_0 z_0} \sum_{n=-\infty}^{\infty} a_n \delta\left(k_\rho - n\frac{2\pi}{\rho_0}, k_z - n\frac{2\pi}{vt_0}\right) \otimes \quad (37.30)$$

$$4\frac{\sin k_\rho \frac{N\rho_0}{2}}{k_\rho} \frac{\sin k_z \frac{Nz_0}{2}}{k_z}$$

Each "P element" is an linear differentiator—the output is the sum (superposition) of the derivative of the inputs. The differentiation property of Fourier transforms [8] is $$x(t) = \int_{-\infty}^{\infty} X(f)e^{j2\pi ft} df \quad X(t) = \int_{-\infty}^{\infty} x(t)e^{-j2\pi ft} dt \quad (37.31)$$

$$\text{Differentiation } \frac{dx(t)}{dt} \Leftrightarrow j2\pi f X(f)$$

From Eqs. (37.30) and (37.31), the Fourier transform of a "P element response", $V(k_\rho, k_z)$, called a "FC" is $$V(k_\rho, k_z) = k_\rho k_z \frac{4\pi}{1 + \frac{k_z^2}{k_\rho^2}} \frac{1}{\rho_0 z_0} \sum_{n=-\infty}^{\infty} a_n \delta\left(k_\rho - n\frac{2\pi}{\rho_0}, k_z - n\frac{2\pi}{vt_0}\right) \otimes \quad (37.32)$$

$$4\frac{\sin k_\rho \frac{N\rho_0}{2}}{k_\rho} \frac{\sin k_z \frac{Nz_0}{2}}{k_z}$$

$$= \frac{4\pi}{1 + \frac{k_z^2}{k_\rho^2}} \frac{1}{\rho_0 z_0} \sum_{n=-\infty}^{\infty} a_n \delta\left(k_\rho - n\frac{2\pi}{\rho_0}, k_z - n\frac{2\pi}{vt_0}\right) \otimes$$

$$4\sin k_\rho \frac{N\rho_0}{2} \sin k_z \frac{Nz_0}{2}$$

$$= \frac{4\pi}{1 + \frac{k_z^2}{k_\rho^2}} \frac{1}{\rho_0 z_0} \sum_{n=-\infty}^{\infty} a_0 \sin\left(\left(k_\rho - n\frac{2\pi}{\rho_0}\right)\frac{N\rho_0}{2}\right) \sin$$

$$\left(\left(k_z - n\frac{2\pi}{vt_0}\right)\frac{Nz_0}{2}\right)$$

Information "carried" by "P elements" may be represented by a Fourier series called a "SFCs" (series of Fourier components) comprising the superposition of the "P element responses" of multiple "P elements". Each "P element" contributes a Fourier component comprising an amplitude, $a_{0_m}$, at a specific frequency, $$\frac{N_m \rho_{0_m}}{2}, \frac{N_m \rho_{0_m}}{2},$$

which is repeated as a series with a specific phase, $$\frac{nN_m}{2}.$$

A "SFCs" comprising the Fourier transform of the superposition of the "P element responses" of M "P elements", $^r\Sigma$ is $$V_{\Sigma_m}(k_\rho, k_z) = \sum_{m=1}^{m} \sum_{n=-\infty}^{\infty} \frac{4\pi}{1 + \frac{k_z^2}{k_\rho^2}} \frac{4}{\rho_{0_m} z_{0_m}} a_{0_m} \sin\left(\left(k_\rho - n\frac{2\pi}{\rho_{0_m}}\right) \frac{N_{m\rho 0} \rho_{0_m}}{2}\right) \\ \sin\left(\left(k_z - n\frac{2\pi}{vt_0}\right) \frac{N_{m z 0} z_{0_m}}{2}\right) \quad (37.33)$$

Each "FC" of Eqs. (37.33) is a series of a Fourier component with quantized frequency and phase angle.

Consider the case that the amplitude of all "P element responses", are equal where each amplitude is represented by $a_{0_m}$. The "P element response" function given by Eq. (37.33) corresponds to recording to memory ("writing"). Consider the case that memory elements are activated to read the stored information. In one embodiment, this "read" operation is effected by a voltage ramp that is linear with time. The Fourier transform of the response is given by the differentiation and duality properties of Fourier transforms [8]. The "read" total response $^r\Sigma$ in Fourier space comprising a "SFCs", the superposition of M "FCs" wherein each "FC" corresponds to the response of a "M or P element" is $$V_{\Sigma_m}(k_\rho, k_z) = \sum_{m=1}^{M} \sum_{n=-\infty}^{\infty} \frac{4\pi}{1 + \frac{k_z^2}{k_\rho^2}} \frac{4}{\rho_{0_m} z_{0_m}} a_{0_m} \frac{N_{m\rho 0} \rho_{0_m}}{2} \frac{N_{m z 0} z_{0_m}}{2} \sin\left(\left(k_\rho - n\frac{2\pi}{\rho_{0_m}}\right) \frac{N_{m\rho 0} \rho_{0_m}}{2}\right) \sin\left(\left(k_z - n\frac{2\pi}{v_m t_{0_m}}\right) \frac{N_{m z 0} z_{0_m}}{2}\right) = \\ \sum_{m=1}^{M} \sum_{n=-\infty}^{\infty} \frac{4\pi}{1 + \frac{k_z^2}{k_\rho^2}} a_{0_m} N_{m\rho 0} N_{m z 0} \sin\left(\left(k_\rho - n\frac{2\pi}{\rho_{0_m}}\right) \frac{N_{m\rho 0} \rho_{0_m}}{2}\right) \\ \sin\left(\left(k_z - n\frac{2\pi}{v_m t_{0_m}}\right) \frac{N_{m z 0} z_{0_m}}{2}\right) \quad (37.33a)$$

Each "FC" of Eqs. (37.33a) is a series of a Fourier component with quantized amplitude, frequency, and phase angle.

The relationship between k,ω-space and real space is $$k_\rho = \frac{2\pi}{\lambda_\rho} = \frac{2\pi}{\rho} = \frac{2\pi}{n\rho_0} \quad (37.34)$$
$$k_z = \frac{2\pi}{\lambda_z} = \frac{2\pi}{z} = \frac{2\pi}{nvt_0}$$

In k,ω-space, the Fourier transform of the "impulse response" function (the left-hand side of Eq. (37.33)) filters each "FC" of a "P element". In the special case that $$k_\rho = k_z \quad (37.35)$$

the Fourier Transform of the system function (the left-hand side of Eq. (37.33)) is given by $$H = 4\pi \quad (37.36)$$

Thus, the Fourier Transform of the system function band-passes the Fourier Transform of the time dependent "P element response" function when the spatial frequency of the "FC" is equal to the temporal frequency. In one embodiment, "FC" filtering may be provided by adjusting the "P element" response corresponding to $k_\rho$ versus $k_z$ such that the band-pass condition of Eq. (37.35) is not met. In an analog embodiment, the "FC" may be filtered by adjusting the "impulse response" frequency as a function of time and therefore space corresponding to $k_\rho$ since the "impulse response" is a traveling wave. In another analog embodiment, the "FC" may be filtered by adjusting the conduction velocity which alters the output corresponding to $k_z$.

When the band-pass condition is met (Eq. (37.35)), the Fourier transform of the superposition of a series of pulse trains of "impulse responses" of multiple "P elements" representing information is a series of trigonometric functions. Thus, in one embodiment of the present invention, the "processor" is an analog Fourier processor. According to the Fourier theorem any waveform can be recreated by an infinite series of trigonometric functions.

$$x(t) = a_0 + \sum_{n=1}^{\infty} a_n \cos \omega_n t + \sum_{n=1}^{\infty} b_n \sin \omega_n t \quad (37.37)$$

where $a_0$, $a_n$, and $b_n$ are constants. And, any aspect of the universe can be represented by an infinite series of sine and cosine functions as processed by the "processor". For the present "processor", the trigonometric function is the basis element of information. And, the complexity or information content of any analog waveform or digital equivalent is reducible to the number of Fourier components required for its assimilation.

A unique feature of the present invention is that information is encoded in a Fourier series in k,ω-space versus a conventional Fourier series in time and space.

Sub-Appendix II

Modulation and Sampling Gives the Input to the Association Mechanism and Basis of Reasoning Each "P element" connects to multiple other "P elements" which further connect to association "stages" that propagate the "P element responses" as input along these "stages" in a linear cascade. Consider an amplifier made up of cascaded stages. The stages need not be identical. Let $h_i(t)$ be the impulse response of the $i^{th}$ stage and assume that $h_i(t) \geq 0$, so that the step response of each stage (or indeed of any number of cascaded stages) is monotonic. Assuming that both integrals exist, $T_i$, the normalized first moment of $h_i(t)$ is defined as $$T_i = \frac{\int_{-\infty}^{\infty} t h_i(t) dt}{\int_{-\infty}^{\infty} h_i(t) dt} \quad (37.38)$$

which can be interpreted as the center of gravity of a mass distributed along the t-axis with density $h_i(t)$. If $h_i(t)$ is positive, it is analogous to a probability density function, and $T_i$ corresponds to the statistical analog—the mean of $h_i(t)$. Thus, $T_i$ is considered as the measure of the delay in the impulse or step response of the $i^{th}$ stage. The delay resulting from a cascade of n stages is the sum of the delays of each stage [9]; that is if $$h(t)=h_1(t) \otimes h_2(t) \otimes \ldots \otimes h_n(t) \quad (37.39)$$

where $\otimes$ is the convolution operator, then $$T=T_1+T_2+\ldots+T_n \quad (37.40)$$

Similarly, assuming that both integrals exist, $$\left(\frac{\Delta T_i}{2}\right)^2,$$

the normalized moment of inertia about a center of gravity of a mass distribution $h_i(t)$ is defined as $$(\Delta T_i)^2 = 4\left[\frac{\int_{-\infty}^{\infty} t^2 h_i(t)\,dt}{\int_{-\infty}^{\infty} h_i(t)\,dt} - T_i^2\right] \quad (37.41)$$

$$= 4\frac{\int_{-\infty}^{\infty} (t-T_i)^2 h_i(t)\,dt}{\int_{-\infty}^{\infty} h_i(t)\,dt}$$

If $h_i(t)$ is positive, it is analogous to a probability density function, and $$\left(\frac{\Delta T_i}{2}\right)^2$$

can be interpreted as the statistical analog—the variance or dispersion of $h_i(t)$. $\Delta T_i$ is twice the radius of gyration of the mass distribution. Thus, $\Delta T_i$ is a measure of the duration of $h_i(t)$ or of the rise time of the step response of the $i^{th}$ stage. The rise time resulting from a cascade of n stages is the sum of the rise times of each stage [10]; that is if h(t) is given by Eq. (37.39), then $$(\Delta T)^2=(\Delta T_1)^2+(\Delta T_2)^2+\ldots+(\Delta T_n)^2 \quad (37.42)$$

Thus, in particular, for identical stages, the rise time is proportional to the square root of the number of stages. If $h_i(t)$ is not positive, rather than the definition of Eq. (37.41), the measure of duration is better defined as $$(\Delta T)^2 = 4\left[\frac{\int_{-\infty}^{\infty} t^2 h^2(t)\,dt}{\int_{-\infty}^{\infty} h^2(t)\,dt} - \left(\frac{\int_{-\infty}^{\infty} t h^2(t)\,dt}{\int_{-\infty}^{\infty} h^2(t)\,dt}\right)^2\right] \quad (37.43)$$

$$= 4\frac{\int_{-\infty}^{\infty} (t-T_i)^2 h_i(t)\,dt}{\int_{-\infty}^{\infty} h_i(t)\,dt}$$

In many ways $\Delta T$ of Eq. (37.43) is the most analytically satisfactory simple general measure of duration; for virtually any $h_i(t)$ for which the integrals exist, Eq. (37.43) will give a reasonable estimate of duration. Equivalently, possibly the best simple measure of bandwidth for real lowpass waveforms is $$(\Delta W)^2 = 4\frac{\int_{-\infty}^{\infty} f^2 |H(f)|^2\,df}{\int_{-\infty}^{\infty} |H(f)|^2\,df} \quad (37.44)$$

From the definitions of $\Delta T$ and $\Delta W$ given by Eq. (37.43) and Eq. (37.44), respectively, it is possible to prove the following Uncertainty Principle [9]:

For any real waveform for which $\Delta T$ and $\Delta W$ of Eq. (37.41) and Eq. (37.43) exist, $$\Delta T \Delta W \geq 1/\pi \quad (37.45)$$

In other words, $\Delta T$ and $\Delta W$ cannot simultaneously be arbitrarily small: A short duration implies a large bandwidth, and a small-bandwidth waveform must last for a long time.

Consider a cascade of association "stages". The Uncertainty Principle given by Eq. (37.45) applies to the "P element response" as it is transmitted from one "stage" to another in the cascade. In one embodiment, the "voltage" decays exponentially at the junction or linkage of any two "stages". The cascade forms a filter, and an ideal filter response is that which has the smallest duration-bandwidth product in the sense of Eqs. (37.43) and (37.44). Such a response is a Gaussian pulse which also has the same form in the time and space domain [9]. However, a Gaussian pulse cannot be the impulse response of any casual system, even with substantial delay. Consider, for example, an N-stage amplifier with the impulse response of each stage equal to $$h(t)=\alpha\sqrt{N}e^{-\alpha\sqrt{N}t}u(t) \quad (37.46)$$

The frequency response of the cascade of N such stages is $$H_N(f) = [H(f)]^N = \left(\frac{1}{1+\frac{j2\pi f}{\alpha\sqrt{N}}}\right)^N \quad (37.47)$$

The shape of $H_N(f)$ for large N can be determined by taking logarithms and using the power series expansion $$\ln(1+x) = x - \frac{x^2}{2} + \frac{x^3}{3} \ldots \quad (37.48)$$

The power series expansion of the $\ln H_N$ is $$\ln H_N = -N\left[\frac{j2\pi f}{\alpha\sqrt{N}} - \frac{1}{2}\left(\frac{j2\pi f}{\alpha\sqrt{N}}\right)^2 + \frac{1}{3}\left(\frac{j2\pi f}{\alpha\sqrt{N}}\right)^3 \ldots\right] \quad (37.49)$$

$$\approx -j\frac{2\pi f}{\alpha}\sqrt{N} - \frac{1}{2}\left(\frac{2\pi f}{\alpha}\right)^2$$

where the remaining terms vanish as fast as $$\frac{1}{\sqrt{N}}$$

for large N. Thus, the frequency response tends to $$H_N(f) \approx e^{-\frac{1}{2}\left(\frac{2\pi f}{\alpha}\right)^2} e^{-j\sqrt{N}\left(\frac{2\pi f}{\alpha}\right)} \qquad (37.50)$$

for large N, and the impulse response of the cascade tends to $$h_N(t) \approx \frac{\alpha}{\sqrt{2\pi}} e^{-\frac{\left(t-\frac{\sqrt{N}}{\alpha}\right)^2}{\frac{2}{\alpha^2}}} \qquad (37.51)$$

that is, a Gaussian pulse delayed by $$\frac{\sqrt{N}}{\alpha}.$$

This result is a very special case of a remarkable theorem [10]—the Central Limit Theorem of probability theory—which states in effect that, under very general conditions, the cascade of a large number of linear-time-invariant (LTI) systems will tend to have a Gaussian impulse response, almost independent of the characteristics of the systems cascaded. Sufficient conditions of the Central Limit Theorem are that 1. The absolute third moments, $$\int_{-\infty}^{\infty} |t|^3 h_i(t)\,dt \qquad (37.52)$$

exist for all components of the systems and are uniformly bounded;

2. The durations, $\Delta T_i$, of the component systems in the sense of Eq. (37.43) satisfy the relation $$\lim_{N\to\infty} \frac{1}{N}\sum_{i=1}^{N} (\Delta T_i)^2 \neq 0 \qquad (37.53)$$

For large N, the first condition allows the higher order terms in the expansion such as Eq. (37.49) to be ignored, and the second condition guarantees that no finite subset of the component systems will dominate the result because the remainder have relatively wide bandwidths. Given this theorem, it follows from Eqs. (37.38-37.45) [9] that the overall impulse response of N cascaded stages is approximately $$h(t) \approx \frac{k}{\sqrt{2\pi}\Delta T} e^{\frac{(t-T)^2}{2(\Delta T)^2}} \qquad (37.54)$$

where T and $\Delta T$ are given by Eq. (37.40) and Eq. (37.42), respectively, and $$k = \prod_{i=1}^{N} \int_{-\infty}^{\infty} h_i(t)\,dt \qquad (37.55)$$

Eq. (37.54) is a filter function. Consider Eq. (37.33) where the Fourier transform of the superposition of "P element responses" (the sum of multiple pulse trains of "impulse responses" representing information) is given by a series of trigonometric functions wherein the "processor" can be an analog Fourier processor. The input of information to the association mechanism arises as the Fourier series is modulated and sampled. Consider the output of a cascade of association "stages"—each with an "impulse response". The "stages" are cascaded as an N-stage amplifier with the transmission impulse response of each stage in one embodiment equal to that of a decaying exponential given by Eq. (37.46). The filtered signal is the sum of the convolution of the response of each transmission stage of the cascade with each "P element response". Using the distributive, commutative, and associative laws of the convolution operation and using the Central Limit Theorem, the filtered signal is the convolution of the superposition of the "P element responses" over the cascade of "stages" also given by Eq. (37.27) with the Gaussian response given by Eq. (37.51). A very important theorem of Fourier analysis states that the Fourier transform of a convolution is the product of the individual Fourier transforms [5]. Thus, the output of a cascade of N stages each with a transmission decay constant $\alpha$ (corresponding to the transmission impulse response) is the product of Eq. (37.33) and Eq. (37.50). By changing the decay constant $\alpha$ and the number of "stages" N in the cascade, Fourier series representing information including that from memory can be filtered and delayed (modulated and sampled in frequency space) to provide input to form associations of the Association Filter Layer. For example, consider the result on exemplary filter functions and the corresponding Fourier transforms shown in FIGS. 8 to 15 as the decay constant $\alpha$ and the number of "stages" N of each corresponding cascade are altered. In frequency space, the time delayed Gaussian filter corresponds to modulation and sampling of the Fourier series representation of the memory output comprising the superposition of multiple "M element responses". Thus, the time delayed Gaussian filter selects memory output and provides input for the association mechanism and basis of reasoning.

In another embodiment, the time delayed Gaussian filter may be modulated in the time domain to effect a frequency shift in k,ω-space. The shift follows from Eq. (37.109) and the duality property of Fourier transforms [8].

Sub-Appendix III

The Association Mechanism and Basis of Reasoning

"Coupling"

A cascade of association "stages" called an "association ensemble" is "activated" with input from "M elements", "P elements", or "stages" of a different "association ensemble". The "association ensemble" is "active" if it is "carrying" a Fourier series such as a "SFCs" wherein "active" in the digital case may refer to a recall of an "SFCs" from memory followed by steps a-i of the Association Filter Layer to Form a "String" Section. The "association ensemble" is "inactive" if it has no output and is not "carrying" a Fourier series such as a "SFCs" wherein "inactive" in the digital case may refer to no recall of an "SFCs" from memory.

In an analog embodiment, the "stages" of an "association ensemble" are intraconnected and interconnected. A first "active" cascade of association "stages" can interfere with and "couple" with a second set, third set, etc. The probability distribution function of "coupling" between a first "active" "association ensemble" and at least one other "active" "association ensemble" is Poissonian. Each "association ensemble" is comprised of a large number of cascaded association "stages" each weakly linked to one or more "stages" of the one or more different "association ensembles". (The "coupling" is analogous to interference between coherent or harmonic states.) The probability $$P_t\left(\frac{\sqrt{N_1}}{\alpha_1}, \frac{\sqrt{N_2}}{\alpha_2}, \ldots, \frac{\sqrt{N_s}}{\alpha_s}\right)$$

that a first "active" cascade of association "stages" with modulation $$e^{-j\sqrt{N_1}\left(\frac{2\pi f}{\alpha_1}\right)}$$

given by Eq. (37.50) will interfere with and "couple" with s separate "active" cascades of association "stages" ("association ensembles") each with modulation $$e^{-j\sqrt{N_s}\left(\frac{2\pi f}{\alpha_s}\right)}$$

given by Eq. (37.50) can be derived from the correlation function (Eq. (37.78) for the statistical average of the large number of possible "couplings" between the individual weakly linked "stages".

The physical behavior of a large number of "active" cascaded association "stages" (an "association ensemble") each weakly linked to provide a Poissonian probability of "coupling" to one or more "stages" of one or more different "association ensembles" is equivalent to that of the interaction of ultrasound with Mössbauer gamma rays. Each "association ensemble" "carries" a Fourier series in k,ω-space such as a "M or P element response" which comprises a sum of harmonic functions. Thus, physically, the former case corresponds to interference of a first Fourier series input filtered by an "association ensemble" with a second, third, or s th Fourier series input filtered by s th "association ensemble". The latter case corresponds to interference of an electronic transition and an oscillator transition. In both cases, a harmonic energized state interferes with another.

Consider the Lamb-Mössbauer formula for the absorption of a γ ray of energy E by a nucleus in a crystal given by Maradudin [11].

$$\sigma_a(E) = \frac{1}{4}\sigma_0 \Gamma^2 \sum_{mn} e^{-\frac{\beta E_m}{Z}} X \frac{\langle m|e^{i\left(\frac{P}{\hbar}\right)R(1)}|n\rangle\langle n|e^{-i\left(\frac{P}{\hbar}\right)R(1)}|m\rangle}{(E_0 - E + E_n - E_m)^2 + \frac{1}{4}\Gamma^2} \quad (37.56)$$

In this equation, $E_0$ is the energy difference between the final and initial nuclear states of the absorbing nucleus, $E_m$ and $E_n$ are the energies of the eigenstates $|m\rangle$ and $|n\rangle$ of the crystal, respectively, $\Gamma$ is the natural width of the excited state of the nucleus, p is the momentum of the γ ray, R(l) is the instantaneous position vector of the absorbing nucleus, Z is the crystal's partition function, $T=(k\beta)^{-1}$, and $\sigma_0$ is the resonance absorption cross section for the absorbing nucleus. By expressing the denominator of Eq. (37.56) as an integral, Eq. (37.56) is equivalent to $$\sigma_a(E) = \frac{1}{2}\sigma_0\gamma \int_{-\infty}^{\infty} dt e^{i\omega t - \gamma|t|} X \langle \exp[-ik \cdot u(l;t)]\exp[ik;u(l;0)]\rangle \quad (37.57)$$

wherein the position vector R(l) is $$R(l) = x(l) + u(l) \quad (37.58)$$

For, Eq. (37.58), x(l) is the position vector of the mean position of the absorbing nucleus, and u(l) is its displacement from the mean position. Eq. (37.57) follows from Eq. (37.56) with the following substitutions:

$$\left(\frac{1}{\hbar}\right)p = k \quad (37.59)$$

$$\hbar\omega = E - E_0 \quad (37.60)$$

$$\gamma = \frac{\Gamma}{2\hbar} \quad (37.61)$$

and u(l;t) denotes the Heisenberg operator, $$u(l;t) = e^{i\left(\frac{t}{\hbar}\right)H}u(l;0)e^{-i\left(\frac{t}{\hbar}\right)H} \quad (37.62)$$

where H is the Hamiltonian. The angular brackets in Eq. (37.57) denote an average over the canonical ensemble of the crystal.

The correlation function for the statistical average of a large number of "active" cascaded association "stages" (an "association ensemble") each weakly coupled to one or more "stages" of one or more different "active" "association ensembles" is equivalent to that of the interaction of ultrasound with Mössbauer gamma rays. From Eq. (37.57), the correlation function Q(t) of acoustically modulated gamma ray absorption by Mössbauer nuclei is $$Q(t) = \langle \exp[ik \cdot u(l;t)]\exp[ik \cdot u(l;0)]\rangle \quad (37.63)$$

In the present case, u(l) corresponds to the delay of an "association ensemble" s comprising a time delayed Gaussian filter. In k,ω-space, the time delay corresponds to a modulation of the s th Fourier series (e.g. "P or M element response" given by Eq. (37.33)) that is "carried" by the "association ensemble" s). Since the Fourier series is a sum of trigonometric functions in k,ω-space, the modulation corresponds to a frequency shift of the Fourier series "carried" by the "association ensemble" s. k of Eq. (37.59) corresponds to the wavenumber of the frequency shifted s th Fourier series.

$$\frac{E - E_0}{\hbar}$$

of Eq. (37.60) is the shifted frequency of a first Fourier series that is "carried" by a first "association ensemble".

In the case of acoustically modulated gamma ray absorption by Mössbauer nuclei, u(l;t) of Eq. (37.62) is $$u(l;t) = e^{i\left(\frac{t}{\hbar}\right)E}u(l;0)e^{-i\left(\frac{t}{\hbar}\right)E} \quad (37.64)$$

The matrix elements of Eq. (37.63) are calculated by using the theorem [12]

$$e^A e^B = e^{A+B} e^{\frac{1}{2}[A,B]} \text{ if } [[A,B],A] = [[A,B],B] = 0 \quad (37.65)$$

For a harmonic oscillator, the commutator of k·u(l;t) and k·u(l;0) is a c number; thus, $$Q(t) = \langle \exp[-ik \cdot u(l;t)] \exp[ik \cdot u(l;0)] \rangle \quad (37.66)$$

$$= \langle \exp[-ik \cdot [u(l;t) - u(l;0)]] \rangle \times \exp\left[\frac{1}{2}\langle [k \cdot u(l;t), k \cdot u(l;0)] \rangle\right]$$

Since the correlation function applies to an ensemble of harmonic oscillator states, the first thermodynamic average can be simplified as follows:

$$\langle \exp[-ik \cdot [u(l;t) - u(l;0)]] \rangle = \exp\left[-\frac{1}{2}\langle \{k \cdot [u(l;t) - u(l;0)]\}^2 \rangle\right] \quad (37.67)$$

This theorem is known in lattice dynamics as Ott's theorem [13] or sometimes as Bloch's theorem [14]. Using the time independence of the harmonic potential, Eq. (37.67) is $$\exp-\left[\frac{1}{2}\langle \{k \cdot [u(l;t) - u(l;0)]\}^2 \rangle\right] = \quad (37.68)$$

$$\exp-\left[\frac{1}{2}\langle [k \cdot u(l;t)]^2 \rangle + \frac{1}{2}\langle [k \cdot u(l;0)]^2 \rangle\right]$$

$$= \exp-\langle [k \cdot u(l)]^2 \rangle \quad (37.69)$$

Substitution of Eqs. (37.67-37.69) into Eq. (37.66) gives $$Q(t) = \exp\langle -[k \cdot u(l;t)]^2 \rangle \times \exp\left[\frac{1}{2}\langle [k \cdot u(l;t), k \cdot u(l;0)] \rangle\right] \quad (37.70)$$

Expanding $u_\alpha(l;t)$ in terms of the normal coordinates of the harmonic potential and the phonon operators of that harmonic potential gives $$u_\alpha(l;t) = \left(\frac{\hbar}{2M_l}\right)^{\frac{1}{2}} \sum_s \frac{B_\alpha^{(s)}(l)}{(\omega_s)^{\frac{1}{2}}} (b_s e^{-i\omega_s t} + b_s^\dagger e^{i\omega_s t}) \quad (37.71)$$

where α labels the Cartesian components, $M_l$ is the mass of the ion in the lth experiment, $\omega_s$ is the frequency of the sth normal mode, $B^{(s)}(l)$ is the associated unit eigenvector, and $b_s^\dagger$ and $b_s$ are the phonon creation and destruction operators for the sth normal mode. By use of the coordinate expansion, the exponential of the correlation function appearing in Eq. (37.70) can be written as $$e^{\langle k \cdot u(l;t) k \cdot u(l;0) \rangle} = e^{\sum_s -c_s^2 \left(\frac{e^{i\omega_s t}}{(\gamma_s)^{\frac{1}{2}}} + (\gamma_s)^{\frac{1}{2}} e^{i\omega_s t}\right)} \quad (37.72)$$

$$= \prod_s e^{-c_s^2 \left(\frac{e^{i\omega_s t}}{(\gamma_s)^{\frac{1}{2}}} + (\gamma_s)^{\frac{1}{2}} e^{-i\omega_s t}\right)}$$

$$= \prod_s \left[J_0(2c_s^2) + \sum_{n=1}^\infty J_n(2c_s^2)\left(\frac{e^{i\omega_s t}}{(\gamma_s)^{\frac{1}{2}}} + (\gamma_s)^{\frac{1}{2}} e^{-i\omega_s t}\right)\right]$$

where the following substitutions were made:

$$\gamma_s = \frac{n_s + 1}{n_s} = e^{\frac{\hbar\omega_s}{kT}} \quad (37.73)$$

$$n_s = \frac{1}{e^{\frac{\hbar\omega_s}{kT}} - 1} \quad (37.74)$$

$$c_s^2 = \frac{\hbar}{2M_l} \frac{[k \cdot B^{(s)}(l)]^2}{\omega_s} \frac{e^{\frac{\hbar\omega_s}{2kT}}}{e^{\frac{\hbar\omega_s}{kT}} - 1} \quad (37.75)$$

and where the Bessel function relationship [15]

$$e^{\frac{1}{2}x(y+y^{-1})} = \sum_{n=-\infty}^\infty J_n(x) y^n \quad (37.76)$$

was used. $n_s$ is the mean number of phonons in the sth mode at temperature T.

In the case of "coupling" between a first "active" "association ensemble" and at least one other "active" "association ensemble", the correlation function is independent of time—not a function of $e^{i\omega_s t}$ and $e^{-i\omega_s t}$. Thus, the time dependent factors are dropped in Eq. (37.72), and combining Eqs. (37.70-37.72) and Eq. (37.75) gives the correlation function as $$Q(c_s^2) = \exp-c_s^2 \prod_s J_0(2c_s^2) \quad (37.77)$$

For the "coupling" of "active" "association ensembles", the partition function of Eq. (37.56) is equal to one. By the Central Limit Theorem, s=1 in Eq. (37.72) corresponds to each cascade of association "stages" giving rise to a specific frequency shift. The correlation function for each "association ensemble" is $$Q(c_s^2) = \exp-[c_s^2]J_0(2c_s^2) \quad (37.78)$$

The probability $$P_1\left(\frac{\sqrt{N_1}}{\alpha_1}, \frac{\sqrt{N_2}}{\alpha_2}, \ldots, \frac{\sqrt{N_s}}{\alpha_s}\right)$$

that a first "active" association ensemble will "couple" with s "active" "association ensembles" can be derived from the correlation function, Eq. (37.78). The expansion of the Bessel function is $$J_\nu(x) = \left(\frac{x}{2}\right)^\nu \sum_{m=0}^{\infty} \frac{\left(\frac{-x^2}{4}\right)^m}{[m!\Gamma(m+\nu+1)]} \quad (37.79)$$

$$J_0(x) = \sum_{m=0}^{\infty} \frac{\left(\frac{-x^2}{4}\right)^m}{[m!\Gamma(m+1)]} = \sum_{m=0}^{\infty} \frac{\left(\frac{-x^2}{4}\right)^m}{[m!m!]}$$

where $\Gamma(m+1)=m!$ was used. The probability distribution function of "coupling" between "association ensembles" (coherent states) is Poissonian. From SUB-APPENDIX II—Modulation and Sampling Gives the Input to the Association Mechanism and Basis of Reasoning, the output of a cascade of N "stages" with a transmission decay constant $\alpha$ is the product of Eq. (37.33) and Eq. (37.50). From Eqs. (37.40), (37.42), (37.46), (37.50), (37.51), and (37.54), the frequency shift of "association ensemble" one is $$\frac{\sqrt{N_1}}{\alpha_1},$$

and the frequency shift of "association ensemble" s is $$\frac{\sqrt{N_s}}{\alpha_s}$$

where the impulse response of each "stage" in both "association ensembles" is $$h(t) = \alpha\sqrt{N}e^{-\alpha\sqrt{N}t}u(t) \quad (37.80)$$

"Coupling" of filtered Fourier series is based on their spectral similarity. In one embodiment, the "coupling cross section" amplitude, $\beta_s^2$, is given by the integral of the product of the spectrum of the first Fourier series sampled and modulated by the first "association ensemble" and the complex conjugate of the spectrum of the s th Fourier series sampled and modulated by the s th "association ensemble". The spectrum of a Fourier series ("SFCs") sampled and modulated by an "association ensemble" is given by the product of Eq. (37.33) and Eq. (37.50). Thus, Eq. (37.75) is $$\beta_s^2 = \int_0^\infty \int_0^\infty V_1(k_\rho, k_z(f)) V_s^*(k_\rho, k_z(f)) H_N(f)_1 H_N^*(f)_s \, df \, dk_\rho \quad (37.81)$$

$$\beta_s^2 = \int_0^\infty \int_0^\infty \left(\frac{4\pi}{1+\frac{k_z^2}{k_\rho^2}}\right)^2 \left(e^{-\frac{1}{2}\left(\frac{2\pi f}{\alpha_1}\right)^2} e^{-j\sqrt{N_1}\left(\frac{2\pi f}{\alpha_1}\right)}\right)$$

$$\left(e^{-\frac{1}{2}\left(\frac{2\pi f}{\alpha_s}\right)^2} e^{+j\sqrt{N_s}\left(\frac{2\pi f}{\alpha_s}\right)}\right)$$

$$\sum_{m_1=1}^{M_1} \frac{4}{\rho_{0_{m_1}} z_{0_{m_1}}} a_{0_{m_1}} \sum_{n=-\infty}^{\infty} \sin\left(\left(k_\rho - n\frac{2\pi}{\rho_{0_{m_1}}}\right)\frac{N_{m_1}\rho_{0_{m_1}}}{2}\right)$$

$$\sin\left(\left(k_z - n\frac{2\pi}{v_{m_1} t_{0_{m_1}}}\right)\frac{N_{m_1} z_{0_{m_1}}}{2}\right)$$

$$\sum_{m_s=1}^{M_s} \frac{4}{\rho_{0_{m_s}} z_{0_{m_s}}} a_{0_{m_s}} \sum_{n=-\infty}^{\infty} e^{-j\pi k_\rho} \sin\left(\left(k_\rho - n\frac{2\pi}{\rho_{0_{m_s}}}\right)\frac{N_{m_s}\rho_{0_{m_s}}}{2}\right)$$

$$e^{-j\pi k_z} \sin\left(\left(k_z - n\frac{2\pi}{v_{m_s} t_{0_{m_s}}}\right)\frac{N_{m_s} z_{0_{m_s}}}{2}\right) df \, dk_\rho$$

Let $k_\rho = k_z$, then $\rho_0 = z_0 = vt_0$. Thus, Eq. (37.82) is (37.82)

$$\beta_s^2 = \int_0^\infty (8\pi)^2$$

$$\sum_{m_1=1}^{M_1} \frac{4}{\rho_{0_{m_1}} z_{0_{m_1}}} a_{0_{m_1}} \sum_{n=-\infty}^{\infty} \sin\left(\left(k_z - n\frac{2\pi}{v_{m_1} t_{0_{m_1}}}\right)\frac{N_{m_1} z_{0_{m_1}}}{2}\right)$$

$$\left(e^{-\frac{1}{2}\left(\frac{2\pi f}{\alpha_1}\right)^2} e^{-j\sqrt{N_1}\left(\frac{2\pi f}{\alpha_1}\right)}\right)$$

$$\sum_{m_s=1}^{M_s} \frac{4}{\rho_{0_{m_s}} z_{0_{m_s}}} a_{0_{m_s}} \sum_{n=-\infty}^{\infty} e^{-j\pi k_z} \sin\left(\left(k_z - n\frac{2\pi}{v_{m_s} t_{0_{m_s}}}\right)\frac{N_{m_s} z_{0_{m_s}}}{2}\right)$$

$$\left(e^{-\frac{1}{2}\left(\frac{2\pi f}{\alpha_s}\right)^2} e^{+j\sqrt{N_s}\left(\frac{2\pi f}{\alpha_s}\right)}\right) df \quad (37.83)$$

Substitution of $$k_z = \frac{2\pi f}{v}$$

and $\sin\theta = e^{-j\theta}$ into Eq. (37.83) gives $$\beta_s^2 = \int_0^\infty (8\pi)^2 \sum_{m_1=1}^{M_1} \frac{4}{\rho_{0_{m_1}} z_{0_{m_1}}} a_{0_{m_1}} \quad (37.84)$$

$$\sum_{n=-\infty}^{\infty} e^{-j\left(\left(\frac{2\pi f}{v_{m_1}} - n\frac{2\pi}{v_{m_1} t_{0_{m_1}}}\right)\frac{N_{m_1} z_{0_{m_1}}}{2}\right)} \left(e^{-\frac{1}{2}\left(\frac{2\pi f}{\alpha_1}\right)^2} e^{-j\sqrt{N_1}\left(\frac{2\pi f}{\alpha_1}\right)}\right)$$

$$\sum_{m_s=1}^{M_s} \frac{4}{\rho_{0_{m_s}} z_{0_{m_s}}} a_{0_{m_s}} \sum_{n=-\infty}^{\infty} e^{+j\left(\left(\frac{2\pi f}{v_{m_s}} - n\frac{2\pi}{v_{m_s} t_{0_{m_s}}}\right)\frac{N_{m_s} z_{0_{m_s}}}{2}\right)}$$

$$\left(e^{-\frac{1}{2}\left(\frac{2\pi f}{\alpha_s}\right)^2} e^{+j\sqrt{N_s}\left(\frac{2\pi f}{\alpha_s}\right)}\right) df$$

-continued

The integral of *Eq.* (37.84)　　　　　　　　　　(37.85)

is given by Hogg and Tanis [16]

$$\beta_s^2 = (8\pi)^2 \frac{1}{\sqrt{2\pi}} \sqrt{\frac{\alpha_1^2 \alpha_s^2}{\alpha_1^2 + \alpha_s^2}}$$

$$\sum_{m_1=1}^{M_1} \frac{4}{\rho_{0_{m_1}} z_{0_{m_1}}} a_{0_{m_1}} \sum_{m_s=1}^{M_s} \frac{4}{\rho_{0_{m_s}} z_{0_{m_s}}} a_{0_{m_s}}$$

$$\sum_{n'=-\infty}^{\infty} \sum_{n=-\infty}^{\infty} \left| \cos 2\pi \left( \frac{nN_{m_1} z_{0_{m_1}}}{2v_{m_1} t_{0_{m_1}}} - \frac{n' N_{m_s} z_{0_{m_s}}}{2v_{m_s} t_{0_{m_s}}} \right) \right|$$

$$\exp - \left\{ \frac{\frac{\alpha_1^2 \alpha_s^2}{\alpha_1^2 + \alpha_s^2} \left( \frac{\sqrt{N_1}}{\alpha_1} - \frac{\sqrt{N_s}}{\alpha_s} + \frac{N_{m_1} z_{0_{m_1}}}{2v_{m_1}} - \frac{N_{m_s} z_{0_{m_s}}}{2v_{m_s}} \right)^2}{2} \right\}$$

where $$\sigma^2 = \frac{\alpha_1^2 \alpha_s^2}{\alpha_1^2 + \alpha_s^2}$$

and $$t = -j \left( \frac{\sqrt{N_1}}{\alpha_1} - \frac{\sqrt{N_s}}{\alpha_s} + \frac{N_{m_1} z_{0_{m_1}}}{2v_{m_1}} - \frac{N_{m_s} z_{0_{m_s}}}{2v_{m_s}} \right)$$

in corresponding integrals. It was given previously (Eq. (37.83)) that $\rho_0 = z_0 = vt_0$; thus, Eq. (37.85) simplifies to $$\beta_s^2 = \tag{37.86}$$

$$(8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} \frac{4}{\rho_{0_{m_1}}^2} a_{0_{m_1}} \sum_{m_s=1}^{M_s} \frac{4}{\rho_{0_{m_s}}^2} a_{0_{m_s}} \sum_{n'=-\infty}^{\infty}$$

$$\sum_{n=-\infty}^{\infty} |\cos\pi(nN_{m_1} - n' N_{m_s})| \exp -$$

$$\left\{ \frac{\frac{\alpha_1^2 \alpha_s^2}{\alpha_1^2 + \alpha_s^2} \left( \frac{\sqrt{N_1}}{\alpha_1} - \frac{\sqrt{N_s}}{\alpha_s} + \frac{N_{m_1} t_{0_{m_1}}}{2} - \frac{N_{m_s} t_{0_{m_s}}}{2} \right)^2}{2} \right\}$$

where $$\sigma^2 = \frac{\alpha_1^2 \alpha_s^2}{\alpha_1^2 + \alpha_s^2}$$

and $$t = -j \left( \frac{\sqrt{N_1}}{\alpha_1} - \frac{\sqrt{N_s}}{\alpha_s} + \frac{N_{m_1} t_{0_{m_1}}}{2} - \frac{N_{m_s} t_{0_{m_s}}}{2} \right)$$

in corresponding integrals. Consider the case that the amplitude of all "P element responses" are equal, thus $a_{0_{m_1}} = a_{0_m}$ for all $m_1$ and $m_s$ in Eq. (37.86). In the case that each "SFCs" is represented by Eq. (37.33a), Eq. (37.86) is $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} a_{0_{m_s}} N_{m_s} \tag{37.87a}$$

$$\sum_{n'=-\infty}^{\infty} \sum_{n=-\infty}^{\infty} |\cos\pi(nN_{m_1} - n' N_{m_s})| \exp -$$

$$\left\{ \frac{\frac{\alpha_1^2 \alpha_s^2}{\alpha_1^2 + \alpha_s^2} \left( \frac{\sqrt{N_1}}{\alpha_1} - \frac{\sqrt{N_s}}{\alpha_s} + \frac{N_{m_1} t_{0_{m1}}}{2} - \frac{N_{m_s} t_{0_{m_s}}}{2} \right)^2}{2} \right\}$$

where $$\sigma^2 = \frac{\alpha_1^2 \alpha_s^2}{\alpha_1^2 + \alpha_s^2}$$

and $$t = -j \left( \frac{\sqrt{N_1}}{\alpha_1} - \frac{\sqrt{N_s}}{\alpha_s} + \frac{N_{m_1} t_{0_{m_1}}}{2} - \frac{N_{m_s} t_{0_{m_s}}}{2} \right)$$

in corresponding integrals.

In one embodiment, the present "processor" is an analog Fourier processor wherein the data is digitized according to the parameter N of Eqs. (37.33), (37.33a), and (37.87). Each "FC" of Eqs. (37.33) is a series of a Fourier component with quantized frequency and phase angle. Each "FC" of Eqs. (37.33a) is a series of a Fourier component with quantized amplitude, frequency, and phase angle. Each "SFCs" represented by Eq. (37.33) and Eq. (37.33a) is filtered and delayed in the time domain (modulated and sampled in the frequency domain) as it is recalled from memory and processed by an "association ensemble". "Association ensembles" produce interference or "coupling" of the "SFCs" of one set of "M or P elements" with that of another by producing frequency matched and phase locked Fourier series—sums of trigonometric waves that are frequency matched and periodically in phase—that give rise to "association" of the corresponding recalled or processed information. The Poissonian probability of such "coupling" (Eq. (37.106)) can be derived from the correlation function (Eq. (37.78) wherein Eq. (37.87) is a parameter. The magnitude of the "coupling cross section" of Eq. (37.87a) and Eq. (37.86) is independent of any phase matching condition because the phase angle is quantized. Thus, the argument of the cosine function of Eq. (37.87a) and Eq. (37.86) is zero or an integer multiple of $\pi$. Consequentially, in each case, the corresponding time convolution of Eq. (37.84) is a cyclic convolution, and the sum over n is eliminated. Whereas, the frequency matching condition provided by the frequency shifts of the cascades of association "stages" comprises the zero argument of the exponential function of Eq. (37.87a). Thus, the magnitude of the "coupling cross section" follows from Eq. (37.87a)

$$\beta_s^2 = (8\pi)^2 \frac{1}{\sqrt{2\pi}} \sqrt{\frac{\alpha_1^2 \alpha_s^2}{\alpha_1^2 + \alpha_s^2}} \qquad (37.87\text{ b})$$

$$\sum_{m_1=1}^{M_1} a_{0_{m_1}} N_{m_1} \sum_{m_s=1}^{M_s} a_{0_{m_s}} N_{m_s} \exp -$$

$$\left\{ \frac{\frac{\alpha_1^2 \alpha_s^2}{\alpha_1^2 + \alpha_s^2}\left(\frac{\sqrt{N_1}}{\alpha_1} - \frac{\sqrt{N_s}}{\alpha_s} + \frac{N_{m_1} t_{0_{m_1}}}{2} - \frac{N_{m_s} t_{0_{m_s}}}{2}\right)^2}{2} \right\}$$

In terms of the relationship $\rho_0 = z_0 = vt_0$, Eq. (37.87b) is $$\beta_s^2 = (8\pi)^2 \frac{1}{\sqrt{2\pi}} \sqrt{\frac{\alpha_1^2 \alpha_s^2}{\alpha_1^2 + \alpha_s^2}} \qquad (37.87\text{ c})$$

$$\sum_{m_1=1}^{M_1} a_{0_{m_1}} N_{m_1} \sum_{m_s=1}^{M_s} a_{0_{m_s}} N_{m_s} \exp -$$

$$\left\{ \frac{\frac{\alpha_1^2 \alpha_s^2}{\alpha_1^2 + \alpha_s^2}\left(\frac{\sqrt{N_1}}{\alpha_1} - \frac{\sqrt{N_s}}{\alpha_s} + \frac{N_{m_1} \rho_{0_{m_1}}}{2v_{m_1}} - \frac{N_{m_s} \rho_{0_{m_s}}}{2v_{m_s}}\right)^2}{2} \right\}$$

"Coupling" between "active" "association ensembles" further depends on the frequency difference angle, $\phi_s$, between the two or more Fourier series "carried" by the corresponding "association ensembles". In k,ω-space, the information is represented as Fourier series which comprise sums of harmonic functions. Thus, the "coupling cross section" is a complex number with a projection in k,ω-space that is a function of the frequency shift $$\frac{\sqrt{N_1}}{\alpha_1}$$

of the first "association ensemble" and the frequency shift $$\frac{\sqrt{N_s}}{\alpha_s}$$

of the s th "association ensemble". The frequency shift of each "association ensemble" corresponds to the respective modulation function given by the Fourier transform of the delayed Gaussian filter (Eq. (37.50)). The resultant "coupling cross section", $\langle \beta_s^2(\phi_s) \rangle$, as a function of frequency difference angle, $\phi_s$, is given by $$\langle \beta_s^2(\phi_s) \rangle = \beta_s^2 e^{i2\phi_s} \qquad (37.88)$$

where the frequency difference angle, $\phi_s$, is $$\phi_s = \frac{\pi\left(\frac{\sqrt{N_1}}{\alpha_1} - \frac{\sqrt{N_s}}{\alpha_s} + \sum_{m_1=1}^{M_1} \frac{N_{m_1} \rho_{0_{m_1}}}{2v_{m_1}} - \sum_{m_s=1}^{M_s} \frac{N_{m_s} \rho_{0_{m_s}}}{2v_{m_s}}\right)}{\frac{\sqrt{N_1}}{\alpha_1} + \sum_{m_1=1}^{M_1} \frac{N_{m_1} \rho_{0_{m_1}}}{2v_{m_1}}} \qquad (37.89)$$

Thus, the "coupling cross section" given by Eq. (37.88) is a dimensionless complex number that comprises a "coupling cross section" amplitude, $\beta_s^2$, and frequency difference angle, $\phi_s$, of the harmonic "coupling". In other embodiments of the present invention, further operations may be performed on $\langle \beta_s^2(\phi_s) \rangle$ such as phase shifting, normalizing to a given parameter, scaling, multiplication by a factor or parameter such as a gain factor, addition or subtraction of a given parameter or number such as an offset, etc. In a further embodiment, $\langle \beta_s^2(\phi_s) \rangle$ may be represented by different equations than those such as Eq. (37.87c) and Eq. (37.81) that also represent the spectral similarity and difference of the frequencies of filtered or unfiltered Fourier series that may "couple".

In the case that $\rho_0 = z_0 = vt_0$, the frequency difference, $\phi_s$, is $$\phi_s = \frac{\pi\left(\frac{\sqrt{N_1}}{\alpha_1} - \frac{\sqrt{N_s}}{\alpha_s} + \sum_{m_1=1}^{M_1} \frac{N_{m_1} t_{0_{m_s}}}{2} - \sum_{m_s=1}^{M_s} \frac{N_{m_s} t_{0_{m_s}}}{2}\right)}{\frac{\sqrt{N_1}}{\alpha_1} + \sum_{m_1=1}^{M_1} \frac{N_{m_1} t_{0_{m_1}}}{2}} \qquad (37.90)$$

The probability distribution of "coupling" between two "association ensembles" each "carrying" a Fourier series such as a "SFCs" is Poissonian with mean number of "stage" "couplings"

$$\langle n \rangle = \beta^2 \qquad (37.91)$$

The probability [17] of "coupling" with a second "association ensemble" with m "couplings" between "stages" is $$P_m = \frac{\langle n \rangle^m e^{-\langle n \rangle}}{m!} = \frac{(\beta^2)^m e^{-\beta^2}}{m!} = \frac{\beta^{2m} e^{-\beta^2}}{m!} \qquad (37.93)$$

with mean number of "stage" "coupling" events $\langle n \rangle = \beta^2$. The probability $$P_\uparrow\left(\frac{\sqrt{N_1}}{\alpha_1}, \frac{\sqrt{N_2}}{\alpha_2}, ..., \frac{\sqrt{N_s}}{\alpha_s}\right)$$

can be derived by factoring Eq. (37.93) from the Bessel function of the correlation function (Eq. (37.78)) and its expansion which follows from Eq. (37.79).

$$J_0(x) = \sum_{m=0}^{\infty} \frac{\left(\frac{-x^2}{4}\right)^m}{[m!m!]}; \qquad (37.94)$$

-continued $$J_0(\beta x) = \sum_{m=0}^{\infty} \frac{\left(\frac{-(\beta x)^2}{4}\right)^m}{m!m!} = \frac{1}{e^{-\beta^2}} \sum_{m=0}^{\infty} \frac{\left(\frac{-x^2}{4}\right)^m}{m!} \frac{\beta^{2m} e^{-\beta^2}}{m!}$$

Combining Eq. (37.93) and Eq. (37.94) demonstrates that the probability $$P_\uparrow\left(\frac{\sqrt{N_1}}{\alpha_1}, \frac{\sqrt{N_s}}{\alpha_s}\right) = P_\uparrow(\beta x)$$

is proportional to $$P_\uparrow(\beta x) \propto \sum_{m=0}^{\infty} \frac{\left(\frac{-x^2}{4}\right)^m}{m!} \qquad (37.95)$$

Let $x=y^2$, then the change of variable in Eq. (37.95) is $$P_\uparrow(\beta y) \propto \sum_{m=0}^{\infty} \frac{\left(\frac{-x}{4}\right)^m}{m!} = \sum_{m=0}^{\infty} \frac{\left(\frac{-x^2}{4}\right)^{m/2}}{m!} \qquad (37.96)$$

Let $m'=m/2$, then the change of variable in Eq. (37.96) is $$P_\uparrow(\beta y) \propto \sum_{m=0}^{\infty} \frac{\left(\frac{-x^2}{4}\right)^{m/2}}{m!} \propto \sum_{m=0}^{\infty} \frac{\left(\frac{-x^2}{4}\right)^{m'}}{(2m')!} \qquad (37.97)$$

The series expansion of $\cos(x)$ is $$\cos(x) = \sum_{m=0}^{\infty} \frac{(-x^2)^m}{(2m)!} \qquad (37.98)$$

Combining Eq. (37.78) and Eqs. (37.95-37.98) gives the probability $$P_\uparrow\left(\frac{\sqrt{N_1}}{\alpha_1}, \frac{\sqrt{N_s}}{\alpha_s}\right)$$

proportional to $$P_\uparrow\left(\frac{\sqrt{N_1}}{\alpha_1}, \frac{\sqrt{N_s}}{\alpha_s}\right) \propto \cos\left(2\beta\sqrt{c_s^2}\right) \qquad (37.99)$$

where $y=\sqrt{x}=\sqrt{c_s^2}$. From Eqs. (37.81-37.90), $$c_s^2 = \beta^{-2}(\phi_s) = \beta_s^{-2} \sin^2\phi_s \qquad (37.100)$$

Combining Eq. (37.99) and Eq. (37.100) gives the probability $$P_\uparrow\left(\frac{\sqrt{N_1}}{\alpha_1}, \frac{\sqrt{N_s}}{\alpha_s}\right)$$

proportional to $$P_\uparrow\left(\frac{\sqrt{N_1}}{\alpha_1}, \frac{\sqrt{N_s}}{\alpha_s}\right) \propto \cos(2\sin\phi_s) \qquad (37.101)$$

where $\phi_s$ is the frequency difference angle. Combining Eq. (37.78), Eq. (37.100), and Eq. (37.101) gives the probability $P_\downarrow(\phi)$ proportional to $$P_\uparrow\left(\frac{\sqrt{N_1}}{\alpha_1}, \frac{\sqrt{N_s}}{\alpha_s}\right) \propto \exp[-\beta_s^{-2}\sin^2\phi_s]\cos(2\sin\phi_s) = \exp\left[-\beta_s^{-2}\left(\frac{1-\cos 2\phi_2}{2}\right)\right]\cos(2\sin\phi_s) \qquad (37.102)$$

where $\phi_s$ is the frequency difference angle and $\beta_s^2$ is the "coupling cross section" amplitude.

According to the time delay property of Fourier transforms [8], a time delay, $\delta(t-t_0)$, during independent activation of a given "association ensemble" with recall from memory is equivalent to a phase shift of the correlation function given by Eq. (37.63)

$$Q(t) = \langle \exp i\delta \exp[-ik\cdot u(l;t)]\exp[ik\cdot u(l;0)]\rangle \qquad (37.103)$$

Thus, Eq. (37.102) is phase shifted.

$$P_\uparrow\left(\frac{\sqrt{N_1}}{\alpha_1}, \frac{\sqrt{N_s}}{\alpha_s}, \delta_s\right) \propto \exp\left[-\beta_s^{-2}\left(\frac{1-\cos 2\phi_2}{2}\right)\right]\cos(\delta_s + 2\sin\phi_s) \qquad (37.104)$$

where $\phi_s$ is the frequency difference angle, $\beta_s^2$ is the "coupling cross section" amplitude, and $\delta_s$ is the phase shift.

In an analog embodiment, each of the s separate "association ensembles" that may "couple" with the first "active" "association ensemble" may be "inactive" before "coupling". The "coupling" causes the corresponding "association ensemble" to become "active". Eq. (37.104) represents the probability that a first "active" "association ensemble" will "couple" with s "active" "association ensembles" as a function of the frequency difference angle, $\phi_s$, the "coupling cross section" amplitude, $\beta_s^2$, and the phase shift, $\delta_s$. Eq. (37.104) also represents the probability that a first "active" "association ensemble" will "couple" with and "activate" s "inactive" "association ensembles" as a function of the frequency difference angle, $\phi_s$, the "coupling cross section" amplitude, $\beta_s^2$, and the phase shift, $\delta_s$. In the latter case, the Fourier series such as a "SFCs" "carried" by the "activated" s th "association ensemble" may be "linked" with the "association ensemble". The "linkage" is as described for "transducer strings" in SUB-APPENDIX VI—Input Context.
"Association"

Given that a first "association ensemble" is "active", the probability of the occurrence of either the "active" state or the "inactive" state of the s th "association ensemble" is one. In one embodiment, in the absence of interference (i.e. "coupling") between the "association ensembles", the probability of the occurrence of the "active" state of the s th "association ensemble" is the same as the probability of the occurrence of the "inactive" state—½. However, in the event that "coupling" between the first and s th "association ensemble" may occur, the s th "association ensemble" may be "activated". The probability of the occurrence of the "active" state of the s th "association ensemble" with the possibility of "coupling" with the first "active" "association ensemble" is ½ plus the probability function, Eq. (37.104), normalized to ½. Therefore, given that the first "active" "association ensemble" may "couple" with the s th "association ensemble", the probability function for the occurrence of the "active" state of the s th "association ensemble" is $$P_A\left(\frac{\sqrt{N_1}}{\alpha_1}, \frac{\sqrt{N_s}}{\alpha_s}, \delta_s\right) = \frac{1 + \exp\left[-\beta_s^{-2}\left(\frac{1-\cos 2\phi_2}{2}\right)\right]\cos(\delta_s + 2\sin\phi_s)}{2}$$

where $\phi_s$ is the frequency difference angle, $\beta_s^2$ is the "coupling cross section" amplitude, and $\delta_s$ is the phase shift.

In an embodiment, the two Fourier series (e.g. each a "SFCs") are "associated" if they are "active" simultaneously. Thus, given that the first "active" "association ensemble" may "couple" with the s th "association ensemble", Eq. (37.105) is the probability function for the occurrence of the "association" of the Fourier series of the first "active" "association ensemble" with that which may be "carried" by the s th "association ensemble" as a function of the frequency difference angle, $\phi_s$, the "coupling cross section" amplitude, $\beta_s^2$, and the phase shift, $\delta_s$.

Figure 16:
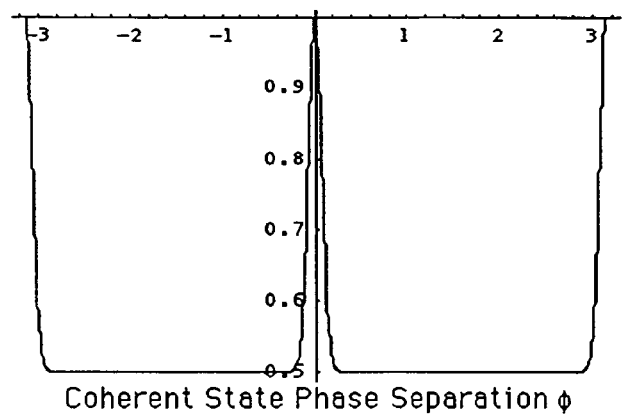
FIGS. 16A, 16B, and 16C illustrate plots of the probability $P_A(\phi)$ (Eq. (37.106a)) of association of the corresponding Fourier series based on a first active association ensemble coupling with a second association ensemble as a function of frequency difference angle, $\phi_s$, coupling cross section amplitude, $\beta_s^2$, and phase shift, $\delta_s=0$ wherein the parameter $\beta_s^2=0.01, 0.25,$ and $1.00$, respectively, in accordance with the invention.
Figure 16:
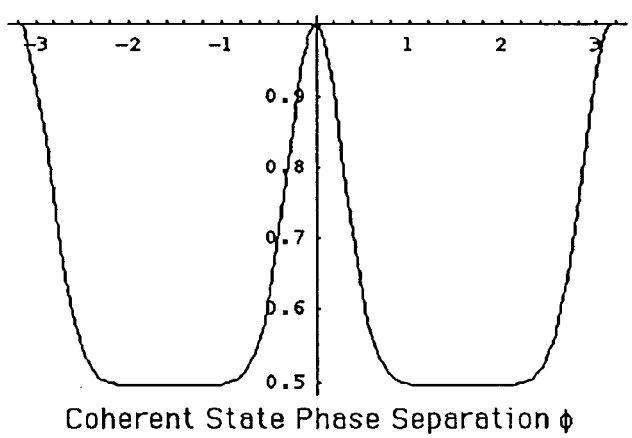
Figure 16:
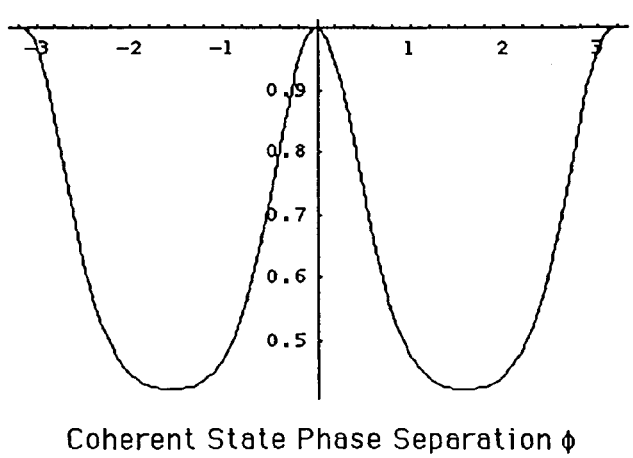
Figure 17A:
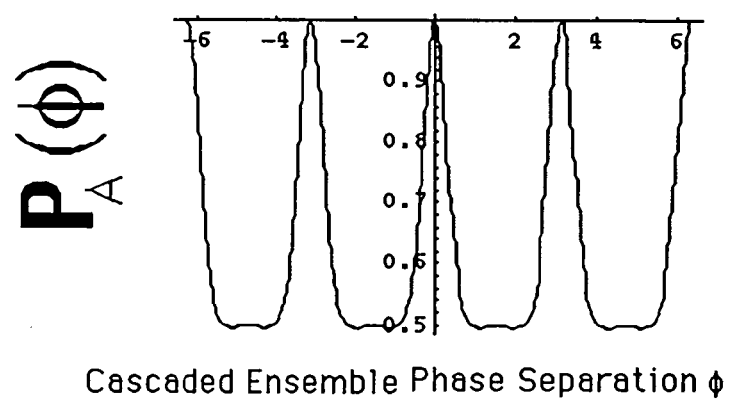
FIGS. 17A, 17B, 17C, and 17D illustrate plots of the probability $P_A(\phi)$ (Eq. (37.106a)) of association of the corresponding Fourier series based on a first active association ensemble coupling with a second association ensemble as a function of frequency difference angle, $\phi_s$, and phase shift, $\delta_s$, for the coupling cross section amplitude, $\beta_s^2=0.25$, wherein the parameter $\delta_s=0, 0.25\pi, 0.50\pi,$ and $\pi$, respectively, in accordance with the present invention.
Figure 17B:
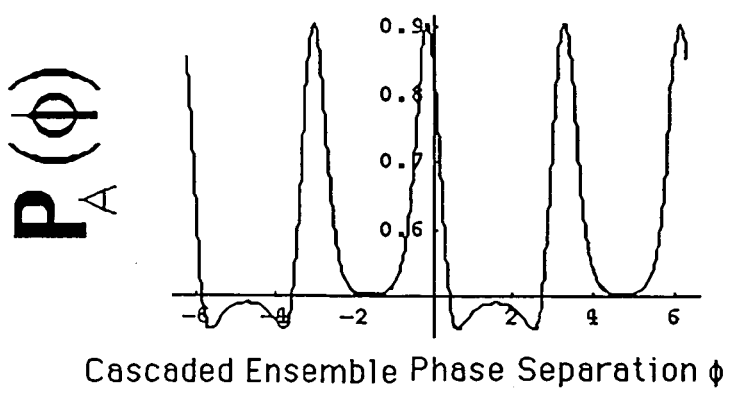
Figure 17:
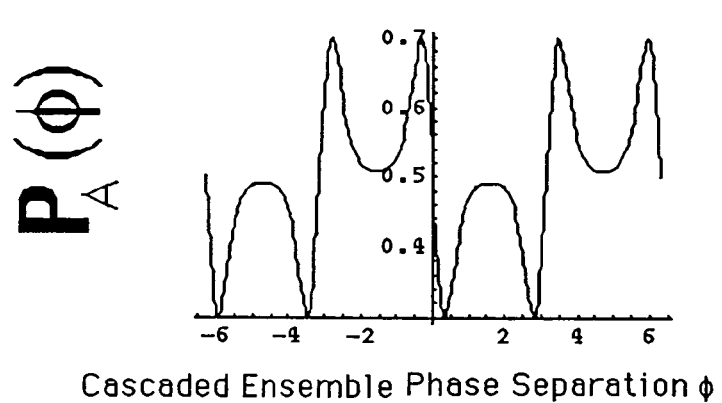
Figure 17:
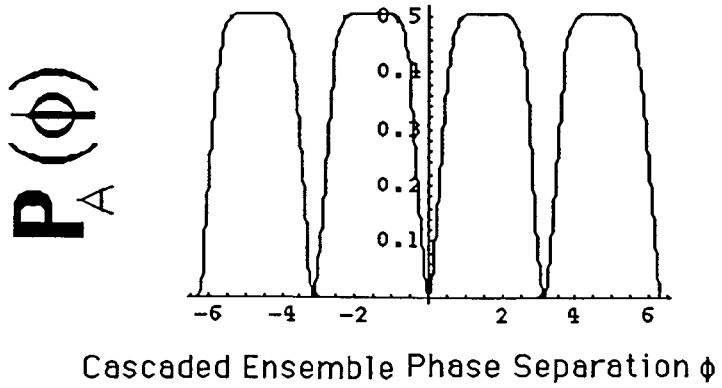

The probability of the occurrence of "association" between a first Fourier series and s other Fourier series $$P_A\left(\frac{\sqrt{N_1}}{\alpha_1}, \frac{\sqrt{N_2}}{\alpha_2}, \ldots, \frac{\sqrt{N_s}}{\alpha_s}, \delta_s\right)$$

wherein the first "active" "association ensemble" may "couple" with each of s "association ensembles" is the product of the probabilities $$P_A\left(\frac{\sqrt{N_1}}{\alpha_1}, \frac{\sqrt{N_2}}{\alpha_2}, \ldots, \frac{\sqrt{N_s}}{\alpha_s}, \delta_s\right) = \prod_s \frac{1 + \exp\left[-\beta_s^{-2}\left(\frac{1-\cos 2\phi_2}{2}\right)\right]\cos(\delta_s + 2\sin\phi_s)}{2} \quad (37.106a)$$

wherein the first "association ensemble" provides modulation $$e^{-j\sqrt{N_1}\left(\frac{2\pi f}{\alpha_1}\right)}$$

given by Eq. (37.50), the s th "association ensembles" provides modulation $$e^{-j\sqrt{N_s}\left(\frac{2\pi f}{\alpha_s}\right)}$$

given by Eq. (37.50, $\phi_s$ is the frequency difference angle, $\beta_s^2$ is the "coupling cross section" amplitude, and $\delta_s$ is the phase shift. The plot of the probability $$P_A\left(\frac{\sqrt{N_1}}{\alpha_1}, \frac{\sqrt{N_2}}{\alpha_2}, \ldots, \frac{\sqrt{N_s}}{\alpha_s}, \delta_s\right)$$

of the occurrence of "association" of the first Fourier series with the s th Fourier series according to Eq. (37.106a) is given in FIGS. 16 A-C and FIGS. 17 A-D.

In another embodiment, in the absence of "coupling" between the "association ensembles", the probability of the occurrence of "association" is $p_\uparrow$. With the replacement of ½ of Eq. (37.106a) with $p_\uparrow$, the probability of the occurrence of "association" of the corresponding Fourier series based on a first "active" "association ensemble" "coupling" with s separate "association ensembles" is $$P_A\left(\frac{\sqrt{N_1}}{\alpha_1}, \frac{\sqrt{N_2}}{\alpha_2}, \ldots, \frac{\sqrt{N_s}}{\alpha_s}, p_{\uparrow_s}, \delta_s\right) = \prod_s \left[p_{\uparrow_s} + (1-p_{\uparrow_s})\exp\left[-\beta_s^{-2}\left(\frac{1-\cos 2\phi_2}{2}\right)\right]\cos(\delta_s + 2\sin\phi_s)\right] \quad (37.106b)$$

where $p_{\uparrow_s}$ is the probability of the occurrence of "association" in the absence of "coupling", $\phi_s$ is the frequency difference angle, $\beta_s^2$ is the "coupling cross section" amplitude, and $\delta_s$ is the phase shift.

Eq. (37.106b) gives one as the maximum probability of the occurrence of "association". In other embodiments, the probability maximum may be less than one. In this case, Eq. (37.106b) is $$P_A\left(\frac{\sqrt{N_1}}{\alpha_1}, \frac{\sqrt{N_2}}{\alpha_2}, \ldots, \frac{\sqrt{N_s}}{\alpha_s}, p, p_{\uparrow_s}, \delta_s\right) = \qquad (37.106c)$$

$$\prod_s \left[p_{\uparrow_s} + (P - p_{\uparrow_s})\exp\left[-\beta_s^{-2}\left(\frac{1-\cos 2\phi_s}{2}\right)\right]\cos(\delta_s + 2\sin\phi_s)\right]$$

where P is the maximum probability of the occurrence of "association". Eq. (37.105) and Eq. (37.106) represent the "association" probability parameter.

The probability of "association" of Fourier series was herein derived for Poissonian statistics using delayed Gaussian filters; however, the invention is not limited to Poissonian statistics and the use of Gaussian filters. In other embodiments, the "association" can be based on alternative statistics corresponding to their respective distributions. Examples are Gaussian or normal statistics, binomial statistics, Chi-square statistics, F statistics, and t statistics. Other statistical distributions are given in Hogg and Tanis [18] which are herein incorporated by reference. Furthermore, in other embodiments, the "association" can be base on alternative filters such as Butterworth, band pass, low pass, and high pass filters. Other filters are given in Siebert [19] which are herein incorporated by reference.

In an analog embodiment, "coupling" may potentiate the two or more Fourier series. For example, each signal in the time domain corresponding to the Fourier series k,ω-space may repeat in time and therefore increase in duration. In an embodiment, potentiated Fourier series are recorded to memory as "associated" with a probability that depends of the potentiation. In an embodiment, the probability is given by Eq. (37.106c) wherein the potentiation is via "coupling".

Eq. (37.106c) also applies to the probability of "association" between a first "active" "association ensemble" and s "active" "association ensembles". In this case, an equivalent digital embodiment comprises the recall of Fourier series such as two or more "SFCs" from memory followed by steps a-i of the Association Filter Layer to Form a "String" Section.

Eq. (37.106) gives the probability $$P_A\left(\frac{\sqrt{N_1}}{\alpha_1}, \frac{\sqrt{N_2}}{\alpha_2}, \ldots, \frac{\sqrt{N_s}}{\alpha_s}, \delta_s\right)$$

of the occurrence of "association" of the corresponding Fourier series based on a first "active" "association ensemble" with modulation $$e^{-j\sqrt{N_1}\left(\frac{2\pi f}{\alpha_1}\right)}$$

given by Eq. (37.50) "coupling" with s separate "association ensembles" each with modulation $$e^{-j\sqrt{N_s}\left(\frac{2\pi f}{\alpha_s}\right)}$$

given by Eq. (37.50) and independent phase shift, $\delta_s$. The process of first establishing "associations" between different Fourier series representative of different pieces of information is the basis of producing information with novel conceptual content. The formation of "associations" is also the basis of reasoning. The generation of "associations" depends on the statistics of "coupling" of multiple "association ensembles" each comprised of cascaded association "stages". Then the "associated" information is ordered or further processed to provide general context such as cause and effect relationships by a mechanism involving the half-width parameters, $\alpha_s$, the time delay parameters, $$\frac{\sqrt{N_s}}{\alpha_s},$$

and potentially the independent phase shifts, $\delta_s$, of Eq. (37.106). The ordering of "associated" information is described in SUB-APPENDIX IV—Ordering of Associations: Matrix Method.

Sub-Appendix IV

Ordering of Associations

Matrix Method

The set of "associated" Fourier series such as at least two "groups of SFCs" and/or at least two "SFCs" is herein called a "string". The "string" is a superposition of Fourier series; thus, it comprises a Fourier series, a linear sum of "FCs". FIG. 19 is a flow diagram of an exemplary hierarchical relationship of the signals in Fourier space comprising "FCs", "SFCs", "groups of SFCs", and a "string" in accordance with the present invention. Each "FC" is the output of a "P element" or is stored into and/or recalled from a "M element" as shown in FIG. 18. The information of "string" may be ordered to provide cause and effect, chronology, and hierarchical relationships. The ordered "string" is retained in memory to provide successive associative reference or further ordering of information. The information of the "string" is ordered or sequenced temporally, conceptually, or according to causality via the Matrix Method of Analysis of Mills [3, 4].

Consider Eqs. (37.33) and (37.33a) where each represents a "SFCs" a in k,ω-space comprising a Fourier series. A "string" is a sum of Fourier series which follows from Eqs. (37.33) and (37.33a) as follows:

$$V_{\Sigma_{s,m}}(k_\rho, k_z) = \sum_{s=1}^{S}\sum_{m=1}^{M_s}\sum_{n=-\infty}^{\infty} \frac{4\pi}{1+\frac{k_z^2}{k_\rho^2}}\frac{4}{\rho_{0_{s,m}}z_{0_{s,m}}}a_{0_{s,m}}\sin\left(\left(k_\rho - n\frac{2\pi}{\rho_{0_{s,m}}}\right)\frac{N_{s,m\rho_0}\rho_{0_{s,m}}}{2}\right)\sin\left(\left(k_z - n\frac{2\pi}{v_{s,m}t_{0_{s,m}}}\right)\frac{N_{s,mz_0}z_{0_{s,m}}}{2}\right) \qquad (37.107)$$

$$V_{\Sigma_{s,m}}(k_\rho, k_z) = \sum_{s=1}^{S} \sum_{m=1}^{M_s} \sum_{n=-\infty}^{\infty} \frac{4\pi}{1 + \frac{k_z^2}{k_\rho^2}} \frac{4}{\rho_{0s,m} z_{0s,m}} a_{0s,m} \frac{N_{s,m_{\rho_0}} \rho_{0s,m}}{2} \frac{N_{s,m_{z_0}} z_{0s,m}}{2}$$ (37.108)

$$\sin\left(\left(k_\rho - n\frac{2\pi}{\rho_{0s,m}}\right)\frac{N_{s,m_{\rho_0}} \rho_{0s,m}}{2}\right) \sin\left(\left(k_z - n\frac{2\pi}{v_{s,m}t_{0s,m}}\right)\frac{N_{s,m_{z_0}} z_{0s,m}}{2}\right) =$$

$$\sum_{s=1}^{S} \sum_{m=1}^{M_s} \sum_{n=-\infty}^{\infty} \frac{4\pi}{1 + \frac{k_z^2}{k_\rho^2}} a_{0s,m} N_{s,m_{\rho_0}} N_{s,m_{z_0}} \sin\left(\left(k_\rho - n\frac{2\pi}{\rho_{0s,m}}\right)\frac{N_{s,m_{\rho_0}} \rho_{0s,m}}{2}\right) \sin\left(\left(k_z - n\frac{2\pi}{v_{s,m}t_{0s,m}}\right)\frac{N_{s,m_{z_0}} z_{0s,m}}{2}\right)$$

The corresponding equations in the time domain are a sum of multiple finite series of traveling dipoles ("impulse responses") wherein each dipole series is periodic in space and time. In frequency space, each time delayed Gaussian filter ("association ensemble" corresponding to a "SFCs") modulates and samples the Fourier series which encodes information. Thus, the time delayed Gaussian filter selects information from the "string" and provides input for the association mechanism as the "processor" implements the Matrix Method of Analysis to find the order of the associated pieces of information represented by each "SFCs" of the "string".

Consider the time interval $t=t_i$ to $t=t_f$ of a "string" associated by "association ensembles" and recorded to memory. By processing the "string" with multiple "association ensembles" comprising Gaussian filters each of different delay, $$\frac{\sqrt{N_s}}{\alpha_s},$$

and half-width parameter, $\alpha_s$, the "string" can be "broken" into "groups of SFCs" each having a center of mass at a time point corresponding to the delay $$\frac{\sqrt{N_s}}{\alpha_s}$$

and frequency composition corresponding to $\alpha_s$ which form a nested set of "sequential subsets" of "groups of SFCs" of the "string" in k,ω-space. The set members map to time points which are randomly positioned along the time interval from the $t=t_1$-side and the $t=t_2$-side as shown in FIGS. 8, 10, 12, and 14. This nested set of "sequential subsets" of random "groups of SFCs" mapping to random time points from the $t=t_i$-side and the $t=t_f$-side is analogous to the nested set of "sequential subsets" of random DNA fragments from the 5' end and the 3' end. The order in both cases can be solved by the Genomic DNA Sequencing Method/Matrix Method of Analysis of Mills [3,4] described in SUB-APPENDIX V.

The output of an association filter is the convolution of the input "groups of SFCs" (each "SFCs" given by Eqs. (37.33) and (37.33a)) of a "string" (Eq. 37.108) or the "string" itself with a delayed Gaussian. In terms of the matrix method of analysis (hereafter "MMA"), the filter parameter α of the time delayed Gaussian filter corresponds to the acquisition of the composition of a polynucleotide member of a nested set of subsets. The time delay (time domain) and modulation (frequency domain) parameter $$\frac{\sqrt{N}}{\alpha}$$

determines the center of mass of the output, and it corresponds to the terminal nucleotide data. By forming "associations" with input from "High Level Memory" as given in SUB-APPENDIX III—Association Mechanism and Basis of Reasoning, the "processor" determines the relative position of the center of mass of each Fourier series such as a "group of SFCs" as either "before" or "after" the center of mass of the preceding and succeeding Fourier series "associated" with Fourier series input from "High Level Memory". The complete set of Fourier series "associated" with Fourier series input from "High Level Memory" covers all of the frequencies of the "string". By Parseval's theorem, by processing the entire interval in k,ω-space, the information is entirely processed in the time domain. The order such as temporal order of the Fourier series representing information is determined using the MMA.

Input to form associations is provided by changing the decay constant α and the number of "stages" in the cascade N, or by processing each "group of SFCs" of a "string" using an "association ensemble" with different parameters α and N over all "groups of SFCs" that make up the entire "string". Each "group of SFCs" is determined to be on the $t=t_i$-side or the $t=t_f$-side of the "axis" of the "string" corresponding to the 5'-side or 3'-side of the "axis" of a polynucleotide to be sequenced via the Matrix Method of Analysis. A feedback loop comprises sequentially switching to different "known", "set", or "hardwired" delayed Gaussian filters which corresponds to changing the decay constant, $\alpha_s$, with a concomitant change in the half-width parameter, $\alpha_s$, and the number of elements, $N_s$, with a concomitant change in the delay, $$\frac{\sqrt{N_s}}{\alpha_s},$$

where each $\alpha_s$ and $$\frac{\sqrt{N_s}}{\alpha_s}$$

is "known" from past experiences and associations. The feedback loop whereby information from memory encoded in the "string" is filtered and delayed (modulated and sampled in frequency space) to provide "FCs", "SFCs" or "groups of SFCs" which are associated with input from "High Level Memory" provides the data acquisition and processing equivalent to the formation, acquisition, and analysis of the composition and terminal nucleotide data of a set of "sequential subsets" of the Matrix Method of Analysis. Changing the filters which process the "string" corresponds to changing the "guess" of the "known" nucleotides, $K_1 K_2 K_3 K_4 \ldots K_{n'}$, as well as the "unknown" nucleotides, $X_1, X_2, X_3, X_4 \ldots$, of the Matrix Method of Analysis as applied to DNA sequencing. The order of the "groups of SFCs" of the "string" is established when "associations" with the "High Level Memory" are achieved for a given set of delayed Gaussian filters (i.e. the order of Fourier series representing information is solved when internal consistence is achieved according to the MMA). Then each Fourier series of the ordered "string" is recorded to the "High Level Memory" wherein each Fourier series of the ordered "string" may be multiplied by the Fourier transform of the delayed Gaussian filter represented by $$e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)}$$

that established the correct order to form the ordered "string".

Also, multiple other cascades of association "stages" ("association ensembles") may act as delay-line memory actuators that produce a time delay, $\delta(t-t_0)$, during independent "activation" of a given "association ensemble" with recall from memory. In k,ω-space, the time delay is equivalent to a modulation of the correlation function given by Eq. (37.63) corresponding to the independent phase shifts, $\delta_s$, of the correlation function (Eq. (37.106)) of the separate "associated" "groups of SFCs". During "string" ordering by the Matrix Method of Analysis, the independent phase shifts, $\delta_s$, may modify the order of the Fourier series of the "string" representing information. In addition, the independent phase shifts, $\delta_s$, may initially modify the content of the "string" by altering the correlation function (Eq. (37.106)) to cause information to be "associated" which otherwise would not likely be or inhibit the "association" of information which otherwise would be. These mechanisms further provide for information with novel conceptual content.

Sub-Appendix V

Genomic DNA Sequencing Method/Matrix Method of Analysis

Abstract

As an overview, the Mills method of sequencing DNA comprises the steps of:

a) preparing from segments of a DNA strand to be sequenced, families of polynucleotides, each family including all polynucleotides, complementary to at least a portion of the DNA segment and at least a portion of the 3' flanking DNA segment of the DNA strand to be sequenced, of the formula:

$$K_{n'} \ldots K_4 K_3 K_2 K_1 X_1 X_2 X_3 X_4 \ldots X_n$$

ranging in length from $K_1 X_1$ to $K_{n'}$-$X_n$ wherein $K_1 K_2 K_3 K_4 \ldots K_{n'}$ represents the nucleotides 5' to an internal reference point, the reference point defined as the dividing line between $K_1$ and $X_1$; wherein $X_1 X_2 X_3 X_4 \ldots X_n$ represents the nucleotides 3' to the internal reference point; wherein n and n' are integers and n+n', the number of nucleotides in a polynucleotide, is less than or equal to the number of nucleotides in a polynucleotide of length within the analyzable limit of the method for determining base composition and identity of the 3' terminal nucleotide of a polynucleotide; and wherein each polynucleotide in the family conforms to the criterion that if the polynucleotide contains $X_n$ it also contains $X_{n-1}, X_{n-2} \ldots X_1$; and the criteria that if the polynucleotide contains $K_n$ it also contains $K_{n'-1}, K_{n'-2} \ldots K_1$;

b) determining the base composition (the number of A's, T's, C's, and G's) and the identity of the 3' terminal base of each polynucleotide of each family;

c) determining the base sequence of the longest polynucleotide in each family from the determined base composition and identity of the 3' terminal base of each polynucleotide in the family and derived change in base composition and terminal base between polynucleotides in each family; and d) determining the base sequence of the entire DNA strand to be sequenced based upon the overlapping sequences of the longest polynucleotides in each family.

The base sequence of the longest polynucleotide of each family is determined by the Matrix Method of Analysis of the base composition of each polynucleotide in the family and the identity of the 3' terminal base of each polynucleotide.

The base sequence of the longest polynucleotide in each set is determined by:

a) setting up a matrix consisting of ½M+1 columns and ½M rows where M is the number of nucleotides in the longest polynucleotide of the set;

b) assigning the longest polynucleotide a coordinate position in the matrix of column 1, row 1;

c) assigning polynucleotides which are successively one nucleotide shorter on the 5' end to each column position and polynucleotides which are successively one nucleotide shorter on the 3' end to each row position;

d) determining all paths through the matrix from position 1,1 to position ½M+1, ½M which are consistent with the base composition and the 3' terminal base of the polynucleotide assigned to each position in the matrix and with the change in base composition and 3' terminal base between polynucleotides; and e) from position ½M+1, ½M determining the path back to position 1,1 which permits the assignment of specific bases at each step either the 5' or 3' end of a polynucleotide, consistent with the compositional and terminal base data, to arrive at the sequence of the longest polynucleotide wherein $K_1 K_2 K_3 K_4 \ldots K_{n'}$ is guessed and steps d) and e) are performed reiteratively until a sequence can be assigned without contradiction.

Mills [3,4] has developed a method of determining the nucleotide sequence of a DNA molecule of arbitrary length as a single procedure by sequencing portions of the molecule in a fashion such that the sequence of the 5' end of the succeeding contiguous portion is sequenced as the 3' end of its preceding portion is sequenced, for all portions, where the order of contiguous portions is determined by the sequence of the DNA molecule. Sequencing of the individual portions is accomplished by generating a family of polynucleotides under conditions which determine that the elements are partial copies of the portion and are of random nucleotide length on the 3' and 5' ends about a dinucleotide which is an internal reference point; determining the base composition and terminal base identity of each element of the family and solving for the sequence by a method of analysis wherein the base composition and terminal base data of each element is used to solve for a single base of the sequence by assigning the base to either the 5' or 3' end of the partial sequence about the internal reference point as the entire sequence of the portion is built up from a dinucleotide.

The molecules generated from the DNA to be sequenced comprise families of polynucleotides. Each family corresponds to a segment of the DNA to be sequenced and is made up of a longest polynucleotide (the length of which is selected to be within the analyzable limit of the procedure used to determine base composition and identity of the terminal base) and shorter polynucleotides which form a "sequential subset" of the longest polynucleotides. Grouped hierarchically from the longest to the shortest polynucleotide of the family is progressively one nucleotide shorter than the preceding polynucleotide and has the same sequence except that it lacks the one nucleotide. A further restraint on the elements of the family is that there is a specific dinucleotide of the sequence contained in each element. The molecules can be envisioned as being built around an "axis" which is at the mid position of the common dinucleotide. The "axis" constitutes an internal reference point. The polynucleotides vary around the "axis," each containing one less nucleotide on the 3' or 5' end than its longer predecessor in the group. All such molecules are included in the family, from the longest to the shortest, a dinucleotide.

The sequence of the DNA portion from which each family of polynucleotides has been made can be solved by determining the base composition (the number of A's, T's, C's, and G's) and the identity of the 3' terminal base of each polynucleotide of the family. The composition and terminal nucleotide data of the elements of each family of polynucleotides are used to solve the sequence of the corresponding DNA portion template by a method of first generating all polynucleotides which can be obtained from a guessed solution of the sequence by successive removal of a 3' or 5' nucleotide consistent with the data of the change in composition between set elements and with the further constraint that a specific dinucleotide of the sequence must be present in all polynucleotides. The terminal nucleotide data is used to determine if a subset of the hypothetical family of polynucleotides exists such that the elements have a one to one correspondence with the data of terminal nucleotide as well as composition. If no such subset exists, the process is repeated for improved guesses until convergence to the correct solution for the sequence occurs.

A method which performs this analysis by testing for the validity of a guess for part of the sequence while solving for the remaining part using the composition and terminal base data independently to execute binary hypothesis testing decisions compatible with computer logic is the matrix method of analysis algorithm.

The matrix method of analysis is analogous to solving a system of n equations in n unknowns where the knowns are: 1) the structural properties of the polynucleotides, 2) the base composition and the identity of the terminal base, 3) the change in composition and change in terminal base between a polynucleotide and the next in the family. The method exploits the given information by implementing a reiterative procedure to find a path through a matrix of the possible polynucleotides having sequences consistent with the data. Final assignment of the sequence is made when the entire path finding procedure can be accomplished without contradictions between sequence assignment and actual data.

Strategy of the Sequencing Method

The strategy is to create a group of molecules which contain a reference point which is internal. Initially, location of the reference point is unknown, but it exists in all of the molecules. The molecules are a family of polynucleotides comprising complementary copies of a portion of the parent molecule from which they are generated and superimpose on the parent by alignment of this internal point of reference. The location of the point of reference or "axis," and the sequence of the parent molecule is solved for simultaneously by an algorithm called the matrix method of analysis.

The family of polynucleotides can be thought of as being all molecules which result from the sequential loss of nucleotides from the 5' and 3' end of the longest polynucleotide of the group. An ordered pattern of terminal nucleotide change and nucleotide compositional change occurs between members of sequential subsets. This algorithm exploits the pattern of ordered systematic nucleotide compositional change and terminal nucleotide change that a designated longest polynucleotide with a given internal reference point and given nucleotide loss constraints can produce.

Criteria of Polynucleotides

The nucleotide sequence of a DNA strand can be solved by generating a family of polynucleotides overlapping portions of the DNA to be sequenced. Each family of polynucleotides forms a "sequential subset" of the longest polynucleotide of the group. The molecules are identical less one nucleotide from either the 5' or 3' end of a given molecule, and the former are defined as sequential subsets of the latter.

The molecules can be depicted as follows:

$$K_{n'} \ldots K_4 K_3 K_2 K_1 X_1 X_2 X_3 X_4 \ldots X_n$$

Where the series $K_1, K_2, K_3, K_4 \ldots K_{n'}$ represent the nucleotides of the polynucleotide 5' to the internal reference point, or axis, and the series $X_1, X_2, X_3, X_4 \ldots X_n$ represents the nucleotides of the polynucleotide on the 3' side of the axis. The 5' end with respect to the axis is designated as the "known" portion of the molecules (this does not necessarily imply that this sequence is initially known), and the 3' end of the polynucleotide is designated as the "unknown" portion. Thus, $K_1, K_2, K_3, K_4 \ldots$ represent the "known" sequence and $X_1, X_2, X_3, X_4 \ldots$ represent the "unknown" sequence. The distinction is that in the matrix, as described below $K_1, K_2, K_3, K_4 \ldots$ appear as nucleotides, where as the X's represent variables. The nucleotides of the "known" portion can be known extrinsically or they can be guessed.

The polynucleotides are governed by the following constraints. No polynucleotide contains $X_2$ without containing $X_1$. In general terms, no polynucleotide contains $X_n$ without containing $X_{n-1}, X_{n-2}, \ldots X_1$. In addition, no polynucleotide contains $K_2$ without containing $K_1$. That is, polynucleotide contains an unknown with out containing all preceding unknowns and, every polynucleotide contains all succeeding knowns if it contains any given known. As a set, all the polynucleotides satisfy these criteria and vary randomly at the 3' and 5' ends.

The criteria can be represented symbolically as follows:
$X_n \rightarrow X_1$ ($X_n$ implies $X_1$)
$K_{n'} \rightarrow K_1$ ($K_{n'}$ implies $K_1$)
$\ldots K_{n'}$-$X_n \ldots$ (the polynucleotides are random at the 5' and 3' ends; the knowns and unknowns are variables where K=Known, X=Unknown, n'=1 to 4 . . . and n=1 to 4 . . . )

Principles of Matrix Method of Analysis

The matrix method of analysis entails setting up a rectangular matrix where the designated longest polynucleotide appears at position (1,1). The sequence of one half of this molecule is "known". The nucleotide sequence at the other one half of the molecule is designated "unknown" and is represented by variables. The term "known" does not necessarily imply that the nucleotide sequence of the parent molecule is known initially. The division between the "knowns" and "unknowns" is the internal reference point. The location of the internal reference point is not necessarily known initially and can be changed by changing the knowns so that this sequence superimposes a different region of the parent molecule. That is, when the sequence is solved, it will superimpose a region of the parent and the location of the internal reference point will be fixed. The location on the parent is at the line dividing the "knowns" and the "unknowns". If the 5' end of the sequence (and consequently the entire sequence) superimposes on a different region of the parent, the location of the internal reference point would be different. Thus, the location of the internal reference point relative to the parent molecule is determined by the "knowns".

An exemplary matrix is shown below for polynucleotides which conform to the criteria set forth. For a designated longest polynucleotide which contains a total of eight (8) nucleotides the matrix consists of 5 rows and 4 columns.

| $K_4$ $K_3$ $K_2$ $K_1$ $X_1$ | $X_2$ $X_3$ $X_4$ | | |
|---|---|---|---|
| $K_4K_3K_2K_1X_1X_2X_3X_4$ | $K_4K_3K_2K_1X_1X_2X_3$ | $K_4K_3K_2K_1X_1X_2$ | $K_4K_3K_2K_1X_1$ |
| $K_3K_2K_1X_1X_2X_3X_4$ | $K_3K_2K_1X_1X_2X_3$ | $K_3K_2K_1X_1X_2$ | $K_3K_2K_1X_1$ |
| $K_2K_1X_1X_2X_3X_4$ | $K_2K_1X_1X_2X_3$ | $K_2K_1X_1X_2$ | $K_2K_1X_1$ |
| $K_1X_1X_2X_3X_4$ | $K_1X_1X_2X_3$ | $K_1X_1X_2$ | $K_1X_1$ |
| $X_1X_2X_3X_4$ | $X_1X_2X_3$ | $X_1X_2$ | $X_1$ |

The matrix columns contain polynucleotides which have lost nucleotides at the 5' end; the rows are formed of polynucleotides which have lost nucleotides from the 3' end. Nucleotides are lost from the 5' end down any column and lost from the 3' end across any row. The matrix is constructed such that all the constraints governing the polynucleotides are satisfied, and all possible polynucleotides are recorded in the matrix according to the describe format.

The determination of the sequence of the polynucleotides proceeds as follows: starting at position (1,1) in the matrix, the base which has been lost is determined by the difference in base composition between the longest polynucleotide and the next longest of the set. The change is consistent with a move to position (1,2) and/or (2,1) of the matrix. The step is repeated for each polynucleotide of the family. These moves are down a column and/or across the row from left to right. Moves down a column or across a row from left to right are designated from/to moves. The result can be recorded, e.g. in a "lattice" which contains all coordinate positions arranged in levels such that each successive level from top to bottom corresponds to all possible from/to moves, and each successive level from bottom to top corresponds to all possible to/from moves. A to/from move is a movement up a column and/or across a row from right to left.

General Lattice

```
            11
          /    \
        12      21
       /  \    /  \
      13    22    31
     /  \  /  \  /  \
    14    23    32    41
   /  \  /  \  /  \  /  \
K₄K₃K₂K₁ 24  33  42  51
   \  /  \  /  \  /  \  /
  K₃K₂K₁ 34  43  52
     \  /  \  /  \  /
    K₂K₁ 44  53
       \  /  \  /
       K₁    54
```

| Polynucleotide | Lattice Coordinate position |
|---|---|
| $K_4K_3K_2K_1$ | 15 |
| $K_3K_2K_1$ | 25 |
| $K_2K_1$ | 35 |
| $K_1$ | 45 |

For each step, the base which could have been lost from the 3' or 5' end is determined, and the appropriate move to a position in the matrix is made. This establishes the appropriate path in the matrix which can be designated by connecting the corresponding coordinates in the lattice. This procedure is repeated until all consistent from/to moves are recorded in the lattice. At least one path is formed from coordinate position (1,1) to a point of convergence, i.e., a coordinate position from which no further from/to moves can be made.

The next step is to determine which path is the correct path. This is accomplished by starting at a point of convergence and determining which to/from steps for all single or binary decisions are consistent with the terminal base data as moves are made back to position (1,1) from the point of convergence. Assignment of a base to the 3' or 5' end is made by a to/from move which does not contradict the change in base. For all to/from moves, if the path that is chosen from one coordinate to another corresponds to a move across a row from right to left, then the base is assigned to the 3' end which is consistent with the move. That is the base change determined from the data occurred from the 3' end. A contradiction arises if this assignment is inconsistent with terminal base data for the polynucleotide represented at the coordinate position or if the change in terminal base for this step is inconsistent with the data. For all to/from moves, if the path that is chosen from one coordinate to another corresponds to a move up a column then the base change for that step indicates which base to assign to the 5' end. A contradiction would arise if the next "known" up the column in the matrix is different from that indicated by the base change.

The sequence is solved when at least one path is found from (1,1) to a point of convergence by from/to moves and to the (1,1) position from the point of convergence by to/from moves at each data step without contradictions. The matrix method of analysis yields a unique solution for a matrix of all possible polynucleotides of size (½M+1, ½M) that conform to the constraints for polynucleotides, for any set of data of M−1 polynucleotides that are successively one nucleotide less and are sequential subsets from M−1 nucleotides to a dinucleotide. (The longest polynucleotide is M nucleotides in length.)

The key to the matrix method of analyze is that there is convergence to at least one of the terminal possibilities (point in the matrix at which no further from/to moves can be made). It may converge to more than one (e.g., if the sequence contained only A, or T, or C, or G bases, then it would converge to all possible termini of the matrix that yields the solution of the sequence). Once any terminus is determined to be correct, it can serve as an initiation point, that is, a point, or coordinate position from which the initial to/from move is made. A terminus representing a single nucleotide or single variable in the matrix is correct if it is consistent with the data. The sequence can be deciphered by making decisions at branch points and by taking the return path that is determined to be correct by the data, i.e. the terminal base and the change in the terminal base at each step. If more than one path is correct, anyone of the correct paths will yield the sequence.

Examples of Solving Sequences by the Matrix Method of Analysis

To further illustrate the matrix method of determining sequence, examples of its application are given below. In each example a matrix for a polynucleotide family of eight nucleotides in length is shown. The lattice diagram shows all possible matrix from/to moves consistent with the change in composition data. The column labeled "path" represents the possible to/from moves in the matrix which are consistent with the terminal base data and the change in terminal base. The path which determines the solution to the sequence is read from bottom to top.

Example 1

| | 1 | 4 | 6 | 7 | 5 | 3 | 2 |
|---|---|---|---|---|---|---|---|
| | | | | G | | | |
| | | | | $X_1X_2X_3X_4$ | | | |

| | 1 | 2 | 3 | 4 |
|---|---|---|---|---|
| 1. | $ATTCX_1X_2X_3X_4$ | $ATTCX_1X_2X_3$ | $ATTCX_1X_2$ | $ATTCX_1$ |
| 2. | $TTCX_1X_2X_3X_4$ | $TTCX_1X_2X_3$ | $TTCX_1X_2$ | $TTCX_1$ |
| 3. | $TCX_1X_2X_3X_4$ | $TCX_1X_2X_3$ | $TCX_1X_2$ | $TCX_1$ |
| 4. | $CX_1X_2X_3X_4$ | $CX_1X_2X_3$ | $CX_1X_2$ | $CX_1$ |
| 5. | $X_1X_2X_3X_4$ | $X_1X_2X_3$ | $X_1X_2$ | $X_1$ |

| Lattice | Composition Data | Δ | Terminal Nucleotide | Path | Sequence |
|---|---|---|---|---|---|
| | 3T,2C,1G,2A | | A | 1,1 | ATTCGCTA |
| | | A | | | |
| | 3T,2C,1G,1A | | A | 2,1 | TTCGCTA |
| | | A | | | |
| | 3T,2C,1G | | T | 2,2 | TTCGCT |
| | | T | | | |
| | 2T,2C,1G | | C | 2,3 | TTCGC |
| | | T | | | |
| | 1T,2C,1G | | C | 3,3 | TCGC |
| | | C | | | |
| | 1T,1C,1G | | G | 3,4 | TCG |
| | | T | | | |
| | 1C,1G | | G | 4,4 | CG |
| | | C | | | |
| | 1G | | G | 5,4 | G |

Example 2

| | 1 | 2 | 5 | 7 | 6 | 4 | 3 |
|---|---|---|---|---|---|---|---|
| | | | | A | | | |
| | | | | $X_1X_2X_3X_4$ | | | |

| | 1 | 2 | 3 | 4 |
|---|---|---|---|---|
| 1. | $AGTCX_1X_2X_3X_4$ | $AGTCX_1X_2X_3$ | $AGTCX_1X_2$ | $AGTCX_1$ |
| 2. | $GTCX_1X_2X_3X_4$ | $GTCX_1X_2X_3$ | $GTCX_1X_2$ | $GTCX_1$ |
| 3. | $TCX_1X_2X_3X_4$ | $TCX_1X_2X_3$ | $TCX_1X_2$ | $TCX_1$ |
| 4. | $CX_1X_2X_3X_4$ | $CX_1X_2X_3$ | $CX_1X_2$ | $CX_1$ |
| 5. | $X_1X_2X_3X_4$ | $X_1X_2X_3$ | $X_1X_2$ | $X_1$ |

| Lattice | Composition Data | Δ | Terminal Nucleotide | Path | Sequence | |
|---|---|---|---|---|---|---|
| | 3T,2G,1C,2A | | G | 1,1 1,1 | AGTCATTG | AGTCATTG |
| | | A | | | | |
| | 3T,2G,1C,1A | | G | 2,1 2,1 | GTCATTG | GTCATTG |
| | | G | | | | |
| | 3T,1G,1C,1A | | G | 3,1 3,1 | TCATTG | TCATTG |
| | | G | | | | |
| | 3T,1C,1A | | T | 3,2 3,2 | TCATT | TCATT |
| | | T | | | | |
| | 2T,1C,1A | | T | 3,3 4,2 | TCAT | CATT |
| | | T | | | | |
| | 1T,1C,1A | | T | 4,3 4,3 | CAT | CAT |
| | | A | | | | |
| | 1C,1A | | A | 4,4 4,4 | CA | CA |
| | | C | | | | |
| | 1A | | A | 5,4 5,4 | A | A |

Sub-Appendix VI

Input Context

An Input Layer receives data and transforms it into a Fourier series in k,ω-space wherein input context is encoded in time as delays which corresponds to modulation of the Fourier series at corresponding frequencies. The Fourier series in Fourier space represents information parameterized according to the data and the input context. The information is the data and the input context. The information is based on physical characteristics or representations of physical characteristics and physical context. Data from transducers responding to an input signal representative of the physical characteristics and the physical context is used to parameterize the Fourier series in k,ω-space whereby i.) "Data" such as intensity and rate of change recorded by a transducer is represented in terms of the parameters $\rho_{0_m}$ and $N_{m_{p_0}}$ of each component of the Fourier series wherein the input context corresponds to the physical context based upon the identity of a specific transducer and its particular transducer elements. The physical context maps on a one to one basis to the input context. The processed signals from each transducer which can be input from the Input Layer to other layers such as the Association Layer and the "String" Ordering Layer, and the Predominant Configuration Layer comprises a Fourier series as given by Eq. (37.33) and Eq. (37.33a) wherein:

each of the factors $N_{m_{p_0}}$ and $N_{m_{z_0}}$ of the Fourier series component is proportional to the rate of change of the signal response of each transducer which is proportional to the rate of change of the physical signal such as the surface roughness, or the intensity of sound, light, or temperature; and each of the factors $\rho_{0_m}$ and $z_{0_m}$ of each Fourier component is inversely proportional to the amplitude of the signal response of each transducer which is proportional to the physical signal such as the surface roughness, or the intensity of sound, light, or temperature; or each of the factors $N_{m_{p_0}}$ and $N_{m_{z_0}}$ of the Fourier series component is proportional to the amplitude of the signal response of each transducer which is proportional to the physical signal such as the surface roughness, or the intensity of sound, light, or temperature; and each of the factors $\rho_{0_m}$ and $z_{0_m}$ of each Fourier component is inversely proportional to the rate of change of the signal response of each transducer which is proportional to the rate of change of the physical signal such as the surface roughness, or the intensity of sound, light, or temperature; or each of the factors $N_{m_{p_0}}$ and $N_{m_{z_0}}$ of the Fourier series component is proportional to the duration of the signal response of each transducer; and each of the factors $\rho_{0_m}$ and $z_{0_m}$ of each Fourier component is inversely proportional to the amplitude of the signal response of each transducer which is proportional to the physical signal such as the surface roughness, or the intensity of sound, light, or temperature.

ii.) The input from the Input Layer to other layers shown in FIG. 21 can be an analog waveform in the analog case and a matrix in the digital case. Input context of a given transducer can be encoded in time as delays which correspond to modulation of the Fourier series in k,ω-space at corresponding frequencies whereby the data corresponding to each transducer maps to a distinct memory location called a "register" that encodes the input context by recording the data to corresponding specific time intervals of a time division structured memory. The input context maps on a one to one basis to an Input Layer section of a memory. Thus, there is a one to one map of physical context to input context to Input Layer section of a memory. The representation of information as a Fourier series in Fourier space allows for the mapping.

iii.) Input context of a complex transducer system can be encoded in time by the mapping of data from the components of the transducer system to a memory structured according to a corresponding hierarchical set of time intervals representative of each transducer system with respect to different transducer systems, a transducer element's rank relationship relative to other transducer elements, and the response of a transducer element as a function of time. In terms of digital processing, the data from a transducer having n levels of subcomponents is assigned a master time interval with n+1 sub time intervals in a hierarchical manner wherein the data stream from the final n th level transducer element is recorded as a function of time in the n+1 th time coded memory buffer. During processing the time intervals represent time delays which are transformed into modulation frequencies which encode input context. FIG. 3 is a flow diagram of an exemplary transducer data structure of a time delay interval subdivision hierarchy wherein the data from a transducer having n levels of subcomponents numbering integer m per level is assigned a master time interval with n+1 sub time intervals in a hierarchical manner wherein the data stream from the final n th level transducer element is recorded as a function of time in the n+1 th time coded sub memory buffer in accordance with the present invention.

The "processor" may be taught the relationship between the "data" such as intensity and rate of change recorded by a transducer and the parameters such as $\rho_{0_m}$ and $N_{m_{p_0}}$ of each component of the Fourier series by inputting standard physical signals to each transducer together with other information that is "associated" with the standards. A data base may be established. The information that is "associated" with the standard may be recalled and can comprise input into the Association Layer and the "String" Ordering Layer shown in FIG. 20 and FIG. 21 during "processing" according to the present invention.

The process of storing output from multiple transducers to memory further comprises creation of "transducer strings". In one embodiment, associations occur at the transducer level, and "SFCs" are mapped to distinct memory "registers" from the corresponding distinct transducers responding simultaneously, for example. In one embodiment, two or more Fourier series such as two or more "SFCs" of the "string" are "linked" whereby activation of any Fourier series such as a "SFCs" of the "string" may thereby activate other or all Fourier series of the "string" stored in the corresponding "registers". The activation may be based on probability. The activation probability may depend on the "strength of the linkage" which is defined in terms of a linkage probability parameter which increases with the linkage rate, the rate at which the activation of a Fourier series of a "string" thereby causes the activation of another Fourier series of the "string". Probability operators may activate other or all Fourier series of the "string" when any Fourier series of the "string" is "active" based on the linkage probability parameter.

In a digital embodiment comprising "memory linkages" of the "transducer string", recalling any part of a "transducer string" from a distinct memory location may thereby cause additional "linked" Fourier series of the "transducer string" to be recalled. In one embodiment, a linkage probability parameter is generated and stored in memory for each "string" Fourier series such as a "SFCs". A probability operand is generated having a value selected from a set of zero and one, based on the linkage probability parameter. If the value is one, the corresponding Fourier series is recalled. Thus, when any part of a "transducer string" is recalled from memory, any other "string" Fourier series is randomly recalled wherein the recalling is based on the linkage probability parameter. The linkage probability parameter is weighted based on the linkage rate.

| Delay | $x(t) = \int_{-\infty}^{\infty} X(f) e^{j2\pi ft} df$ | $X(t) = \int_{-\infty}^{\infty} x(t) e^{-j2\pi ft} dt$ | (37.109) |
|---|---|---|---|
| | $\delta(t - t_0)$ | $\Leftrightarrow$ | $e^{-j2\pi f t_0}$ |

Consider a "transducer string" made up of multiple "groups of SFCs" where each "SFCs" represents information of the transducer system with respect to different transducer systems, a transducer element's rank relationship relative to other transducer elements, and the response of a transducer element as a function of time, space, or space and time. (The latter case applies to a transducer which is responsive to changes in the intensity of a parameter over time and spatial position). These aspects of each transducer are encoded via delays corresponding to modulation in k,ω-space within a frequency band corresponding to each aspect of the transducer.

The "string" in k,ω-space is analogous to a multidimensional Fourier series. The modulation within each frequency band may further encode context in a general sense. In one embodiment, it encodes temporal order, cause and effect relationships, size order, intensity order, before-after order, top-bottom order, left-right order, etc. which is relative to the transducer.

Eq. (37.33a), the "read" total response $r_\Sigma$ in Fourier space comprising the superposition of M "FCs" wherein each "FC" corresponds to the response of a "M or P element" with input context encoded by the modulation factor $$e^{-jk_\rho(\rho_{fb_{s,m}} + \rho_{t_{s,m}})}$$

becomes where $\rho_{t_m} = v_{t_m} t_{t_m}$ is the modulation factor which corresponds to the physical time delay $t_{t_m}$ and $\rho_{fb_m} = v_{fb_m} t_{fb_m}$ is the modulation factor which corresponds to the specific transducer time delay $t_{fb_m}$. $v_{t_m}$ and $v_{fb_m}$ are constants such as the signal propagation velocities.

"Associations" are established between Fourier series such as "SFCs" and "groups of SFCs" (i.e. a "string" is created) by "coupling" with Poissonian probability between "association ensembles" "carrying" the "SFCs" and "groups of SFCs". Input context is encoded by the transducer frequency band modulation factor $$e^{-jk_\rho(\rho_{fb_{s,m}} + \rho_{t_{s,m}})}$$

according to Eq. (37.110). In this case, Eq. (37.87b) is $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} a_{0_{m_s}} N_{m_s} \quad (37.111a)$$

$$\exp -\left\{ \frac{\frac{\alpha_1^2 \alpha_s^2}{\alpha_1^2 + \alpha_s^2} \left( \frac{\sqrt{N_1}}{\alpha_1} - \frac{\sqrt{N_s}}{\alpha_s} + \left( \frac{N_{m_1} t_{0_{m_1}}}{2} + t_{fb_{m_1}} + t_{t_{m_1}} \right) - \left( \frac{N_{m_s} t_{0_{m_s}}}{2} + t_{fb_{m_s}} + t_{t_{m_s}} \right) \right)^2}{2} \right\}$$

$$V_{\Sigma, m}(k_\rho, k_z) = \sum_{m=1}^{M} \sum_{n=-\infty}^{\infty} \frac{\frac{4\pi}{k_z^2}}{1 + \frac{k_z^2}{k_\rho^2}} a_{0_m} N_{m_{\rho_0}} N_{m_{z_0}} e^{-jk_\rho(\rho, \phi_m + \rho_{t_m})} \sin\left( k_\rho \frac{N_{m_{\rho_0}} \rho_{0_m}}{2} - n \frac{2\pi N_{m_{\rho_0}}}{2} \right) \sin\left( k_z \frac{N_{m_{z_0}} z_{0_m}}{2} - n \frac{2\pi N_{m_{z_0}}}{2} \right) \quad (37.110)$$

And, Eq. (37.87c) is $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} a_{0_{m_s}} N_{m_s}$$

$$\exp-\left\{\frac{\frac{\alpha_1^2 \alpha_s^2}{\alpha_1^2 + \alpha_s^2}\left(\frac{\sqrt{N_1}}{\alpha_1} - \frac{\sqrt{N_s}}{\alpha_s} + \left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right) - \left(\frac{N_{m_s}\rho_{0_{m_s}}}{2v_{m_s}} + \frac{\rho_{fb_{m_s}}}{v_{fb_{m_s}}} + \frac{\rho_{t_{m_s}}}{v_{t_{m_s}}}\right)\right)^2}{2}\right\}$$

(37.111b)

The corresponding frequency difference angle, $\phi_s$, which follows from Eq. (37.89) is $$\phi_s = \frac{\pi\left(\frac{\sqrt{N_1}}{\alpha_1} - \frac{\sqrt{N_s}}{\alpha_s} + \sum_{m_1=1}^{M_1}\left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right) - \sum_{m_s=1}^{M_s}\left(\frac{N_{m_s}\rho_{0_{m_s}}}{2v_{m_s}} + \frac{\rho_{fb_{m_s}}}{v_{fb_{m_s}}} + \frac{\rho_{t_{m_s}}}{v_{t_{m_s}}}\right)\right)}{\frac{\sqrt{N_1}}{\alpha_1} + \sum_{m_1=1}^{M_1}\left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right)}$$

(37.112a)

where $\rho_{t_{s,m}} = v_{t_{s,m}} t_{s,m}$ is the modulation factor which corresponds to the physical time delay $t_{t_{s,m}}$ and $\rho_{fb_{s,m}} = v_{fb_{s,m}} t_{fb_{s,m}}$ is the modulation factor which corresponds to the specific transducer time delay $t_{fb_{s,m}}$. $v_{t_{s,m}} \cdot v_{t_{s,m}}$ and $v_{fb_{s,m}}$ are constants such as The corresponding frequency difference angle, $\phi_s$, which follows from Eq. (37.90) is $$\phi_s = \frac{\pi\left(\frac{\sqrt{N_1}}{\alpha_1} - \frac{\sqrt{N_s}}{\alpha_s} + \sum_{m_1=1}^{M_1}\left(\frac{N_{m_1} t_{0_{m_1}}}{2} + t_{fb_{m_1}} + t_{t_{m_1}}\right) - \sum_{m_s=1}^{M_s}\left(\frac{N_{m_s} t_{0_{m_s}}}{2} + t_{fb_{m_s}} + t_{t_{m_s}}\right)\right)}{\frac{\sqrt{N_1}}{\alpha_1} + \sum_{m_1=1}^{M_1}\left(\frac{N_{m_1} t_{0_{m_1}}}{2} + t_{fb_{m_1}} + t_{t_{m_1}}\right)}$$

(37.112b)

Eq. (37.108), the "read" total response $^r\tilde{\Sigma}$ in Fourier space comprising the superposition of S "SFCs" wherein each "SFCs" corresponds to the response of $M_s$ "M or P elements", with input context encoded by the modulation factor $$e^{-jk\rho\left(\rho_{fb_{s,m}} + \rho_{t_{s,m}}\right)},$$

becomes the following "string".

the signal propagation velocities. In another embodiment, the output $^r\tilde{\Sigma}$ is the Gaussian sampled and modulated "string" of Eq. (37.113) wherein each "SFCs" is multiplied by the Fourier transform of the delayed Gaussian filter (Eq. (37.50)) (i.e. the modulation factor $$e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)})$$

$$V_{\Sigma_{s,m}}(k_\rho, k_z) \sum_{s=1}^{S} \sum_{m=1}^{M_s} \sum_{n=-\infty}^{\infty} \frac{4\pi}{1 + \frac{k_z^2}{k_\rho^2}} a_{0_{s,m}} N_{s,m_{\rho_0}} N_{s,m_{z_0}} e^{-jk\rho\left(\rho_{fb_{s,m}} + \rho_{t_{s,m}}\right)}$$

$$\sin\left(\left(k_\rho - n\frac{2\pi}{\rho_{0_{s,m}}}\right)\frac{N_{s,m_{\rho_0}}\rho_{0_{s,m}}}{2}\right) \sin\left(\left(k_z - n\frac{2\pi}{v_{s,m}t_{0_{s,m}}}\right)\frac{N_{s,m_{z_0}}z_{0_{s,m}}}{2}\right)$$

(37.113)

which gave rise to "coupling" and "association" to form the "string". $r_\Sigma$ is given by $$V_{\Sigma s,m}(k_\rho, k_z) \sum_{s=1}^{S}\sum_{m=1}^{M_s}\sum_{n=-\infty}^{\infty} \frac{4\pi}{1+\frac{k_z^2}{k_\rho^2}} a_{0s,m} N_{s,m_{\rho_0}} N_{s,m_{z_0}} e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)} \quad (37.114)$$

$$e^{-jk_\rho(\rho_{fbs,m}+\rho_{ts,m})} \sin\left(\left(k_\rho - n\frac{2\pi}{\rho_{0s,m}}\right)\frac{N_{s,m_{\rho_0}}\rho_{0s,m}}{2}\right)\sin\left(\left(k_z - n\frac{2\pi}{v_{s,m}t_{0s,m}}\right)\frac{N_{s,m_{z_0}}z_{0s,m}}{2}\right)$$

wherein input context is encoded by the modulation factor $$e^{-jk_\rho(\rho_{fbs,m}+\rho_{ts,m})}.$$

(37.114) is also an exemplary "string" with each Fourier series multiplied by the Fourier transform of the delayed Gaussian filter represented by $$e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)}$$

that established the correct order to form the ordered "string" given in SUB-APPENDIX IV—Ordering of Associations: Matrix Method. The index over s is independent of m since each "FC" of a given "SFCs" is filtered by the same Gaussian filter. In embodiments, the index for the Gaussian filter is not independent of m. In one case, some "FCs" may be filtered by the same Gaussian filters; whereas, other "FCs" may be filtered by different Gaussian filters. In another case, each "FC" may be filtered by a different Gaussian filter.

For the case where $v_{s,m}t_{0s,m} = \rho_{0s,m}$ and $k_\rho = k_z$, the "string" in Fourier space is one dimensional in terms of $k_\rho$ and is given by $$V_{\Sigma s,m}(k_\rho, k_z) = \quad (37.115)$$

$$\sum_{s=1}^{S}\sum_{m=1}^{M_s}\sum_{n=-\infty}^{\infty} a_{0s,m} N_{s,m_{\rho_0}} e^{-\frac{1}{2}\left(v_{sp0}\frac{k_\rho}{\alpha_{sp0}}\right)^2} e^{-j\frac{\sqrt{N_{sp0}}}{\alpha_{sp0}}(v_{sp0}k_\rho)}$$

$$e^{-jk_\rho\rho_{fbs,m}}\sin\left(\left(k_\rho - n\frac{2\pi}{\rho_{0s,m}}\right)\frac{N_{s,m_{\rho_0}}\rho_{0s,m}}{2}\right)$$

The "string" comprises a Fourier series, a linear sum of "FCs" each multiplied by its corresponding Gaussian filter modulation factor and modulation factor which encodes input context (Eqs. (37.114-37.115)). FIG. 19 is a flow diagram of an exemplary hierarchical relationship of the signals in Fourier space comprising "FCs", "SFCs", "groups of SFCs", and a "string" in accordance with the present invention. Each "FC" is encoded by a "P element" or stored into and/or recalled from a "M element" as shown in FIG. 18.

Sub-Appendix VII

Comparison of Processing Activity to Statistical Thermodynamics/Predominant Configuration The quantity of information that can be "associated" into ordered "strings" called "P strings" is essentially infinite based on the input to the layers of the "processor" comprising Fourier series in k,ω-space. Consider Eq. (37.33a). In the case that the parameter $N_{s,m}$ spans 1 to 100, $\rho_{0s,m}$ spans 1 to 1000, and there are 1000 modulation bands, the number of distinct inputs W is $$W = 1000!1000!100! \quad (37.116)$$

Using Sterling's approximation $$\ln N! = N \ln N - N \quad (37.117)$$

W is approximately $$W = e^{12,360} \quad (37.118)$$

In essence an infinite amount of information can be represented as distinct Fourier series in k,ω-space according to this method of encoding it.

According to statistical thermodynamics [20], a macroscopic thermodynamic system is viewed as an assembly of myriad submicroscopic entities in ever changing quantum states. Consider the number of distinct ways each called a microstate that a set number quanta of energy can be distributed between a set number of energy levels. The total number of microstates W associated with any configuration involving N distinguishable units is $$W = \frac{N!}{(\eta_a!)(\eta_b!)\ldots} \quad (37.119)$$

where $\eta_a$ represents the number of units assigned the same number of energy quanta (and, hence, occupying the same quantum number), and $\eta_b$ represents the number of units occupying some other quantum level. As the number of units increases, the total number of microstates skyrockets to unimaginable magnitudes. Thus, one can calculate that an assembly of 1000 localized harmonic oscillators sharing 1000 energy quanta possesses more than $10^{600}$ different microstates. This explosive expansion of the total number of microstates with increasing N is a direct consequence of the mathematics of permutations, from which arises also a second consequence of no less importance. Statistical analysis shows that the emergence of a predominant configuration is characteristic of any assembly with a large number (N) of units. Of the immense total number of microstates that can be assumed by a large assembly, an overwhelming proportion arises from one comparatively, small set of configurations centered on, and only minutely different from, the predominant configuration—with which they share an empirically identical set of macroscopic properties.

Eq. (37.119) is equally valid for the number of distinct ways that a set of "active" states at any given time can be distributed over N "P elements" and "M elements" where $\eta_a$ represents one set of indistinguishable "P elements", or "M elements", and $\eta_b$ represents another set of indistinguishable "P elements", or "M elements". Eq. (37.119) is equally valid for the number of distinct ways that interference or "coupling" can occur between cascades of association "stages" at any given time distributed over N "links" where $\eta_a$ represents one set of indistinguishable "links", and $\eta_b$ represents another set of indistinguishable "links". Of the immense total number of microstates that can be assumed by a large assembly of "active" states distributed over a large set of "P or M elements" or by a large assembly of "couplings" distributed over many cascades of association "stages", an overwhelming proportion arises from one comparatively, small set of configurations centered on, and only minutely different from, the predominant configuration—with which they share an empirically identical set of macroscopic properties. Due to the large numbers of "P and M elements" and cascades of association "stages" involved in information processing, the present "processor's" performance is stable.

Consider the "processor" on a component level such as that of a "P element". In an embodiment, the activation of a "P element" increases its excitability or probability of future activation with input. Each "P element" has an "activation" memory with a finite half-life. Repetitive "activation" of a "P element" results in a longer half-life of the increased excitability; thus, the "activation" memory becomes long term. The same principle applies to ensembles of association "stages", "processor elements" ("P elements"), and "memory elements" ("M elements") and "configurations" of "couplings" of ensembles. Each ensemble is comprised of "stages", "P elements", or "M elements" in different states of "activity" where each state is equivalent to a microstate of statistical thermodynamics. A predominant configuration arises for any ensemble. Of the immense total number of microstates that can be assumed by an ensemble, an overwhelming proportion arises from one comparatively, small set of configurations centered on, and only minutely different from, the predominant configuration—with which they share an empirically identical set of macroscopic properties. On a higher level, a configuration of "couplings" between ensembles increases the activation of the "stages" "P elements", or "M elements" comprising the ensembles. Analogously to statistical thermodynamics, a predominant configuration arises from the ensemble level. Consider the "processor" on a higher level. The activation history of each ensemble relates to a hierarchical activation relationship of "coupled" ensembles which gives rise to a precedence of higher order predominant configurations. The ability to associate information and create novel information, is a consequence. Machine learning arises by the feedback loop of transducer input to the coupled predominant configurations which increases the basis for creating information with novel conceptual content.

REFERENCES

1. Siebert, W. McC., *Circuits, Signals, and Systems*, The MIT Press, Cambridge, Mass., (1986), pp. 372-373.
2. Siebert, W. McC., *Circuits, Signals, and Systems*, The MIT Press, Cambridge, Mass., (1986), pp. 435-439.
3. R. L. Mills, U.S. Pat. No. 5,064,754, "Genomic Sequencing Method", Nov. 12, 1991.
4. R. L. Mills, U.S. Pat. No. 5,221,518, "DNA Sequencing Apparatus", Jun. 22, 1993.
5. Reynolds, G. O., DeVelis, J. B., Parrent, G. B., Thompson, B. J., *The New Physical Optics Notebook*, SPIE Optical Engineering Press, (1990).
6. Mills, R., The Grand Unified Theory of Classical Quantum Mechanics, January 1998 Edition, provided by BlackLight Power, Inc., Great Valley Corporate Center, 41 Great Valley Parkway, Malvern, Pa. 19355; www.blacklightpower.com.
7. Mills, R., Magnetic Susceptibility Imaging (MSI), U.S. Pat. No. 5,073,858 (1991).
8. Siebert, W. McC., *Circuits, Signals, and Systems*, The MIT Press, Cambridge, Mass., (1986), p. 416.
9. Siebert, W. McC., *Circuits, Signals, and Systems*, The MIT Press, Cambridge, Mass., (1986), pp. 491-497.
10. M. Fisz, *Probability Theory and Mathematical Statistics*, New York, N.Y., John Wiley, (1963). The version stated is a special case of Lyapunov's Theorem.
11. A. A. Maradudin, Rev. Mod. Phys., Vol. 36, (1964), pp. 417-432.2.
12. A. Messiah, Quantum Mechanics, Vol. I, North-Holland Publishing Company, Amsterdam, (1961), p. 442.
13. H. Ott, Ann. Physik, Vol. 23, (1935), p. 169.
14. F. Bloch, Z. Physik, Vol. 74, (1932), p. 295.
15. G. N. Watson, *Bessel Functions*, Cambridge University Press, Cambridge, (1944), p. 14.
16. R. V. Hogg, E. A. Tanis, *Probability and Statistical Inference*, MacMillan Publishing Co., Inc., New York, (1977), pp. 128-129.
17. R. V. Hogg, E. A. Tanis, *Probability and Statistical Inference*, MacMillan Publishing Co., Inc., New York, (1977), pp. 78-82.
18. R. V. Hogg, E. A. Tanis, *Probability and Statistical Inference*, MacMillan Publishing Co., Inc., New York, (1977).
19. Siebert, W. McC., *Circuits, Signals, and Systems*, The MIT Press, Cambridge, Mass., (1986).
20. L. K. Nash, Chemthermo: A Statistical approach to Classical Chemical Thermodynamics, Addison-Wesley Publishing Company, Reading Mass., (1976), pp. 1-44.

Modifications and substitutions of the system elements and process steps by one of skill in the art are considered within the scope of the present invention which is not to be limited except by the claims. What is claimed is:

What is claimed is:
1. A method for recognizing a pattern in information comprising data,
the method comprising:
producing data representative of one or more physical characteristics or one or more representations of physical characteristics within a physical context of an item of interest with a transducer;
inputting said data into a computer comprising a memory and a display device;
encoding, in said computer, said data as parameters of a plurality of Fourier components in Fourier space;
adding at least two of said Fourier components together to form at least one Fourier series in Fourier space;
sampling at least one of said Fourier series in Fourier space with a filter to form a sampled Fourier series;
modulating said sampled Fourier series in Fourier space with said filter to form a modulated Fourier series;
determining a spectral similarity between said modulated Fourier series and another Fourier series;
determining a probability expectation value based on said spectral similarity;
generating a probability operand based on said probability expectation value;
selecting a desired value for said probability operand, wherein recognition of a pattern in said information is obtained when said probability operand has said desired value; and
displaying said recognized pattern on said display device.

2. A method according to claim 1, further comprising adding said modulated Fourier series and said another Fourier series to form a string of Fourier series in Fourier space when said probability operand has said desired value.

3. A method according to claim 2, further comprising storing said string of Fourier series to a memory.

4. A method according to claim 1, wherein said another Fourier series represents known information.

5. A method according to claim 1, wherein said steps of adding said plurality of Fourier components together, sampling at least one of said plurality of Fourier series in Fourier space, modulating said sampled Fourier series in Fourier space, determining a spectral similarity between said modulated Fourier series and another one of said plurality of Fourier series, determining a probability expectation value, and generating a probability operand are repeated until a said probability operand has said desired value.

6. A method according to claim 1, wherein said value of said probability operand is selected from a set of zero and one; and wherein said desired value is one.

7. A method according to claim 1, wherein said step of encoding data further comprises modulating at least one of said Fourier components to provide an input context.

8. A method according to claim 7, wherein inputted information comprises said data and an input context, said input context mapping on a one to one basis to a physical context, said physical context being a relationship between physical characteristics represented by said inputted information.

9. A method according to claim 7, wherein step of encoding said data further comprises encoding said input context as a characteristic time delay which corresponds to a characteristic modulation of said Fourier components or Fourier series at a frequency within a band.

10. A method according to claim 9, wherein said characteristic modulation frequency band represents said input context according to at least one of a transducer, specific transducer element, and fundamental relationships including a physical context, a temporal order, a cause and effect relationship including a temporal order, a size order, an intensity order, a before-and-after order, a top-and-bottom order, and a left-and-right order.

11. A method according to claim 10, wherein said transducer has n levels of subcomponents, and is assigned a master time interval with n+1 sub time intervals in a hierarchical manner corresponding to said n levels of the transducer subcomponents, and wherein a data stream from a $n^{th}$ level subcomponent of said transducer is recorded as a function of time in the n+1 sub time intervals, each of said n+1 time intervals representing a time delay that corresponds to said characteristic modulation frequency band representing said input context.

12. A method according to claim 11, wherein the input context is based on the identity of the specific transducer and transducer subcomponents.

13. A method according to claim 9, wherein the characteristic modulation having a frequency within the band in Fourier space is represented by $e^{-j\pi f t^0}$ which corresponds to the time delay $\delta(t-t_0)$ wherein f is the frequency variable, t is the time variable, and $t_0$ is the time delay.

14. A method according to claim 13, wherein the step of adding at least two Fourier components together further comprises storing the characteristic modulation frequency in a distinct memory location within the band encoded as a delay in time.

15. A method according to claim 13, wherein the Fourier series in Fourier space, has a characteristic modulation having a frequency within the band represented by $$e^{-jk_\rho(\rho_{fb_m}+\rho_{t_m})}$$

and is selected from one of:

$$\sum_{m=1}^{M}\sum_{n=-\infty}^{\infty}\frac{4\pi}{1+\frac{k_z^2}{k_\rho^2}}a_{0_m}N_{m_{\rho 0}}N_{m_{z_0}}e^{-jk_\rho(\rho_{fb_m}+\rho_{t_m})}$$

$$\sin\left(k_\rho\frac{N_{m_{\rho 0}}\rho_{0_m}}{2}-n\frac{2\pi N_{m_{\rho 0}}}{2}\right)\sin\left(k_z\frac{N_{m_{z 0}}z_{0_m}}{2}-n\frac{2\pi N_{m_{z 0}}}{2}\right)$$

and $$\sum_{m=1}^{M}\sum_{n=-\infty}^{\infty}\frac{4\pi}{1+\frac{k_z^2}{k_\rho^2}}a_{0_m}\frac{4}{\rho_{0_m}z_{0_m}}e^{-jk_\rho(\rho_{fb_m}+\rho_{t_m})}$$

$$\sin\left(k_\rho\frac{N_{m_{\rho 0}}\rho_{0_m}}{2}-n\frac{2\pi N_{m_{\rho 0}}}{2}\right)\sin\left(k_z\frac{N_{m_{z 0}}z_{0_m}}{2}-n\frac{2\pi N_{m_{z 0}}}{2}\right)$$

wherein $\rho_{t_m}=v_{t_m}t_{t_m}$ is the modulation factor which corresponds to the physical time delay $t_{t_m}$, $\rho_{fb_m}=v_{fb_m}t_{fb_m}$ is the modulation factor which corresponds to the specific transducer time delay $t_{fb_m}$, $v_{t_m}$ and $v_{fb_m}$ are constants such as the signal propagation velocities, $a_{0_m}$ is a constant, $k_\rho$ and $k_z$ are the frequency variables, n, m, and M are integers, and $N_{m_{\rho_0}}N_{m_{z_0}}$, $\rho_{0_m}$, and $z_{0_m}$ are data parameters.

16. A method according to claim 15, wherein each of the data parameters $N_{m_{\rho_0}}$ and $N_{m_{z_0}}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

17. A method according to claim 15, wherein each of the data parameters $N_{m_{\rho_0}}$ and $N_{m_{z_0}}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

18. A method according to claim 15, wherein each of the data parameters $N_{m_{\rho_0}}$ and $N_{m_{z_0}}$ of the Fourier series component is proportional to the duration of a signal response of each transducer and each of the data parameters $\rho_{0_m}$ and $z_{0_m}$ of each Fourier component is inversely proportional to the physical characteristic.

19. A method according to claim 13, wherein the string has a characteristic modulation having a frequency within the band represented by $$e^{-jk_\rho(\rho_{fb_m}+\rho_{t_m})}$$

is selected from one of:

$$\sum_{s=1}^{S}\sum_{m=1}^{M_s}\sum_{n=-\infty}^{\infty}\frac{4\pi}{1+\frac{k_z^2}{k_\rho^2}}a_{0_{s,m}}N_{s,m_{\rho 0}}N_{s,m_{z_0}}e^{-jk_\rho(\rho_{fb_{s,m}}+\rho_{t_{s,m}})}$$

$$\sin\left(\left(k_\rho-n\frac{2\pi}{\rho_{0_{s,m}}}\right)\frac{N_{s,m_{\rho_0}}\rho_{0_{s,m}}}{2}\right)\sin\left(\left(k_z-n\frac{2\pi}{z_{0_{s,m}}}\right)\right)$$

-continued $$\frac{N_{s,m_{z0}} z_{0_{s,m}}}{2}\right)\text{ and}$$

$$\sum_{s=1}^{S}\sum_{m=1}^{M_s}\sum_{n=-\infty}^{\infty}\frac{4\pi}{1+\frac{k_z^2}{k_\rho^2}}a_{0_{s,m}}\frac{4}{\rho_{0_{s,m}}z_{0_{s,m}}}e^{-jk_\rho(\rho_{fb_{s,m}}+\rho_{t_{s,m}})}$$

$$\sin\left(\left(k_\rho-n\frac{2\pi}{\rho_{0_{s,m}}}\right)\frac{N_{s,m_{\rho 0}}\rho_{0_{s,m}}}{2}\right)\sin\left(\left(k_z-n\frac{2\pi}{z_{0_{s,m}}}\right)\frac{N_{s,m_{z0}}z_{0_{s,m}}}{2}\right)$$

wherein $\rho_{t_{s,m}} = v_{t_{s,m}} t_{t_{s,m}}$ is the modulation factor which corresponds to the physical time delay $t_{t_{s,m}}$, $\rho_{fb_{s,m}} = v_{fb_{s,m}} t_{fb_{s,m}}$ is the modulation factor which corresponds to the specific transducer time delay $t_{fb_{s,m}}$, $v_{t_{s,m}}$ and $v_{fb_{s,m}}$ are constants such as the signal propagation velocities, $a_{0_{s,m}}$ is a constant, $k_\rho$ and $k_z$ are the frequency variables, n, m, s, $M_s$, and S are integers, and $N_{s,m_{\rho_0}}$, $N_{s,m_{z_0}}$, $\rho_{0_{s,m}}$, and $z_{0_{s,m}}$ are data parameters.

20. A method according to claim 19, wherein each of the data parameters $N_{m_{\rho_0}}$ and $N_{m_{z_0}}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

21. A method according to claim 19, wherein each of the data parameters $N_{m_{\rho_0}}$ and $N_{m_{z_0}}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

22. A method according to claim 19, wherein each of the data parameters $N_{m_{\rho_0}}$ and $N_{m_{z_0}}$ of the Fourier series component is proportional to the duration of a signal response of each transducer and each of the data parameters $\rho_{0_m}$ and $z_{0_m}$ of each Fourier component is inversely proportional to the physical characteristic.

23. A method according to claim 13, wherein the Fourier series in Fourier space, has a characteristic modulation having a frequency within the band represented by $$e^{-jk_\rho(\rho_{fb_m}+\rho_{t_m})}$$

and is selected from one of:

$$\sum_{m=1}^{M}\sum_{n=-\infty}^{\infty}\frac{4\pi}{1+\frac{k_z^2}{k_\rho^2}}a_{0_m}N_{m_{\rho_0}}N_{m_{z_0}}e^{-jk_\rho(\rho_{fb_m}+\rho_{t_m})}$$

$$\sin\left(k_\rho\frac{N_{m_{\rho_0}}\rho_{0_m}}{2}-n\frac{2\pi N_{m_{\rho_0}}}{2}\right)\sin\left(k_z\frac{N_{m_{z_0}}z_{0_m}}{2}-n\frac{2\pi N_{m_{z_0}}}{2}\right)\text{ and}$$

$$\sum_{m=1}^{M}\sum_{n=-\infty}^{\infty}\frac{4\pi}{1+\frac{k_z^2}{k_\rho^2}}a_{0_m}\frac{4}{\rho_{0_m}z_{0_m}}e^{-jk_\rho(\rho_{fb_m}+\rho_{t_m})}\sin\left(k_\rho\frac{N_{m_{\rho_0}}\rho_{0_m}}{2}-n\frac{2\pi N_{m_{\rho_0}}}{2}\right)$$

$$\sin\left(k_z\frac{N_{m_{z_0}}z_{0_m}}{2}-n\frac{2\pi N_{m_{z_0}}}{2}\right)$$

wherein $\rho_{t_m} = v_{t_m} t_{t_m}$ is the modulation factor which corresponds to the physical time delay $t_{t_m}$; $\rho_{fb_m} = v_{fb_m} t_{fb_m}$ is the modulation factor which corresponds to the specific transducer time delay $t_{fb_m}$, $v_{t_m}$ and $v_{fb_m}$ are constants such as the signal propagation velocities, $a_{0_m}$ is a constant, $k_\rho$ and $k_z$ are the frequency variables, n, m, and M are integers, and $N_{m_{\rho_0}}$, $N_{m_{z_0}}$, $\rho_{0_m}$, and $z_{0_m}$ are data parameters.

24. A method according to claim 23, wherein each of the data parameters $N_{m_{\rho_0}}$ and $N_{m_{z_0}}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

25. A method according to claim 23, wherein each of the data parameters $N_{m_{\rho_0}}$ and $N_{m_{z_0}}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

26. A method according to claim 23, wherein each of the data parameters $N_{m_{\rho_0}}$ and $N_{m_{z_0}}$ of the Fourier series component is proportional to the duration of a signal response of each transducer and each of the data parameters $\rho_{0_m}$ and $z_{0_m}$ of each Fourier component is inversely proportional to the physical characteristic.

27. A method according to claim 23, wherein each Fourier series of the string is multiplied by the Fourier transform of the delayed Gaussian filter represented by $$e^{-\frac{1}{2}\left(v_{s\rho 0}\frac{k_\rho}{\alpha_{s\rho 0}}\right)^2}e^{-j\frac{\sqrt{N_{s\rho 0}}}{\alpha_{s\rho 0}}(v_{s\rho 0}k_\rho)}e^{-\frac{1}{2}\left(v_{sz0}\frac{k_z}{\alpha_{sz0}}\right)^2}e^{-j\frac{\sqrt{N_{sz0}}}{\alpha_{sz0}}(v_{sz0}k_z)}$$

wherein the filter established the association to form the string, wherein the string is represented by:

$$\sum_{s=1}^{S}\sum_{m=1}^{M_s}\sum_{n=-\infty}^{\infty}\frac{4\pi}{1+\frac{k_z^2}{k_\rho^2}}a_{0_{s,m_{\rho_0}}}N_{s,m_{z_0}}e^{-\frac{1}{2}\left(v_{s\rho 0}\frac{k_\rho}{\alpha_{s\rho 0}}\right)^2}$$

$$e^{-j\frac{\sqrt{N_{s\rho 0}}}{\alpha_{s\rho 0}}(v_{s\rho 0}k_\rho)}e^{-\frac{1}{2}\left(v_{sz0}\frac{k_z}{\alpha_{sz0}}\right)^2}e^{-j\frac{\sqrt{N_{sz0}}}{\alpha_{sz0}}(v_{sz0}k_z)}e^{-jk_\rho(\rho_{fb_{s,m}}+\rho_{t_{s,m}})}$$

$$\sin\left(\left(k_\rho-n\frac{2\pi}{\rho_{0_{s,m}}}\right)\frac{N_{s,m_{\rho_0}}\rho_{0_{s,m}}}{2}\right)\sin\left(\left(k_z-n\frac{2\pi}{v_{s,m}t_{0_{s,m}}}\right)\frac{N_{s,m_{z_0}}z_{0_{s,m}}}{2}\right)$$

wherein $v_{s\rho 0}$ and $v_{sz0}$ are constants such as the signal propagation velocities in the $\rho$ and z directions, respectively, $$\frac{\sqrt{N_{s\rho 0}}}{\alpha_{s\rho 0}}\text{ and }\frac{\sqrt{N_{sz0}}}{\alpha_{sz0}}$$

are delay parameters and $\alpha_{s\rho 0}$ and $\alpha_{sz0}$ are half-width parameters of a corresponding Gaussian filter in the $\rho$ and z directions, respectively, $\rho_{t_{s,m}} = v_{t_{s,m}} t_{t_{s,m}}$ is the modulation factor which corresponds to the physical time delay $t_{t_{s,m}}$, $\rho_{fb_{s,m}} = v_{fb_{s,m}} t_{fb_{s,m}}$ is the modulation factor which corresponds to the specific transducer time delay $t_{fb_{s,m}}$, $v_{t_{s,m}}$ and $v_{fb_{s,m}}$ are constants such as the signal propagation velocities, $a_{0_{s,m}}$ is a constant, $k_\rho$ and $k_z$ are the frequency variables, n, m, s, $M_s$, and S are integers, and $N_{s,m_{\rho_0}}$, $N_{s,m_{z_0}}$, $\rho_{0_{s,m}}$, and $z_{0_{s,m}}$ are data parameters.

28. A method according to claim 27, wherein each of the data parameters $N_{m_{\rho_0}}$ and $N_{m_{z_0}}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

29. A method according to claim 27, wherein each of the data parameters $N_{m_{p_k}}$ and $N_{m_{z_k}}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

30. A method according to claim 27, wherein each of the data parameters $N_{m_{p_k}}$ and $N_{m_{z_k}}$ of the Fourier series component is proportional to the duration of a signal response of each transducer and each of the data parameters $\rho_{0_m}$ and $z_{0_m}$ of each Fourier component is inversely proportional to the physical characteristic.

31. A method according to claim 1, wherein each Fourier component of said at least one Fourier series comprises a quantized amplitude, a frequency, or a phase angle.

32. A method according to claim 1, wherein said step of adding at least two Fourier components together is conducted to provide at least two Fourier series.

33. A method according to claim 1, wherein said data is representative of physical characteristics and said Fourier series in Fourier space is selected from one of:

$$\sum_{m=1}^{M} \sum_{n=-\infty}^{\infty} \frac{4\pi}{1 + \frac{k_z^2}{k_\rho^2}} a_{0_m} N_{m_{\rho 0}} N_{m_{z_0}}$$

$$\sin\left(\left(k_\rho - n\frac{2\pi}{\rho_{0_m}}\right)\frac{N_{m_{\rho 0}} \rho_{0_m}}{2}\right) \sin\left(\left(k_z - n\frac{2\pi}{z_{0_m}}\right)\frac{N_{m_{z_0}} z_{0_m}}{2}\right) \text{ and}$$

$$\sum_{m=1}^{M} \sum_{n=-\infty}^{\infty} \frac{4\pi}{1 + \frac{k_z^2}{k_\rho^2}} \frac{4}{\rho_{0_m} z_{0_m}} a_{0_m} \sin\left(\left(k_\rho - n\frac{2\pi}{\rho_{0_m}}\right)\frac{N_{m_{\rho 0}} \rho_{0_m}}{2}\right)$$

$$\sin\left(\left(k_z - n\frac{2\pi}{z_{0_m}}\right)\frac{N_{m_{z_0}} z_{0_m}}{2}\right)$$

wherein $\alpha_{0_m}$ is a constant, $k_\rho$ and $k_z$ are the frequency variables, n, m, and M are integers, and $N_{m_{p_k}} N_{m_{z_k}}$, $\rho_{0_m}$, and $z_{0_m}$ are data parameters.

34. A method according to claim 33, wherein each of $N_{m_{\rho 0}}$ and $N_{m_{z_0}}$ is proportional to a rate of change of said physical characteristics, and each of $\rho_{0_m}$ and $z_{0_m}$ is inversely proportional to an amplitude of said physical characteristics.

35. A method according to claim 33, wherein each of $N_{m_{\rho 0}}$ and $N_{m_{z_0}}$ is proportional to said amplitude of said physical characteristics, and each of $\rho_{0_m}$ and $z_{0_m}$ is inversely proportional to said rate of change of said physical characteristics.

36. A method according to claim 33, wherein each of $N_{m_{\rho 0}}$ and $N_{m_{z_0}}$ is proportional to a duration of a signal response of at least one input transducer; and each of $\rho_{0_m}$ and $z_{0_m}$ is inversely proportional to said physical characteristics.

37. A method according to claim 1, wherein the step of adding at least two of said Fourier components together further comprises creating transducer strings by obtaining a Fourier series from at least two selected transducers and adding the Fourier series.

38. A method according to claim 37, further comprises selecting transducers that are active simultaneously.

39. A method according to claim 38, wherein the transducer string is stored in a distinct memory location wherein a characteristic modulation having a frequency within the band in Fourier space is represented by $e^{-j2\pi f t_o}$ which corresponds to the time delay $\delta(t-t_o)$ wherein f is the frequency variable, t is the time variable, and $t_0$ is the time delay.

40. A method according to claim 39, wherein the step of adding at least two of said Fourier components together further comprises recalling any part of the transducer string from the distinct memory location which thereby causes additional Fourier series of the transducer string to be recalled.

41. A method according to claim 1, wherein the filter is a time delayed Gaussian filter in the time domain.

42. A method according to claim 41, wherein the Gaussian filter comprises a plurality of cascaded stages each stage having a decaying exponential system function between stages.

43. A method according to claim 42, wherein the Gaussian filter is modulated in the time domain to produce a frequency shift of the sampling and modulation in the frequency domain.

44. A method according to claim 41, wherein the filter is characterized in time by:

$$\frac{\alpha}{\sqrt{2\pi}} e^{-\frac{\left(t - \frac{\sqrt{N}}{\alpha}\right)^2}{\frac{2}{\alpha^2}}}$$

wherein $$\frac{\sqrt{N}}{\alpha}$$

is a delay parameter, $\alpha$ is a half-width parameter, and t is the time parameter.

45. A method according to claim 44, wherein the filter, in frequency space, is characterized by:

$$e^{-\frac{1}{2}\left(\frac{2\pi f}{\alpha}\right)^2} e^{-j\sqrt{N}\left(\frac{2\pi f}{\alpha}\right)}$$

wherein $$\frac{\sqrt{N}}{\alpha}$$

and $\alpha$ are a corresponding delay parameter and a half-width parameter in time, respectively, and f is the frequency parameter.

46. A method according to claim 1, wherein the probability expectation value is based upon Poissonian probability.

47. A method according to claim 46, wherein the probability expectation value is characterized by $$\prod_s \left[ p_{\uparrow_s} + (p - p_{\uparrow_s}) \exp\left[-\beta_s^{-2}\left(\frac{1 - \cos 2\phi_s}{2}\right)\right] \cos(\delta_s + 2\sin\phi_s) \right]$$

wherein P is the maximum probability of at least one other Fourier series being associated with a first Fourier series, $p_{\uparrow_s}$ is a probability of at least one other Fourier series being associated with a first Fourier series in the absence of coupling of the first Fourier series with the at least one other Fourier series, $\beta_s^2$ is a number that represents the amplitude of spectral similarity between at least two filtered or unfiltered Fourier series, $\phi_s$ represents the frequency difference angle between at least two filtered or unfiltered Fourier series, and $\delta_s$, is a phase factor.

48. A method according to claim 47, wherein $\beta_s^2$ is characterized by $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} a_{0_{m_s}} N_{m_s} \exp -$$

$$\left\{ \frac{\frac{\alpha_1^2 \alpha_s^2}{\alpha_1^2 + \alpha_s^2} \left( \frac{\sqrt{N_1}}{\alpha_1} - \frac{\sqrt{N_s}}{\alpha_s} + \frac{N_{m_1} \rho_{0_{m_1}}}{2 v_{m_1}} - \frac{N_{m_s} \rho_{0_{m_s}}}{2 v_{m_s}} \right)^2}{2} \right\}$$

$\frac{\sqrt{N_1}}{\alpha_1}$ and $\frac{\sqrt{N_s}}{\alpha_s}$ correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}$ and $a_{0_{m_s}}$ are constants, $v_{m_1}$ and $v_{m_s}$ are constants such as the signal propagation velocities, and $N_{m_1}$, $N_{m_s}$, $\rho_{0_{m_1}}$, and $\rho_{0_{m_s}}$ are data parameters.

49. A method according to claim 48, wherein each of the data parameters $N_{m_1}$ and $N_{m_s}$ of the Fourier series component is proportional to the rate of change of the physical characteristic and each of the data parameters $\rho_{O_m}$ and $z_{O_m}$ of each Fourier component is inversely proportional to the amplitude of the physical characteristic.

50. A method according to claim 48, wherein each of the data parameters $N_{m_1}$ and $N_{m_s}$ of the Fourier series component is proportional to the amplitude of the physical characteristic and each of the data parameters $\rho_{O_m}$ and $z_{O_m}$ of each Fourier component is inversely proportional to the rate of change of the physical characteristic.

51. A method according to claim 48, wherein each of the data parameters $N_{m_1}$ and $N_{m_s}$ of the Fourier series component is proportional to the duration of a signal response of each transducer and each of the data parameters $\rho_{O_m}$ and $z_{O_m}$ of each Fourier component is inversely proportional to the physical characteristic.

52. A method according to claim 47, wherein $\phi_s$ is characterized by $$\phi_s = \frac{\pi \left( \frac{\sqrt{N_1}}{\alpha_1} - \frac{\sqrt{N_s}}{\alpha_s} + \sum_{m_1=1}^{M_1} \frac{N_{m_1} \rho_{0_{m_1}}}{2 v_{m_1}} - \sum_{m_s=1}^{M_s} \frac{N_{m_s} \rho_{0_{m_s}}}{2 v_{m_s}} \right)}{\frac{\sqrt{N_1}}{\alpha_1} + \sum_{m_1=1}^{M_1} \frac{N_{m_1} \rho_{0_{m_1}}}{2 v_{m_1}}}$$

$\frac{\sqrt{N_1}}{\alpha_1}$ and $\frac{\sqrt{N_s}}{\alpha_s}$ correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}$ and $a_{0_{m_s}}$ are constants, $v_{m_1}$ and $v_{m_s}$ are constants such as the signal propagation velocities, and $N_{m_1}$, $N_{m_s}$, $\rho_{0_{m_1}}$, and $\rho_{0_{m_s}}$ are data parameters.

53. A method according to claim 52, wherein each of the data parameters $N_{m_1}$ and $N_{m_s}$ of the Fourier series component is proportional to the rate of change of the physical characteristic and each of the data parameters $\rho_{O_m}$ and $z_{O_m}$ of each Fourier component is inversely proportional to the amplitude of the physical characteristic.

54. A method according to claim 52, wherein each of the data parameters $N_{m_1}$ and $N_{m_s}$ of the Fourier series component is proportional to the amplitude of the physical characteristic and each of the data parameters $\rho_{O_m}$ and $z_{O_m}$ of each Fourier component is inversely proportional to the rate of change of the physical characteristic.

55. A method according to claim 52, wherein each of the data parameters $N_{m_1}$ and $N_{m_s}$ of the Fourier series component is proportional to the duration of a signal response of each transducer and each of the data parameters $\rho_{O_m}$ and $z_{O_m}$ of each Fourier component is inversely proportional to the physical characteristic.

56. A method according to claim 47, wherein $\beta_s^2$ is characterized by $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} \alpha_{0_{m_s}} N_{m_s} \exp -$$

$$\left\{ \frac{\frac{(\alpha_1^2 \alpha_s^2)}{(\alpha_1^2 + \alpha_s^2)} \left( \frac{\sqrt{N_1}}{\alpha_1} - \frac{\sqrt{N_s}}{\alpha_s} + \left( \frac{N_{m_1} \rho_{0_{m_1}}}{2 v_{m_1}} + \frac{\rho_{fb_{m_1}}}{v_{fb_{m_1}}} + \frac{\rho_{t_{m_1}}}{v_{t_{m_1}}} \right) - \left( \frac{N_{m_s} \rho_{0_{m_s}}}{2 v_{m_s}} + \frac{\rho_{fb_{m_s}}}{v_{fb_{m_s}}} + \frac{\rho_{t_{m_s}}}{v_{t_{m_s}}} \right) \right)^2}{2} \right\} \quad (2)$$

wherein $$\rho_{t_{m_1}} = v_{t_{m_1}} t_{m_1} \text{ and } \rho_{t_{m_s}} = v_{t_{m_s}} t_{m_s}$$

are the modulation factors which corresponds to the physical time delays $t_{m_1}$ and $t_{m_s}$ respectively, $$\rho_{fb_{m_1}} = v_{fb_{m_1}} t_{fb_{m_1}} \text{ and } \rho_{fb_{m_s}} = v_{fb_{m_s}} t_{fb_{m_s}}$$

are the modulation factors which corresponds to the specific transducer time delay $t_{fb_{m_1}}$ and $t_{fb_{m_s}}$ respectively, $v_{t_{m_1}}, v_{t_{m_s}}, v_{fb_{m_1}}$, and $v_{fb_{m_s}}$ are constants such as the signal propagation velocities, $$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}, a_{0_{m_s}}$ are constants, $v_{m_1}$ and $v_{m_s}$ are constants such as the signal propagation velocities, and $N_{m_1}, N_{m_s}, \rho_{0_{m_1}}$, and $\rho_{0_{m_s}}$ are data parameters.

57. A method according to claim 56, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

58. A method according to claim 56, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

59. A method according to claim 56, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

60. A method according to claim 47, wherein $\phi_s$ is characterized by $$\phi_s = \frac{\pi\left(\frac{\sqrt{N_1}}{\alpha_1} - \frac{\sqrt{N_s}}{\alpha_s} + \sum_{m_1=1}^{M_1}\left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right) - \sum_{m_s=1}^{M_s}\left(\frac{N_{m_s}\rho_{0_{m_s}}}{2v_{m_s}} + \frac{\rho_{fb_{m_s}}}{v_{fb_{m_s}}} + \frac{\rho_{t_{m_s}}}{v_{t_{m_s}}}\right)\right)}{\left(\frac{\sqrt{N_1}}{\alpha_1} + \sum_{m_1=1}^{M_1}\left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right)\right)}$$

wherein $$\rho_{t_{m_1}} = v_{t_{m_1}} t_{m_1} \text{ and } \rho_{t_{m_s}} = v_{t_{m_s}} t_{m_s}$$

are the modulation factors which corresponds to the physical time delays $t_{m_1}$ and $t_{m_s}$ respectively, $$\rho_{fb_{m_1}} = v_{fb_{m_1}} t_{fb_{m_1}} \text{ and } \rho_{fb_{m_s}} = v_{fb_{m_s}} t_{fb_{m_s}}$$

are the modulation factors which corresponds to the specific transducer time delay $t_{fb_{m_1}}$ and $t_{fb_{m_s}}$ respectively, $v_{t_{m_1}}, v_{t_{m_s}}, v_{fb_{m_1}}$, and $v_{fb_{m_s}}$ are constants such as the signal propagation velocities, $$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}$, and $a_{0_{m_s}}$ are constants, $v_{m_1}$ and $v_{m_s}$ are constants such as the signal propagation velocities, and $N_{m_1}, N_{m_s}, \rho_{0_{m_1}}$, and $\rho_{0_{m_s}}$ are data parameters.

61. A method according to claim 60, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

62. A method according to claim 60, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

63. A method according to claim 60, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

64. A method according to claim 1, further comprising linking at least two Fourier series stored in a memory comprising the steps of
   a.) generating a probability expectation value that recalling any part of one of the Fourier series from the memory causes at least another Fourier series to be recalled from the memory;
   b.) storing the probability expectation value to memory;
   c.) generating a probability operand based on the probability expectation value, and
   d.) recalling the at least another Fourier series from the memory if the operand has a desired value.

65. A method according to claim 64, wherein said probability operand is a value selected from a set of zero and one value selected from a set of zero and one.

66. A method according to claim 65, wherein said desired value is one.

67. A method according to claim 64, whereby the probability expectation value increases with a rate of recalling any part of any of the Fourier series.

68. A method for recognizing a pattern in information, the method comprising:
  producing data relating to said information with a transducer, wherein said information is representative of one or more physical characteristics or one or more representations of physical characteristics within a physical context of an item of interest;
  inputting said data into a computer comprising a memory and a display device;
  representing the information in said memory as a plurality of Fourier series in Fourier space;
  forming associations between at least two of the Fourier series by modulating and sampling the Fourier series with filters and by coupling the filtered Fourier series based on a probability distribution, wherein when at least two of the Fourier series have been associated recognition of a pattern in the information is achieved; and
  outputting, using said display device, a recognized pattern in the information.

69. A method according to claim 68, wherein coupling is based on spectral similarity of said Fourier series.

70. A method according to claim 68, further comprising adding the associated Fourier series to form a string, and ordering the string.

71. A method according to claim 70, wherein the string is selected from one of:

$$\sum_{s=1}^{S}\sum_{m=1}^{M_s}\sum_{n=-\infty}^{\infty}\frac{4\pi}{1+\frac{k_z^2}{k_\rho^2}}a_{0_{s,m}}N_{s,m_{\rho_0}}N_{s,m_{z_0}}\sin\left(\left(k_\rho-n\frac{2\pi}{\rho_{0_{s,m}}}\right)\frac{N_{s,m_{\rho_0}}\rho_{0_{s,m}}}{2}\right)$$

$$\sin\left(\left(k_z-n\frac{2\pi}{z_{0_{s,m}}}\right)\frac{N_{s,m_{z_0}}z_{0_{s,m}}}{2}\right) \text{ and}$$

$$\sum_{s=1}^{S}\sum_{m=1}^{M_s}\sum_{n=-\infty}^{\infty}\frac{4\pi}{1+\frac{k_z^2}{k_\rho^2}}a_{0_{s,m}}\frac{4}{\rho_{0_{s,m}}z_{0_{s,m}}}\sin\left(\left(k_\rho-n\frac{2\pi}{\rho_{0_{s,m}}}\right)\frac{N_{s,m_{\rho_0}}\rho_{0_{s,m}}}{2}\right)$$

$$\sin\left(\left(k_z-n\frac{2\pi}{z_{0_{s,m}}}\right)\frac{N_{s,m_{z_0}}z_{0_{s,m}}}{2}\right)$$

wherein $a_{0_{s,m}}$ is a constant, $k_\rho$ and $k_z$ are the frequency variables, n, m, s, $M_s$, and S are integers, and $N_{m_n}N_{m_0}$, $\rho_{0_{s,m}}$, and $z_{0_{s,m}}$ are data parameters.

72. A method according to claim 71, wherein each of the data parameters $N_{m_n}$ and $N_{m_0}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

73. A method according to claim 71, wherein each of the data parameters $N_{m_n}$ and $N_{m_0}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

74. A method according to claim 71, wherein each of the data parameters $N_{m_n}$ and $N_{m_0}$ of the Fourier series component is proportional to the duration of a signal response of each transducer and each of the data parameters $\rho_{0_m}$ and $z_{0_m}$ of each Fourier component is inversely proportional to the physical characteristic.

75. A method according to claim 68, wherein the filter is a time delayed Gaussian filter in the time domain.

76. A method according to claim 68, wherein the probability distribution is Poissonian.

77. A method for recognizing a pattern in information and establishing an order formatted pattern in information with respect to standard ordered information, the method comprising:
  a.) obtaining a string comprising a sum of Fourier series from a memory of a computer, said string representing information representative of one or more physical characteristics or one or more representations of physical characteristics within a physical context of an item of interest;
  b.) selecting, using the computer, at least two filters from a selected set of filters;
  c.) sampling, using the computer, the string with the filters such that each of the filters produces a sampled Fourier series, each Fourier series comprising a subset of the string;
  d.) modulating, using the computer each of the sampled Fourier series in Fourier space with the corresponding selected filter such that each filter produces an order formatted Fourier series;
  e.) adding, using the computer the order formatted Fourier series produced by each filter to form a summed Fourier series in Fourier space;
  f.) obtaining an ordered Fourier series from the memory;
  g.) determining, using the computer a spectral similarity between the summed Fourier series and the ordered Fourier series;
  h.) determining, using the computer, a probability expectation value based on the spectral similarity;
  i.) generating, using the computer, a probability operand based on the probability expectation value;
  j.) repeating steps b-i until the probability operand has a desired value, when the probability operand has a desired value a pattern in information has been recognized and an order formatted pattern in the information has been established;
  k.) storing the summed Fourier series to an intermediate memory;
  l.) removing the selected filters from the selected set of filters to form an updated set of filters;
  m.) removing the subsets from the string to obtain an updated string;
  n.) selecting an updated filter from the updated set of filters;
  o.) sampling the updated string with the updated filter to form a sampled Fourier series comprising a subset of the string;
  p.) modulating the sampled Fourier series in Fourier space with the corresponding selected updated filter to form an updated order formatted Fourier series;
  q.) recalling the summed Fourier series from the intermediate memory;
  r.) adding the updated order formatted Fourier series to the summed Fourier series from the intermediate memory to form an updated summed Fourier series in Fourier space;
  s.) obtaining an updated ordered Fourier series from the high level memory;
  t.) determining a spectral similarity between the updated summed Fourier series and the updated ordered Fourier series;
  u.) determining a probability expectation value based on the spectral similarity;
  v.) generating a probability operand based on the probability expectation value;

w.) repeating steps n-v until the probability operand has a desired value or all of the updated filters have been selected from the updated set of filters, when the probability operand has a desired value a pattern in information has been recognized an order formatted pattern in the information has been established;

x.) if all of the updated filters have been selected before the probability operand has a desired value, then clearing the intermediate memory and returning to step b;

y.) if the probability operand has a desired value, then storing the updated summed Fourier series to the intermediate memory;

z.) repeating steps l-y until one of the following set of conditions is satisfied: the updated set of filters is empty, or the remaining subsets of the string of step m.) is nil; and aa.) storing the Fourier series in the intermediate memory in the high level memory of said computer.

78. A method according to claim 77, wherein information is represented by a sum of Fourier series in Fourier space.

79. A method according to claim 77, further comprising encoding data which includes modulating at least one of said Fourier components to provide an input context.

80. A method according to claim 77, wherein inputted information comprises data and an input context, said input context mapping on a one to one basis to a physical context, said physical context being a relationship between physical characteristics represented by said inputted information.

81. A method according to claim 77, wherein each Fourier component of said at least one Fourier series comprises a quantized amplitude, a frequency, or a phase angle.

82. A method according to claim 77, wherein said probability operands having a value selected from a set of zero and one.

83. A method according to claim 82, wherein said desired values are one.

84. A method according to claim 77, wherein the high level memory is initialized with standard inputs.

85. A method according to claim 77, wherein the ordering is according to one of temporal order, cause and effect relationships, size order, intensity order, before-after order, top-bottom order, or left-right order.

86. A method according to claim 77, wherein each filter of the set of filters is a time delayed Gaussian filter having a half-width parameter $\alpha$ which determines the amount of the string that is sampled.

87. A method according to claim 77, wherein each filter of the set of filters is a time delayed Gaussian filter having a delay parameter $$\frac{\sqrt{N}}{\alpha}$$

which corresponds to a time point.

88. A method according to claim 87, wherein each Fourier series of the string is multiplied by the Fourier transform of the delayed Gaussian filter represented by $$e^{-\frac{1}{2}\left(v_{s\rho 0}\frac{k_\rho}{\alpha_{s\rho 0}}\right)^2} e^{-j\frac{\sqrt{N_{s\rho 0}}}{\alpha_{s\rho 0}}(v_{s\rho 0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)}$$

wherein the filter established the correct order to form the string, wherein the ordered string is represented by:

$$\sum_{s=1}^{S}\sum_{m=1}^{M_s}\sum_{n=-\infty}^{\infty}\frac{4\pi}{1+\frac{k_z^2}{k_\rho^2}}a_{0_{s,m}}N_{s,m_{\rho 0}}N_{s,m_{z0}}e^{-\frac{1}{2}\left(v_{s\rho 0}\frac{k_\rho}{\alpha_{s\rho 0}}\right)^2}$$

$$e^{-j\frac{\sqrt{N_{s\rho 0}}}{\alpha_{s\rho 0}}}e^{-\frac{1}{2}\left(v_{sz0}\frac{k_z}{\alpha_{sz0}}\right)^2}e^{-j\frac{\sqrt{N_{sz0}}}{\alpha_{sz0}}(v_{sz0}k_z)}e^{-jk_\rho\left(\rho_{fb_{s,m}}+\rho_{t_{s,m}}\right)}$$

$$\sin\left(\left(k_\rho - n\frac{2\pi}{\rho_{0_{s,m}}}\right)\frac{N_{s,m_{\rho 0}}\rho_{0_{s,m}}}{2}\right)\sin\left(\left(k_z - n\frac{2\pi}{v_{s,m}t_{0_{s,m}}}\right)\frac{N_{s,m_{z0}}z_{0_{s,m}}}{2}\right)$$

wherein $v_{s\rho 0}$ and $v_{sz0}$ are constants such as the signal propagation velocities in the $\rho$ and z directions, respectively, $$\frac{\sqrt{N_{s\rho 0}}}{\alpha_{s\rho 0}} \text{ and } \frac{\sqrt{N_{sz0}}}{\alpha_{sz0}}$$

are delay parameters and $\alpha_{s\rho 0}$ and $\alpha_{sz0}$ are half-width parameters of a corresponding Gaussian filter in the $\rho$ and z directions, respectively, $\rho_{t_{s,m}}=v_{t_{s,m}}t_{t_{s,m}}$ is the modulation factor which corresponds to the physical time delay $t_{t_{s,m}}$, $\rho_{fb_{s,m}}=v_{fb_{s,m}}t_{fb_{s,m}}$ is the modulation factor which corresponds to the specific transducer time delay $t_{fb_{s,m}}$, $v_{t_{s,m}}$ and $v_{fb_{s,m}}$ are constants such as the signal propagation velocities, $a_{0_{s,m}}$ is a constant, $k_\rho$ and $k_z$ are the frequency variables, n, m, s, $M_s$, and S are integers, and $N_{m_\rho}N_{m_z}$, $\rho_{0_{s,m}}$, and $z_{0_{s,m}}$ are data parameters.

89. A method according to claim 88, wherein each of the data parameters $N_{m_\rho}$ and $N_{m_z}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

90. A method according to claim 88, wherein each of the data parameters $N_{m_\rho}$ and $N_{m_z}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

91. A method according to claim 88, wherein each of the data parameters $N_{m_\rho}$ and $N_{m_z}$ of the Fourier series component is proportional to the duration of a signal response of each transducer and each of the data parameters $\rho_{0_m}$ and $z_{0_m}$ of each Fourier component is inversely proportional to the physical characteristic.

92. A method according to claim 88, wherein $v_{s,m}t_{0_{s,m}}=\rho_{0_{s,m}}$ and $k_\rho=k_z$ such that the string in Fourier space is one dimensional in terms of $k_\rho$ and is represented by $$\sum_{s=1}^{S}\sum_{m=1}^{M_s}\sum_{n=-\infty}^{\infty}a_{0_{s,m}}N_{s,m_{\rho 0}}e^{-\frac{1}{2}\left(v_{s\rho 0}\frac{k_\rho}{\alpha_{s\rho 0}}\right)^2}$$

$$e^{-j\frac{\sqrt{N_{s\rho 0}}}{\alpha_{s\rho 0}}(v_{s\rho 0}k_\rho)}e^{-jk_\rho\rho_{fb_{s,m}}}\sin\left(\left(k_\rho - n\frac{2\pi}{\rho_{0_{s,m}}}\right)\frac{N_{s,m_{\rho 0}}\rho_{0_{s,m}}}{2}\right)$$

wherein $v_{s\rho0}$ is a constant such as the signal propagation velocity in the $\rho$ direction, $$\frac{\sqrt{N_{s\rho0}}}{\alpha_{s\rho0}}$$

is a delay parameter and $\alpha_{s\rho0}$ is a half-width parameter of a corresponding Gaussian filter in the $k_\rho$-space, $\rho_{fb_{s,m}} = v_{fb_{s,m}} t_{fb_{s,m}}$ is the modulation factor which corresponds to the specific transducer time delay $t_{fb_{s,m}}$, $v_{fb_{s,m}}$ is a constant such as the signal propagation velocity, $a_{0_{s,m}}$ is a constant, $k_\rho$ is the frequency variable, n, m, s, $M_s$, and S are integers, and $N_{m_s}$ and $\rho_{0_{s,m}}$ are data parameters.

93. A method according to claim 92, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

94. A method according to claim 92, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

95. A method according to claim 92, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

96. A method according to claim 77, wherein the probability expectation value is based upon Poissonian probability.

97. A method according to claim 96, wherein the probability expectation value is characterized by $$\prod_s \left[ p_{\uparrow_s} + (P - p_{\uparrow_s}) \exp\left[-\beta_s^2 \left(\frac{1-\cos 2\phi_s}{2}\right)\right] \cos(\delta_s + 2\sin\phi_s) \right]$$

wherein P is the maximum probability that at least one other Fourier series is active given that a first Fourier series is active, $p_{\uparrow_s}$ is a probability of a Fourier series becoming active in the absence of coupling from at least one other active Fourier series, $\beta_s^2$ is a number that represents the amplitude of spectral similarity between at least two filtered or unfiltered Fourier series, $\phi_s$ represents the frequency difference angle between at least two filtered or unfiltered Fourier series, and $\delta_s$, is a phase factor.

98. A method according to claim 97, wherein $\beta_s^2$ is characterized by $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} a_{0_{m_s}} N_{m_s} \exp -$$

-continued $$\left\{ \frac{\frac{\alpha_1^2 \alpha_s^2}{\alpha_1^2 + \alpha_s^2} \left( \frac{\sqrt{N_1}}{\alpha_1} - \frac{\sqrt{N_s}}{\alpha_s} + \left( \frac{N_{m_1} \rho_{0_{m_1}}}{2 v_{m_1}} + \frac{\rho_{fb_{m_1}}}{v_{fb_{m_1}}} + \frac{\rho_{t_{m_1}}}{v_{t_{m_1}}} \right) - \left( \frac{N_{m_s} \rho_{0_{m_s}}}{2 v_{m_s}} + \frac{\rho_{fb_{m_s}}}{v_{fb_{m_s}}} + \frac{\rho_{t_{m_s}}}{v_{t_{m_s}}} \right) \right)^2}{2} \right\}$$

wherein $$\rho_{t_{m_1}} = v_{t_{m_1}} t_{t_{m_1}} \text{ and } \rho_{t_{m_s}} = v_{t_{m_s}} t_{t_{m_s}}$$

are the modulation factors which corresponds to the physical time delays $t_{t_{m_1}}$ and $t_{t_{m_s}}$, respectively, $$\rho_{fb_{m_1}} = v_{fb_{m_1}} t_{fb_{m_1}} \text{ and } \rho_{fb_{m_s}} = v_{fb_{m_s}} t_{fb_{m_s}}$$

are the modulation factors which corresponds to the specific transducer time delay $t_{fb_{m_1}}$ and $t_{fb_{m_s}}$, respectively, $v_{m_1}, v_{m_s}, v_{fb_{m_1}}$, and $v_{fb_{m_s}}$ are constants such as the signal propagation velocities, $$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}, a_{0_{m_s}}$ are constants, $v_{m_1}$ and $v_{m_s}$ are constants such as the signal propagation velocities, and $N_{m_1}, N_{m_s}, \rho_{0_{m_1}}$, and $\rho_{0_{m_s}}$ are data.

99. A method according to claim 98, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

100. A method according to claim 98, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

101. A method according to claim 98, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

102. A method according to claim 98, wherein $\phi_s$ is characterized by $$\phi_s = \frac{\pi\left(\frac{\sqrt{N_1}}{\alpha_1} - \frac{\sqrt{N_s}}{\alpha_s} + \sum_{m_1=1}^{M_1}\left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right) - \sum_{m_s=1}^{M_s}\left(\frac{N_{m_s}\rho_{0_{m_s}}}{2v_{m_s}} + \frac{\rho_{fb_{m_s}}}{v_{fb_{m_s}}} + \frac{\rho_{t_{m_s}}}{v_{t_{m_s}}}\right)\right)}{\frac{\sqrt{N_1}}{\alpha_1} + \sum_{m_1=1}^{M_1}\left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right)}$$

wherein $$\rho_{t_{m_1}} = v_{t_{m_1}} t_{t_{m_1}} \text{ and } \rho_{t_{m_s}} = v_{t_{m_s}} t_{t_{m_s}}$$

are the modulation factors which corresponds to the physical time delays $t_{t_m}$, $t_{t_{m_s}}$, respectively, $$\rho_{fb_{m_1}} = v_{fb_{m_1}} t_{fb_{m_1}} \text{ and } \rho_{fb_{m_s}} = v_{fb_{m_s}} t_{fb_{m_s}}$$

are the modulation factors which corresponds to the specific transducer time delay $t_{fb_{m_1}}$ and $t_{fb_{m_s}}$, respectively, $v_{m_1}$, $v_{m_s}$, $v_{fb_{m_1}}$, and $v_{fb_{m_s}}$ are constants such as the signal propagation velocities, $$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$, and $M_s$ are integers, $a_{0_{m_1}}$ and $a_{0_{m_s}}$ are constants, $v_{m_1}$ and $v_{m_s}$ are constants such as the signal propagation velocities, and $N_{m_1}$, $N_{m_s}$, $\rho_{0_{m_1}}$, and $\rho_{0_{m_s}}$ are data parameters.

103. A method according to claim 102, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

104. A method according to claim 102, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

105. A method according to claim 102, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

106. A computer comprising:
a processor for recognizing a pattern in information comprising data and establishing an order formatted pattern in information:
a computer memory comprising a set of initial ordered Fourier series;
software loaded into the memory of the computer that, when executed by the processor, causes the computer to generate:
an input layer that receives data representative of physical characteristics or representations of physical characteristics within an input context of the physical characteristics and transforms the data into a Fourier series in Fourier space wherein the input context is encoded in time as delays corresponding to modulation of the Fourier series at corresponding frequencies;
an association layer that receives a plurality of the Fourier series in Fourier space from the memory, recognizes a pattern in information represented by the Fourier series, forms a string comprising a sum of Fourier series, and stores the string in memory;
a string ordering layer that receives the string and at least one ordered Fourier series from the memory, orders the Fourier series contained in the string by establishing an order formatted pattern in information to form an ordered string, and stores the ordered string in memory; and
a predominant configuration layer that receives multiple ordered strings from the memory, forms complex ordered strings from the ordered strings, stores the complex ordered strings to the memory, and activates the components of any of the layers of the system to recognize a pattern in information and establish an order formatted pattern in information; and
a display device for displaying the recognized pattern.

107. A method of recognizing a pattern in information, the method comprising:
a.) generating, using a computer, an activation probability parameter based on a prior activation probability parameter generated based on a Fourier Series in Fourier Space and a weighting based on an activation rate of a corresponding component, wherein the activation probability parameter relates to the frequency with which the component is activated, wherein the computer does not recognize a pattern in the information;
b.) storing the activation probability parameter in a memory of the computer;
c.) generating a probability operand based on the activation probability parameter;
d.) if said probability operand is a desired value, activating any component of one or more of the group consisting of an input layer, an association layer, a string ordering layer, and a predominant configuration layer, the activation being based on the activation probability parameter, wherein a pattern in information is recognized when said probability operand is said desired value;
e.) repeating steps a-d until the computer recognizes a pattern in the information.

108. A method according to claim 107, wherein said probability operand having a value selected from a set of zero and one.

109. A method according to claim 108, wherein said desired value is one.

110. A computer program product, comprising a computer-readable medium having a computer readable program code embodied therein, said computer readable program code adapted to be executed by a computer to implement a method for recognizing a pattern in information comprising data, the method comprising:
encoding data as parameters of a plurality of Fourier components in Fourier space using said computer;

adding at least two of said Fourier components together to form at least one Fourier series in Fourier space using said computer;

providing a system using said computer, wherein the system comprises distinct software components, and wherein the distinct software components comprise:

a filter for sampling at least one of said Fourier series in Fourier space to form a sampled Fourier series, wherein the sampled Fourier series in Fourier space is modulated with said filter to form a modulated Fourier series;

a spectral similarity analyzer for determining a spectral similarity between said modulated Fourier series and another Fourier series;

a probability expectation analyzer for determining a probability expectation value based on said spectral similarity; and a probability operand generator for generating a probability operand based on said probability expectation value, wherein the system selects a desired value for said probability operand, wherein recognition of a pattern in said information is obtained when said probability operand has said desired value wherein the computer readable medium is a non-transitory computer readable medium.

111. A computer program product according to claim 110, wherein said data is inputted from a transducer which transduces physical data into computer readable data.

112. A computer program product according to claim 110, further comprising adding said modulated Fourier series and said another Fourier series to form a string of Fourier series in Fourier space when said probability operand has said desired value.

113. A computer program product according to claim 112, further comprising storing said string of Fourier series to a memory.

114. A computer program product according to claim 110, wherein said another Fourier series represents known information.

115. A computer program product according to claim 110, wherein said steps of adding said plurality of Fourier components together, sampling at least one of said plurality of Fourier series in Fourier space, modulating said sampled Fourier series in Fourier space, determining a spectral similarity between said modulated Fourier series and another one of said plurality of Fourier series, determining a probability expectation value, and generating a probability operand are repeated until a said probability operand has said desired value.

116. A computer program product according to claim 110, wherein said value of said probability operand is selected from a set of zero and one; and wherein said desired value is one.

117. A computer program product according to claim 110, wherein said step of encoding data further comprises modulating at least one of said Fourier components to provide an input context.

118. A computer program product according to claim 117, wherein step of encoding said data further comprises encoding said input context as a characteristic time delay which corresponds to a characteristic modulation of said Fourier components or Fourier series at a frequency within a band.

119. A computer program product according to claim 118, wherein said characteristic modulation frequency band represents said input context according to at least one of a transducer, a specific transducer element, and at least one of fundamental relationship including a physical context, a temporal order, a cause and effect relationships including a temporal order, a size order, an intensity order, a before-and-after order, a top-and-bottom order, and a left-and-right order.

120. A computer program product according to claim 119, wherein said transducer has n levels of subcomponents, and is assigned a master time interval with n+1 sub time intervals in a hierarchical manner corresponding to said n levels of the transducer subcomponents, and wherein a data stream from a $n^{th}$ level subcomponent of said transducer is recorded as a function of time in the n+1 sub time intervals, each of said n+1 time intervals representing a time delay that corresponds to said characteristic modulation frequency band representing said input context.

121. A computer program product according to claim 120, wherein the input context is based on the identity of the specific transducer and transducer subcomponents.

122. A computer program product according to claim 120, wherein the characteristic modulation having a frequency within the band in Fourier space is represented by $e^{-j2\pi f t_0}$ which corresponds to the time delay $\delta(t-t_0)$ wherein f is the frequency variable, t is the time variable, and $t_0$ is the time delay.

123. A computer program product according to claim 122, wherein the step of adding at least two Fourier components together further comprises storing the characteristic modulation frequency in a distinct memory location within the band encoded as a delay in time.

124. A computer program product according to claim 122, wherein the Fourier series in Fourier space, has a characteristic modulation having a frequency within the band represented by $$e^{-jk_\rho(\rho_{fb_m}+\rho_{t_m})}$$

and is selected from one of:

$$\sum_{m=1}^{M}\sum_{n=-\infty}^{\infty}\frac{4\pi}{1+\frac{k_z^2}{k_\rho^2}}a_{0_m}N_{m_{\rho_0}}N_{m_{z_0}}e^{-jk_\rho(\rho_{fb_m}+\rho_{t_m})}$$

$$\sin\left(k_\rho\frac{N_{m_{\rho_0}}\rho_{0_m}}{2}-n\frac{2\pi N_{m_{\rho_0}}}{2}\right)\sin\left(k_z\frac{N_{m_{z_0}}z_{0_m}}{2}-n\frac{2\pi N_{m_{z_0}}}{2}\right) \text{ and}$$

$$\sum_{m=1}^{M}\sum_{n=-\infty}^{\infty}\frac{4\pi}{1+\frac{k_z^2}{k_\rho^2}}a_{0_m}\frac{4}{\rho_{0_m}z_{0_m}}e^{-jk_\rho(\rho_{fb_m}+\rho_{t_m})}\sin\left(k_\rho\frac{N_{m_{\rho_0}}\rho_{0_m}}{2}-n\frac{2\pi N_{m_{\rho_0}}}{2}\right)$$

$$\sin\left(k_z\frac{N_{m_{z_0}}z_{0_m}}{2}-n\frac{2\pi N_{m_{z_0}}}{2}\right)$$

wherein $\rho_{t_m}=v_{t_m}t_{t_m}$ is the modulation factor which corresponds to the physical time delay $t_{t_m}$, $\rho_{fb_m}=v_{fb_m}t_{fb_m}$ is the modulation factor which corresponds to the specific transducer time delay $t_{fb_m}$, $v_{t_m}$ and $v_{fb_m}$ are constants such as the signal propagation velocities, $a_{0_m}$ is a constant, $k_\rho$ and $k_z$ are the frequency variables, n, m, and M are integers, and $N_{m_{r_0}}, N_{m_{z_0}}, \rho_{0_m}$, and $z_{0_m}$ are data parameters.

125. A computer program product according to claim 124, wherein each of the data parameters $N_{m_{r_0}}$ and $N_{m_{z_0}}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

126. A computer program product according to claim 124, wherein each of the data parameters $N_{m_\rho}$ and $N_{m_z}$ of the Fourier series component is proportional to the amplitude of the physical characteristic and each of the data parameters $\rho_{O_m}$ and $z_{O_m}$ of each Fourier component is inversely proportional to the rate of change of the physical characteristic.

127. A computer program product according to claim 124, wherein each of the data parameters $N_{m_\rho}$ and $N_{m_z}$ of the Fourier series component is proportional to the duration of a signal response of each transducer and each of the data parameters $\rho_{O_m}$ and $z_{O_m}$ of each Fourier component is inversely proportional to the physical characteristic.

128. A computer program product according to claim 122, wherein the string has a characteristic modulation having a frequency within the band represented by $$e^{-jk_\rho(\rho_{fb_m}+\rho_{t_m})}$$

is selected from one of:

$$\sum_{s=1}^{S}\sum_{m=1}^{M_s}\sum_{n=-\infty}^{\infty}\frac{4\pi}{1+\frac{k_z^2}{k_\rho^2}}a_{0s,m}N_{s,m_{\rho_0}}N_{s,m_{z_0}}e^{-jk_\rho(\rho_{fb_{s,m}}+\rho_{t_{s,m}})}$$

$$\sin\left(\left(k_\rho-n\frac{2\pi}{\rho_{0_{s,m}}}\right)\frac{N_{s,m_{\rho_0}}\rho_{0_{s,m}}}{2}\right)\sin\left(\left(k_z-n\frac{2\pi}{z_{0_{s,m}}}\right)\frac{N_{s,m_{z_0}}z_{0_{s,m}}}{2}\right) \text{ and}$$

$$\sum_{s=1}^{S}\sum_{m=1}^{M_s}\sum_{n=-\infty}^{\infty}\frac{4\pi}{1+\frac{k_z^2}{k_\rho^2}}a_{0s,m}\frac{4}{\rho_{0_{s,m}}z_{0_{s,m}}}e^{-jk_\rho(\rho_{fb_{s,m}}+\rho_{t_{s,m}})}\sin\left(\left(k_\rho-n\frac{2\pi}{\rho_{0_{s,m}}}\right)\right.$$

$$\left.\frac{N_{s,m_{\rho_0}}\rho_{0_{s,m}}}{2}\right)\sin\left(\left(k_z-n\frac{2\pi}{z_{0_{s,m}}}\right)\frac{N_{s,m_{z_0}}z_{0_{s,m}}}{2}\right)$$

wherein $\rho_{t_{s,m}}=v_{t_{s,m}}t_{t_{s,m}}$ is the modulation factor which corresponds to the physical time delay $t_{t_{s,m}}$, $\rho_{fb_{s,m}}=v_{fb_{s,m}}t_{fb_{s,m}}$ is the modulation factor which corresponds to the specific transducer time delay $t_{fb_{s,m}}$, $v_{t_{s,m}}$ and $v_{fb_{s,m}}$ are constants such as the signal propagation velocities, $a_{0_{s,m}}$ is a constant, $k_\rho$ and $k_z$ are the frequency variables, n, m, s, $M_s$, and S are integers, and $N_{m_\rho}N_{m_z}$ $\rho_{0_{s,m}}$, and $z_{0_{s,m}}$ are data parameters.

129. A computer program product according to claim 128, wherein each of the data parameters $N_{m_\rho}$ and $N_{m_z}$ of the Fourier series component is proportional to the rate of change of the physical characteristic and each of the data parameters $\rho_{O_m}$ and $z_{O_m}$ of each Fourier component is inversely proportional to the amplitude of the physical characteristic.

130. A computer program product according to claim 128, wherein each of the data parameters $N_{m_\rho}$ and $N_{m_z}$ of the Fourier series component is proportional to the amplitude of the physical characteristic and each of the data parameters $\rho_{O_m}$ and $z_{O_m}$ of each Fourier component is inversely proportional to the rate of change of the physical characteristic.

131. A computer program product according to claim 128, wherein each of the data parameters $N_{m_\rho}$ and $N_{m_z}$ of the Fourier series component is proportional to the duration of a signal response of each transducer and each of the data parameters $\rho_{O_m}$ and $z_{O_m}$ of each Fourier component is inversely proportional to the physical characteristic.

132. A computer program product according to claim 122, wherein the Fourier series in Fourier space, has a characteristic modulation having a frequency within the band represented by $$e^{-jk_\rho(\rho_{fb_m}+\rho_{t_m})}$$

and is selected from one of:

$$\sum_{m=1}^{M}\sum_{n=-\infty}^{\infty}\frac{4\pi}{1+\frac{k_z^2}{k_\rho^2}}a_{0_m}N_{m_{\rho_0}}N_{m_{z_0}}e^{-jk_\rho(\rho_{fb_m}+\rho_{t_m})}$$

$$\sin\left(k_\rho\frac{N_{m_{\rho_0}}\rho_{0_m}}{2}-n\frac{2\pi N_{m_{\rho_0}}}{2}\right)\sin\left(k_z\frac{N_{m_{z_0}}z_{0_m}}{2}-n\frac{2\pi N_{m_{z_0}}}{2}\right) \text{ and}$$

$$\sum_{m=1}^{M}\sum_{n=-\infty}^{\infty}\frac{4\pi}{1+\frac{k_z^2}{k_\rho^2}}a_{0_m}\frac{4}{\rho_{0_m}z_{0_m}}e^{-jk_\rho(\rho_{fb_m}+\rho_{t_m})}\sin\left(k_\rho\frac{N_{m_{\rho_0}}\rho_{0_m}}{2}-n\frac{2\pi N_{m_{\rho_0}}}{2}\right)$$

$$\sin\left(k_z\frac{N_{m_{z_0}}z_{0_m}}{2}-n\frac{2\pi N_{m_{z_0}}}{2}\right)$$

wherein $\rho_{t_m}=v_{t_m}t_{t_m}$ is the modulation factor which corresponds to the physical time delay $t_{t_m}$, $\rho_{fb_m}=v_{fb_m}t_{fb_m}$ is the modulation factor which corresponds to the specific transducer time delay $t_{fb_m}$, $v_{t_m}$ and $v_{fb_m}$ are constants such as the signal propagation velocities, $a_{0_m}$ is a constant, $k_\rho$ and $k_z$ are the frequency variables, n, m, and M are integers, and $N_{m_\rho}N_{m_z}$ $\rho_{O_m}$, and $z_{O_m}$ are data parameters.

133. A computer program product according to claim 132, wherein each of the data parameters $N_{m_\rho}$ and $N_{m_z}$—of the Fourier series component is proportional to the rate of change of the physical characteristic and each of the data parameters $\rho_{O_m}$ and $z_{O_m}$ of each Fourier component is inversely proportional to the amplitude of the physical characteristic.

134. A computer program product according to claim 132, wherein each of the data parameters $N_{m_\rho}$ and $N_{m_z}$ of the Fourier series component is proportional to the amplitude of the physical characteristic and each of the data parameters $\rho_{O_m}$ and $z_{O_m}$ of each Fourier component is inversely proportional to the rate of change of the physical characteristic.

135. A computer program product according to claim 132, wherein each of the data parameters $N_{m_\rho}$ and $N_{m_z}$ of the Fourier series component is proportional to the duration of a signal response of each transducer and each of the data parameters $\rho_{O_m}$ and $z_{O_m}$ of each Fourier component is inversely proportional to the physical characteristic.

136. A computer program product according to claim 132, wherein each Fourier series of the string is multiplied by the Fourier transform of the delayed Gaussian filter represented by $$e^{-\frac{1}{2}\left(v_{s\rho0}\frac{k_\rho}{\alpha_{s\rho0}}\right)^2}e^{-j\frac{\sqrt{N_{s\rho0}}}{\alpha_{s\rho0}}(v_{s\rho0}k_\rho)}e^{-\frac{1}{2}\left(v_{sz0}\frac{k_z}{\alpha_{sz0}}\right)^2}e^{-j\frac{\sqrt{N_{sz0}}}{\alpha_{sz0}}(v_{sz0}k_z)}$$

wherein the filter established the association to form the string, wherein the string is represented by:

$$\sum_{s=1}^{S}\sum_{m=1}^{M_s}\sum_{n=-\infty}^{\infty}\frac{4\pi}{1+\frac{k_z^2}{k_\rho^2}}a_{0s,m}N_{s,m_{\rho_0}}N_{s,m_{z_0}}e^{-\frac{1}{2}\left(v_{s\rho0}\frac{k_\rho}{\alpha_{s\rho0}}\right)^2}$$

-continued $$e^{-j\frac{\sqrt{N_{s\rho0}}}{\alpha_{s\rho0}}(v_{s\rho0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)} e^{-jk_\rho\left(\rho_{fb_{s,m}}+\rho_{t_{s,m}}\right)}$$

$$\sin\left(\left(k_\rho - n\frac{2\pi}{\rho_{0_{s,m}}}\right)\frac{N_{s,m_{\rho0}}\rho_{0_{s,m}}}{2}\right)\sin\left(\left(k_z - n\frac{2\pi}{v_{s,m}t_{0_{s,m}}}\right)\frac{N_{s,m_{z0}}z_{0_{s,m}}}{2}\right)$$

wherein $v_{s\rho0}$ and $v_{sz0}$ are constants such as the signal propagation velocities in the $\rho$ and z directions, respectively, and $$\frac{\sqrt{N_{s\rho0}}}{\alpha_{s\rho0}} \text{ and } \frac{\sqrt{N_{sz0}}}{\alpha_{sz0}}$$

are delay parameters and $\alpha_{s\rho0}$ and $\alpha_{sz0}$ are half-width parameters of a corresponding Gaussian filter in the $\rho$ and z directions, respectively, $\rho_{t_{s,m}} = v_{t_{s,m}} t_{t_{s,m}}$ is the modulation factor which corresponds to the physical time delay $t_{s,m}$, $\rho_{fb_{s,m}} = v_{fb_{s,m}} t_{fb_{s,m}}$ is the modulation factor which corresponds to the specific transducer time delay $t_{fb_{s,m}}$, $v_{t_{s,m}}$ and $v_{fb_{s,m}}$ are constants such as the signal propagation velocities, $a_{0_{s,m}}$ is a constant, $k_\rho$ and $k_z$ are the frequency variables, n, m, s, $M_s$, and S are integers, and $N_{m_n}N_{m_s}$, $\rho_{0_{s,m}}$, and $z_{0_{s,m}}$ are data parameters.

137. A computer program product according to claim 136, wherein each of the data parameters $N_{m_n}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

138. A computer program product according to claim 136, wherein each of the data parameters $N_{m_n}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

139. A computer program product according to claim 136, wherein each of the data parameters $N_{m_n}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

140. A computer program product according to claim 110, wherein inputted information comprises said data and an input context, said input context mapping on a one to one basis to a physical context, said physical context being a relationship between physical characteristics represented by said inputted information.

141. A computer program product according to claim 140, wherein each Fourier component of said at least one Fourier series comprises a quantized amplitude, a frequency, or a phase angle.

142. A computer program product according to claim 110, wherein said step of adding at least two Fourier components together is conducted to provide at least two Fourier series.

143. A computer program product according to claim 110, wherein said data is representative of physical characteristics and said Fourier series in Fourier space is selected from one of:

$$\sum_{m=1}^{M}\sum_{n=-\infty}^{\infty}\frac{4\pi}{1+\frac{k_z^2}{k_\rho^2}}a_{0_m}N_{m_{\rho_0}}N_{m_{z_0}}\sin\left(\left(k_\rho - n\frac{2\pi}{\rho_{0_m}}\right)\frac{N_{m_{\rho_0}}\rho_{0_m}}{2}\right)$$

$$\sin\left(\left(k_z - n\frac{2\pi}{z_{0_m}}\right)\frac{N_{m_{z_0}}z_{0_m}}{2}\right) \text{ and}$$

$$\sum_{m=1}^{M}\sum_{n=-\infty}^{\infty}\frac{4\pi}{1+\frac{k_z^2}{k_\rho^2}}\frac{4}{\rho_{0_m}z_{0_m}}a_{0_m}\sin\left(\left(k_\rho - n\frac{2\pi}{\rho_{0_m}}\right)\frac{N_{m_{\rho_0}}\rho_{0_m}}{2}\right)\sin\left(\left(k_z - n\frac{2\pi}{z_{0_m}}\right)\frac{N_{m_{z_0}}z_{0_m}}{2}\right)$$

wherein $a_{0_m}$ is a constant, $k_\rho$ and $k_z$ are the frequency variables, n, m, and M are integers, and $N_{m_n}N_{m_s}$, $\rho_{0_m}$, and $z_{0_m}$ are data parameters.

144. A computer program product according to claim 143, wherein each of $N_{m_{\rho_0}}$ and $N_{m_{z_0}}$ is proportional to a rate of change of said physical characteristics, and each of $\rho_{0_m}$ and $z_{0_m}$ is inversely proportional to an amplitude of said physical characteristics.

145. A computer program product according to claim 143, wherein each of $N_{m_{\rho_0}}$ and $N_{m_{z_0}}$ is proportional to said amplitude of said physical characteristics, and each of $\rho_{0_m}$ and $z_{0_m}$ is inversely proportional to said rate of change of said physical characteristics.

146. A computer program product according to claim 143, wherein each of $N_{m_{\rho_0}}$ and $N_{m_{z_0}}$ is proportional to a duration of a signal response of at least one input transducer; and each of $\rho_{0_m}$ and $z_{0_m}$ is inversely proportional to said physical characteristics.

147. A computer program product according to claim 110, wherein the step of adding at least two of said Fourier components together further comprises creating transducer strings by obtaining a Fourier series from at least two selected transducers and adding the Fourier series.

148. A computer program product according to claim 147, further comprises selecting transducers that are active simultaneously.

149. A computer program product according to claim 148, wherein the transducer string is stored in a distinct memory location wherein a characteristic modulation having a frequency within the band in Fourier space is represented by $e^{-j2\pi ft_0}$ which corresponds to the time delay $\delta(t-t_0)$ wherein f is the frequency variable, t is the time variable, and $t_0$ is the time delay.

150. A computer program product according to claim 149, wherein the step of adding at least two of said Fourier components together further comprises recalling any part of the transducer string from the distinct memory location which thereby causes additional Fourier series of the transducer string to be recalled.

151. A computer program product according to claim 110, wherein the filter is a time delayed Gaussian filter in the time domain.

152. A computer program product according to claim 151, wherein the Gaussian filter comprises a plurality of cascaded stages each stage having a decaying exponential system function between stages.

153. A computer program product according to claim 151, wherein the Gaussian filter is modulated in the time domain to produce a frequency shift of the sampling and modulation in the frequency domain.

154. A computer program product according to claim 151, wherein the filter is characterized in time by:

$$\frac{\alpha}{\sqrt{2\pi}} e^{-\frac{\left(t-\frac{\sqrt{N}}{\alpha}\right)^2}{\frac{2}{\alpha^2}}}$$

wherein $$\frac{\sqrt{N}}{\alpha}$$

is a delay parameter, $\alpha$ is a half-width parameter, and t is the time parameter.

155. A computer program product according to claim 151, wherein the filter, in frequency space, is characterized by:

$$e^{-\frac{1}{2}\left(\frac{2\pi f}{\alpha}\right)^2} e^{-j\sqrt{N}\left(\frac{2\pi f}{\alpha}\right)}$$

wherein $$\frac{\sqrt{N}}{\alpha}$$

and $\alpha$ are a corresponding delay parameter and a half-width parameter in time, respectively, and f is the frequency parameter.

156. A computer program product according to claim 110, wherein the probability expectation value is based upon Poissonian probability.

157. A computer program product according to claim 156, wherein the probability expectation value is characterized by $$\prod_s \left[ p_{\uparrow_s} + (P - p_{\uparrow_s}) \exp\left[-\beta_s^2 \left(\frac{1-\cos 2\phi_s}{2}\right)\right] \cos(\delta_s + 2\sin\phi_s) \right]$$

wherein P is the maximum probability of at least one other Fourier series being associated with a first Fourier series, $p_{\uparrow_s}$ is a probability of at least one other Fourier series being associated with a first Fourier series in the absence of coupling of the first Fourier series with the at least one other Fourier series, $\beta_s^2$ is a number that represents the amplitude of spectral similarity between at least two filtered or unfiltered Fourier series, $\phi_s$ represents the frequency difference angle between at least two filtered or unfiltered Fourier series, and $\delta_s$, is a phase factor.

158. A computer program product according to claim 157, wherein $\beta_s^2$ is characterized by $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_s}} N_{m_s} \exp -$$

-continued $$\left\{ \frac{\alpha_1^2 \alpha_s^2}{\alpha_1^2 + \alpha_s^2} \left( \frac{\sqrt{N_1}}{\alpha_1} - \frac{\sqrt{N_s}}{\alpha_s} + \frac{N_{m_1} \rho_{0_{m_1}}}{2v_{m_1}} - \frac{N_{m_s} \rho_{0_{m_s}}}{2v_{m_s}} \right)^2 \right\}$$

$$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}$ and $a_{0_{m_s}}$ are constants, $v_{m_1}$ and $v_{m_s}$ are constants such as the signal propagation velocities, and $N_{m_1}$, $N_{m_s}$, $\rho_{0_{m_1}}$, and $\rho_{0_{m_s}}$ are data parameters.

159. A computer program product according to claim 158, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

160. A computer program product according to claim 158, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

161. A computer program product according to claim 158, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

162. A computer program product according to claim 158, wherein $\phi_s$ is characterized by $$\phi = \frac{\pi \left( \frac{\sqrt{N_1}}{\alpha_1} - \frac{\sqrt{N_s}}{\alpha_s} + \sum_{m_1=1}^{M_1} \frac{N_{m_1} \rho_{0_{m_1}}}{2v_{m_1}} - \sum_{m_s=1}^{M_s} \frac{N_{m_s} \rho_{0_{m_s}}}{2v_{m_s}} \right)}{\frac{\sqrt{N_1}}{\alpha_1} + \sum_{m_1=1}^{M_1} \frac{N_{m_1} \rho_{0_{m_1}}}{2v_{m_1}}}$$

$$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}$ and $a_{0_{m_s}}$ are constants, $v_{m_1}$ and $v_{m_s}$ are constants such as the signal propagation velocities, and $N_{m_1}$, $N_{m_s}$, $\rho_{0_{m_1}}$, and $\rho_{0_{m_s}}$ are data parameters.

163. A computer program product according to claim 162, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

164. A computer program product according to claim 162, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

165. A computer program product according to claim 162, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

166. A computer program product according to claim 158, wherein $\beta_s^2$ is characterized by $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} \alpha_{0_{m_1}} N_{m_1} \sum_{m_s=1}^{M_s} a_{0_{m_s}} N_{m_s} \exp-$$

$$\left\{ \frac{\frac{\alpha_1^2 \alpha_s^2}{\alpha_1^2 + \alpha_s^2}\left(\frac{\sqrt{N_1}}{\alpha_1} - \frac{\sqrt{N_s}}{\alpha_s} + \left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right) - \left(\frac{N_{m_s}\rho_{0_{m_s}}}{2v_{m_s}} + \frac{\rho_{fb_{m_s}}}{v_{fb_{m_s}}} + \left(\frac{\rho_{t_{m_s}}}{v_{t_{m_s}}}\right)\right)\right)^2}{2} \right\}$$

wherein $$\rho_{t_{m_1}} = v_{t_{m_1}} t_{t_{m_1}} \text{ and } \rho_{t_{m_s}} = v_{t_{m_s}} t_{t_{m_s}}$$

are the modulation factors which corresponds to the physical time delays $t_{m_1}$ and $t_{m_s}$, respectively, $$\rho_{fb_{m_1}} = v_{fb_{m_1}} t_{fb_{m_1}} \text{ and } \rho_{fb_{m_s}} = v_{fb_{m_s}} t_{fb_{m_s}}$$

are the modulation factors which corresponds to the specific transducer time delay $t_{fb_{m_1}}$ and $t_{fb_{m_s}}$, respectively, $v_{m_1}, v_{m_s}, v_{fb_{m_1}}$ and $v_{fb_{m_s}}$ are constants such as the signal propagation velocities, $$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}, a_{0_{m_s}}$ are constants, $v_{m_1}$ and $v_{m_s}$ are constants such as the signal propagation velocities, and $N_{m_1}$, $N_{m_s}$, $\rho_{0_{m_1}}$, and $\rho_{0_{m_s}}$ are data parameters.

167. A computer program product according to claim 166, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

168. A computer program product according to claim 166, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

169. A computer program product according to claim 166, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

170. A computer program product according to claim 158, wherein $\phi_s$ is characterized by $$\phi_s = \frac{\pi\left(\frac{\sqrt{N_1}}{\alpha_1} - \frac{\sqrt{N_s}}{\alpha_s} + \sum_{m_1=1}^{M_1}\left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right) - \sum_{m_s=1}^{M_s}\left(\frac{N_{m_s}\rho_{0_{m_s}}}{2v_{m_s}} + \frac{\rho_{fb_{m_s}}}{v_{fb_{m_s}}} + \frac{\rho_{t_{m_s}}}{v_{t_{m_s}}}\right)\right)}{\frac{\sqrt{N_1}}{\alpha_1} + \sum_{m_1=1}^{M_1}\left(\frac{N_{m_1}\rho_{0_{m_1}}}{2v_{m_1}} + \frac{\rho_{fb_{m_1}}}{v_{fb_{m_1}}} + \frac{\rho_{t_{m_1}}}{v_{t_{m_1}}}\right)}$$

wherein $$\rho_{t_{m_1}} = v_{t_{m_1}} t_{t_{m_1}} \text{ and } \rho_{t_{m_s}} = v_{t_{m_s}} t_{t_{m_s}}$$

are the modulation factors which corresponds to the physical time delays $t_{m_1}$ and $t_{m_s}$, respectively, $$\rho_{fb_{m_1}} = v_{fb_{m_1}} t_{fb_{m_1}} \text{ and } \rho_{fb_{m_s}} = v_{fb_{m_s}} t_{fb_{m_s}}$$

are the modulation factors which corresponds to the specific transducer time delay $t_{fb_{m_1}}$ and $t_{fb_{m_s}}$, respectively, $v_{m_1}, v_{m_s}, v_{fb_{m_1}}$ and $v_{fb_{m_s}}$ are constants such as the signal propagation velocities, $$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$, and $M_s$ are integers, $a_{0_{m_1}}$ and $a_{0_{m_s}}$ are constants, $v_{m_1}$ and $v_{m_s}$ are constants such as the signal propagation velocities, and $N_{m_1}$, $N_{m_s}$, $\rho_{0_{m_1}}$, and $\rho_{0_{m_s}}$ are data parameters.

171. A computer program product according to claim 170, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

172. A computer program product according to claim 170, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

173. A computer program product according to claim 170, wherein each of the data parameters $N_{s,m_\rho}$ and $N_{s,m_z}$ of the Fourier series component is proportional to the duration of a signal response of each transducer and each of the data parameters $\rho_{0_m}$ and $z_{0_m}$ of each Fourier component is inversely proportional to the physical characteristic.

174. A computer program product according to claim 110, further comprising linking at least two Fourier series stored in a memory comprising the steps of
 a.) generating a probability expectation value that recalling any part of one of the Fourier series from the memory causes at least another Fourier series to be recalled from the memory;
 b.) storing the probability expectation value to memory;
 c.) generating a probability operand based on the probability expectation value, and
 d.) recalling the at least another Fourier series from the memory if the operand has a desired value.

175. A computer program product according to claim 174, wherein said probability operand is a value selected from a set of zero and one.

176. A computer program product according to claim 175, wherein said desired value is one.

177. A computer program product according to claim 110, whereby the probability expectation value increases with a rate of recalling any part of any of the Fourier series.

178. A computer-readable medium on which is stored a computer program for providing a method for recognizing a pattern in information, the computer program comprising instructions which, when executed by a computer comprising a processor, cause the processor to:
 represent the information as a plurality of Fourier series in Fourier space, wherein the information is representative of one or more physical characteristics or one or more representations of physical characteristics within a physical context of an item of interest;
 form associations, using the computer, between at least two of the Fourier series by modulating and sampling the Fourier series with filters and by coupling the filtered Fourier series based on a probability distribution, wherein when at least two of the Fourier series have been associated recognition of a pattern in the information is achieved; and
 store the at least two of the Fourier series that have been associated in a memory wherein the computer readable medium is a non-transitory computer readable medium.

179. A computer-readable according to claim 178, wherein coupling is based on spectral similarity of said Fourier series.

180. A computer-readable according to claim 178, further comprising adding the associated Fourier series to form a string, and ordering the string.

181. A computer-readable according to claim 180, wherein the string is selected from one of:

$$\sum_{s=1}^{S}\sum_{m=1}^{M_s}\sum_{n=-\infty}^{\infty} \frac{4\pi}{1+\frac{k_z^2}{k_\rho^2}} a_{0_{s,m}} N_{s,m_{\rho_0}} N_{s,m_{z_0}} \sin\left(\left(k_\rho - n\frac{2\pi}{\rho_{0_{s,m}}}\right)\frac{N_{s,m_{\rho_0}}\rho_{0_{s,m}}}{2}\right)$$

$$\sin\left(\left(k_z - n\frac{2\pi}{z_{0_{s,m}}}\right)\frac{N_{s,m_{z_0}}z_{0_{s,m}}}{2}\right) \text{ and}$$

$$\sum_{s=1}^{S}\sum_{m=1}^{M_s}\sum_{n=-\infty}^{\infty} \frac{4\pi}{1+\frac{k_z^2}{k_\rho^2}} a_{0_{s,m}} \frac{4}{\rho_{0_{s,m}}z_{0_{s,m}}} \sin\left(k_\rho - n\frac{2\pi}{\rho_{0_{s,m}}}\right)$$

-continued $$\left.\frac{N_{s,m_{\rho_0}}\rho_{0_{s,m}}}{2}\right)\sin\left(\left(k_z - n\frac{2\pi}{z_{0_{s,m}}}\right)\frac{N_{s,m_{z_0}}z_{0_{s,m}}}{2}\right)$$

wherein $a_{0_{s,m}}$ is a constant, $k_\rho$ and $k_z$ are the frequency variables, n, m, s, $M_s$, and S are integers, and $N_{s,m_{\rho_0}}$, $N_{s,m_{z_0}}$, $\rho_{0_{s,m}}$, and $z_{0_{s,m}}$ are data parameters.

182. A computer-readable according to claim 181, wherein each of the data parameters $N_{s,m_\rho}$ and $N_{s,m_z}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

183. A computer-readable according to claim 181, wherein each of the data parameters $N_{s,m_\rho}$ and $N_{s,m_z}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

184. A computer-readable according to claim 181, wherein each of the data parameters $N_{s,m_\rho}$ and $N_{s,m_z}$ of the Fourier series component is proportional to the duration of a signal response of each transducer and each of the data parameters $\rho_{0_m}$ and $z_{0_m}$ of each Fourier component is inversely proportional to the physical characteristic.

185. A computer-readable according to claim 178, wherein the filter is a time delayed Gaussian filter in the time domain.

186. A computer-readable according to claim 178, wherein the probability distribution is Poissonian.

187. A computer-readable medium on which is stored a computer program for providing a method for recognizing a pattern in information and establishing an order formatted pattern in information with respect to standard ordered information, the computer program comprising instructions which, when executed by a computer, perform the steps of:
 a.) obtaining, using the computer, a string comprising a sum of Fourier series from a memory, said string representing information, said information representative of one or more physical characteristics or one or more representations of physical characteristics within a physical context of an item of interest;
 b.) selecting, using the computer, at least two filters from a selected set of filters;
 c.) sampling, using the computer, the string with the filters such that each of the filters produces a sampled Fourier series, each Fourier series comprising a subset of the string;
 d.) modulating, using the computer, each of the sampled Fourier series in Fourier space with the corresponding selected filter such that each filter produces an order formatted Fourier series;
 e.) adding, using the computer, the order formatted Fourier series produced by each filter to form a summed Fourier series in Fourier space;
 f.) obtaining, using the computer, an ordered Fourier series from the memory;
 g.) determining, using the computer, a spectral similarity between the summed Fourier series and the ordered Fourier series;
 h.) determining, using the computer, a probability expectation value based on the spectral similarity;
 i.) generating, using the computer, a probability operand based on the probability expectation value;
 j.) repeating steps b-i until the probability operand has a desired value, when the probability operand has a desired value a pattern in information has been recognized and an order formatted pattern in the information has been established;
k.) storing the summed Fourier series to an intermediate memory;
l.) removing the selected filters from the selected set of filters to form an updated set of filters;
m.) removing the subsets from the string to obtain an updated string;
n.) selecting an updated filter from the updated set of filters;
o.) sampling the updated string with the updated filter to form a sampled Fourier series comprising a subset of the string;
p.) modulating the sampled Fourier series in Fourier space with the corresponding selected updated filter to form an updated order formatted Fourier series;
q.) recalling the summed Fourier series from the intermediate memory;
r.) adding the updated order formatted Fourier series to the summed Fourier series from the intermediate memory to form an updated summed Fourier series in Fourier space;
s.) obtaining an updated ordered Fourier series from the high level memory;
t.) determining a spectral similarity between the updated summed Fourier series and the updated ordered Fourier series;
u.) determining a probability expectation value based on the spectral similarity;
v.) generating a probability operand based on the probability expectation value;
w.) repeating steps n-v until the probability operand has a desired value or all of the updated filters have been selected from the updated set of filters, when the probability operand has a desired value a pattern in information has been recognized and an order formatted pattern in the information has been established;
x.) if all of the updated filters have been selected before the probability operand has a desired value, then clearing the intermediate memory and returning to step b;
y.) if the probability operand has a desired value, then storing the updated summed Fourier series to the intermediate memory;
z.) repeating steps l-y until one of the following set of conditions is satisfied: the updated set of filters is empty, or the remaining subsets of the string of step m.) is nil; and
aa.) storing the Fourier series in the intermediate memory in the high level memory wherein the computer readable medium is a non-transitory computer readable medium.

188. A computer-readable medium according to claim 187, wherein information is represented by a sum of Fourier series in Fourier space.

189. A computer-readable medium according to claim 187, further comprising encoding data which includes modulating at least one of said Fourier components to provide an input context.

190. A computer-readable according to claim 187, wherein inputted information comprises data and an input context, said input context mapping on a one to one basis to a physical context, said physical context being a relationship between physical characteristics represented by said inputted information.

191. A computer-readable medium according to claim 187, wherein each Fourier component of said at least one Fourier series comprises a quantized amplitude, a frequency, or a phase angle.

192. A computer-readable medium according to claim 187, wherein said probability operands having a value selected from a set of zero and one.

193. A computer-readable medium to claim 192, wherein said desired values are one.

194. A computer-readable medium to claim 187, wherein the high level memory is initialized with standard inputs.

195. A computer-readable medium to claim 187, wherein the ordering is according to one of the list of: temporal order, cause and effect relationships, size order, intensity order, before-after order, top-bottom order, or left-right order.

196. A computer-readable medium to claim 187, wherein each filter of the set of filters is a time delayed Gaussian filter having a half-width parameter $\alpha$ which determines the amount of the string that is sampled.

197. A computer-readable medium to claim 187, wherein each filter of the set of filters is a time delayed Gaussian filter having a delay parameter $$\frac{\sqrt{N}}{\alpha}$$

which corresponds to a time point.

198. A computer-readable medium to claim 197, wherein each Fourier series of the string is multiplied by the Fourier transform of the delayed Gaussian filter represented by $$e^{-\frac{1}{2}\left(v_{s\rho 0}\frac{k_\rho}{\alpha_{s\rho 0}}\right)^2} e^{-j\frac{\sqrt{N_{s\rho 0}}}{\alpha_{s\rho 0}}(v_{s\rho 0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)}$$

wherein the filter established the correct order to form the string, wherein the ordered string is represented by:

$$\sum_{s=1}^{S}\sum_{m=1}^{M_s}\sum_{n=-\infty}^{\infty} \frac{4\pi}{1+\frac{k_z^2}{k_\rho^2}} a_{0_{s,m}} N_{s,m_{\rho 0}} N_{s,m_{z 0}} e^{-\frac{1}{2}\left(v_{s\rho 0}\frac{k_\rho}{\alpha_{s\rho 0}}\right)^2}$$
$$e^{-j\frac{\sqrt{N_{s\rho 0}}}{\alpha_{s\rho 0}}(v_{s\rho 0}k_\rho)} e^{-\frac{1}{2}\left(v_{sz0}\frac{k_z}{\alpha_{sz0}}\right)^2} e^{-j\frac{\sqrt{N_{sz0}}}{\alpha_{sz0}}(v_{sz0}k_z)} e^{-jk_\rho\left(\rho_{fb_{s,m}}+\rho_{t_{s,m}}\right)}$$
$$\sin\left(\left(k_\rho - n\frac{2\pi}{\rho_{0_{s,m}}}\right)\frac{N_{s,m_{\rho 0}}\rho_{0_{s,m}}}{2}\right) \sin\left(\left(k_z - n\frac{2\pi}{v_{s,m}t_{0_{s,m}}}\right)\frac{N_{s,m_{z 0}}z_{0_{s,m}}}{2}\right)$$

wherein $v_{s\rho 0}$ and $v_{sz0}$ are constants such as the signal propagation velocities in the $\rho$ and z directions, respectively, $$\frac{\sqrt{N_{s\rho 0}}}{\alpha_{s\rho 0}} \text{ and } \frac{\sqrt{N_{sz0}}}{\alpha_{sz0}}$$

are delay parameters and $\alpha_{s\rho 0}$ and $\alpha_{sz0}$ are half-width parameters of a corresponding Gaussian filter in the $\rho$ and z directions, respectively, $\rho_{t_{s,m}}=v_{t_{s,m}}t_{t_{s,m}}$ is the modulation factor which corresponds to the physical time delay $t_{t_{s,m}}$; $\rho_{fb_{s,m}}=v_{fb_{s,m}}t_{fb_{s,m}}$ is the modulation factor which corresponds to the specific transducer time delay $t_{fb_{s,m}}$, $v_{t_{s,m}}$ and $v_{fb_{s,m}}$ are constants such as the signal propagation velocities, $a_{0_{s,m}}$ is a constant, $k_\rho$ and $k_z$ are the frequency variables, n, m, s, $M_s$, and S are integers, and $N_{s,m_\rho}, N_{s,m_z}, \rho_{0_{s,m}}$, and $z_{0_{s,m}}$ are data parameters.

199. A computer-readable medium to claim 198, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

200. A computer-readable medium to claim 198, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

201. A computer-readable medium to claim 198, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

202. A computer-readable medium to claim 198, wherein $v_{s,m} t_{0_{s,m}} = \rho_{0_{s,m}}$ and $k_\rho = k_z$ such that the string in Fourier space is one dimensional in terms of $k_\rho$ and is represented by $$\sum_{s=1}^{S} \sum_{m=1}^{M_s} \sum_{n=-\infty}^{\infty} a_{0_{s,m}} N_{s,m,\rho 0} e^{-\frac{1}{2}\left(v_{s\rho 0} \frac{k_\rho}{\alpha_{s\rho 0}}\right)^2}$$

$$e^{-j\frac{\sqrt{N_{s\rho 0}}}{\alpha_{s\rho 0}}(v_{s\rho 0} k_\rho)} e^{-j k_\rho \rho_{fb_{s,m}}} \sin\left(\left(k_\rho - n\frac{2\pi}{\rho_{0_{s,m}}}\right) \frac{N_{s,m,\rho 0} \rho_{0_{s,m}}}{2}\right)$$

wherein $v_{s\rho 0}$ is a constant such as the signal propagation velocity in the $\rho$ direction, $$\frac{\sqrt{N_{s\rho 0}}}{\alpha_{s\rho 0}}$$

is delay parameter and $\alpha_{s\rho 0}$ is a half-width parameter of a corresponding Gaussian filter in the $k_\rho$-space, $\rho_{fb_{s,m}} = v_{fb_{s,m}} t_{fb_{s,m}}$ is the modulation factor which corresponds to the specific transducer time delay $t_{fb_{s,m}}$, $v_{fb_{s,m}}$ is a constant such as the signal propagation velocity, $a_{0_{s,m}}$ is a constant, $k_\rho$ is the frequency variable, n, m, s, $M_s$, and S are integers, and $N_{s,m_0}$ and $\rho_{0_{s,m}}$ are data parameters.

203. A computer-readable medium to claim 202, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

204. A computer-readable medium to claim 202, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

205. A computer-readable medium to claim 202, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

206. A computer-readable medium to claim 187, wherein the probability expectation value is based upon Poissonian probability.

207. A computer-readable medium to claim 206, wherein the probability expectation value is characterized by $$\prod_s \left[ p_{\uparrow_s} + (P - p_{\uparrow_s}) \exp\left[-\beta_s^2\left(\frac{1-\cos 2\phi_s}{2}\right)\right] \cos(\delta_s + 2\sin\phi_s) \right]$$

wherein P is the maximum probability that at least one other Fourier series is active given that a first Fourier series is active, $p_{\uparrow_s}$ is a probability of a Fourier series becoming active in the absence of coupling from at least one other active Fourier series, $\beta_s^2$ is a number that represents the amplitude of spectral similarity between at least two filtered or unfiltered Fourier series, $\phi_s$ represents the frequency difference angle between at least two filtered or unfiltered Fourier series, and $\delta_s$, is a phase factor.

208. A computer-readable medium to claim 207, wherein $\beta_s^2$ is characterized by $$\beta_s^2 = (8\pi)^2 \frac{1}{\sqrt{2\pi}} \sqrt{\frac{\alpha_1^2 \alpha_s^2}{\alpha_1^2 + \alpha_s^2}} \sum_{m_1=1}^{M_1} a_{0_{m_1}} N_{m_1} \sum_{m_s=1}^{M_s} a_{0_{m_s}} N_{m_s} \exp -$$

$$\left\{ \frac{\frac{\alpha_1^2 \alpha_s^2}{\alpha_1^2 + \alpha_s^2} \left( \frac{\sqrt{N_1}}{\alpha_1} - \frac{\sqrt{N_s}}{\alpha_s} + \left( \frac{N_{m_1} \rho_{0_{m_1}}}{2 v_{m_1}} + \frac{\rho_{fb_{m_1}}}{v_{fb_{m_1}}} + \frac{\rho_{t_{m_1}}}{v_{t_{m_1}}} \right) - \left( \frac{N_{m_s} \rho_{0_{m_s}}}{2 v_{m_s}} + \frac{\rho_{fb_{m_s}}}{v_{fb_{m_s}}} + \frac{\rho_{t_{m_s}}}{v_{t_{m_s}}} \right) \right)^2 }{2} \right\}$$

wherein $$\rho_{t_{m_1}} = v_{t_{m_1}} t_{t_{m_1}} \quad \text{and} \quad \rho_{t_{m_s}} = v_{t_{m_s}} t_{t_{m_s}}$$

are the modulation factors which corresponds to the physical time delays $t_{t_{m_1}}$ and $t_{t_{m_s}}$ respectively, $$\rho_{fb_{m_1}} = v_{fb_{m_1}} t_{fb_{m_1}} \quad \text{and} \quad \rho_{fb_{m_s}} = v_{fb_{m_s}} t_{fb_{m_s}}$$

are the modulation factors which corresponds to the specific transducer time delay $t_{fb_{m_1}}$ and $t_{fb_{m_s}}$ respectively, $v_{m_1}, v_{m_s}, v_{fb_{m_1}}$, and $v_{fb_{m_s}}$ are constants such as the signal propagation velocities, $$\frac{\sqrt{N_1}}{\alpha_1} \quad \text{and} \quad \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$ and $M_s$ are integers, $a_{0_{m_1}}, a_{0_{m_s}}$ are constants, $v_{m_1}$ and $v_{m_s}$ are constants such as the signal propagation velocities, and $N_{m_1}, N_{m_s}, \rho_{0_{m_1}}$ and $\rho_{0_{m_s}}$ are data parameters.

209. A computer-readable medium to claim 208, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

210. A computer-readable medium to claim 208, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

211. A computer-readable medium to claim 208, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

212. A computer-readable medium to claim 208, wherein $\phi_s$ is characterized by $$\phi_s = \frac{\pi \left( \frac{\sqrt{N_1}}{\alpha_1} - \frac{\sqrt{N_s}}{\alpha_s} + \sum_{m_1=1}^{M_1} \left( \frac{N_{m_1} \rho_{0_{m_1}}}{2v_{m_1}} + \frac{\rho_{fb_{m_1}}}{v_{fb_{m_1}}} + \frac{\rho_{t_{m_1}}}{v_{t_{m_1}}} \right) - \sum_{m_s=1}^{M_s} \left( \frac{N_{m_s} \rho_{0_{m_s}}}{2v_{m_s}} + \frac{\rho_{fb_{m_s}}}{v_{fb_{m_s}}} + \frac{\rho_{t_{m_s}}}{v_{t_{m_s}}} \right) \right)}{\frac{\sqrt{N_1}}{\alpha_1} + \sum_{m_1=1}^{M_1} \left( \frac{N_{m_1} \rho_{0_{m_1}}}{2v_{m_1}} + \frac{\rho_{fb_{m_1}}}{v_{fb_{m_1}}} + \frac{\rho_{t_{m_1}}}{v_{t_{m_1}}} \right)}$$

wherein $$\rho_{t_{m_1}} = v_{t_{m_1}} t_{t_{m_1}} \text{ and } \rho_{t_{m_s}} = v_{t_{m_s}} t_{t_{m_s}}$$

are the modulation factors which corresponds to the physical time delays $t_{m_1}$ and $t_{m_s}$ respectively, $$\rho_{fb_{m_1}} = v_{fb_{m_1}} t_{fb_{m_1}} \text{ and } \rho_{fb_{m_s}} = v_{fb_{m_s}} t_{fb_{m_s}}$$

are the modulation factors which corresponds to the specific transducer time delay $t_{fb_{m_1}}$ and $t_{fb_{m_s}}$ respectively, $v_{m_1}, v_{m_s}, v_{fb_{m_1}}$, and $v_{fb_{m_s}}$ are constants such as the signal propagation velocities, $$\frac{\sqrt{N_1}}{\alpha_1} \text{ and } \frac{\sqrt{N_s}}{\alpha_s}$$

correspond to delay parameters of a first and s-th time delayed Gaussian filter, respectively, $\alpha_1$ and $\alpha_s$ corresponding half-width parameters of a first and s-th time delayed Gaussian filter, respectively, $M_1$, and $M_s$ are integers, $a_{0_{m_1}}$ and $a_{0_{m_s}}$ are constants, $v_{m_1}$ and $v_{m_s}$ are constants such as the signal propagation velocities, and $N_{m_1}$, $N_{m_s}$, $\rho_{0_{m_1}}$ and $\rho_{0_{m_s}}$ are data parameters.

213. A computer-readable medium to claim 212, wherein each of the data parameters $N_{m_1}$ and $N_{m_s}$ of the Fourier series component is proportional to the rate of change of the physical characteristic and each of the data parameters $\rho_{0_m}$ and $z_{0_m}$ of each Fourier component is inversely proportional to the amplitude of the physical characteristic.

214. A computer-readable medium to claim 212, wherein each of the data parameters $N_{m_1}$ and $N_{m_s}$ of the Fourier series component is proportional to the amplitude of the physical characteristic and each of the data parameters $\rho_{0_m}$ and $z_{0_m}$ of each Fourier component is inversely proportional to the rate of change of the physical characteristic.

215. A computer-readable medium to claim 212, wherein each of the data parameters $N_{m_1}$ and $N_{m_s}$ of the Fourier series component is proportional to the duration of a signal response of each transducer and each of the data parameters $\rho_{0_m}$ and $z_{0_m}$ of each Fourier component is inversely proportional to the physical characteristic.

216. A computer-readable medium on which is stored a computer program for providing a method for recognizing a pattern in information and establishing an order formatted pattern in information, the computer program comprising instructions which, when executed by a computer, perform the steps of:
   a.) recording ordered strings comprising Fourier series in Fourier Space to a high level memory, said Fourier series representing information, said information representative of one or more physical characteristics or one or more representations of physical characteristics within a physical context of an item of interest;
   b.) forming association between Fourier series of the ordered strings to form complex strings and recognizing a pattern in information;
   c.) ordering the Fourier series of the complex strings to form complex ordered strings representing recognized information and establishing an order formatted pattern in information;
   d.) storing the complex ordered strings to the high level memory; and
   e.) displaying the pattern in the information on a display device of the computer wherein the computer readable medium is a non-transitory computer readable medium.

217. A computer-readable medium on which is stored a computer program for providing a method for recognizing a pattern in information comprising data and forming a predominant configuration, the computer program comprising instructions which, when executed by a computer, perform the steps of:
   a.) accepting an input at the computer from one or more components representative of the current activation rates of the one or more components and one or more prior activation probability parameters generated based on a Fourier Series in Fourier Space;
   b.) generating an activation probability parameter using the computer based on a prior activation probability parameter and a weighting based on an activation rate of the corresponding component;
   c.) storing the activation probability parameter in memory;
   d.) generating a probability operand based on the activation probability parameter using the computer;
   e.) if said probability operand is a desired value, activating, using the computer, any component of one or more of the group consisting of an input layer, an association layer, a string ordering layer, and a predominant configuration layer, the activation being based on the activation probability parameter, wherein recognition of a pattern in information is achieved when said probability operand is said desired value, and f.) repeating steps b-e to form a predominate configuration wherein the computer readable medium is a non-transitory computer readable medium.

218. A method according to claim 217, wherein said probability operand having a value selected from a set of zero and one.

219. A method according to claim 218, wherein said desired value is one.

220. A computer program product for recognizing a pattern in information for use in a computer including a central processing unit and a memory, the memory maintaining a set of initial ordered Fourier series, the computer program product comprising:
  a computer readable medium;
  program code means embodied in the computer readable medium, the program code means comprising:
    means for receiving data representative of physical characteristics or representations of physical characteristics within an input context of the physical characteristics from a transducer and transforming the data, using the central processing unit, into a Fourier series in Fourier space wherein the input context is encoded in time as delays corresponding to modulation of the Fourier series at corresponding frequencies;
    means for receiving a plurality of the Fourier series in Fourier space including at least one ordered Fourier series from the memory, forming a string comprising a sum of the Fourier series using the central processing unit and storing the string in memory;
    means for retrieving the string from memory, ordering the Fourier series contained in the string to form an ordered string using the central processing unit and storing the ordered string in memory; and
    means for retrieving multiple ordered strings from the memory, forming complex ordered strings from the ordered strings using the central processing unit and storing the complex ordered strings to the memory; and
    means for receiving the complex ordered strings and displaying a pattern recognized using the complex ordered strings on a display wherein the computer readable medium is a non-transitory computer readable medium.

221. A method of recognizing a pattern in information comprising data and establishing an order formatted pattern in information, the method comprising:
  receiving input data from a transducer at a computer comprising a memory, the input data related to one or more physical characteristics or one or more representations of physical characteristics within a physical context of an item of interest;
  encoding inputted data, using the computer, as a plurality of Fourier components in Fourier Space and form a plurality of Fourier series from said Fourier components, said Fourier series representing information comprising data and input context;
  associating said plurality of Fourier series with each other according to spectral similarities between said plurality of Fourier series to form a string using the computer, said string being a sum of associated plurality of Fourier series;
  ordering said plurality of Fourier series within said string based on relative degree of association of order formatted subsets of said string with relevant aspects of a standard ordered string using the computer;
  assigning an activation probability parameter to each of said plurality of Fourier components and to each of said plurality of Fourier series to produce a predominant configuration string using the computer, generating a probability operand based on said activation probability parameter, said probability operand determining whether an activation of any one of said plurality of Fourier component and said plurality of Fourier series is to cause an activation of an associated another of said plurality of Fourier components and said plurality of Fourier series from said ordered string; and
  storing said predominant configuration string in said memory, wherein the predominant configuration string allows a pattern in newly inputted information to be recognized.

222. A method according to claim 221, wherein said step of associating said plurality of Fourier series comprises sampling and modulating at least one of said plurality of Fourier series with at least one filter.

223. A method according to claim 222, wherein said at least one filter comprises a time delayed Gaussian filter in time domain.

224. A method according to claim 221, wherein said step of ordering said plurality of Fourier series comprises sampling and modulating at least two of said plurality of Fourier series with at least two filters from a set of filters.

225. A method according to claim 224, wherein said at least two filters comprises a time delayed Gaussian filter in time domain.

226. A method according to claim 221, wherein said step of associating ones of said plurality of Fourier series comprises coupling said plurality of Fourier series based on a probability distribution.

227. A method according to claim 221, wherein said probability distribution is a Poissonian distribution.

228. A method according to claim 221, wherein said coupling is based on a spectral similarity of said plurality of Fourier series.

229. A method according to claim 221, wherein said probability operand is selected from the group of one and zero.

230. A method according to claim 229, wherein said desired value is one.

231. A system for recognizing a pattern in information comprising data using a computer comprising a memory, the system comprising:
  an input layer operable to receive said data at the computer, wherein said data comprises information representative of one or more physical characteristics or one or more representations of physical characteristics within a physical context of an item of interest, and to encode said received data as parameters of a plurality of Fourier series in Fourier space, said plurality of Fourier series including input context of said data;
  a memory comprising a set of initial ordered Fourier series;
  an association layer operable to add associated Fourier series together to form a string using the computer;
  an ordering layer operable to order said string based on relative degree of association of order formatted subsets of said string with relevant aspects of characteristics with respect to at least one of said initial ordered Fourier series to form an ordered string using the computer; and
  a predominant configuration layer for receiving said ordered string using the computer and for assigning an activation probability parameter to each of said plurality of Fourier series using the computer to produce a predominant configuration string, generating a probability operand based on said activation probability parameter using the computer, said probability operand determining whether an activation of any one of said plurality of Fourier components and said plurality of Fourier series is to cause an activation of an associated another one of said plurality of Fourier components or Fourier series, wherein the memory stores said predominant configuration string, said predominant configuration string allowing a determination of a relative association of a newly inputted information to said inputted information already processed, thereby recognition of a pattern in said information can be recognized.

232. A system according to claim 231, wherein said association layer is operable to associate Fourier series based on a spectral similarity between one another.

233. A system according to claim 231, wherein said probability operand is determined based on a historical value of said activation probability parameter and an activation rate of respective Fourier series.

234. A system according to claim 231, wherein said information context is encoded in time as delays corresponding to modulation of each Fourier component and Fourier series at corresponding frequencies.

235. A computer-implemented method of recognizing a pattern in information comprising data, the method comprising utilizing a computer comprising a processor to perform the steps:
   providing an input layer operable to receive data, said data comprising said information, said information representative of one or more physical characteristics or one or more representations of physical characteristics within a physical context of an item of interest;
   providing an association layer operable to add associated portions of said data together to form a string;
   providing an ordering layer operable to order said string based on a relative degree of association of order formatted subsets of said string with relevant aspects of information of a standard string to form an ordered string;
   providing a predominant configuration layer operable to receive a plurality of ordered strings to form a complex ordered string therefrom;
   assigning, using said processor, an activation probability parameter to each of said input layer, said association layer, said ordering layer and said predominant configuration layer, said activation probability parameter being determined based on a historical value of said activation probability parameter and an activation rate of respective ones of said input layer, said association layer, said ordering layer and said predominant configuration layer;
   generating a probability operand based on the activation probability parameter using said processor;
   activating, using said processor, one or more of said input layer, said association layer, said ordering layer, said predominant configuration, said ordering layer, said predominant configuration layer, and said association layer if said probability operand has a desired value, whereby a pattern in said information is recognized according to a historical associative pattern in said data; and
   storing said pattern in a memory of said computer.

236. A method according to claim 235, wherein said step of providing an ordering layer comprises ordering said string according to a plurality of associations between the information of the order formatted subsets of said string and at least one ordered Fourier series from a high level memory.

237. A method according to claim 235, wherein said step of providing an input layer comprises providing an input layer operable to encode said received data as parameters of a plurality of Fourier series in Fourier space.

238. A method according to claim 235, wherein said step of providing an association layer comprises providing said association layer to associate Fourier series based on a spectral similarity between one another.

239. A method according to claim 235, wherein said probability operand has a binary value of one and zero, and said desired value is one.

240. A computer readable medium having stored thereon a computer program to implement a method of recognizing a pattern in information comprising data using a computer, said computer program comprising a plurality of codes for executing the steps of:
   encoding, using the computer, said data as parameters of a plurality of Fourier components in Fourier space, wherein said information comprising said data represents one or more physical characteristics or one or more representations of physical characteristics within a physical context of an item of interest;
   adding, using the computer, said plurality of Fourier components together to form a plurality of Fourier series in Fourier space, said plurality of Fourier series representing inputted information;
   sampling, using the computer, at least one of said plurality of Fourier series in Fourier space with a filter to form a sampled Fourier series;
   modulating, using the computer, said sampled Fourier series in Fourier space with said filter to form a modulated Fourier series;
   determining, using the computer, a spectral similarity between said modulated Fourier series and another one of said plurality of Fourier series;
   determining, using the computer, a probability expectation value based on said spectral similarity;
   generating, using the computer, a probability operand based on said probability expectation value;
   adding, using the computer, said modulated Fourier series and said another Fourier series, if said probability operand has a desired value, to form a string of Fourier series in Fourier space, said string representing an association between Fourier series to thereby allow recognition of a pattern in the information; and
   storing said string in a memory of the computer wherein the computer readable medium is a non-transitory computer readable medium.

241. A computer-readable medium according to claim 240, further comprising storing said string of Fourier series to a memory.

242. A computer-readable medium according to claim 240, wherein said probability operand has a value selected from the set of one and zero.

243. A computer-readable medium according to claim 242, wherein said desired value is one.

244. A method for recognizing a pattern in information and establishing an order formatted pattern in information with respect to standard ordered information, the method performed in a computer and comprising:
   a.) obtaining, using the computer, a string comprising a sum of Fourier series from a computer memory, said string representing information that represents a one or more physical characteristics or one or more representations of physical characteristics within physical context of an item of interest;
   b.) selecting, using the computer, at least two filters from a selected set of filters;

c.) sampling, using the computer, the string with the filters such that each of the filters produces a sampled Fourier series, each Fourier series comprising a subset of the string;

d.) modulating, using the computer, each of the sampled Fourier series in Fourier space with the corresponding selected filter such that each filter produces an order formatted Fourier series;

e.) adding, using the computer, the order formatted Fourier series produced by each filter to form a summed Fourier series in Fourier space;

f.) obtaining, using the computer, an ordered Fourier series from the memory;

g.) determining, using the computer, a spectral similarity between the summed Fourier series and the ordered Fourier series;

h.) determining, using the computer, a probability expectation value based on the spectral similarity;

i.) generating, using the computer, a probability operand based on the probability expectation value;

j.) repeating steps b-i until the probability operand has a desired value, when said probability operand has a desired value a pattern in information has been recognized and an order formatted pattern in the information has been established;

k.) storing the summed Fourier series to an intermediate memory;

l.) removing the selected filters from the selected set of filters to form an updated set of filters;

m.) removing the subsets from the string to obtain an updated string;

n.) selecting an updated filter from the updated set of filters;

o.) sampling the updated string with the updated filter to form a sampled Fourier series comprising a subset of the string;

p.) modulating the sampled Fourier series in Fourier space with the corresponding selected updated filter to form an updated order formatted Fourier series;

q.) recalling the summed Fourier series from the intermediate memory;

r.) adding the updated order formatted Fourier series to the summed Fourier series from the intermediate memory to form an updated summed Fourier series in Fourier space;

s.) obtaining an updated ordered Fourier series from the high level memory;

t.) determining a spectral similarity between the updated summed Fourier series and the updated ordered Fourier series;

u.) determining a probability expectation value based on the spectral similarity;

v.) generating a probability operand based on the probability expectation value;

w.) repeating steps n-v until the probability operand has a desired value or all of the updated filters have been selected from the updated set of filters, when the probability operand has a desired value a pattern in information has been recognized and an order information pattern in the information has been established;

x.) if all of the updated filters have been selected before the probability operand has a desired value, then clearing the intermediate memory and returning to step b;

y.) if the probability operand has a desired value, then storing the updated summed Fourier series to the intermediate memory;

z.) repeating steps l-y until one of the following set of conditions is satisfied: the updated set of filters is empty, or the remaining subsets of the string of step m.) is nil; and aa.) storing the Fourier series in the intermediate memory in the high level memory, said updated summed Fourier series representing said plurality of Fourier series in said strings ordered according to a plurality of associations between the information of the plurality of order formatted subset Fourier series and the at least one ordered Fourier series from high level memory.

245. A method according to claim 244, wherein information is represented by a sum of Fourier series in Fourier space.

246. A method according to claim 244, further comprising encoding data which includes modulating at least one of said Fourier components to provide an input context.

247. A method according to claim 244, wherein inputted information comprises data and an input context, said input context mapping on a one to one basis to a physical context, said physical context being a relationship between physical characteristics represented by said inputted information.

248. A method according to claim 244, wherein each Fourier component of said at least one Fourier series comprises a quantized amplitude, a frequency, or a phase angle.

249. A computer readable medium having stored thereon a computer program to implement a method of recognizing a pattern in information comprising data and establishing an order formatted pattern in the information, said computer program comprising a plurality of codes for executing the steps of:

providing an input layer operable to receive data, said information comprising said data representative of one or more physical characteristics or one or more representations of physical characteristics within a physical context of an item of interest;

providing an association layer operable to add associated portions of said data together to form a string;

providing an ordering layer operable to order said string based on a relative degree of association of order formatted subsets of said string with relevant aspects of information of a standard string to form an ordered;

providing a predominant configuration layer operable to receive a plurality of ordered strings to form a complex ordered string therefrom;

assigning an activation probability parameter to each of said input layer, said association layer, said ordering layer and said predominant configuration layer, said activation probability parameter being determined based on a historical value of said activation probability parameter and an activation rate of respective ones of said input layer, said association layer, said ordering layer and said predominant configuration layer;

generating a probability operand based on the activation probability parameter;

activating one or more of said input layer, said association layer, said ordering layer, said predominant configuration, said ordering layer, said predominant configuration layer, and said association layer if said probability operand has a desired value, whereby a pattern in said information is recognized according to a historical associative pattern in said data; and displaying said pattern on a display device wherein the computer readable medium is a non-transitory computer readable medium.

250. A computer readable medium according to claim 249, wherein said input layer is operable to encode said received data as parameters of a plurality of Fourier series in Fourier space.

251. A computer readable medium according to claim 249, wherein said association layer is operable to associate ones of said plurality of Fourier series based on a spectral similarity between one another.

252. A computer readable medium according to claim 249, wherein said probability operand has a binary value of one or zero.

253. A computer readable medium according to claim 252, wherein said desired value is one.

254. A computer program product for use in a system for recognizing a pattern in information comprising data, said computer program product comprising:
a computer readable medium having stored thereon program code means, said program code means comprising:
means for receiving data from a transducer at a computer, and to encode said received data as parameters of a plurality of Fourier series in Fourier space, said plurality of Fourier series including input context of said data, wherein said information comprising said data represents one or more physical characteristics or one or more representations of physical characteristics within a physical context of an item of interest;
means for associating Fourier series together to form a string using the computer,
means for ordering said string based on a relative degree of association of order formatted subsets of said string with relevant aspects of information of a standard string to form an ordered string using the computer;
means for forming a complex ordered string from a plurality of ordered strings, said complex ordered string representing a historical association and order of processed and stored information to thereby allow recognition of a pattern in information using the computer; and
means for storing said complex ordered string in a memory wherein the computer readable medium is a non-transitory computer readable medium.

255. A computer program product according to claim 254, further comprising storing said complex ordered string in high level memory.

256. A computer program product according to claim 255, wherein said means for associating is operable to associate ones of said plurality of Fourier series based on a spectral similarity between one another.

* * * * *